US005455902A

United States Patent [19]

Ellson et al.

[11] Patent Number: 5,455,902
[45] Date of Patent: Oct. 3, 1995

[54] METHOD AND APPARATUS FOR PERFORMING REAL-TIME COMPUTER ANIMATION

[75] Inventors: Richard N. Ellson; Lawrence A. Ray, both of Rochester, N.Y.; Marc Olano, Chapel Hill, N.C.

[73] Assignee: Eastman Kodak Company, Rochester, N.Y.

[21] Appl. No.: 631,991

[22] Filed: Dec. 21, 1990

[51] Int. Cl.⁶ ............................................. G06T 15/70
[52] U.S. Cl. ............................................. 395/152; 364/578
[58] Field of Search ................................ 395/152, 133, 395/134, 135, 136, 137, 138, 919, 920, 921; 340/725; 345/122; 364/509, 510, 578

[56] References Cited

U.S. PATENT DOCUMENTS

| | | | |
|---|---|---|---|
| 4,210,964 | 7/1980 | Rogers et al. | 364/578 |
| 4,398,189 | 8/1983 | Pasierb, Jr. et al. | 340/725 |
| 4,549,275 | 10/1985 | Sakonick | 340/725 |
| 4,590,465 | 5/1986 | Fuchs | 340/723 |
| 4,604,718 | 8/1986 | Norman et al. | 364/578 |
| 4,628,470 | 12/1986 | Baumann | 395/134 |
| 4,639,223 | 1/1987 | Keller, Jr. | 434/272 |
| 4,688,181 | 8/1987 | Cottrell et al. | 395/133 |
| 4,689,616 | 8/1987 | Goude et al. | 340/725 |
| 4,757,461 | 7/1988 | Stöhr et al. | 395/138 |
| 4,783,649 | 11/1988 | Fuchs et al. | 340/725 |
| 4,809,065 | 2/1989 | Harris et al. | 395/133 |
| 4,819,192 | 4/1989 | Kuragano et al. | 395/134 |
| 4,953,107 | 8/1990 | Hedley et al. | 395/152 |
| 4,962,465 | 10/1990 | Saito et al. | 395/136 |
| 4,965,752 | 10/1990 | Keith | 395/138 |
| 5,101,364 | 3/1992 | Davenport et al. | 395/152 |
| 5,151,856 | 1/1992 | Halmann et al. | 364/413.03 |

OTHER PUBLICATIONS

Hibbard, W., "Visualizing Large Data Sets in the Earth Sciences", Computer vol. 22 No. 8 (Aug. 1989) pp. 53–57.
Bancroft, G. V., "Scientific Visualization in Computational Aerodynamics at NASA Ames Research Center", Computer vol. 22 No. 8 (Aug. 1989) pp. 89–95.
Bancroft, G., "3-D Graphics Applications in Fluid Flow Simulations", IEEE Computer Society Press (1988) pp. 142–147.
*Applications of Computer Aided Engineering in Injection Molding*, ed. Louis T. Manzione, Hanser Publications, New York: Macmillan, 1987, Chapter 7 "C-Flow: a CAE Package with High–Level Interface Graphics", Wang et al.
"Visualization of Injection Molding", R. Ellson and D. Cox, Simulation, vol. 51, No. 5, Nov., 1988.

*Primary Examiner*—Heather R. Herndon
*Assistant Examiner*—N. Kenneth Burraston
*Attorney, Agent, or Firm*—Edward Dugas

[57] ABSTRACT

A method and apparatus for performing real-time computer animation of data used to simulate physical phenomena is disclosed. The animation system generates floating point geometrical element simulation data and byte width variable simulation data with a processing unit. The floating point geometrical simulation data is supplied to a graphics processor which generates element transformation matrices. The variable simulation data is applied to each of the element transformation matrices by the graphics processor to generate a plurality of layer transformation matrices. The layer transformation matrices are then applied to a stock piece-wise polygonal surface to generate a plurality of layer elements. The layer elements are displayed on a graphics display unit in real-time in the form of glyphs which animate the physical phenomena.

8 Claims, 12 Drawing Sheets

FIG. 15

METHOD AND APPARATUS FOR PERFORMING REAL-TIME COMPUTER ANIMATION

TECHNICAL FIELD

The invention relates generally to the field of computer animation. More specifically, the invention relates to a method and apparatus for providing real-time computer animation of physical simulation data generated by computer-aided design systems in order to model a physical phenomena.

BACKGROUND ART

Advancements in computer-aided design technology have led to systems that enable engineers to run simulations that test the physical properties of parts or systems. The ability to run simulations of the physical properties of the parts or systems prior to their the actual manufacture or implementation enables the engineer to identify potential design flaws or deficiencies during the design process. Simulations can be run, for example, to determine when and where a mechanical part will fail under load conditions, thereby enabling the engineer to strengthen or modify the part during the design process to improve its performance.

In addition to the analysis of completed parts, simulations of physical processes are also useful to identify potential problems in the manufacturing process. Injection molding, for example, is a physical process that would benefit by the application of computer simulation technology. The injection molding process consists of three stages; filling a mold with plastic under high pressure; holding and compressing the plastic into the mold; and solidifying the plastic in the mold. The process is particularly useful for manufacturing thin walled structures with complicated shapes. Many problems, however, can occur during the molding process such as a premature solidification of plastic in a part of the mold which blocks the flow of plastic into adjacent regions.

A detailed understanding of physical flow of the plastic through the mold is an essential element in mold design to avoid such problems. Traditionally, the mold designer had to design parts without the benefit of having data that simulated the dynamics involved in the molding process. Thus, the mold designer was required to rely on time consuming physical tests of a series of prototype molds to determine if parts manufactured by the molds were of sufficient quality. Adjustments to the mold design were made based on the results obtained from the prototype molds on a trial and error basis and mold design tended to be more of an art than science.

More recently, computer simulations of the molding process have been devised over the past fifteen years that enable the mold designer to simulate the flow of plastic through the mold during the design process. Cornell University of Ithaca, N.Y., for example, has maintained an ongoing research project in cooperation with the National Science Foundation, designated the Injection Molding Project, directed to computer-aided design of injection molds. The progress and results of the Injection Molding Project have been published in a series of progress reports. See generally, Injection Molding Project, Progress Reports Nos. 1–14, Wang et al., Cornell University, 1975–1988, the contents of which are herein incorporated by reference, and in particular Progress Report 11 entitled "Computer-Aided Design and Fabrication of Molds and Computer Control of Injection Molding", Wang et al., April 1985, NSF Grant MEA-8200743, Progress Report 12 entitled "Integration of CAD/CAM for Injection-Molded Plastic Parts:, by Wang et al., May 1986, NSF Grant DMC-8507371, and Progress Report 13 entitled "Integration of CAD/CAM for Injection-Molded Parts", by Wang et al., June 1987, NSF Grant DMC-8507371.

The results of the research project has yielded a computer aided engineering package referred to as the Cornell Injection Molding Program (CIMP) that enables the mold designer to simulate flow characteristics of the plastic through a mold design. Further development work based on the research done at Cornell has also produced commercially available software packages such as C-FLOW, an extension of the CIMP developed by Advanced CAE Technology, (See generally, *Applications of Computer Aided Engineering in Injection Molding*, ed. Louis T. Manzione, Hanser Publications, New York:Macmillian, 1987, the contents of which are herein incorporated by reference, and specifically Chapter 7 entitled "C-Flow: a CAE Package with High-Level Interface Graphics", by Wang et al.). With the aid of computer simulations, the mold designer is able to make modifications to the mold design during the design process without having to produce prototype molds, thereby significantly reducing the time required to finalize the mold design and produce production molds.

While computer packages have been developed that permit the mold designer to generate simulation data as noted above, the simulation data generated by such packages often contains large data sets having many parameters, i.e., multi-variable data, which is difficult to present in a format that can be readily interpreted by the mold designer. Conventional methods for presenting multi-variable data include the use of contour plots and three-dimensional surface elevation maps, for example a geological survey map, which plot elevation and surface type over a two-dimensional surface by the use of color and contour lines. Another approach is to use symbols, called glyphs, which represent data at sample points. See, *Glyphs Getting the Picture*, W. Sacco et al., Janson Publications, Inc., Providence, R.I., 1987.

The application of glyphs to present injection mold simulation data is discussed in detail in an article entitled "Visualization of Injection Molding", by R. Ellson and D. Cox, Simulation, Vol. 51, No. 5, November, 1988, incorporated herein by reference. A multi-layer glyph is used to represent the simulation data at various points in the mold during the molding process. The shape of the glyph is modified to reflect changes in the flow rate of the plastic. The temperature of the plastic is represented by the coloring of various layers of the glyph. The pressure of the plastic is represented by the coloring of a base plane of the glyph. The simulation data is processed to generate a plurality of image frames illustrating, through the use of the glyphs, the flow of the plastic through the mold. Once all of the frames are generated, a moving animation of the plastic flow can be generated by displaying the plurality of image frames in sequence.

The presentation of simulation data in the forms of glyphs as described above represents a vast improvement over conventional two-dimensional graphical presentation methods. Unfortunately, the mold designer is not able to view the animation of the plastic flow in real-time as a significant amount of processing capacity and time is required to generate pictorial representations, i.e., image frames, of the multi-variable data in easily comprehensible forms such as glyphs. For example, the system described by Ellson and Cox cited above requires about eight minutes to generate the image data for a single frame using a mini-supercomputer. A typical animation may includes one hundred animation frames. Accordingly, the generation of the image data for the animation frames alone takes between 13 and 14 hours. Additional time is required to generate a moving animation by linking the frames together. Thus, the mold designer must run the simulation program and wait several days before a moving animation of the physical phenomena can be viewed.

The primary drawbacks to achieving real-time animation are found in the basic approach taken by conventional systems to generate and display the simulation data. Conventional injection mold simulation programs as mentioned above, for example, divide the mold into a number of geometric elements represented by floating point data and characterize the flow of plastic through the geometric elements with variables, such as velocity, temperature, pressure, etc., that are also represented as floating point data. Animation processes of the type described above have centered on the generation of a list of polygons, based on the geometrical and variable floating point data, that are used to create an image frame of the physical process for each step in time.

Each image frame generated by the animation process may contain over a hundred thousand polygons. The polygons are represented by a number of vertices (3 or 4) having three-dimensional coordinates that relate to the location of the polygon within the mold cavity. The shear volume and complexity of processing the floating-point data used to generate the tens of thousands of polygons required to construct each image frame in real-time is beyond the capability conventional computer processing equipment, such as stand alone engineering workstations, that are available to the average mold designer.

Real-time animation is technically possible, of course, if large dedicated supercomputers were used to perform the processing of the floating-point data in the above-described manner. The average mold designer, however, does not have access to such computing power. Thus, even after the generation of the simulation data is complete, the mold designer must wait a significant period of time to view the simulation data in a comprehensible form.

In view of the above, it is an object of the invention to provide a method and apparatus for performing real-time computer animation that would enable the mold designer to view the animation of the simulation data in real-time, thereby enabling the mold designer to analyze the simulation data and make required corrections to modify the mold design in an efficient manner.

It is a further object of the invention to provide a method and apparatus for performing real-time computer animation that is economical and therefore readily available to the average designer.

It is an additional object of the invention to provide a method and apparatus for performing real-time computer animation of a physical phenomena that permits a user to modify the animation display.

SUMMARY OF THE INVENTION

The present invention provides a method and apparatus for performing real-time computer animation of data used to simulate physical phenomena. More specifically, a real-time animation system is provided that generates floating point geometrical element simulation data and byte width variable simulation data with a processing unit. The floating point geometrical simulation data is supplied to a graphics processor which generates element transformation matrices. The variable simulation data is applied to each of the element transformation matrices by the graphics processor to generate a plurality of layer transformation matrices. The layer transformation matrices are then applied to a stock piece-wise polygonal surface to generate a plurality of layer elements. The layer elements are displayed on a graphics display unit in real-time in the form of glyphs which animate the physical phenomena.

The animation system also includes a direct user interface that permits a user of the system to vary the presentation of the animation display. For example, the user may alter the viewpoint or perspective from which an observer views the animation display by rotating and translating the glyph representation presented on the graphics display unit. The user can also utilize the user interface to recall the specific data that was used to generate a particular glyph, thereby enabling the user to view the quantitative scalar values of the variable data. In addition, the user interface is employed to permit the user to define certain characteristics of the animation display including the size and aspect ratio of the glyphs and the frame rate at which the animation display runs. The user may also utilize the user interface to select variable ranges so that the animation display reflects only information regarding the physical phenomena that is within the selected variable ranges.

BRIEF DESCRIPTION OF THE DRAWINGS

With the above as background, reference should now be made to the following detailed description of the preferred embodiment and the accompanying drawings, wherein:

FIG. 15 illustrates how the option windows shown in FIG. 9–14 can be overlayed on a single frame displayed on the user interface display of the animation system illustrated in FIG. 1.

DETAILED DESCRIPTION OF THE PREFERRED EMBODIMENT

The invention is based on the recognition that data handling and processing in an animation system to generate an animation display of a physical phenomena can be greatly enhanced by defining a complex geometrical shape as a plurality of geometrical elements represented by floating point data, defining variations in the physical phenomena as it relates to the geometrical elements as byte width variable data, using a graphics processor to generate transformation matrices, and applying the transformation matrices to a standard geometrical display element to generate a plurality of glyphs which—when displayed on a graphics monitor—animate the physical phenomena. The invention is useful in modeling any type of physical phenomena that includes multi-variable data that is associated with complex geometrical configurations. It should therefore be understood, that while the invention will be discussed in detail with reference to its application to the animation of injection molding processes, the invention is not limited to the specific application set forth below.

Figure 1:
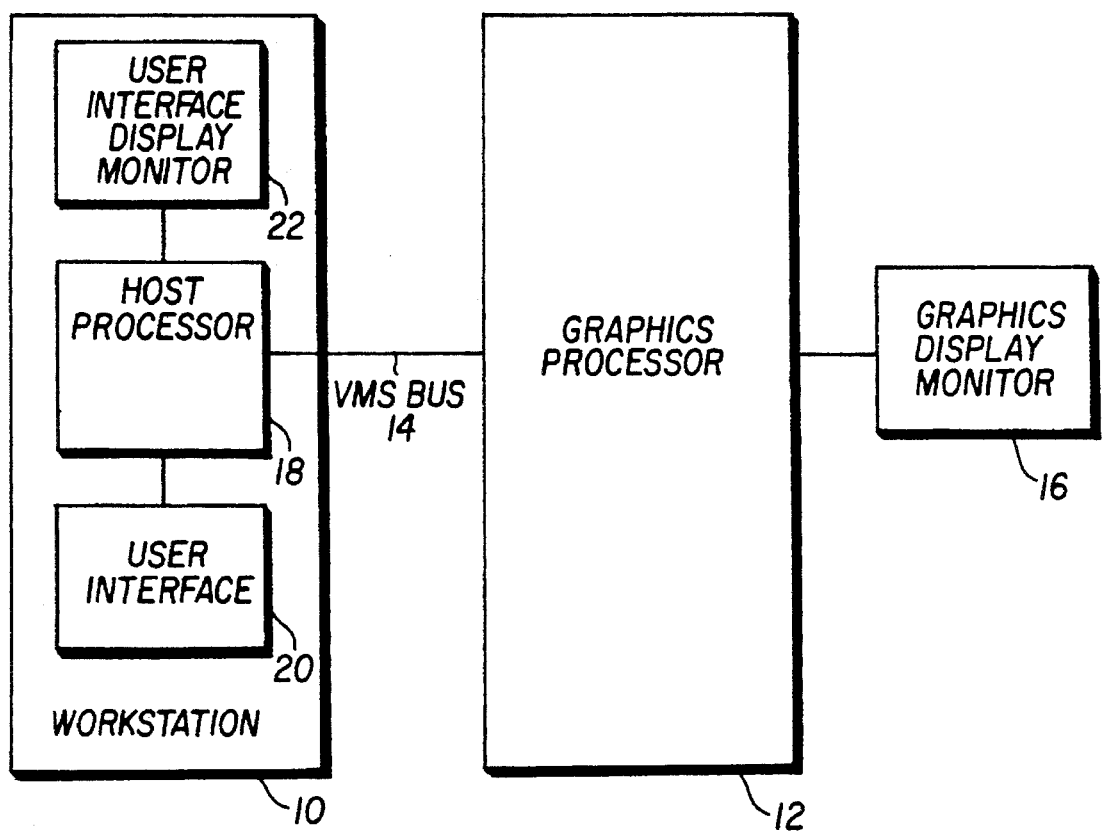
FIG. 1 is a basic block diagram of an animation system in accordance with the present invention.

Referring now to FIG. 1, a basic block diagram of a real-time animation system in accordance with the present invention is shown including a workstation 10 (for example a SUN 3/260 workstation available from Sun Microsystems Inc.), a graphics processor 12 (for example an AT&T PXM 900 Series Pixel Machine) coupled to the workstation 10 via a VME bus 14, and a high resolution graphics display monitor 16 coupled to the graphics processor 12. The workstation 10 includes a host processor 18, a user interface 20 (such as a keyboard, mouse, etc.), and a user interface display monitor 22. The host processor 18 and graphics processor 12 include memory units (not shown) in which operating programs and data files are stored. As will be described in greater detail below, the illustrated real-time animation system takes advantage of the ability of the graphics processor 12 to perform matrix additions and multiplications extremely rapidly.

In operation, a standard CAD/CAM software package is run on the workstation 10 to permit a user to define a mold cavity utilizing the user interface 20. The CAD/CAM package divides the defined mold cavity into a plurality of geometric elements in a conventional manner. A simulation program is then run on the workstation 10 to simulate the flow of plastic through each of the geometric elements. Simulation data generated by the simulation program is stored as a geometry file that contains floating-point data for each geometric element and a time step file that includes only variable data associated with changes in the physical properties of the plastic (such as temperature, pressure, speed, etc.) as it flows through the geometric elements.

The flow of the plastic through the geometric elements is actually broken down into a number of element layers. The data for the element layers of a given geometric element will be used to generate a corresponding multi-layer glyph of the type illustrated in FIG. 2. The glyph in FIG. 2 conveys information on the pressure, temperature and velocity of the plastic as it moves through a defined geometric element. Direction of flow is illustrated by the orientation of the glyph. The length of each glyph layer illustrates the speed of the plastic through that layer of the geometric element. The temperature of the plastic is illustrated by the coloring of the glyph layers. The pressure of the plastic is illustrated by the coloring of the base plane of the glyph. The data structure for the time step files which determine the shape, color and size of layers (n) of the glyphs (g) at various points in time (t) can be represented as follows:

```
Time (t)
    Glyph 1 = [pressure, velocity angle,
               speed 1, . . . speed n,
               temperature 1, . . . temperature n]
    Glyph 2 = [pressure, velocity angle,
               speed 1, . . . speed n,
               temperature 1, . . . temperature n]
                    :
    Glyph n = [pressure, velocity angle,
               speed 1, . . . speed n,
               temperature 1, . . . temperature n]
Time (t + 1)
    Glyph 1 = [pressure, velocity angle,
               speed 1, . . . speed n,
               temperature 1, . . . temperature n]
    Glyph 2 = [pressure, velocity angle,
               speed 1, . . . speed n,
               temperature 1, . . . temperature n]
                    :
    Glyph n = [pressure, velocity angle,
               speed 1, . . . speed n,
               temperature 1, . . . temperature n]
Time (t + 2)              :
```

The variable data representing each physical property is scaled to a single byte (an integer value between 0–255).

Floating-point numbers are not used to define the variable data, but are used to define the geometrical information in the geometry file for each of the elements (e) as illustrated below:

```
Element (e) = element_x_axis (x, y, z)
              element_y_axis (x, y, z)
              element_z_axis (x, y, z)
              element_center (x, y, z)
              vertex_1 (x, y, z)
              vertex_2 (x, y, z)
              vertex_3 (x, y, z)
              element thickness
```

Figure 3:
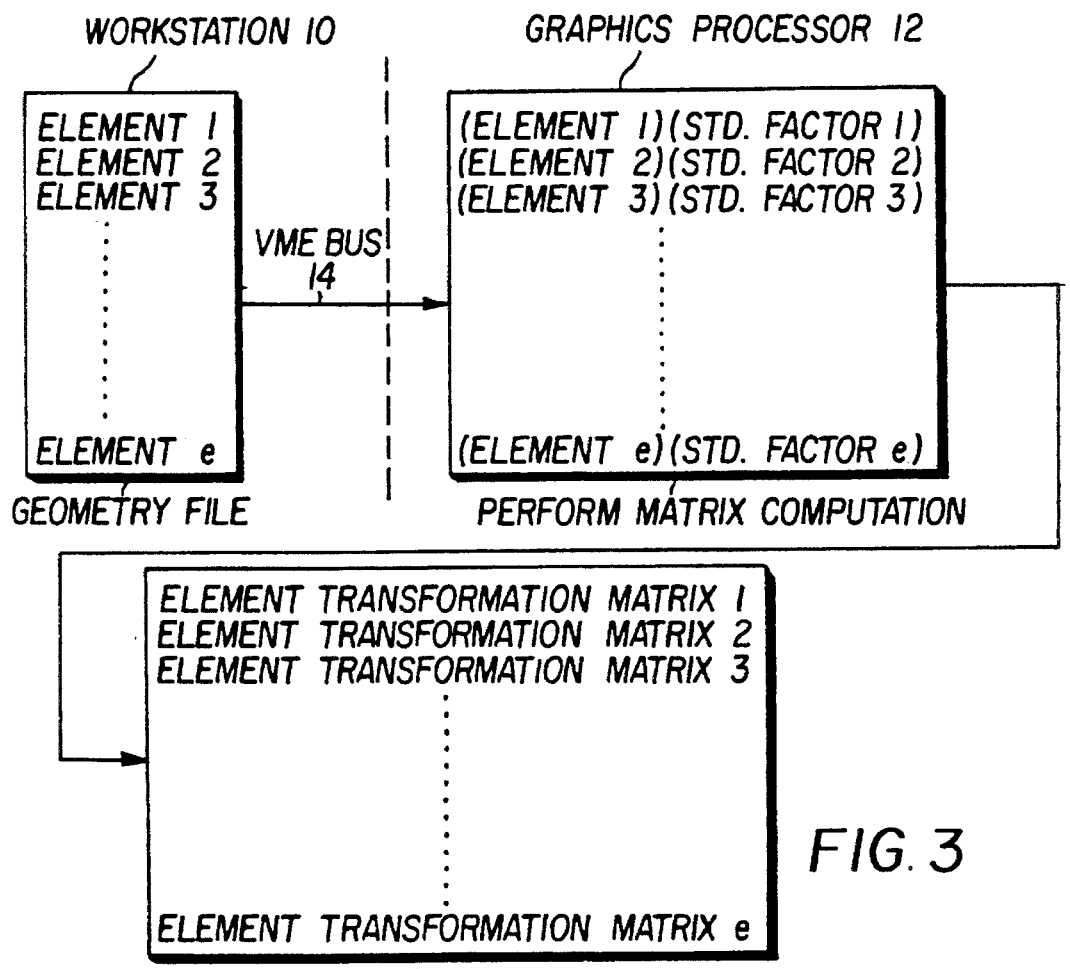
FIG. 3 is a block diagram representation of the generation of element transformation matrices from data contained in a geometry file.

The real-time animation system generates image frames in real-time through the use of transformation matrices constructed from the floating point data in the geometry and the byte width data in the time step files. At initialization of an animation program, the floating point data in the geometry file for each geometric element is multiplied by standard factors in order to generate a plurality of element transformation matrices that relate the data to a local coordinate system. More specifically, as illustrated in FIG. 3, the host processor 18 of the workstation 10 passes the floating point data in the geometry file corresponding to each of the elements to the graphics processor 12 over the VME bus 14. The graphics processor 12 performs matrix computations on the floating point geometry data to generate element transformation matrices that corresponds to each the geometric elements.

Figure 4:
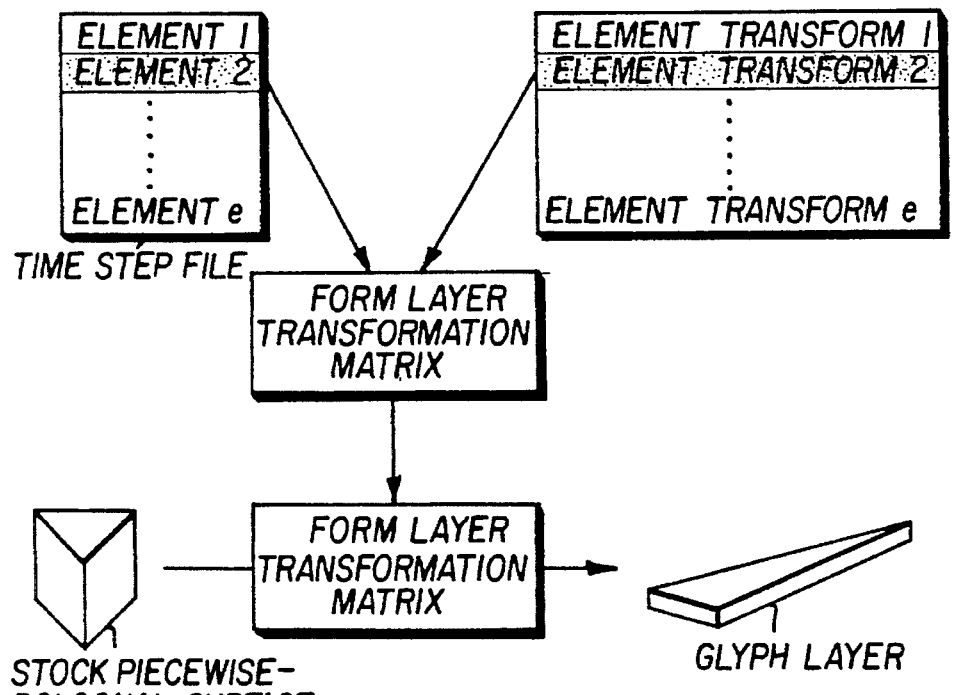
FIG. 4 is a block diagram representation of the generation of layer transformation matrices from the element transformation matrices and the generation of layer elements based on the layer transformation matrices.

A layer transformation matrix is then generated for each layer of the geometric elements. Referring now to the block diagram representation illustrated in FIG. 4, the host processor 18 recalls and passes the byte length variable data related to the first layer of the first geometric element, i.e, the data for Glyph 1, layer 1, to the graphics processor 12. The graphics processor 12 uses the variable data to modify the previously generated element transformation matrix for the first element to produce a layer transformation matrix for the first layer of the first element. The host processor 18 then sends a data representation of a stock piecewise-polygonal surface to the graphics processor 12. The graphics processor 12 applies the layer transformation matrix to the data representation of the stock piecewise-polygonal surface. The layer transformation matrix modifies the stock piecewise-polygonal surface to generate the first glyph layer of the glyph that corresponds to the first element and the first glyph layer is displayed on the graphics display monitor 16. The process is repeated until each layer of the first glyph has been generated and displayed. The graphics processor 12 then retrieves the element transformation matrix corresponding to the second element and the process is continued, i.e., the host processor 18 supplies the variable data for the first layer of the second element, the graphics processor 12 modifies the second element transformation matrix based on the variable data to form a first layer transformation matrix for the second element, and the host processor 18 supplies the stock polygon piece to the graphics processor 12 which modifies the stock polygon based on the first layer transformation matrix to generate the first layer of the second glyph. The overall process is continued until all of the glyphs for a given frame are generated and displayed. The process is then repeated for the next image frame.

Figure 2:
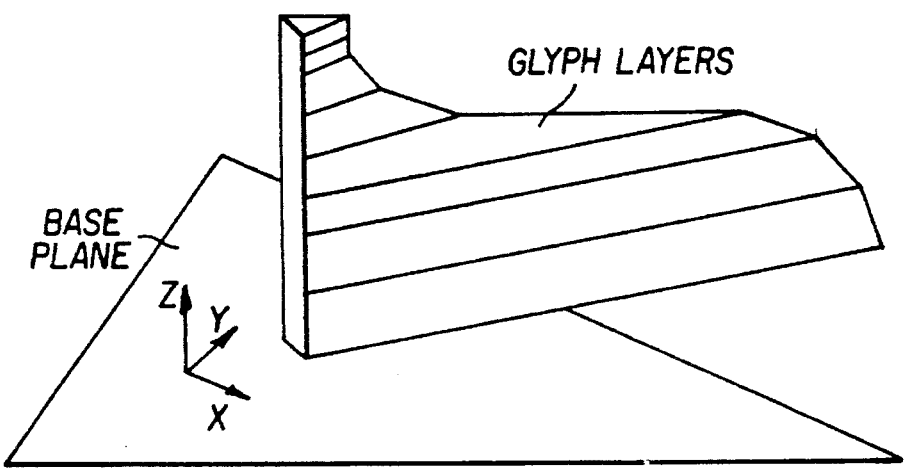
FIG. 2 illustrates a glyph that is used by the animation system illustrated in FIG. 1 to represent the physical characteristics of plastic as it flows through a mold cavity.
Figure 5:
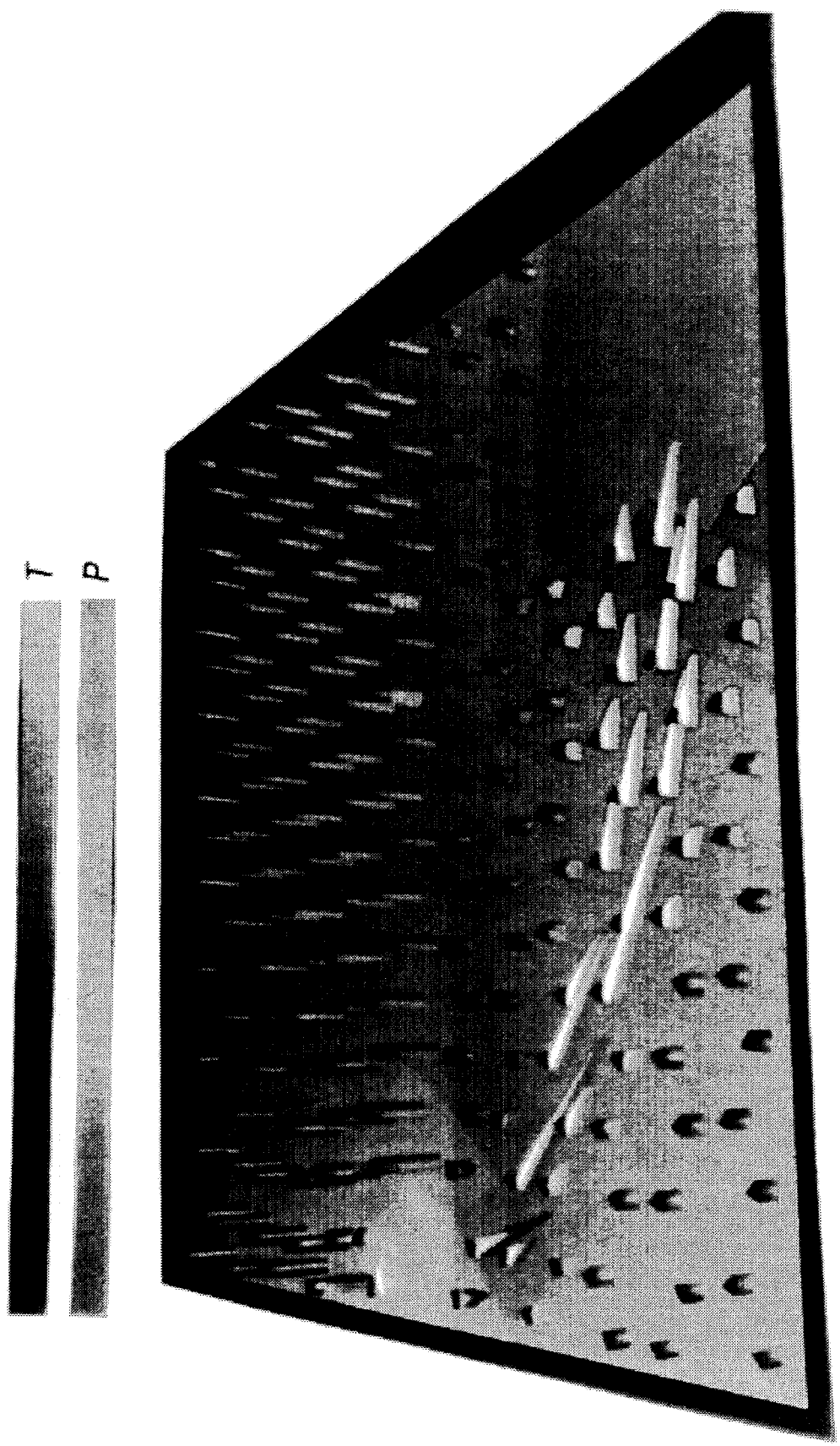
FIG. 5 is an illustration of a single image frame generated by the animation system illustrated in FIG. 1.

An example of one image frame that is displayed on the graphics display monitor 16 is shown in FIG. 5 (FIG. 5 is a representation of the color illustration of the image frame published as FIG. 2 of the article entitled "Visualization of Injection Molding" incorporated by reference above). The image frame represents a mold having two thicknesses. Temperature (T) and pressure (P) color bar graphs are provided above the mold animation. The back portion of the mold is the thicker portion and fills first. The filling of the thinner front portion of the mold produces high shear and the plastic flows along a curved path. The plastic flow is illustrated by the elongated glyphs.

After the initial display of several animation frames, the user may desire to change certain aspects of the animation display including the scaling of the glyphs or the view presented to the user. In addition, the user may wish to delete certain information from the animation display to more clearly illustrate certain aspects of the physical phenomena being modeled. For example, it may be desirable to animate only the plastic flow that is above certain temperatures or pressures. The illustrated animation system permits the user to enter certain user variables to change the aspect ratio, view presented to the user, etc., via the user interface 20. The user variables are supplied to the graphics processor 12 and are used to modify each of the element transformation matrices thereby changing the animation display.

In addition to the use of glyphs to convey data for each time step of the molding process, it is desirable to obtain information on the status of key scalar variable quantities such as material flow rate or pressure during the animation. The animation system permits the user, through the user interface 20, to select a specific glyph and display the variable quantities in the form of simple line graphs. Specifically, a cursor is displayed on the graphics display monitor 16 that the user utilizes to select a specific glyph. The variable information is displayed in the form of line graphs on the user interface display 22 simultaneously with the display of the animation on the graphics display monitor 16. A vertical line sweeps through the graphs as the animation progresses to give the user a time reference as well. While the animation of the plastic flow through the use of glyphs provides a convenient method to observe the dynamics of the process, the ability to see plots of key variables allows the user to observe time dependent variables as an aggregate.

Figure 6:
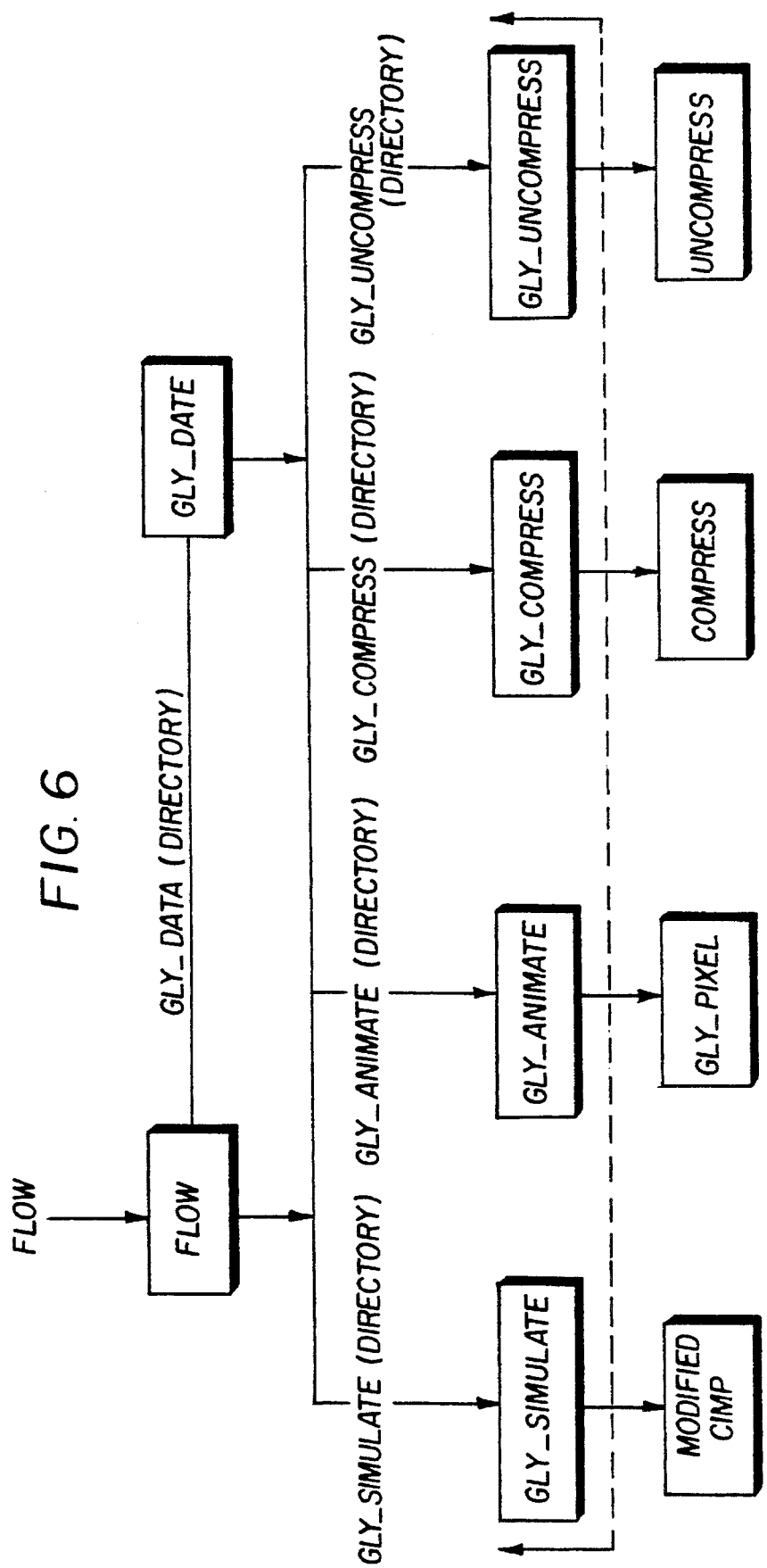
FIG. 6 is a general flow diagram of the operation of the animation system illustrated in FIG. 1.

A detailed explanation of a preferred implementation of the animation system in accordance with the present invention will now be discussed with reference to FIG. 6 which illustrates a general flow diagram of the operation of the animation system. As shown in FIG. 6, a routine called "flow" is run on the workstation 10. The flow routine displays a window of options that can be selected by the user via the user interface 20. The gly_simulate option permits the user to run a simulation program using a selected data file. The simulation program can be a modified version of the CIMP program which produces a geometry file containing floating point data and a time step file containing byte width variable data. Alternatively, a commercially available program, such as C-Flow, can be used to run the simulation and a conversion routine can then be used to convert the output files from the commercially available program to the desired geometry and time step files. The details of the conversion routine would depend, of course, on the particular simulation software that is selected. The output files generated by the simulation program are stored in a directory called gly_data in the memory unit of the workstation 10.

In order to increase the number of simulation output files that can be stored in the memory unit of the workstation, the user is also able to select a data compression option, gly_compress, which uses a conventional data compression routine to compress the simulation output files. The simulation output files must be uncompressed, however, before a real-time animation of the simulation data can be run. Thus, an option is provided, called gly_uncompress, that permits the user to uncompress previously compressed files.

Figure 7A:
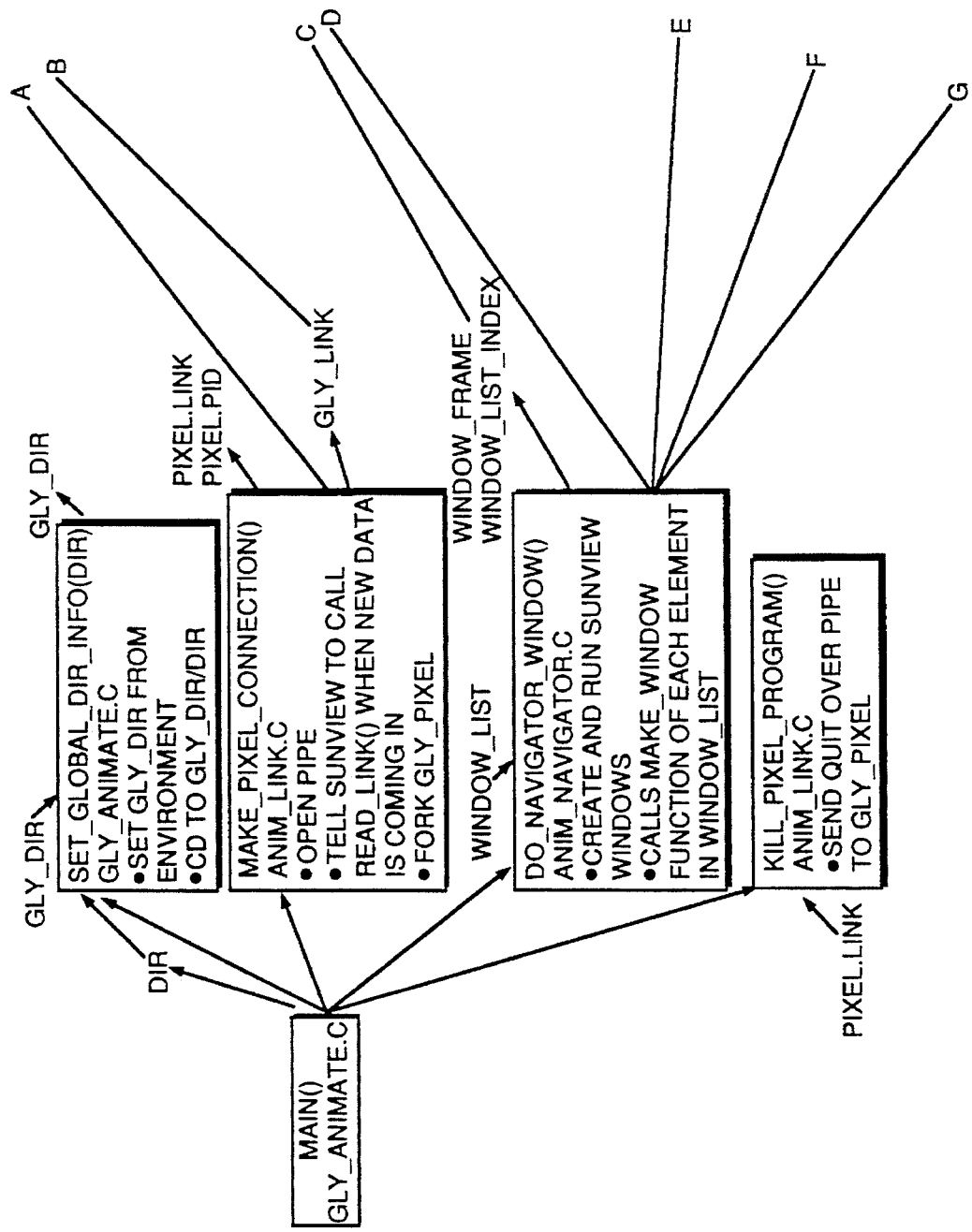
FIGS. 7A and 7B illustrate a detailed flow diagram of an animation program run on the workstation of the animation system illustrated in FIG. 1.
Figure 7B:
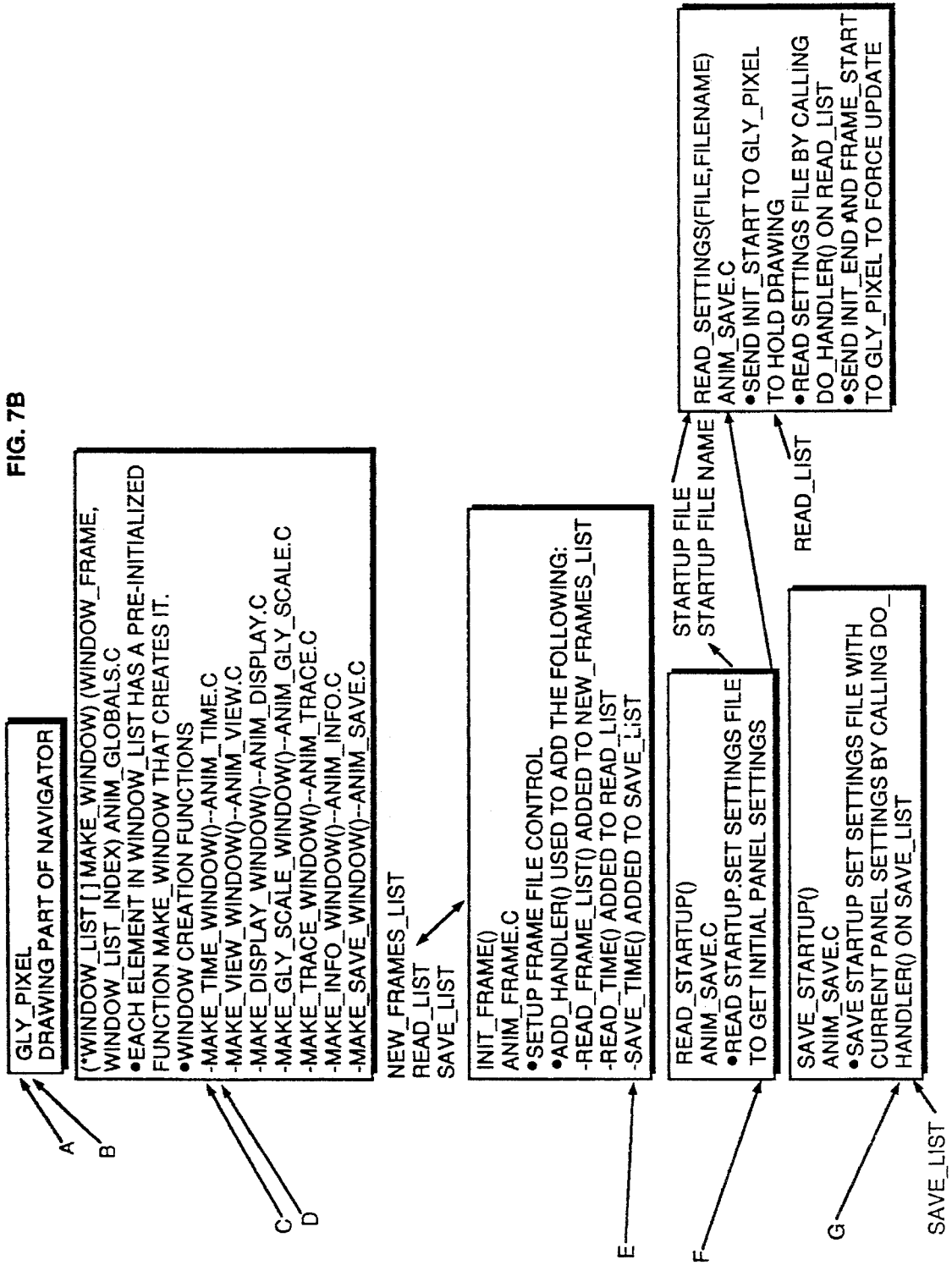
Figure 8:
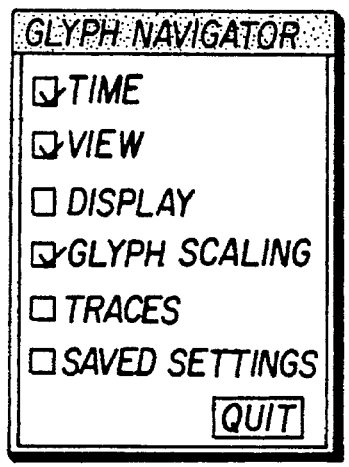
FIG. 8 illustrates a glyph "navigator" option window that is displayed on the user interface display of the animation system illustrated in FIG. 1.

A real-time animation of the simulation data is run by selecting the gly_animate option which permits the user to select and run an animation on one of the simulation output files stored in the gly_data directory. As shown in greater detail in FIGS. 7A and 7B, selection of the gly_animate option causes the workstation 10 to run the main animation program called gly_animate.c. Upon activation, the gly_animate.c routine establishes a link with the graphics processor 12 by running a routine called anim_link.c. A glyph "navigator" window is generated on the user interface display 22 by a routine called anim_navigator.c which calls a make window routine named anim_globals.c. The glyph navigator window, illustrated in FIG. 8, displays a series of options that can be selected by the user with the user interface 20. The anim_globals.c routine contains a number of subroutines that generate a series of option windows which correspond to the options listed in the glyph navigator window. Selection of an option causes the corresponding option window to be displayed on the user interface display 22.

Figure 9:
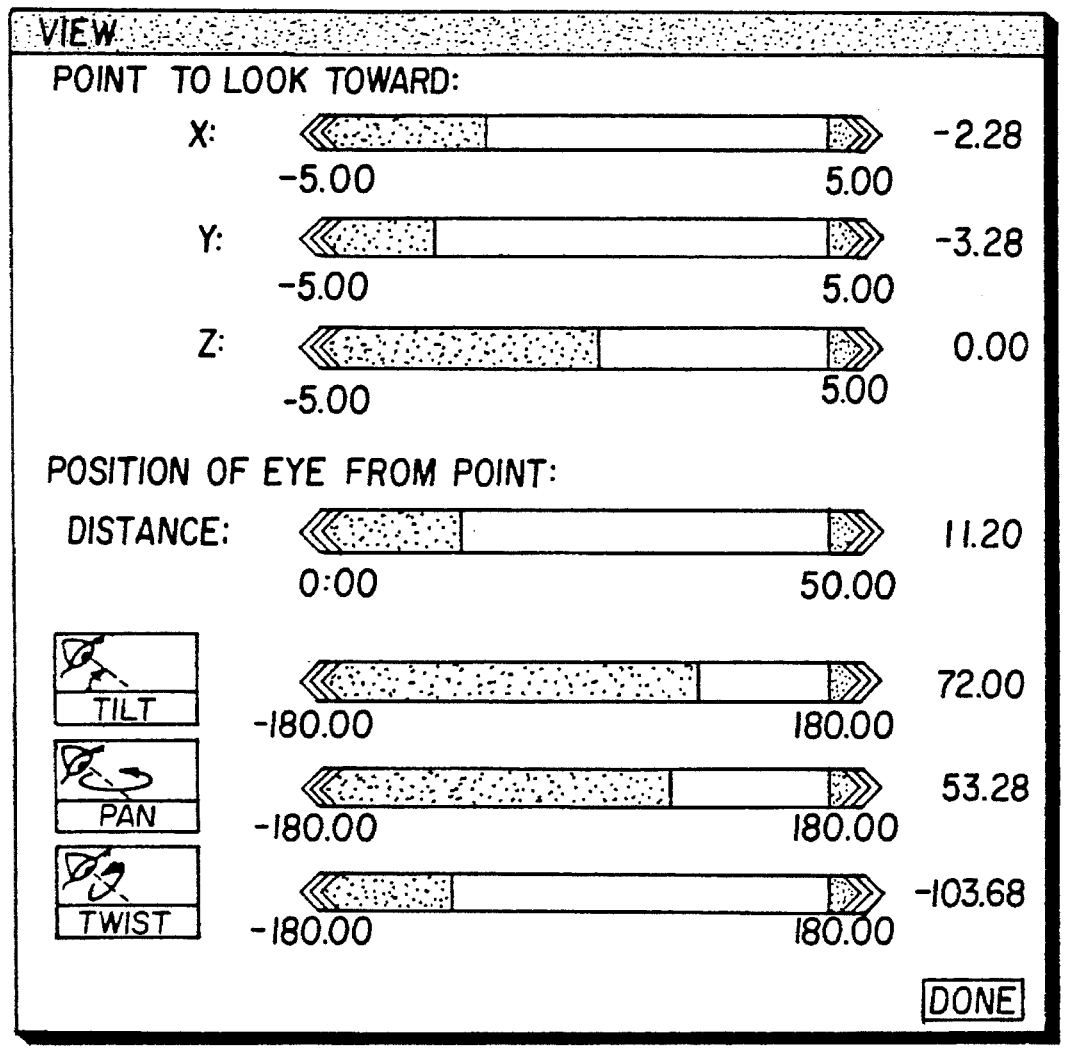
FIG. 9 illustrates a view option window that is displayed on the user interface display of the animation system illustrated in FIG. 1.

Selection of the "view" option causes the subroutine anim-view.c to generate and display a view option window (See FIG. 9) on the user interface display 22. The user utilizes the view option window to enter user variable data that defines how the glyph animation of a mold is to be displayed on the graphics display monitor 16 with respect to the viewer. Specifically, a series of sliders are displayed in the view option window that are used to define the coordinates (X,Y,Z) of a view point, the distance of the viewer's eye from the viewpoint, and tilt, pan and twist angles. The user selects the sliders using the user interface 20 and adjusts the listed variables as desired.

Figure 10:
FIG. 10 illustrates a display option window that is displayed on the user interface display of the animation system illustrated in FIG. 1.

The "display" option controls and limits the simulation data that is included in the animation display. The anim_display.c subroutine generates the display option view window illustrated in FIG. 10. Two sliders, velocity and temperature, are included in the display option view window. The user can select a desired temperature and velocity range, for example, so that only plastic flow at between a certain temperature and velocity range is included in the animation display. This allows the user to highlight particular areas of interest. Two check boxes are also included in the display option view window that permit the user to select the display of an empty mold or a transparent mold wall (outline) that is superimposed on the glyph animation.

Figure 11:
FIG. 11 illustrates a glyph scaling option window that is displayed on the user interface display of the animation system illustrated in FIG. 1.

The "scaling" option controls the dimensions of the glyphs incorporated in the animation display. The anim_gly_scale.c subroutine generates a glyph scaling option window (FIG. 11) that includes sliders which are used to set the length width and height of the glyphs. The scaling option permits emphasis of small flows while preventing large flows or fine meshes from becoming obscured.

Figure 12:
FIG. 12 illustrates a traces option window that is displayed on the user interface display of the animation system illustrated in FIG. 1.

The "traces" option displays two-dimensional graphs of scalar values such as gate pressure and flow rate. The anim_trace.c subroutine generates the traces option window illustrated in FIG. 12. The graphs are displayed on the user interface display 22 of the workstation 10.

Figure 13:
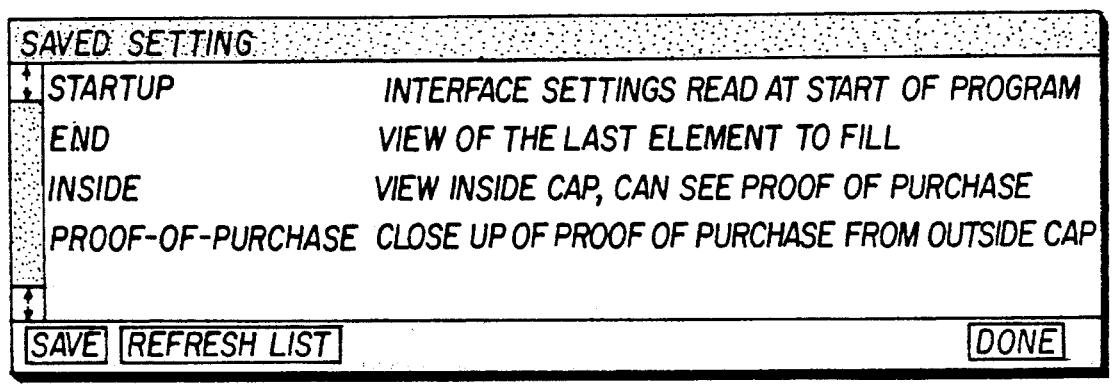
FIG. 13 illustrates a saved setting option window that is displayed on the user interface display of the animation system illustrated in FIG. 1.

The "saved settings" option permits the user to save a particular set of adjustments for future use or recall a previously saved set of adjustments. This permits the user, for example, to save preferred settings so that the same animation display can be run on simulation data based on a modified mold design. The anim_save.c subroutine generates the saved settings option window illustrated in FIG. 13.

Figure 14:
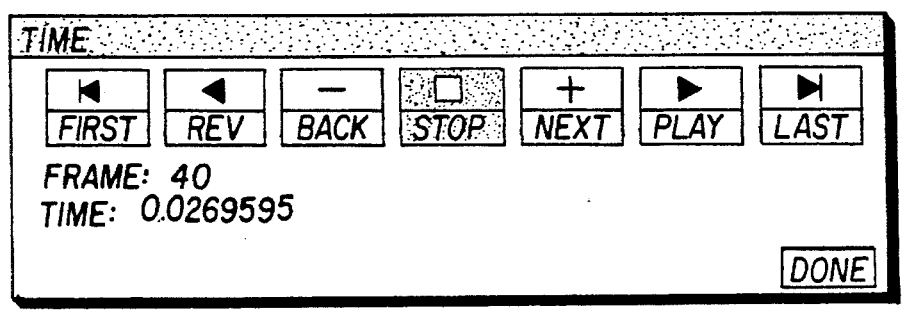
FIG. 14 illustrates a time option window that is displayed on the user interface display of the animation system illustrated in FIG. 1.

The "time" option controls the running of the animation display. The anim_time.c subroutine generates the time option window illustrated in FIG. 14. The time option window displays a set of "buttons" similar in arrangement to the operating controls of a VCR, that permit the user to continuously play the animation in forward or reverse modes, jump to the beginning or end, or step a single frame forward (+) or a single frame backward (−). The current simulation time and frame number are also displayed and can be changed via the user interface 20.

Figure 15:
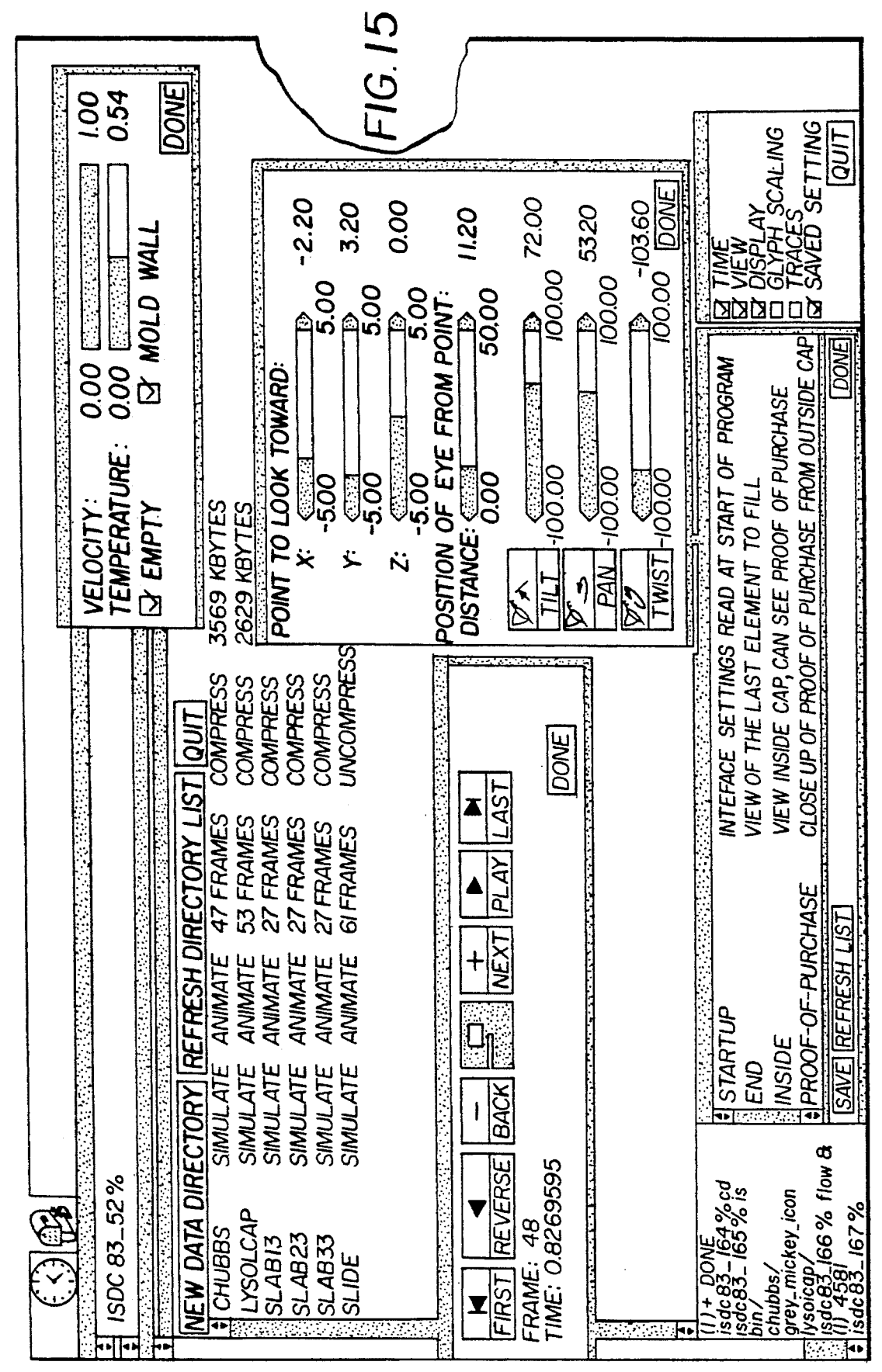

Each of the above-described option windows can be activated while the animation display is running, thereby enabling the user to alter the presentation of the animation display and the information contained therein in real-time. The windows for each of the options can also be overlayed in a conventional manner on a single display frame as shown in FIG. 15.

Figure 16A:
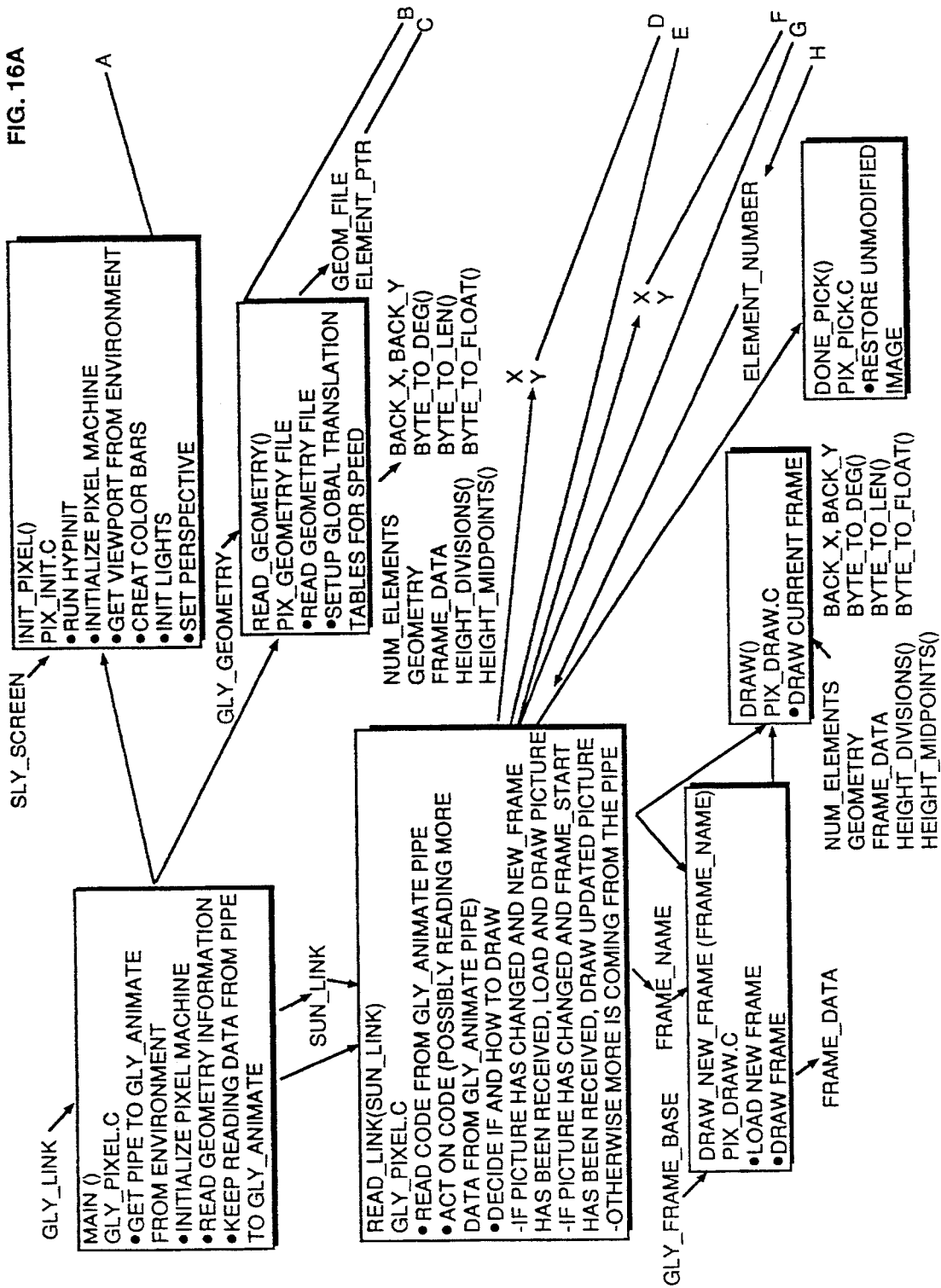
FIGS. 16A and 16B illustrate a detailed flow diagram of the gly_pixel routine that is run on the graphics processor of the animation system illustrated in FIG. 1.
Figure 16B:
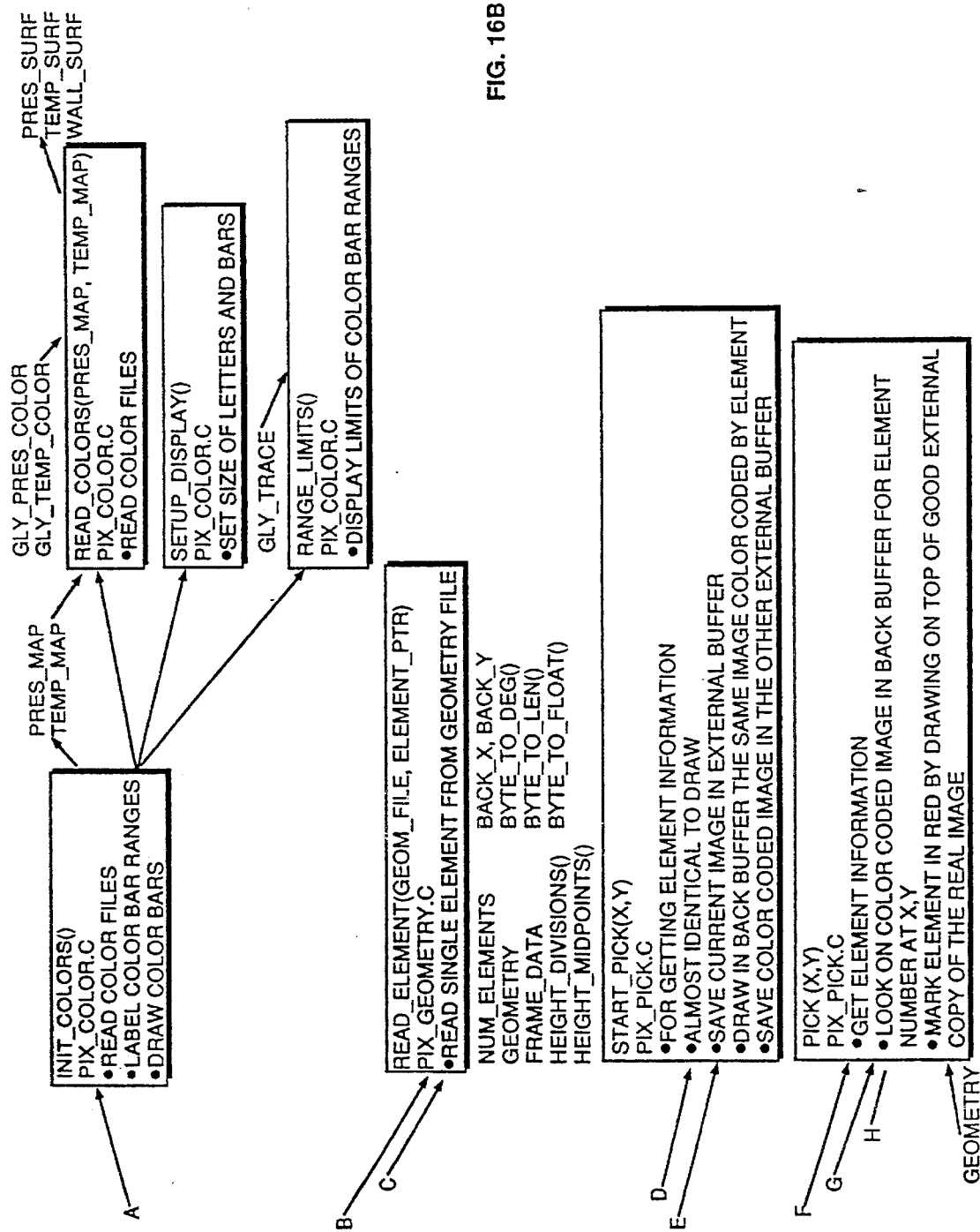

A detailed flow diagram of the operation of the graphics processor 12 is illustrated in FIGS. 16A and 16B. A routine called gly_pixel.c is used to receive information from the workstation 10 and generate the animation frames to be displayed on the graphics display monitor 16. The gly_pixel.c routine calls a screen initialization routine called pix_int.c that reads previously stored color files to generate temperature and pressure bar graphs that appear on the top of the animation frame (See FIG. 5). The colors for the time and pressure bar graphs are selected so that slight variations are easily detected by the human eye. A routine called pix_geometry.c reads the geometry file data from the workstation 10 and performs and generates the element transformations matrices. The generation of the layer transformation matrices and their application to the stock piece-wise polygon surface is accomplished with a routine called pix_draw.c.

As was stated previously, it is also desirable to select a particular glyph that is displayed in the animation display an in order to view the scalar variable data associated therewith. The selection and highlighting of a desired glyph is accomplished with a routine called pix_pick.c. Basically, an "element" option is displayed in the glyph "navigator" window. Selection of the window option generates a "joystick" window on the user interface display monitor 22. When the cursor for the workstation 10 is in the joy-stick window a cursor appears on the graphics display monitor. The cursor on the graphics display monitor is used to select a particular glyph. The scalar variable data associated with the selected glyph is then displayed on the user interface display monitor 22.

A specific example of a software implementation of the routines discussed written in the programming language "C" is provided in Appendix A which forms part of this specification. The specific program employs standard matrix computation routines that are provided on an AT&T 900 Series Pixel Machine. The matrix commands used in the animation program listed in Appendix A are described in the *PIClib Users Guide*, Version 1.2, AT&T Pixel Machines, Holmdel, N.J., 1990.

Industrial Applicability

The invention is applicable to modeling any physical phenomena in which multi-variable data must be presented with respect to a complicated geometrical structure including the modeling of natural phenomena (such as weather patterns) in addition to industrial processes (such as plastic injection molding). The real-time animation of the multi-variable data with the use of glyphs that is enabled by the invention is particularly useful in allowing users to quickly and efficiently analyze the physical phenomena being studied. Because the animation operates in real-time, the user is able to easily make adjustments to the animation display to emphasis particular areas of interest without wasting time. Although the invention has been described with particular reference to certain preferred embodiments thereof, it will be understood that modifications and variations are possible within the spirit and scope of the appended claims. For example, the invention can be implemented using different hardware components and different software than those specifically set forth above.

It should also be noted that a portion of this specification contains material which is subject to copyright protection. The copyright owner has no objection to the facsimile reproduction by anyone of this specification as it appears in the files of the United States Patent and Trademark Office, but otherwise reserves all copyrights whatsoever.

APPENDIX A

Copyright 1990, EASTMAN KODAK CO., ROCHESTER, NY

```
/****************************************************************/
/* anim_display.c by Marc Olano for the Eastman Kodak Company   */
/* all rights reserved by the Eastman Kodak Company             */
/*                                                              */
/* creates Display panel on sun for gly_animate                 */
/****************************************************************/ include <suntool/sunview.h>
include <suntool/panel.h>
#include "anim_globals.h"
include "anim_pix.h"
#include "anim_navigator.h"
#include "item_types.h"
#include "anim_display.h"

static void notify_velocity(rs)
Range_Slider rs;
/*
   called when velocity display range changes
*/
{
  int code = Velocity_Range;
  unsigned char buffer[2];

/* send code and slider value to pixel program */
  write(pixel.link, &code, sizeof(int));
  buffer[0] = (unsigned char) 255.0 *
        (rs->low - rs->bottom) / (rs->top - rs->bottom);
  buffer[1] = (unsigned char) 255.0 *
        (rs->high - rs->bottom) / (rs->top - rs->bottom);
  write(pixel.link, buffer, sizeof(buffer));
} static void notify_temperature(rs)
Range_Slider rs;
/*
   called when temperature display range changes
*/
{
  int code = Temperature_Range;
  unsigned char buffer[2];

/* send code and slider value to pixel program */
  write(pixel.link, &code, sizeof(int));
  buffer[0] = (unsigned char) 255.0 *
        (rs->low - rs->bottom) / (rs->top - rs->bottom);
  buffer[1] = (unsigned char) 255.0 *
        (rs->high - rs->bottom) / (rs->top - rs->bottom);
  write(pixel.link, buffer, sizeof(buffer));
} static void notify_empty_mold(item, value)
Panel_item item;        /* sunview empty mold toggle item */
int value;              /* 1 = visible, 0 = not visible */
/*
   called when toggle to display/not display the empty parts of the mold changes
*/
{
  int code = Empty_Mold;
```

```
  write(pixel.link, &code, sizeof(int));
  write(pixel.link, &value, sizeof(int));
} static void notify_mold_wall(item, value)
Panel_item item;        /* sunview empty mold toggle item */
int value;              /* 1 = visible, 0 = not visible */
/*
  called when toggle to display/not display the mold wall changes
*/
{
  int code = Mold_Wall;

write(pixel.link, &code, sizeof(int));
  write(pixel.link, &value, sizeof(int));
} void make_display_window(parent_frame, window_list_index)
Frame parent_frame;             /* parent frame from navigator window */
int window_list_index;          /* index of Display window in window_list[] */
/*
  makes sun display control window
  uses global window_list[window_list_index].name for the window title
  sets global window_list[window_list_index].frame
*/
{
  Panel panel;                  /* panel inside view window */
  Panel_item pi;                /* item setting file function setup */
  Rect *item_rect;              /* item position and size (for positioning) */
  Range_Slider rs;              /* range slider item (for positioning) */
  int x_gap, y_gap;             /* spacing between items in window */

/* create window for display controls */
  window_list[window_list_index].frame =
        make_navigator_subwindow(parent_frame, window_list_index);

panel = window_create(window_list[window_list_index].frame,
        PANEL_WITH_TEXT,
        0);
  panel_create_item(panel, PANEL_CURSOR_HIDING_PLACE, 0);
  x_gap = (int)panel_get(panel, PANEL_ITEM_X_GAP);
  y_gap = (int)panel_get(panel, PANEL_ITEM_Y_GAP);

/* * * * * * * * * * * * * * * * * * * * * * * * * * * * * * * * */
  /* create items in window                                         */

/* velocity range slider */
  item_rect = (Rect *)panel_get(
        panel_create_item(panel, PANEL_MESSAGE,
                PANEL_LABEL_STRING, "Velocity (in/sec):",
                0),
        PANEL_ITEM_RECT);
  rs = create_range_slider(panel,
        item_rect->r_left + item_rect->r_width + x_gap,
        item_rect->r_top,
        notify_velocity, "%7.0f", 7);
  rs->bottom = 0.0 / 2.54;       /* velocity range in in/sec */
  rs->top = 400.0 / 2.54;
  set_range_slider(rs);
  add_range_slider_setting("Velocity", rs);
```

```
/* temperature range slider */
item_rect = (Rect *)panel_get(
        panel_create_item(panel, PANEL_MESSAGE,
                PANEL_LABEL_X, item_rect->r_left,
                PANEL_LABEL_Y, item_rect->r_top + range_slider_height(rs) +
                        2*y_gap,
                PANEL_LABEL_STRING, "Temperature (F)  :",
                0),
        PANEL_ITEM_RECT);
rs = create_range_slider(panel,
        item_rect->r_left + item_rect->r_width + x_gap,
        item_rect->r_top,
        notify_temperature, "%7.0f", 7);
rs->bottom = 273.0 * 9/5 - 459.4;      /* temperature range in fahrenheit */
rs->top = 700.0 * 9/5 - 459.4;
set_range_slider(rs);
add_range_slider_setting("Temperature", rs);

/* empty mold visibility toggle */
item_rect = (Rect *)panel_get(
        pi = panel_create_item(panel, PANEL_TOGGLE,
                PANEL_LABEL_X, item_rect->r_left,
                PANEL_LABEL_Y, item_rect->r_top + range_slider_height(rs) +
                        3*y_gap,
                PANEL_CHOICE_STRINGS, "Empty Mold", 0,
                PANEL_NOTIFY_PROC, notify_empty_mold,
                0),
        PANEL_ITEM_RECT);
add_toggle_setting("Empty Mold", pi);

/* mold wall visibility toggle */
item_rect = (Rect *)panel_get(
        pi = panel_create_item(panel, PANEL_TOGGLE,
                PANEL_LABEL_X, item_rect->r_left + item_rect->r_width +
                        5*x_gap,
                PANEL_LABEL_Y, item_rect->r_top,
                PANEL_CHOICE_STRINGS, "Mold Wall", 0,
                PANEL_NOTIFY_PROC, notify_mold_wall,
                0),
        PANEL_ITEM_RECT);
add_toggle_setting("Mold Wall", pi);

make_done_button(window_list[window_list_index].frame, panel);
}
```

```c
/*********************************************************************/
/* anim_frame.c by Marc Olano for the Eastman Kodak Company          */
/* all rights reserved by the Eastman Kodak Company                  */
/*                                                                   */
/* frame control for gly_animate                                     */
/*********************************************************************/ include <stdio.h>
include <sys/types.h>
#include <dirent.h>
#include <string.h>
#include "util.h"
#include "env.h"
#include "anim_globals.h"
include "anim_pix.h"
#include "anim_frame.h"

/* table of frame names */
static struct frame_list_struct {
   char name[MAXNAMLEN];       /* frame file name -- first for sorting */
   int number;                 /* timestep number for frame */
   float time;                 /* time for this timestep */
} *frame_list = NULL;          /* malloc'ed array of frame info */ static int frame_list_count;   /* number of frames */ static int read_frame_list()
/*
   reads current directory, puts frames in order into frame list
   sets globals frame_list, frame_list_count
*/
{
   char *frame_base;              /* base file name for frame files */
   char *frame_format;            /* scanf format for frame files */
   DIR *dir;                      /* data directory */
   struct dirent *dir_entry;      /* entry in data directory */
   int i;                         /* loop variable */

/* free old list */
   if (frame_list)
      free(frame_list);

/* try to open directory */
   if ((dir = opendir(".")) == NULL)
      error_box("data directory");
   else {

/* get base name for frame files from environment */
      frame_base = get_environment_var(ENV_FRAME_BASE, FRAME_BASE_DEFAULT);
      frame_base_len = strlen(frame_base);
      frame_format = make_strcat(frame_base, "%d", 0);

/* count frame files */
      frame_list_count=0;
      while ((dir_entry = readdir(dir)) != NULL)
         if (strncmp(dir_entry->d_name, frame_base, frame_base_len) == 0)
            frame_list_count++;
      rewinddir(dir);

/* allocate space for frame list */
      frame_list = (struct frame_list_struct *)
```

```
                malloc(frame_list_count * sizeof(*frame_list));

/* collect list of frame files */
  i=0;
  while (dir_entry = readdir(dir))
    if (strncmp(dir_entry->d_name, frame_base, frame_base_len) == 0) {
      strcpy(frame_list[i].name, dir_entry->d_name);
      sscanf(dir_entry->d_name, frame_format, &frame_list[i].number);

/* get time from trace data (or as a last resort, use timestep) */
      if (frame_list[i].number < total_timesteps)
        frame_list[i].time = trace_data[frame_list[i].number][TRACE_TIME];
      else
        frame_list[i].time = (float) frame_list[i].number;

/* count another frame file */
      i++;
    }
  closedir(dir);

/* sort list of frame files */
  qsort(frame_list, frame_list_count, sizeof(*frame_list), strcmp);

/* clean up */
  free(frame_format);
  } return(0);
} static void frame_step_handlers()
/*
  assumes global frame_index is correct for the new frame
  sets globals frame_number and frame_time
  uses global frame_list[]
  calls functions to update all time displays
*/
{
  static int frame_name_code = Frame_Name;      /* signal to pixel program */
  int name_length;                               /* frame name string length */

/* update global variables */
  frame_number = frame_list[frame_index].number;
  frame_time = frame_list[frame_index].time;

/* send new frame name to pixel program */
  write(pixel.link, &frame_name_code, sizeof(int));
  name_length = strlen(frame_list[frame_index].name);
  write(pixel.link, &name_length, sizeof(int));
  write(pixel.link, frame_list[frame_index].name, name_length);

/* call all hander functions */
  do_handler(frame_step_list, NULL);
} void set_frame_index(index)
int index;
/*
  set index of current frame in frame list
  changes globals frame_index, frame_number, frame_time
  might change globals frame_list, frame_list_count
```

```
*/
{
  /* check index against list size */
  if (index >= frame_list_count  ||  index < 0)
    do_handler(new_frames_list);

/* force index to be within updated list */
  if (index >= frame_list_count)
    frame_index = 0;
  else if (index < 0)
    frame_index = frame_list_count - 1;
  else
    frame_index = index;

/* update frame number and time and any displays that use the frame info */
  frame_step_handlers();
} void set_frame_number(num)
int num;
/*
  set frame number of current frame in frame list
  changes globals frame_index, frame_number, frame_time
  might change globals frame_list, frame_list_count
*/
{
  int i;                 /* loop variable */

/* check frame number against the range of numbers */
  if (num > frame_list[frame_list_count - 1].number  ||
      num < frame_list[0].number)
    do_handler(new_frames_list);

/* set all high frame numbers to the top of the new list */
  if (num >= frame_list[frame_list_count - 1].number)
    frame_index = frame_list_count - 1;

/* set all low frame numbers to the bottom of the list */
  else if (num <= frame_list[0].number)
    frame_index = 0;

/* scan through for the closest existing frame number */
  else
     for(i=1; i<frame_list_count; i++)
       if (num <= frame_list[i].number) {
         if (frame_list[i].number - num  <=  num - frame_list[i-1].number)
           frame_index = i;
         else
           frame_index = i-1;
         break;
       }

/* update frame number and time and any displays that use the frame info */
  frame_step_handlers();
} void set_frame_time(time)
float time;
/*
  set frame time of current frame in frame list
  changes globals frame_index, frame_number, frame_time
  might change globals frame_list, frame_list_count
```

```
*/
{
  int i;                 /* loop variable */

/* check frame time against the range of times */
  if (time >= frame_list[frame_list_count - 1].time  ||
        time < frame_list[0].time)
    do_handler(new_frames_list);

/* set all high frame times to the top of the new list */
  if (time >= frame_list[frame_list_count - 1].time)
    frame_index = frame_list_count - 1;

/* set all low frame times to the bottom of the list */
  else if (time < frame_list[0].time)
    frame_index = 0;

/* scan through for the closest existing frame time */
  else
     for(i=1; i<frame_list_count; i++)
       if (time <= frame_list[i].time) {
         if (frame_list[i].time - time  <=  time - frame_list[i-1].time)
           frame_index = i;
         else
           frame_index = i-1;
         break;
       }

/* update frame number and time and any displays that use the frame info */
  frame_step_handlers();
} static int read_time(line)
char *line;
/*
  parse line from a settings file for the time to display
*/
{
  float time;         /* temporary storage for possible time */
  int scanned;        /* characters scanned */ scanned = -1;
  sscanf(line, "Time %f %n", &time, &scanned);
  if (scanned == strlen(line)) {
    set_frame_time(time);
    return(1);
  } else {
    return(0);
  }
} static int save_time(file)
FILE *file;
/*
  save current frame time in settings file
*/
{
  fprintf(file, "Time %g\n", frame_time);
  return(0);
}
```

```
void init_frame()
/*
   initialize frame list, trace inforamtion, and frame information
*/
{
   /* add function to read frames to list */
   add_handler(&new_frames_list, read_frame_list, NULL);

/* set up to be able to save/load frame number from settings file */
   add_handler(&read_list, read_time, NULL);
   add_handler(&save_list, save_time, NULL);
}
```

```c
/*******************************************************************/
/* anim_globals.c by Marc Olano for the Eastman Kodak Company      */
/* all rights reserved by the Eastman Kodak Company                */
/*                                                                 */
/* global variables used in sun portion of gly_animate program     */
/*******************************************************************/ include "anim_globals.h"
include "anim_pix.h"
#include "anim_time.h"
#include "anim_view.h"
#include "anim_display.h"
#include "anim_gly_scale.h"
#include "anim_info.h"
#include "anim_trace.h"
#include "anim_save.h"

/* process id and socket number for pixel program */
struct pixel_data_struct pixel;

char *gly_dir;                  /* GLY_DIR environment variable */

/* lists of functions for handling various events */
/* list built by a series of calls to add_handler(), used with do_handler() */
Handler_List read_list = NULL;       /* read settings files */
Handler_List save_list = NULL;       /* save settings files */
Handler_List feedback_list = NULL;   /* read messages from pixel program */
Handler_List frame_step_list = NULL; /* called each frame */
Handler_List new_frames_list = NULL; /* called when new frames are read */

/* list of seperate windows and their names */
/* names and creation functions initialized, sunview Frame's created later */
/* use  Frame create_navigator_window(parent_frame, window_list_index); */
/*    to create these windows */
/* the name of the last entry should be NULL */
/* if a creation function is NULL, a toggle box appears, but no window */
struct window_list_struct window_list[] = {
  /* window title      function to create      (other field uninitialized) */
  {"Time",                  make_time_window},
  {"View",                  make_view_window},
  {"Display",               make_display_window},
  {"Glyph Scaling",         make_gly_scale_window},
  {"Traces",                make_trace_window},
  {"Element Information",   make_info_window},
  {"Saved Settings",        make_save_window},
  {0,                       0}
};

/* information identifying current frame */
int frame_index;        /* index in list of frames - 1 frame / index */
int frame_number;       /* timestep of frame - skips */
float frame_time;       /* time in seconds into simulation */

/* center of last-picked element */
Point picked_center = {0.0, 0.0, 0.0};

/* malloc'd array of trace data -- setup and updated by anim_frame.c */
```

```
float (*trace_data)[TRACE_COUNT] = NULL;
int total_timesteps = 0;
```

```c
/**************************************************************************/
/* anim_gly_parm.c by Marc Olano for the Eastman Kodak Company            */
/* all rights reserved by the Eastman Kodak Company                       */
/*                                                                        */
/* creates Glyph Parameters panel on sun for gly_animate                  */
/* controls glyph scalings                                                */
/**************************************************************************/ include <suntool/sunview.h>
include <suntool/panel.h>
#include "anim_globals.h"
include "anim_pix.h"
#include "anim_navigator.h"
#include "item_types.h"
#include "anim_gly_parm.h"

/* icons used as slider labels */

/* length scaling icon */
static short length_image[] = {
# include "length.icon"
};
mpr_static(length_pr, 64, 48, 1, length_image);

/* width scaling icon */
static short width_image[] = {
# include "width.icon"
};
mpr_static(width_pr, 64, 48, 1, width_image);

/* height scaling icon */
static short height_image[] = {
# include "height.icon"
};
mpr_static(height_pr, 64, 48, 1, height_image);

static void notify_length(fs)
Full_Slider fs;
/*
   called when glyph length scaling changes
*/
{
   int code = Glyph_Length;

/* send code and slider value to pixel program */
   write(pixel.link, &code, sizeof(int));
   write(pixel.link, & fs->val, sizeof(float));
} static void notify_width(fs)
Full_Slider fs;
/*
   called when glyph width scaling changes
*/
{
   int code = Glyph_Width;

/* send code and slider value to pixel program */
   write(pixel.link, &code, sizeof(int));
```

```
    write(pixel.link, & fs->val, sizeof(float));
} static void notify_height(fs)
Full_Slider fs;
/*
   called when glyph width scaling changes
*/
{
   int code = Glyph_Height;

/* send code and slider value to pixel program */
   write(pixel.link, &code, sizeof(int));
   write(pixel.link, & fs->val, sizeof(float));
} void make_gly_parm_frame(parent_frame, frame_list_index)
Frame parent_frame;           /* parent frame from navigator window */
int frame_list_index;         /* index of window in frame_list[] */
/*
   makes sun glyph parameter control window
   uses global frame_list[frame_list_index].name for the window title
   sets global frame_list[frame_list_index].frame
   controls length, width, and height scaling of glyphs
*/
{
   Panel panel;               /* panel inside view window */
   Rect *item_rect;           /* position and size of dummy item */
   int slider_x_pos;          /* also used for positioning */
   Full_Slider fs;            /* full slider item (for positioning) */
   int x_gap, y_gap;          /* spacing between items in window */

/* create frame for view controls */
   frame_list[frame_list_index].frame =
        make_navigator_subframe(parent_frame, frame_list_index);

panel = window_create(frame_list[frame_list_index].frame,
        PANEL_WITH_TEXT,
        0);
   panel_create_item(panel, PANEL_CURSOR_HIDING_PLACE, 0);
   x_gap = (int)panel_get(panel, PANEL_ITEM_X_GAP);
   y_gap = (int)panel_get(panel, PANEL_ITEM_Y_GAP);

/* * * * * * * * * * * * * * * * * * * * * * * * * * * * * * * * * * */
/* create items in window                                            */

/* length scaling slider */
   item_rect = (Rect *)panel_get(
        panel_create_item(panel, PANEL_MESSAGE,
              PANEL_LABEL_IMAGE, &length_pr,
              0),
        PANEL_ITEM_RECT);
   slider_x_pos = item_rect->r_left + item_rect->r_width + x_gap;
   fs = create_full_slider(panel,
        slider_x_pos,
        item_rect->r_top + length_pr.pr_height - full_slider_height(fs),
        notify_length, "%7.2f", 7);

/* width scaling slider */
   item_rect = (Rect *)panel_get(
        panel_create_item(panel, PANEL_MESSAGE,
```

```
                    PANEL_LABEL_X, item_rect->r_left,
                    PANEL_LABEL_Y, item_rect->r_top + item_rect->r_height + y_gap,
                    PANEL_LABEL_IMAGE, &width_pr,
                    0),
            PANEL_ITEM_RECT);
    fs = create_full_slider(panel,
            slider_x_pos,
            item_rect->r_top + width_pr.pr_height - full_slider_height(fs),
            notify_width, "%7.2f", 7);

/* height scaling slider */
    item_rect = (Rect *)panel_get(
            panel_create_item(panel, PANEL_MESSAGE,
                    PANEL_LABEL_X, item_rect->r_left,
                    PANEL_LABEL_Y, item_rect->r_top + item_rect->r_height + y_gap,
                    PANEL_LABEL_IMAGE, &height_pr,
                    0),
            PANEL_ITEM_RECT);
    fs = create_full_slider(panel,
            slider_x_pos,
            item_rect->r_top + height_pr.pr_height - full_slider_height(fs),
            notify_height, "%7.2f", 7);

make_done_button(frame_list[frame_list_index].frame, panel);
}
```

```c
/*********************************************************************/
/* anim_gly_scale.c by Marc Olano for the Eastman Kodak Company      */
/* all rights reserved by the Eastman Kodak Company                  */
/*                                                                   */
/* creates Glyph Parameters panel on sun for gly_animate             */
/* controls glyph scalings                                           */
/*********************************************************************/ include <suntool/sunview.h>
include <suntool/panel.h>
#include "anim_globals.h"
include "anim_pix.h"
#include "anim_navigator.h"
#include "item_types.h"
#include "anim_std_save.h"
#include "anim_gly_scale.h"

/* icons used as slider labels */

/* length scaling icon */
static short length_image[] = {
# include "length.icon"
};
mpr_static(length_pr, 64, 48, 1, length_image);

/* width scaling icon */
static short width_image[] = {
# include "width.icon"
};
mpr_static(width_pr, 64, 48, 1, width_image);

/* height scaling icon */
static short height_image[] = {
# include "height.icon"
};
mpr_static(height_pr, 64, 48, 1, height_image);

static void notify_length(fs)
Full_Slider fs;
/*
  called when glyph length scaling changes
*/
{
  int code = Glyph_Length;

/* send code and slider value to pixel program */
  write(pixel.link, &code, sizeof(int));
  write(pixel.link, & fs->val, sizeof(float));
} static void notify_width(fs)
Full_Slider fs;
/*
  called when glyph width scaling changes
*/
{
  int code = Glyph_Width;

/* send code and slider value to pixel program */
```

```
  write(pixel.link, &code, sizeof(int));
  write(pixel.link, & fs->val, sizeof(float));
} static void notify_height(fs)
Full_Slider fs;
/*
   called when glyph width scaling changes
*/
{
  int code = Glyph_Height;

/* send code and slider value to pixel program */
  write(pixel.link, &code, sizeof(int));
  write(pixel.link, & fs->val, sizeof(float));
} void make_gly_scale_window(parent_frame, window_list_index)
Frame parent_frame;               /* parent frame from navigator window */
int window_list_index;            /* index of window in window_list[] */
/*
   makes sun glyph parameter control window
   uses global window_list[window_list_index].name for the window title
   sets global window_list[window_list_index].frame
   controls length, width, and height scaling of glyphs
*/
{
  Panel panel;                    /* panel inside view window */
  Rect *item_rect;                /* position and size of dummy item */
  int slider_x_pos;               /* also used for positioning */
  Full_Slider fs;                 /* full slider item (for positioning) */
  int x_gap, y_gap;               /* spacing between items in window */

/* create window for view controls */
  window_list[window_list_index].frame =
        make_navigator_subwindow(parent_frame, window_list_index);

panel = window_create(window_list[window_list_index].frame,
        PANEL_WITH_TEXT,
        0);
  panel_create_item(panel, PANEL_CURSOR_HIDING_PLACE, 0);
  x_gap = (int)panel_get(panel, PANEL_ITEM_X_GAP);
  y_gap = (int)panel_get(panel, PANEL_ITEM_Y_GAP);

/* * * * * * * * * * * * * * * * * * * * * * * * * * * * * * * * * * */
  /* create items in window                                             */

/* length scaling slider */
  item_rect = (Rect *)panel_get(
        panel_create_item(panel, PANEL_MESSAGE,
              PANEL_LABEL_IMAGE, &length_pr,
              0),
        PANEL_ITEM_RECT);
  slider_x_pos = item_rect->r_left + item_rect->r_width + x_gap;
  fs = create_full_slider(panel,
        slider_x_pos,
        item_rect->r_top + length_pr.pr_height - full_slider_height(fs),
        notify_length, "%7.2f", 7);
  add_full_slider_setting("Length", fs);

/* width scaling slider */
```

```
    item_rect = (Rect *)panel_get(
        panel_create_item(panel, PANEL_MESSAGE,
            PANEL_LABEL_X, item_rect->r_left,
            PANEL_LABEL_Y, item_rect->r_top + item_rect->r_height + y_gap,
            PANEL_LABEL_IMAGE, &width_pr,
            0),
        PANEL_ITEM_RECT);
    fs = create_full_slider(panel,
        slider_x_pos,
        item_rect->r_top + width_pr.pr_height - full_slider_height(fs),
        notify_width, "%7.2f", 7);
    add_full_slider_setting("Width", fs);

/* height scaling slider */
    item_rect = (Rect *)panel_get(
        panel_create_item(panel, PANEL_MESSAGE,
            PANEL_LABEL_X, item_rect->r_left,
            PANEL_LABEL_Y, item_rect->r_top + item_rect->r_height + y_gap,
            PANEL_LABEL_IMAGE, &height_pr,
            0),
        PANEL_ITEM_RECT);
    fs = create_full_slider(panel,
        slider_x_pos,
        item_rect->r_top + height_pr.pr_height - full_slider_height(fs),
        notify_height, "%7.2f", 7);
    add_full_slider_setting("Height", fs);

make_done_button(window_list[window_list_index].frame, panel);
}
```

```c
/*******************************************************************/
/* anim_info.c by Marc Olano for the Eastman Kodak Company         */
/* all rights reserved by the Eastman Kodak Company                */
/*                                                                 */
/* creates Element Information panel on sun for gly_animate        */
/*******************************************************************/ include <suntool/sunview.h>
include <suntool/panel.h>
#include <suntool/canvas.h>
#include <stdio.h>
include "util.h"
#include "anim_globals.h"
include "anim_pix.h"
#include "anim_navigator.h"
#include "anim_info.h"

/* size of cursor control "canvas" */
#define CURSOR_CONTROL_WIDTH    350
#define CURSOR_CONTROL_HEIGHT   350

/* sunview items for values displayed in window */
static Panel_item element_number_pi;
static Panel_item thickness_pi;
static Panel_item pressure_pi;
static Panel_item temperature_pi[NUMSEGS];
static Panel_item velocity_pi[NUMSEGS];

static void canvas_event_function(canvas, event)
Canvas canvas;
Event *event;
/*
   called whenever the mouse does anything in the movement canvas
*/
{
  /* codes to send to pixel program */
  static int start_picking_code = Start_Picking;
  static int move_picking_code = Move_Picking;
  static int select_picking_code = Select_Picking;
  static int done_picking_code = Done_Picking;
  int element_picked;         /* element selected */
  float x,y;                  /* position selected */ switch (event_id(event)) {
    case LOC_RGNENTER:
      /* stop animating */
      animation_pause(1);

/* start -- pixel draws "picking picture" in back buffer - draws mouse */
      write(pixel.link, &start_picking_code, sizeof(int));
      x = (float)event_x(event) / (int)window_get(canvas, WIN_WIDTH);
      write(pixel.link, &x, sizeof(float));
      y = (float)event_y(event) / (int)window_get(canvas, WIN_HEIGHT);
      write(pixel.link, &y, sizeof(float));
      break;

case LOC_RGNEXIT:
      /* done -- pixel clears back buffer - removes mouse */
      write(pixel.link, &done_picking_code, sizeof(int));

/* continue animating */
```

```
            animation_pause(0);
            break;

case LOC_DRAG:
            /* moving -- pixel moves mouse */
            write(pixel.link, &move_picking_code, sizeof(int));
            x = (float)event_x(event) / (int)window_get(canvas, WIN_WIDTH);
            write(pixel.link, &x, sizeof(float));
            y = (float)event_y(event) / (int)window_get(canvas, WIN_HEIGHT);
            write(pixel.link, &y, sizeof(float));
            break;

case MS_LEFT:
            if (event_is_up(event)) {

/* mouse release, tell pixel final click position */
                write(pixel.link, &select_picking_code, sizeof(int));
                x = (float)event_x(event) / (int)window_get(canvas, WIN_WIDTH);
                write(pixel.link, &x, sizeof(float));
                y = (float)event_y(event) / (int)window_get(canvas, WIN_HEIGHT);
                write(pixel.link, &y, sizeof(float));
            } else {

/* mouse push, treat like a drag */
                write(pixel.link, &move_picking_code, sizeof(int));
                x = (float)event_x(event) / (int)window_get(canvas, WIN_WIDTH);
                write(pixel.link, &x, sizeof(float));
                y = (float)event_y(event) / (int)window_get(canvas, WIN_HEIGHT);
                write(pixel.link, &y, sizeof(float));
            }
            break;
    }
} static int pick_element(code_in, my_code)
int code_in;                    /* last pixel code read */
int my_code;                    /* code this function handles */
/*
   called when pixel program sends Select_Picking code when an element is picked
   sets globals picked_center with center of element
*/
{
    int element_picked;                              /* element number picked */
    unsigned char element_data[ELEMENT_SIZE];        /* binary element data */
    float thickness;                                 /* element thickness */
    char num_str[10];                                /* value as string */
    int i;                                           /* loop variable */ if (code_in == my_code) { read(pixel.link, &element_picked, sizeof(element_picked));
        read(pixel.link, &thickness, sizeof(thickness));
        read(pixel.link, &picked_center, sizeof(Point));
        read(pixel.link, element_data, ELEMENT_SIZE);

sprintf(num_str, "%d", element_picked + 1);
        panel_set(element_number_pi, PANEL_LABEL_STRING, num_str, 0);

sprintf(num_str, "%.3f", thickness * 2.0 / 2.54);
        panel_set(thickness_pi, PANEL_LABEL_STRING, num_str, 0);

sprintf(num_str, "%3.0f", element_data[ELEMENT_PRES] * 20000. / 255.);
        panel_set(pressure_pi, PANEL_LABEL_STRING, num_str, 0);
```

```c
    for(i=0; i<NUMSEGS; i++) {
      sprintf(num_str, "%3.0f", element_data[ELEMENT_TEMP + i]
              * (801. - 32.)/ 255. + 32.);
      panel_set(temperature_pi[i], PANEL_LABEL_STRING, num_str, 0);
      sprintf(num_str, "%3.0f", element_data[ELEMENT_VELOCITY + i]
              * 400 / (255. * 2.54));
      panel_set(velocity_pi[i], PANEL_LABEL_STRING, num_str, 0);
    } return(1);

} else
    return(0);
} static void make_element_info_panel(frame, canvas)
Frame frame;                  /* window to put the panel in */
Canvas canvas;                /* joystick canvas to put it next to */
/*
  create panel for display of element information after element is picked
*/
{
  Panel panel;                /* sunview panel created to hold info */
  char num_str[2];            /* string version of numbers for display */
  int i;                      /* loop variable */ panel = window_create(frame, PANEL,
        WIN_Y, 0,
        WIN_RIGHT_OF, canvas,
        0);

panel_create_item(panel, PANEL_MESSAGE,
        PANEL_LABEL_X, ATTR_COL(0),
        PANEL_LABEL_Y, ATTR_ROW(0),
        PANEL_LABEL_STRING, "Element Number Picked: ",
        0);
  element_number_pi = panel_create_item(panel, PANEL_MESSAGE, 0);

panel_create_item(panel, PANEL_MESSAGE,
        PANEL_LABEL_X, ATTR_COL(2),
        PANEL_LABEL_Y, ATTR_ROW(1),
        PANEL_LABEL_STRING, "Thickness (in): ",
        0);
  thickness_pi = panel_create_item(panel, PANEL_MESSAGE, 0);

panel_create_item(panel, PANEL_MESSAGE,
        PANEL_LABEL_X, ATTR_COL(2),
        PANEL_LABEL_Y, ATTR_ROW(2),
        PANEL_LABEL_STRING, "Pressure (PSI): ",
        0);
  pressure_pi = panel_create_item(panel, PANEL_MESSAGE, 0);

panel_create_item(panel, PANEL_MESSAGE,
        PANEL_LABEL_X, ATTR_COL(2),
        PANEL_LABEL_Y, ATTR_ROW(3),
        PANEL_LABEL_STRING, "Segment  Temperature (F)  Velocity (in/sec)",
        0);

for(i=0; i<NUMSEGS; i++) {
    sprintf(num_str, "%d", i+1);
    panel_create_item(panel, PANEL_MESSAGE,
        PANEL_LABEL_X, ATTR_COL(5),
```

```c
            PANEL_LABEL_Y, ATTR_ROW(4+i),
            PANEL_LABEL_STRING, num_str,
            0);
      temperature_pi[i] = panel_create_item(panel, PANEL_MESSAGE,
            PANEL_LABEL_X, ATTR_COL(15),
            0);
      velocity_pi[i] = panel_create_item(panel, PANEL_MESSAGE,
            PANEL_LABEL_X, ATTR_COL(33),
            0);
   }

/* create done button, and position at bottom corner */
   panel_set(make_done_button(frame, panel),
         PANEL_LABEL_Y, ATTR_COLS(-1) + CURSOR_CONTROL_HEIGHT,
         0);
   window_fit(panel);
   window_fit(frame);
} void make_info_window(parent_frame, window_list_index)
Frame parent_frame;              /* parent frame from navigator window */
int window_list_index;           /* index of View window in window_list[] */
/*
   makes sun element information window
   uses global window_list[window_list_index].name for the window title
   sets global window_list[window_list_index].frame
*/
{
   Panel panel;                  /* panel inside info window */
   Canvas canvas;                /* canvas to move around in */

/* create window to control mouse on pixel screen */
   window_list[window_list_index].frame =
         make_navigator_subwindow(parent_frame, window_list_index);

canvas = window_create(window_list[window_list_index].frame, CANVAS,
         WIN_WIDTH, CURSOR_CONTROL_WIDTH,
         WIN_HEIGHT, CURSOR_CONTROL_HEIGHT,
         WIN_EVENT_PROC, canvas_event_function,
         WIN_CONSUME_PICK_EVENTS, LOC_DRAG, LOC_RGNENTER, LOC_RGNEXIT,
               MS_LEFT, 0,
         0);

make_element_info_panel(window_list[window_list_index].frame, canvas);

/* listen for element picks */
   add_handler(&feedback_list, pick_element, Element_Picked);
}
```

```c
/*****************************************************************/
/* anim_link.c by Marc Olano for the Eastman Kodak Company       */
/* All Rights Reserved                                            */
/*                                                                */
/* animated injection molding simulation display program          */
/* runs on SUN workstation and AT&T 900 series Pixel Machine      */
/* developed under Sun OS release 4.0.3                           */
/*    AT&T Pixel Machines PIClib release 1.2                      */
/*                                                                */
/* this module contains code to fork the pixel machine program for*/
/* rendering the glyph graphics, and create a socket link between */
/* the two programs                                               */
/*****************************************************************/ include <suntool/sunview.h>
include <stdio.h>
include <sys/types.h>
#include <sys/socket.h>
#include <vfork.h>
#include "util.h"
#include "env.h"
#include "anim_globals.h"
include "anim_pix.h"
#include "anim_link.h"

/* name of program to draw glyphs */
#define PIXEL_PROGRAM    "gly_pixel"

static Notify_value read_link()
/*
  read incomming data from pixel link
  uses global variable pixel.link to get file descriptor of link
*/
{
  int code;            /* code from anim_pix.h sent by pixel program */

/* read incoming code */
  read(pixel.link, &code, sizeof(code));

/* call the first matching feedback function */
  do_handler(feedback_list, code);
  return(NOTIFY_DONE);
} void make_pixel_connection()
/*
  creates connection socket
  puts socket number into environment for pixel machine program
    and forks drawgly program
  saves socket file descriptor and pixel program process id in global "pixel"
*/
{
  int link[2];                /* socket file descriptors */
  char link_num_str[6];       /* string version of link file number */

/* create a bi-directional socket link */
  if (socketpair(PF_UNIX, SOCK_STREAM, 0, link) == -1)
    error_exit(NULL);
```

```c
  /* save ends of socket link */
  pixel.link = link[0];
  sprintf(link_num_str, "%d", link[1]);
  putenv(make_strcat(ENV_INTERNAL_LINK, "=", link_num_str, 0));

/* get sunview notifier to inform us of any data on the link */
  /* the &pixel.link is used as a unique client number for sunview */
  notify_set_input_func(&pixel.link, read_link, pixel.link);

/* fork pixel part of animation program */
  pixel.pid = fork();
  if (pixel.pid == -1)
    error_exit(NULL);
  else if (pixel.pid == 0)
    if (execlp(PIXEL_PROGRAM, PIXEL_PROGRAM, NULL) == -1)
      error_exit(PIXEL_PROGRAM);
} void kill_pixel_program()
/*
   kills pixel machine program and closes communications socket
   uses global variable "pixel" to get socket and process id
*/
{
  static int code = Quit;

/* kill pixel machine program */
  write(pixel.link, &code, sizeof(code));

/* tell sunview to stop listening to link */
  notify_set_input_func(&pixel.link, NOTIFY_FUNC_NULL, pixel.link);

/* close socket link */
  close(pixel.link);
}
```

```
/*******************************************************************/
/* anim_navigator.c by Marc Olano for the Eastman Kodak Company    */
/* all rights reserved by the Eastman Kodak Company                */
/*                                                                  */
/* animated injection molding simulation display program           */
/* runs on SUN workstation and AT&T 900 series Pixel Machine       */
/* developed under Sun OS release 4.0.3                            */
/*   AT&T Pixel Machines PIClib release 1.2                        */
/*                                                                  */
/* this module contains code for the navigator window              */
/* the navigator window shows a menu where the display of all the other */
/*   windows can be turned on and off                              */
/*******************************************************************/ include <stdio.h>
include <suntool/sunview.h>
include <suntool/panel.h>
#include "anim_globals.h"
#include "anim_frame.h"
#include "anim_save.h"
#include "anim_navigator.h"

/* name of navigator window */
#define NAVIGATOR_WINDOW_NAME   "Glyph Navigator"

/* icon for navigator window */
static short ships_wheel_image[] = {
#  include "ships_wheel.icon"
};
mpr_static(ships_wheel, 64, 64, 1, ships_wheel_image);

/* sunview item for navigator toggle menu */
Panel_item toggle_list_item;

/*------------------------------------------------------------------*/
/* sunview panel functions                                          */ static void notify_quit_button(item)
Panel_item item;
/*
  called when quit button is pushed
*/
{
  window_done( (Panel)panel_get(item, PANEL_PARENT_PANEL));
} static void subwindow_done(frame)
Frame frame;
/*
  called whenever a subwindow in the navigator toggle menu is closed
  turns off toggle in menu
*/
{
  window_set(frame, WIN_SHOW, FALSE, 0);
  panel_set(toggle_list_item,
        PANEL_TOGGLE_VALUE, (int)window_get(frame, WIN_CLIENT_DATA), 0,
        0);
}
```

```
static void notify_done_button(item)
Panel_item item;
/*
   called when done subwindow button (created with make_done_button() is pushed)
*/
{
   subwindow_done((Frame)panel_get(item, PANEL_CLIENT_DATA));
}

Panel_item make_done_button(frame, panel)
Frame frame;             /* frame created with make_subwindow */
Panel panel;             /* panel in the frame to put the button in */
/*
   create a "done" button in the bottom right corner of a subwindow
   notification procedure notify_done_button() uses the PANEL_CLIENT_DATA which
      is set to frame
   returns item created
*/
{
  Panel_item done_item;
  struct pixrect *done_button_pr;

/* shrink window to find it's current limits */
  window_fit(panel);

/* create button just at the edge of the window */
  done_button_pr = panel_button_image(panel, "Done", 0, 0);
  done_item = panel_create_item(panel, PANEL_BUTTON,
        PANEL_LABEL_X, (int)window_get(panel, WIN_WIDTH) -
             done_button_pr->pr_width,
        PANEL_LABEL_Y, (int)window_get(panel, WIN_HEIGHT) +
             (int)panel_get(panel, PANEL_ITEM_Y_GAP),
        PANEL_LABEL_IMAGE, done_button_pr,
        PANEL_NOTIFY_PROC, notify_done_button,
        PANEL_CLIENT_DATA, frame,
        0);

/* adjust the size of the window to include the button */
  window_fit(panel);
  window_fit(frame);

return(done_item);
}

Frame make_navigator_subwindow(parent_frame, window_list_index)
Frame parent_frame;          /* frame with navigator toggle item */
int window_list_index;       /* index in window_list table for this window */
/*
   create sub-window for navigator toggle menu
   labeled by name field in global window_list[]
   WIN_CLIENT_DATA is set to the window_list_index
   FRAME_DONE_PROC is set to subwindow_done
*/
{
  return(window_create(parent_frame, FRAME,
        FRAME_LABEL, window_list[window_list_index].name,
        FRAME_SHOW_LABEL, TRUE,
        FRAME_DONE_PROC, subwindow_done,
        WIN_CLIENT_DATA, window_list_index,
        0));
}
```

```
static void notify_navigator(item, value)
Panel_item item;         /* sunview item for notifier window toggle switches */
int value;               /* bit mask value for first 32 toggles */
{
  int i;

/* set all windows open/closed according to navigator toggle state */
  for(i=0; window_list[i].name; i++)    /* loop till we run out of names */
    if (window_list[i].frame &&         /* if frame exists */
              (((value & 1<<i) != 0) !=  /* and its state changed */
              ((int)window_get(window_list[i].frame, WIN_SHOW) != 0)))
      window_set(window_list[i].frame, WIN_SHOW, (value & 1<<i)!=0, 0);
} void do_navigator_window()
/*
  create and run navigator window -- creates all other panels
  uses global variable window_list[] to get names of windows and functions to
    make them
  sets module-global toggle_list_item to be the sunview navigator toggle list
*/
{
  Frame nav_frame;                       /* sunview frame for navigator window */
  Panel nav_panel;                       /* sunview panel for navigator window */
  struct pixrect *quit_button_pr;        /* pixrect of quit button */
  int i;                                 /* loop variable */

/* create frame and panel for navigator window toggle list */
  nav_frame = window_create(NULL, FRAME,
        FRAME_LABEL, NAVIGATOR_WINDOW_NAME,
        FRAME_ICON, icon_create(ICON_IMAGE, &ships_wheel, 0),
        0);
  nav_panel = window_create(nav_frame, PANEL, 0);

/* create window list */
  toggle_list_item = panel_create_item(nav_panel, PANEL_TOGGLE,
        PANEL_LAYOUT, PANEL_VERTICAL,
        PANEL_NOTIFY_PROC, notify_navigator,
        0);
  for(i=0; window_list[i].name; i++)    /* loop till we run out of names */
    panel_set(toggle_list_item, PANEL_CHOICE_STRING, i, window_list[i].name, 0);

/* position and create quit button */
  window_fit(nav_panel);

quit_button_pr = panel_button_image(nav_panel, "Quit", 0, 0);
  panel_create_item(nav_panel, PANEL_BUTTON,
        PANEL_LABEL_X, (int)window_get(nav_panel, WIN_WIDTH) -
            quit_button_pr->pr_width,
        PANEL_LABEL_Y, (int)window_get(nav_panel, WIN_HEIGHT) +
            (int)panel_get(nav_panel, PANEL_ITEM_Y_GAP),
        PANEL_LABEL_IMAGE, quit_button_pr,
        PANEL_NOTIFY_PROC, notify_quit_button,
        0);

/* change size of window to fit */
  window_fit(nav_panel);
  window_fit(nav_frame);

/* initalize frame file information */
  init_frame();
```

```
    /* create windows using make_window() functions in frame_list */
    for(i=0; window_list[i].name; i++)    /* loop till we run out of names */
      if (window_list[i].make_window)
              ( *window_list[i].make_window )(nav_frame, i);

/* let sunview take over -- returns when quit -- end of program */
    read_startup();              /* read startup.set */
    window_main_loop(nav_frame); /* let sunview take over */
    save_startup();              /* write starup.set */
}
```

```
/****************************************************************/
/* anim_pressure.c by Marc Olano for the Eastman Kodak Company  */
/* all rights reserved by the Eastman Kodak Company             */
/*                                                              */
/* creates Pressure Trace panel on sun for gly_pressure         */
/****************************************************************/ include <suntool/sunview.h>
include <suntool/panel.h>
#include "anim_globals.h"
include "anim_pix.h"
#include "anim_navigator.h"
#include "item_types.h"
#include "anim_pressure.h"

void make_pressure_frame(parent_frame, frame_list_index)
Frame parent_frame;             /* parent frame from navigator window */
int frame_list_index;           /* index of Display window in frame_list[] */
/*
  makes sun display control window
  uses global frame_list[frame_list_index].name for the window title
  sets global frame_list[frame_list_index].frame
*/
{
  Panel panel;                  /* panel inside view window */
  Rect *item_rect;              /* item position and size (for positioning) */
  Range_Slider rs;              /* range slider item (for positioning) */
  int x_gap, y_gap;             /* spacing between items in window */

/* create frame for display controls */
  frame_list[frame_list_index].frame =
        make_navigator_subframe(parent_frame, frame_list_index);

panel = window_create(frame_list[frame_list_index].frame, PANEL, 0);

make_done_button(frame_list[frame_list_index].frame, panel);
}
```

```c
/******************************************************************/
/* anim_save.c by Marc Olano for the Eastman Kodak Company        */
/* all rights reserved by the Eastman Kodak Company               */
/*                                                                */
/* creates the Save Settings panel on the sun for gly_animate     */
/******************************************************************/ include <suntool/sunview.h>
include <suntool/panel.h>
#include <suntool/alert.h>
#include <stdio.h>
#include <ctype.h>
#include <dirent.h>
#include <string.h>
#include "util.h"
#include "sunutil.h"
#include "anim_globals.h"
include "anim_pix.h"
#include "anim_navigator.h"
#include "anim_save.h"

/* character size of settings file list window */
#define SAVE_WIN_COLUMNS        79
#define SAVE_WIN_ROWS           5

/* number of characters for file name in window */
#define SAVE_FILE_NAME_LEN      20

/* maximum length for a line of a setup file */
#define LINE_LEN                256

/* file name of startup settings file */
#define STARTUP_NAME            "startup.set"

static void read_settings(file, filename)
FILE *file;                     /* settings file */
char *filename;                 /* name of settings file (for error msgs) */
/*
   read settings from a file
*/
{
  /* control signals to pixel program */
  static int init_start_code = Init_Start;
  static int init_end_code[2] = {Init_End, Frame_Start};

char line[LINE_LEN];                  /* line of settings file */
  int line_no;                          /* line number in file */
  struct setting_list_struct *set_info; /* settings list loop pointer */
  char *s;                              /* scratch string pointer */

/* signal start of initialization */
  write(pixel.link, &init_start_code, sizeof(init_start_code));

/* parse all lines in file */
  for (line_no = 1; fgets(line, 80, file) != NULL; line_no++) {

/* remove end of line after '#' comment sign */
    if ((s = strchr(line, '#')) != NULL)
      *s = '\0';

/* ignore blank lines */
```

```c
    if (strlen(line) != 0 &&  strspn(line, " \t\n") != strlen(line)) {

/* send through each parsing function until one works */
      if (!do_handler(read_list, line)) {
        sprintf(line, "Unable to read line %d of settings file \"%s\"",
                line_no, filename);
        if (alert_prompt(NULL, NULL,
                ALERT_MESSAGE_STRINGS, line, 0,
                ALERT_BUTTON_NO, "Continue",
                ALERT_BUTTON_YES, "Cancel",
                0))
          return;
      }
    }
  }

/* send end of initialization signal */
  write(pixel.link, init_end_code, sizeof(init_end_code));
} static void notify_file_button(pi)
Panel_item pi;
/*
   called when the button for an settings file is pushed
   PANEL_CLIENT_DATA must be the settings file name
*/
{
  FILE *f;                      /* settings file */
  char *fn;                     /* name of settings file */

/* open settings file */
  fn = (char *)panel_get(pi, PANEL_CLIENT_DATA);

if ((f = fopen(fn, "r")) == NULL) {
    error_box(fn);
  } else {
    read_settings(f, fn);
    fclose(f);
  }
} void read_startup()
/*
   read "startup.set" file
*/
{
  FILE *f;                      /* startup settings file */
  char *fn;                     /* file name when hunting for startup file */

/* try to open local startup settings file */
  if ((f = fopen(STARTUP_NAME, "r")) == NULL) {

/* try to open overall startup file */
    fn = make_strcat(gly_dir, "/data/", STARTUP_NAME, 0);
    f = fopen(fn, "r");
    free(fn);
    if (f == NULL) {
      alert_prompt(NULL, NULL,
                ALERT_MESSAGE_STRINGS, "cannot find startup settings file", 0,
                ALERT_BUTTON_YES, "Ok",
                0);
      return;
```

```c
    }
  }

/* read startup file */
  read_settings(f, STARTUP_NAME);
  fclose(f);
} void save_startup()
/*
  write "startup.set" file
*/
{
  FILE *f;                          /* startup settings file */ if ((f = fopen(STARTUP_NAME, "w")) != NULL) {

/* initial comment line */
    fprintf(f, "# interface settings read at start of program\n");

/* call each saving function to do its stuff */
    do_handler(save_list, f);
    fclose(f);
  }
} static void make_file_line(panel, file_name)
Panel panel;
char *file_name;
/*
  create single line of file list
  file_name is assumed to have a three letter extension which is not printed
*/
{
  FILE *f;                          /* interface settings file */
  char base_name[SAVE_FILE_NAME_LEN + 1];     /* name w/o ".set" extension */
  char comment_line[LINE_LEN];      /* line containing comment */
  char *comment;                    /* comment text only from comment line */
  char line[SAVE_WIN_COLUMNS + 1];  /* full line to display */ if ((f = fopen(file_name, "r")) == NULL) {
    error_box(file_name);
  } else {
    strncpy(base_name, file_name, strlen(file_name)-4); /* chop of ".set" */
    base_name[strlen(file_name)-4] = '\0';
    comment = fgets(comment_line, 80, f);       /* get comment line */

/* skip '#' and spaces to beginning of real comment */
    if (comment)
      for(comment++; isspace(*comment); comment++);
    else
      comment = "";

/* stick together into line for panel */
    sprintf(line, "%*s%*s", -SAVE_FILE_NAME_LEN, base_name,
        -(SAVE_WIN_COLUMNS - SAVE_FILE_NAME_LEN - 2), comment);
    panel_create_item(panel, PANEL_BUTTON,
        PANEL_LABEL_STRING, line,
        PANEL_NOTIFY_PROC, notify_file_button,
        PANEL_CLIENT_DATA, file_name,
        0);
```

```c
    fclose(f);
  }
} static void make_file_list(panel)
Panel panel;
/*
  make settings file list in panel
*/
{
  Panel_item pi;                    /* sunview item for destroying old list */
  DIR *dir;                         /* current directory */
  struct dirent *dir_entry;         /* entry in directory */
  char (*set_table)[MAXNAMLEN];     /* table of setup file names */
  int num_files;                    /* number of ".set" files */
  int i;                            /* loop variable */

/* empty panel */
  panel_each_item(panel, pi)
    panel_destroy_item(pi);
  panel_end_each /* check for and create "startup.set" settings item */
  if (file_check(STARTUP_NAME, "r"))
    make_file_line(panel, STARTUP_NAME);

/* open current directory */
  if ((dir = opendir(".")) == NULL)
    return;

/* count ".set" files */
  for(num_files=0; (dir_entry = readdir(dir)) != NULL; ) {
    if (strlen(dir_entry->d_name) >= 4 &&
        strcmp(".set", &dir_entry->d_name[strlen(dir_entry->d_name) - 4]) == 0)
      num_files++;
}

/* allocate file table */
  set_table = (char (*)[MAXNAMLEN])malloc(num_files * MAXNAMLEN);

/* get list of ".set" files */
  rewinddir(dir);
  for(num_files=0; (dir_entry = readdir(dir)) != NULL; )
    if (strlen(dir_entry->d_name) >= 4  &&
        strcmp(".set", &dir_entry->d_name[strlen(dir_entry->d_name) - 4]) == 0)
      if (strcmp("startup.set", dir_entry->d_name) != 0) {
        strcpy(set_table[num_files], dir_entry->d_name);
        num_files++;
      }

/* sort list of files */
  qsort(set_table, num_files, MAXNAMLEN, strcmp);

/* create list in this order */
  for(i=0; i<num_files; i++)
    make_file_line(panel, set_table[i]);
} static void notify_refresh(pi)
Panel_item pi;
/*
  called when Refresh List button is pushed
```

```
  needs PANEL_CLIENT_DATA for the button to be the list panel
*/
{
  Panel list_panel;

list_panel = (Panel)panel_get(pi, PANEL_CLIENT_DATA);
  make_file_list(list_panel);
  panel_update_scrolling_size(list_panel);
  panel_paint(list_panel, PANEL_CLEAR);
} static void notify_save_button(pi)
Panel_item pi;
/*
  called when save button is pushed
  prompts for file name and comment, saves setup file
  PANEL_CLIENT_DATA setup as for Refresh button -- uses notify_refresh()
*/
{
  char *setup_name;                        /* name of setup file */
  char file_name[SAVE_FILE_NAME_LEN+5];    /* name with ".set" tacked on */
  FILE *f;                                 /* settings file */
  char *comment;                           /* description line for file */

/* get file name */
  if ((setup_name = typein("Save as:", SAVE_FILE_NAME_LEN, "")) == NULL)
    return;
  strcpy(file_name, setup_name);
  strcat(file_name, ".set");

/* start file with descriptive comment */
  if ((comment = typein("Description:",
        SAVE_WIN_COLUMNS - SAVE_FILE_NAME_LEN - 2, "")) == NULL)
    return;

/* open file */
  if ((f = fopen(file_name, "w")) == NULL) {
    error_box(file_name);
    return;
  }
  fprintf(f, "# %s\n", comment);

/* call each saving function to do its stuff */
  do_handler(save_list, f);

/* close file and update window */
  fclose(f);
  notify_refresh(pi);
} void make_save_window(parent_frame, window_list_index)
Frame parent_frame;          /* parent frame from navigator window */
int window_list_index;       /* index of Display window in window_list[] */
/*
  makes sun save settings window
  uses global window_list[window_list_index].name for the window title
  sets global window_list[window_list_index].frame
*/
{
  Panel list_panel;     /* panel contianing list of settings files */
  Panel panel;          /* button panel */
  Rect *item_rect;      /* item position and size (for positioning) */
```

```c
/* create window for settings window controls */
window_list[window_list_index].frame =
      make_navigator_subwindow(parent_frame, window_list_index);

/* * * * * * * * * * * * * * * * * * * * * * * * * * * * * * * * * * */
/* create settings file list panel                                   */ list_panel = window_create(window_list[window_list_index].frame, PANEL,
      WIN_VERTICAL_SCROLLBAR, scrollbar_create(0),
      WIN_COLUMNS, SAVE_WIN_COLUMNS,
      WIN_ROWS, SAVE_WIN_ROWS,
      0);

make_file_list(list_panel);

/* * * * * * * * * * * * * * * * * * * * * * * * * * * * * * * * * * */
/* create settings control button panel                              */ panel = window_create(window_list[window_list_index].frame, PANEL,
      WIN_X, 0,
      WIN_BELOW, list_panel,
      0);

/* save and refresh buttons */
item_rect = (Rect *) panel_get(
      panel_create_item(panel, PANEL_BUTTON,
            PANEL_LABEL_IMAGE, panel_button_image(panel, "Save", 0, 0),
            PANEL_NOTIFY_PROC, notify_save_button,
            PANEL_CLIENT_DATA, list_panel,
            0),
      PANEL_ITEM_RECT);

panel_create_item(panel, PANEL_BUTTON,
      PANEL_LABEL_IMAGE,
            panel_button_image(panel, "Refresh List", 0, 0),
      PANEL_NOTIFY_PROC, notify_refresh,
      PANEL_CLIENT_DATA, list_panel,
      0);

/* dummy message to hold window width for make_done_button() */
panel_create_item(panel, PANEL_MESSAGE,
      PANEL_LABEL_X, ATTR_COL(SAVE_WIN_COLUMNS - 1),
      PANEL_LABEL_STRING, "",
      0);

/* create done button in the same line as the save button */
panel_set(make_done_button(window_list[window_list_index].frame, panel),
      PANEL_LABEL_Y, item_rect->r_top, 0);

/* refit windows to the buttons, etc in them */
window_fit(panel);
window_fit(window_list[window_list_index].frame);
}
```

```c
/*************************************************************/
/* anim_std_save.c by Marc Olano for the Eastman Kodak Company */
/* all rights reserved by the Eastman Kodak Company            */
/*                                                             */
/* "standard" functions for reading/saving setup file lines    */
/* functions for those item types used repeatedly              */
/*                                                             */
/* these functions rely on scanf's "%n"                        */
/*    if reached in a scan, %n sets the next variable in the list to */
/*      the number of characters scanned so far                */
/*    if not reached in the scan, the old value is not changed */
/*    an integer variable is set to -1 before the scan, and a " %n" is */
/*      put at the end of the scanf format to skip whitespace and return */
/*      a count                                                */
/*    if the entire length of the line was scanned, the line is a match */
/*************************************************************/ include <suntool/sunview.h>
include <suntool/panel.h>
#include <stdio.h>
include "util.h"
#include "anim_globals.h"
#include "item_types.h"
#include "anim_save.h"
#include "anim_std_save.h"

/* types to find names and info on the items being saved/read */
typedef struct {
  char *name;
  Text_Entry te;
} *Text_Entry_Setting;

typedef struct {
  char *name;
  Range_Slider rs;
} *Range_Slider_Setting;

typedef struct {
  char *name;
  Full_Slider fs;
} *Full_Slider_Setting;

typedef struct {
  char *name;
  Panel_item pi;
} *Toggle_Setting;

/*-----------------------------------------------------------*/
/* functions for text entry items                            */ static int text_entry_read(line, data)
char *line;
Text_Entry_Setting data;
/*
   standard parse function to setup file line for a text entry item
*/
{
  char *template;      /* template for parsing */
  int val_start;       /* offset into line of start of value string */
  int scanned;         /* characters scanned */
```

```
  /* attempt to scan line */
  /* this one is kind of confusing */
  /*    first %n -- get character position of start of string value */
  /*    %[^\n] -- scan up to the first \n */
  /*    * in %*[^\n] -- ignore the value that has just been scanned */
  /*    final %n -- get character position of end of scan */
  template = make_strcat(data->name, " %n%*[^\n] %n", 0);
  scanned = -1;
  sscanf(line, template, &val_start, &scanned);
  free(template);

/* line didn't match */
  if (scanned != strlen(line))
    return(0);

/* set new values, update item, and do normal notification function */
  line[strcspn(line, "\n")] = '\0';      /* toss \n if it's there */
  strcpy(data->te->val, line + val_start);
  set_text_entry(data->te);
  if (data->te->notify)
    (*data->te->notify)(data->te);
  return(1);
} static int text_entry_save(file, data)
FILE *file;
Text_Entry_Setting data;
/*
    standard function to save setting data for text entry item
*/
{
  fprintf(file, "%s %s\n", data->name, data->te->val);
  return(0);
} void add_text_entry_setting(name, te)
char *name;
Text_Entry te;
/*
    setup standard setting functions for text entry item
*/
{
  Text_Entry_Setting data;

data = (Text_Entry_Setting) malloc(sizeof(*data));
  data->name = name;
  data->te = te;
  add_handler(&read_list, text_entry_read, data);
  add_handler(&save_list, text_entry_save, data);
}

/*--------------------------------------------------------------------*/
/* functions for range sliders                                        */ static int range_slider_read(line, data)
char *line;
Range_Slider_Setting data;
/*
    standard parse function to setup file line for a range slider
*/
{
```

```
  char *template;        /* template for parsing */
  float low, high;       /* temporary value storage */
  int scanned;           /* characters scanned */

/* attempt to scan line */
  template = make_strcat(data->name, " %f %f %n", 0);
  scanned = -1;
  sscanf(line, template, &low, &high, &scanned);
  free(template);

/* line didn't match */
  if (scanned != strlen(line))
    return(0);

/* set new values, update slider, and do normal notification function */
  data->rs->low = low;
  data->rs->high = high;
  set_range_slider(data->rs);
  if (data->rs->notify)
    (*data->rs->notify)(data->rs);
  return(1);
} static int range_slider_save(file, data)
FILE *file;
Range_Slider_Setting data;
/*
   standard function to save setting data for range slider
*/
{
  fprintf(file, "%s %g %g\n", data->name, data->rs->low, data->rs->high);
  return(0);
} void add_range_slider_setting(name, rs)
char *name;
Range_Slider rs;
/*
   setup standard setting functions for range sliders
*/
{
  Range_Slider_Setting data;

data = (Range_Slider_Setting) malloc(sizeof(*data));
  data->name = name;
  data->rs = rs;
  add_handler(&read_list, range_slider_read, data);
  add_handler(&save_list, range_slider_save, data);
}

/*----------------------------------------------------------------------*/
/* functions for full sliders                                           */ static int full_slider_read(line, data)
char *line;
Full_Slider_Setting data;
/*
   standard parse function to setup file line for a full slider
*/
{
```

```c
  char *template;        /* template for parsing */
  float low, val, high;  /* temporary value storage */
  int scanned;           /* characters scanned */

/* attempt to scan line */
  template = make_strcat(data->name, " %f %f %f %n", 0);
  scanned = -1;
  sscanf(line, template, &low, &val, &high, &scanned);
  free(template);

/* line didn't match */
  if (scanned != strlen(line))
    return(0);

/* set new values, update slider, and do normal notification function */
  data->fs->low = low;
  data->fs->val = val;
  data->fs->high = high;
  set_full_slider(data->fs);
  if (data->fs->notify)
    (*data->fs->notify)(data->fs);
  return(1);
} static int full_slider_save(file, data)
FILE *file;
Full_Slider_Setting data;
/*
   standard function to save setting data for full slider
*/
{
  fprintf(file, "%s %g %g %g\n", data->name, data->fs->low, data->fs->val,
          data->fs->high);
  return(0);
} void add_full_slider_setting(name, fs)
char *name;
Full_Slider fs;
/*
   setup standard setting functions for full sliders
*/
{
  Full_Slider_Setting data;

data = (Full_Slider_Setting) malloc(sizeof(*data));
  data->name = name;
  data->fs = fs;
  add_handler(&read_list, full_slider_read, data);
  add_handler(&save_list, full_slider_save, data);
}

/*--------------------------------------------------------------------------*/
/* functions for on/off toggles -- i.e. Mold Wall and Empty Mold            */ static int toggle_read(line, data)
char *line;
Toggle_Setting data;
/*
   standard parse function to setup file line for a simple toggle item
*/
```

```c
{
  char *template;        /* template for parsing */
  int val;               /* toggle val -- 1 = on, 0 = off */
  int scanned;           /* characters scanned */

/* attempt to scan line as "On" */
  template = make_strcat(data->name, " On %n", 0);
  scanned = -1;
  sscanf(line, template, &scanned);
  free(template);

/* line matched */
  if (scanned == strlen(line)) {
    val = 1;
  } else {

/* attempt to scan line as "Off" */
    template = make_strcat(data->name, " Off %n", 0);
    scanned = -1;
    sscanf(line, template, &scanned);
    free(template);

/* line matched, or it isn't for this toggle item */
    if (scanned == strlen(line))
      val = 0;
    else
      return(0);
  }

/* update toggle, and do normal notification function */
  panel_set_value(data->pi, val);
  (* (void (*)()) panel_get(data->pi, PANEL_NOTIFY_PROC) )(data->pi, val);
  return(1);
} static int toggle_save(file, data)
FILE *file;
Toggle_Setting data;
/*
   standard function to save setting data for simple binary toggle item
*/
{
  if ( (int)panel_get_value(data->pi) )
    fprintf(file, "%s On\n", data->name);
  else
    fprintf(file, "%s Off\n", data->name);

return(0);
} void add_toggle_setting(name, pi)
char *name;
Panel_item pi;
/*
   setup standard setting functions for simple binary toggle items
*/
{
  Toggle_Setting data;

data = (Toggle_Setting) malloc(sizeof(*data));
  data->name = name;
  data->pi = pi;
```

```
    add_handler(&read_list, toggle_read, data);
    add_handler(&save_list, toggle_save, data);
}
```

```c
/****************************************************************/
/* anim_time.c by Marc Olano for the Eastman Kodak Company      */
/* all rights reserved by the Eastman Kodak Company             */
/*                                                              */
/* creates Time panel on sun for gly_animate                    */
/****************************************************************/ include <suntool/sunview.h>
include <suntool/panel.h>
#include <stdio.h>
#include <dirent.h>
#include <string.h>
#include "util.h"
#include "anim_globals.h"
include "anim_pix.h"
#include "anim_save.h"
#include "anim_navigator.h"
#include "item_types.h"
#include "anim_frame.h"
#include "anim_time.h"

/* button definitions */
#define FIRST_FRAME    0
#define REVERSE        1
#define BACK_FRAME     2
#define STOP           3
#define NEXT_FRAME     4
#define PLAY           5
#define LAST_FRAME     6

/* icons used as buttons */

/* first frame icon */
static short first_image[] = {
# include "first.icon"
};
mpr_static(first_pr, 64, 48, 1, first_image);

/* reverse icon */
static short reverse_image[] = {
# include "reverse.icon"
};
mpr_static(reverse_pr, 64, 48, 1, reverse_image);

/* back frame icon */
static short back_image[] = {
# include "back.icon"
};
mpr_static(back_pr, 64, 48, 1, back_image);

/* stop icon */
static short stop_image[] = {
# include "stop.icon"
};
mpr_static(stop_pr, 64, 48, 1, stop_image);

/* next frame icon */
static short next_image[] = {
# include "next.icon"
};
mpr_static(next_pr, 64, 48, 1, next_image);
```

```c
/* play icon */
static short play_image[] = {
# include "play.icon"
};
mpr_static(play_pr, 64, 48, 1, play_image);

/* last frame icon */
static short last_image[] = {
# include "last.icon"
};
mpr_static(last_pr, 64, 48, 1, last_image);

/* animation direction flag -- -1 = reverse, 0 = stop, 1 = play */
static int animation_direction = 0;

/* play control button item */
static Panel_item play_controls;

static int feedback_frame_done(code_in, my_code)
int code_in;                    /* last pixel code read */
int my_code;                    /* code this function handles */
/*
   called when Frame_Done code comes from pixel program over pixel.link socket
*/
{
   static int frame_name = Frame_Name;   /* code to send frame file name */
   static int frame_start = Frame_Start; /* code to start rendering */
   int name_len;                         /* length of file name */ if (code_in == my_code) {

/* tell pixel program to draw */
     write(pixel.link, &frame_start, sizeof(frame_start));

/* adjust frame number if play or reverse */
     if (animation_direction > 0)
       set_frame_index(frame_index + 1);
     else if (animation_direction < 0)
       set_frame_index(frame_index - 1);

return(1);

} else return(0);
} static void notify_buttons(item, value)
Panel_item item;
int value;
/*
   called when any animation control button is pushed
   value is the button number
*/
{
  switch (value) {
    case FIRST_FRAME:
      set_frame_index(0);                   /* go back to first frame */
```

```
            animation_direction = 0;         /* stop animation */
            panel_set_value(item, STOP);     /* push stop button */
            break;

case REVERSE:
            set_frame_index(frame_index - 1); /* step back one frame */
            animation_direction = -1;         /* set flag for backwards animation */
            break;

case BACK_FRAME:
            set_frame_index(frame_index - 1); /* step back one frame */
            animation_direction = 0;          /* stop animation */
            panel_set_value(item, STOP);      /* push stop button */
            break;

case STOP:
            animation_direction = 0;          /* stop animation */
            break;

case NEXT_FRAME:
            set_frame_index(frame_index + 1); /* step forward one frame */
            animation_direction = 0;          /* stop animation */
            panel_set_value(item, STOP);      /* push stop button */
            break;

case PLAY:
            set_frame_index(frame_index + 1); /* step forward one frame */
            animation_direction = 1;          /* set flag for forwards animation */
            break;

case LAST_FRAME:
            set_frame_index(-1);              /* frames wrap, so -1 = last frame */
            animation_direction = 0;          /* stop animation */
            panel_set_value(item, STOP);      /* push stop button */
            break;
    }
} int animation_pause(mode)
int mode;
/*
   momentarily stop any animation
   if mode = 1, stop ; if mode = 0, continue
   uses global variable play_controls -- sunview item for play buttons
*/
{
    static int direction_save, button_save;    /* save animation mode */ if (mode) {
        direction_save = animation_direction;
        button_save = (int)panel_get_value(play_controls);
        animation_direction = 0;
        panel_set_value(play_controls, STOP);
    } else {
        animation_direction = direction_save;
        panel_set_value(play_controls, button_save);
        if (button_save == PLAY)
            set_frame_index(frame_index + 1); /* step back one frame */
        else if (button_save == REVERSE)
            set_frame_index(frame_index - 1); /* step back one frame */
    }
}
```

```
static int read_buttons(line, pi)
char *line;
Panel_item pi;
/*
   parse a line from a setup file to set the buttons for reverse, stop, or play
*/
{
   int scanned;          /* number of characters scanned */

/* try to parse as reverse */
   scanned = -1;
   sscanf(line, "Animation Reverse %n", &scanned);
   if (scanned == strlen(line)) {
      animation_direction = -1;
      panel_set_value(pi, REVERSE);
      return(1);
   }

/* try to parse as stop */
   sscanf(line, "Animation Stop %n", &scanned);
   if (scanned == strlen(line)) {
      animation_direction = 0;
      panel_set_value(pi, STOP);
      return(1);
   }

/* try to parse as play */
   sscanf(line, "Animation Play %n", &scanned);
   if (scanned == strlen(line)) {
      animation_direction = 1;
      panel_set_value(pi, PLAY);
      return(1);
   }

/* unable to parse */
   return(0);
} static int save_buttons(file, pi)
FILE *file;
Panel_item pi;
/*
   write the setup file line for the current animation mode -- reverse, stop,
      or play
*/
{
   int val;              /* value of animation mode choice item */ val = (int) panel_get_value(pi);

if (val == REVERSE)
      fprintf(file, "Animation Reverse\n");
   else if (val == PLAY)
      fprintf(file, "Animation Play\n");
   else
      fprintf(file, "Animation Stop\n");

return(0);
} static int new_frame_number(unused_data, frame_te)
```

```
  void *unused_data;
  Text_Entry frame_te;
  /*
    called whenever the frame changes -- updates time step number display
  */
  {
    /* update (as long as it isn't currently being edited) */
    if ((Panel_item)panel_get(panel_get(frame_te->pi, PANEL_PARENT_PANEL),
                PANEL_CARET_ITEM) != frame_te->pi) {
      sprintf(frame_te->val, "%d\n", frame_number);
      set_text_entry(frame_te);
    } return(0);    /* return 0 so other timestep handlers are called too */
  } static void notify_frame_number(frame_te)
  Text_Entry frame_te;
  /*
    called when user has entered a new time step
  */
  {
    int number;        /* temporary storage for possible time step */
    int scanned;       /* number of characters read */ scanned = -1;
    sscanf(frame_te->val, "%d %n", &number, &scanned);
    if (scanned == strlen(frame_te->val))
      set_frame_number(number);
    else
      new_frame_number(NULL, frame_te);   /* illegal entry - restore old value */
  } static int new_frame_time(unused_data, time_te)
  void *unused_data;
  Text_Entry time_te;
  /*
    called whenever the frame changes -- updates simulation time display
  */
  {
    /* update (as long as it isn't currently being edited) */
    if ((Panel_item)panel_get(panel_get(time_te->pi, PANEL_PARENT_PANEL),
                PANEL_CARET_ITEM) != time_te->pi) {
      sprintf(time_te->val, "%g\n", frame_time);
      set_text_entry(time_te);
    } return(0);    /* return 0 so other timestep handlers are called too */
  } static void notify_frame_time(time_te)
  Text_Entry time_te;
  /*
    called when user has entered a new simulation time value
  */
  {
    float time;        /* temporary storage for possible time value */
    int scanned;       /* number of characters read */ scanned = -1;
    sscanf(time_te->val, "%f %n", &time, &scanned);
```

```
    if (scanned == strlen(time_te->val))
      set_frame_time(time);
    else
      new_frame_time(NULL, time_te);        /* illegal entry - restore old value */
} void make_time_window(parent_frame, window_list_index)
Frame parent_frame;                 /* parent frame from navigator window */
int window_list_index;              /* index of Time window in window_list[] */
/*
  makes sun animation time control window
  uses global window_list[window_list_index].name for the window title
  sets global window_list[window_list_index].frame
*/
{
    Panel panel;                    /* panel inside view window */
    Rect *item_rect;                /* position and size of dummy item */
    Text_Entry te;                  /* text entry item (for positioning) */
    int x_gap, y_gap;               /* spacing between items in window */

/* create window for view controls */
    window_list[window_list_index].frame =
        make_navigator_subwindow(parent_frame, window_list_index);

panel = window_create(window_list[window_list_index].frame,
        PANEL_WITH_TEXT,
        0);
    panel_create_item(panel, PANEL_CURSOR_HIDING_PLACE, 0);
    x_gap = (int)panel_get(panel, PANEL_ITEM_X_GAP);
    y_gap = (int)panel_get(panel, PANEL_ITEM_Y_GAP);

/* * * * * * * * * * * * * * * * * * * * * * * * * * * * * * * * * * */
/* create items in window                                            */

/* create choice item for first, reverse, back, stop, next, play, and last */
    item_rect = (Rect *)panel_get(
            play_controls = panel_create_item(panel, PANEL_CHOICE,
                PANEL_LAYOUT, PANEL_HORIZONTAL,
                PANEL_FEEDBACK, PANEL_INVERTED,
                PANEL_CHOICE_IMAGES, &first_pr, &reverse_pr, &back_pr,
                    &stop_pr, &next_pr, &play_pr, &last_pr, 0,
                PANEL_VALUE, 3,
                PANEL_NOTIFY_PROC, notify_buttons,
                0),
            PANEL_ITEM_RECT);
    add_handler(&read_list, read_buttons, play_controls);
    add_handler(&save_list, save_buttons, play_controls);

/* simulation time text item */
    item_rect = (Rect *)panel_get(
            panel_create_item(panel, PANEL_MESSAGE,
                PANEL_LABEL_X, item_rect->r_left,
                PANEL_LABEL_Y, item_rect->r_top + item_rect->r_height + y_gap,
                PANEL_LABEL_STRING, "Frame:",
                0),
            PANEL_ITEM_RECT);
    add_handler(&frame_step_list, new_frame_number,
            create_text_entry(panel,
                item_rect->r_left + item_rect->r_width + x_gap,
                item_rect->r_top, notify_frame_number, 10));

/* simulation time text item */
```

```
    item_rect = (Rect *)panel_get(
        panel_create_item(panel, PANEL_MESSAGE,
            PANEL_LABEL_X, item_rect->r_left,
            PANEL_LABEL_Y, item_rect->r_top + item_rect->r_height + y_gap,
            PANEL_LABEL_STRING, "Time:",
            0),
        PANEL_ITEM_RECT);
    add_handler(&frame_step_list, new_frame_time,
        create_text_entry(panel,
            item_rect->r_left + item_rect->r_width + x_gap,
            item_rect->r_top, notify_frame_time, 10));

/* ask to be called when the pixel program finished a frame */
    add_handler(&feedback_list, feedback_frame_done, Frame_Done);

make_done_button(window_list[window_list_index].frame, panel);
}
```

```
/*********************************************************************/
/* anim_time.c by Marc Olano for the Eastman Kodak Company           */
/* all rights reserved by the Eastman Kodak Company                  */
/*                                                                   */
/* creates Time panel on sun for gly_animate                         */
/*********************************************************************/ include <suntool/sunview.h>
include <suntool/panel.h>
#include <stdio.h>
#include <dirent.h>
#include <string.h>
#include "util.h"
#include "anim_globals.h"
include "anim_pix.h"
#include "anim_save.h"
#include "anim_navigator.h"
#include "item_types.h"
#include "anim_frame.h"
#include "anim_time.h"

/* button definitions */
#define FIRST_FRAME    0
#define REVERSE        1
#define BACK_FRAME     2
#define STOP           3
#define NEXT_FRAME     4
#define PLAY           5
#define LAST_FRAME     6

/* icons used as buttons */

/* first frame icon */
static short first_image[] = {
# include "first.icon"
};
mpr_static(first_pr, 64, 48, 1, first_image);

/* reverse icon */
static short reverse_image[] = {
# include "reverse.icon"
};
mpr_static(reverse_pr, 64, 48, 1, reverse_image);

/* back frame icon */
static short back_image[] = {
# include "back.icon"
};
mpr_static(back_pr, 64, 48, 1, back_image);

/* stop icon */
static short stop_image[] = {
# include "stop.icon"
};
mpr_static(stop_pr, 64, 48, 1, stop_image);

/* next frame icon */
static short next_image[] = {
# include "next.icon"
};
mpr_static(next_pr, 64, 48, 1, next_image);
```

```c
/* play icon */
static short play_image[] = {
# include "play.icon"
};
mpr_static(play_pr, 64, 48, 1, play_image);

/* last frame icon */
static short last_image[] = {
# include "last.icon"
};
mpr_static(last_pr, 64, 48, 1, last_image);

/* animation direction flag -- -1 = reverse, 0 = stop, 1 = play */
static int animation_direction = 0;

/* play control button item */
static Panel_item play_controls;

static int feedback_frame_done(code_in, my_code)
int code_in;                    /* last pixel code read */
int my_code;                    /* code this function handles */
/*
   called when Frame_Done code comes from pixel program over pixel.link socket
*/
{
   static int frame_name = Frame_Name;   /* code to send frame file name */
   static int frame_start = Frame_Start; /* code to start rendering */
   int name_len;                         /* length of file name */ if (code_in == my_code) {

/* tell pixel program to draw */
     write(pixel.link, &frame_start, sizeof(frame_start));

/* adjust frame number if play or reverse */
     if (animation_direction > 0)
        set_frame_index(frame_index + 1);
     else if (animation_direction < 0)
        set_frame_index(frame_index - 1);

return(1);

} else return(0);
} static void notify_buttons(item, value)
Panel_item item;
int value;
/*
   called when any animation control button is pushed
   value is the button number
*/
{
   switch (value) {
     case FIRST_FRAME:
        set_frame_index(0);                 /* go back to first frame */
```

```c
          animation_direction = 0;         /* stop animation */
          panel_set_value(item, STOP);     /* push stop button */
          break;

case REVERSE:
          set_frame_index(frame_index - 1); /* step back one frame */
          animation_direction = -1;         /* set flag for backwards animation */
          break;

case BACK_FRAME:
          set_frame_index(frame_index - 1); /* step back one frame */
          animation_direction = 0;          /* stop animation */
          panel_set_value(item, STOP);      /* push stop button */
          break;

case STOP:
          animation_direction = 0;          /* stop animation */
          break;

case NEXT_FRAME:
          set_frame_index(frame_index + 1); /* step forward one frame */
          animation_direction = 0;          /* stop animation */
          panel_set_value(item, STOP);      /* push stop button */
          break;

case PLAY:
          set_frame_index(frame_index + 1); /* step forward one frame */
          animation_direction = 1;          /* set flag for forwards animation */
          break;

case LAST_FRAME:
          set_frame_index(-1);              /* frames wrap, so -1 = last frame */
          animation_direction = 0;          /* stop animation */
          panel_set_value(item, STOP);      /* push stop button */
          break;
    }
} int animation_pause(mode)
int mode;
/*
   momentarily stop any animation
   if mode = 1, stop ; if mode = 0, continue
   uses global variable play_controls -- sunview item for play buttons
*/
{
   static int direction_save, button_save;       /* save animation mode */ if (mode) {
      direction_save = animation_direction;
      button_save = (int)panel_get_value(play_controls);
      animation_direction = 0;
      panel_set_value(play_controls, STOP);
   } else {
      animation_direction = direction_save;
      panel_set_value(play_controls, button_save);
      if (button_save == PLAY)
         set_frame_index(frame_index + 1); /* step back one frame */
      else if (button_save == REVERSE)
         set_frame_index(frame_index - 1); /* step back one frame */
   }
}
```

```
static int read_buttons(line, pi)
char *line;
Panel_item pi;
/*
  parse a line from a setup file to set the buttons for reverse, stop, or play
*/
{
  int scanned;          /* number of characters scanned */

/* try to parse as reverse */
  scanned = -1;
  sscanf(line, "Animation Reverse %n", &scanned);
  if (scanned == strlen(line)) {
    animation_direction = -1;
    panel_set_value(pi, REVERSE);
    return(1);
  }

/* try to parse as stop */
  sscanf(line, "Animation Stop %n", &scanned);
  if (scanned == strlen(line)) {
    animation_direction = 0;
    panel_set_value(pi, STOP);
    return(1);
  }

/* try to parse as play */
  sscanf(line, "Animation Play %n", &scanned);
  if (scanned == strlen(line)) {
    animation_direction = 1;
    panel_set_value(pi, PLAY);
    return(1);
  }

/* unable to parse */
  return(0);
} static int save_buttons(file, pi)
FILE *file;
Panel_item pi;
/*
  write the setup file line for the current animation mode -- reverse, stop,
    or play
*/
{
  int val;              /* value of animation mode choice item */ val = (int) panel_get_value(pi);

if (val == REVERSE)
    fprintf(file, "Animation Reverse\n");
  else if (val == PLAY)
    fprintf(file, "Animation Play\n");
  else
    fprintf(file, "Animation Stop\n");

return(0);
} static int new_frame_number(unused_data, frame_te)
```

```c
  void *unused_data;
  Text_Entry frame_te;
/*
   called whenever the frame changes -- updates time step number display
*/
{
  /* update (as long as it isn't currently being edited) */
  if ((Panel_item)panel_get(panel_get(frame_te->pi, PANEL_PARENT_PANEL),
              PANEL_CARET_ITEM) != frame_te->pi) {
    sprintf(frame_te->val, "%d\n", frame_number);
    set_text_entry(frame_te);
  } return(0);    /* return 0 so other timestep handlers are called too */
} static void notify_frame_number(frame_te)
  Text_Entry frame_te;
/*
   called when user has entered a new time step
*/
{
  int number;        /* temporary storage for possible time step */
  int scanned;       /* number of characters read */ scanned = -1;
  sscanf(frame_te->val, "%d %n", &number, &scanned);
  if (scanned == strlen(frame_te->val))
    set_frame_number(number);
  else
    new_frame_number(NULL, frame_te);    /* illegal entry - restore old value */
} static int new_frame_time(unused_data, time_te)
  void *unused_data;
  Text_Entry time_te;
/*
   called whenever the frame changes -- updates simulation time display
*/
{
  /* update (as long as it isn't currently being edited) */
  if ((Panel_item)panel_get(panel_get(time_te->pi, PANEL_PARENT_PANEL),
              PANEL_CARET_ITEM) != time_te->pi) {
    sprintf(time_te->val, "%g\n", frame_time);
    set_text_entry(time_te);
  } return(0);    /* return 0 so other timestep handlers are called too */
} static void notify_frame_time(time_te)
  Text_Entry time_te;
/*
   called when user has entered a new simulation time value
*/
{
  float time;        /* temporary storage for possible time value */
  int scanned;       /* number of characters read */ scanned = -1;
  sscanf(time_te->val, "%f %n", &time, &scanned);
```

```
    if (scanned == strlen(time_te->val))
      set_frame_time(time);
    else
      new_frame_time(NULL, time_te);      /* illegal entry - restore old value */
} void make_time_window(parent_frame, window_list_index)
Frame parent_frame;                    /* parent frame from navigator window */
int window_list_index;                 /* index of Time window in window_list[] */
/*
  makes sun animation time control window
  uses global window_list[window_list_index].name for the window title
  sets global window_list[window_list_index].frame
*/
{
  Panel panel;                 /* panel inside view window */
  Rect *item_rect;             /* position and size of dummy item */
  Text_Entry te;               /* text entry item (for positioning) */
  int x_gap, y_gap;            /* spacing between items in window */

/* create window for view controls */
  window_list[window_list_index].frame =
      make_navigator_subwindow(parent_frame, window_list_index);

panel = window_create(window_list[window_list_index].frame,
      PANEL_WITH_TEXT,
      0);
  panel_create_item(panel, PANEL_CURSOR_HIDING_PLACE, 0);
  x_gap = (int)panel_get(panel, PANEL_ITEM_X_GAP);
  y_gap = (int)panel_get(panel, PANEL_ITEM_Y_GAP);

/* * * * * * * * * * * * * * * * * * * * * * * * * * * * * * * * * * * */
/* create items in window                                              */

/* create choice item for first, reverse, back, stop, next, play, and last */
  item_rect = (Rect *)panel_get(
      play_controls = panel_create_item(panel, PANEL_CHOICE,
          PANEL_LAYOUT, PANEL_HORIZONTAL,
          PANEL_FEEDBACK, PANEL_INVERTED,
          PANEL_CHOICE_IMAGES, &first_pr, &reverse_pr, &back_pr,
              &stop_pr, &next_pr, &play_pr, &last_pr, 0,
          PANEL_VALUE, 3,
          PANEL_NOTIFY_PROC, notify_buttons,
          0),
      PANEL_ITEM_RECT);
  add_handler(&read_list, read_buttons, play_controls);
  add_handler(&save_list, save_buttons, play_controls);

/* simulation time text item */
  item_rect = (Rect *)panel_get(
      panel_create_item(panel, PANEL_MESSAGE,
          PANEL_LABEL_X, item_rect->r_left,
          PANEL_LABEL_Y, item_rect->r_top + item_rect->r_height + y_gap,
          PANEL_LABEL_STRING, "Frame:",
          0),
      PANEL_ITEM_RECT);
  add_handler(&frame_step_list, new_frame_number,
      create_text_entry(panel,
          item_rect->r_left + item_rect->r_width + x_gap,
          item_rect->r_top, notify_frame_number, 10));

/* simulation time text item */
```

```
    item_rect = (Rect *)panel_get(
        panel_create_item(panel, PANEL_MESSAGE,
            PANEL_LABEL_X, item_rect->r_left,
            PANEL_LABEL_Y, item_rect->r_top + item_rect->r_height + y_gap,
            PANEL_LABEL_STRING, "Time:",
            0),
        PANEL_ITEM_RECT);
    add_handler(&frame_step_list, new_frame_time,
        create_text_entry(panel,
            item_rect->r_left + item_rect->r_width + x_gap,
            item_rect->r_top, notify_frame_time, 10));

/* ask to be called when the pixel program finished a frame */
    add_handler(&feedback_list, feedback_frame_done, Frame_Done);

make_done_button(window_list[window_list_index].frame, panel);
}
```

```c
/*******************************************************************/
/* anim_trace.c by Marc Olano for the Eastman Kodak Company        */
/* all rights reserved by the Eastman Kodak Company                */
/*                                                                 */
/* creates Traces panel on sun for gly_animate                     */
/* toggle list panel of available traces                           */
/* trace data from "trace" file                                    */
/*******************************************************************/ include <suntool/sunview.h>
include <suntool/panel.h>
#include <suntool/canvas.h>
#include <sys/types.h>
#include <sys/stat.h>
#include <stdio.h>
include "util.h"
#include "env.h"
#include "anim_pix.h"
#include "anim_globals.h"
#include "anim_trace.h"

/* size of graph window in sun screen pixels */
#define TRACE_GRAPH_WIDTH     400
#define TRACE_GRAPH_HEIGHT    300

/* array of info about traces */
typedef struct {
    char *name;            /* string name of graph, NULL = unused */
    char *format;          /* printf label format for y */
    int trace_number;      /* number in frame's trace data for this graph */
    Panel_item toggle_pi;  /* list of traces */
    int toggle_number;     /* number of this trace in toggle_pi */
    Frame frame;           /* sunview frame containing trace */
    Canvas canvas;         /* sunview canvas containing trace */
    Pixrect *image;        /* image of graph (without time cursor) */
    float x_scale;         /* scaling from graph time to canvas coordinates */
    int x_offset;          /* offset from edge of canvas to time = 0.0 */
                           /* time = canvas (int)(x * x_scale) + x_offset */
    int y_bottom, y_top;   /* canvas positions of top and bottom of time mark */
} Trace_Info;

/* ends with NULL (0) in the name field */
static Trace_Info trace_list[] = {

/* name of graph        label format        trace number (all other fields */
/*                                          in file         uninitailized)  */
    {"Gate Pressure",   "%g PSI",           1},
    {"Flow Rate",       "%g",               2},
    {"Clamp Force",     "%g pounds",        3},
    {0,                 0,                  0},
};

static void trace_canvas_done(frame)
Frame frame;
/*
    called when a trace canvas is closed -- turns off toggle box
    frame's WIN_CLIENT_DATA is a pointer to the Trace_Info for this element
*/
{
```

```
  Trace_Info *info;

info = (Trace_Info *)window_get(frame, WIN_CLIENT_DATA);
  window_set(frame, WIN_SHOW, FALSE, 0);
  panel_set(info->toggle_pi, PANEL_TOGGLE_VALUE, info->toggle_number, 0, 0);
} static void notify_done_button(pi)
Panel_item pi;
/*
  called when done button is pushed in canvas
  buttons PANEL_CLIENT_DATA is the sunview frame to close
*/
{
  trace_canvas_done((Frame) panel_get(pi, PANEL_CLIENT_DATA));
} static void draw_new_time(canvas)
Canvas canvas;
/*
  copy image of graph from copy in memory and draw a time marker on it
  needs WIN_CLIENT_DATA for window to be the memory image pixrect
*/
{
  Trace_Info *info;              /* data about this trace graph */
  Pixwin *canvas_pw;
  Pixrect *image;

info = (Trace_Info *)window_get(canvas, WIN_CLIENT_DATA);
  canvas_pw = canvas_pixwin(canvas);
  image = info->image;

pw_write(canvas_pw, 0, 0, image->pr_width, image->pr_height, PIX_SRC,
        image, 0, 0);
  pw_vector(canvas_pw,
        (int)(frame_time * info->x_scale) + info->x_offset, info->y_bottom,
        (int)(frame_time * info->x_scale) + info->x_offset, info->y_top,
        PIX_SRC, 1);
} static int handle_new_frame(unused_data, canvas)
void *unused_data;
Canvas canvas;
/*
  called by do_handler each time the timestep changes
  draw with time marker in a new position
*/
{
  draw_new_time(canvas);

return(0);    /* return 0 so other timestep handlers will be called too */
} static void draw_trace(info)
Trace_Info *info;
/*
  draw trace graph in image pixrect after window and canvas have been created
*/
{
  Pixrect *image;      /* copy of image for this trace */
```

```c
    float x_max, y_max;    /* maximum x and y values */
    float x_scale, y_scale;/* scaling conversion from pixels to data */
    int x_off, y_off;      /* offsets into window for pixel to data conversions */
    Pixfont *font;         /* font for graph labels */
    char label[20];        /* graph label */
    struct pr_subregion text_box; /* bounding box of text */
    int i;                 /* loop variable */

/* don't bother if there is no data */
    if (total_timesteps != 0) {

/* get easy access to image pixrect */
      image = info->image;

/* find range of graph */
      x_max = trace_data[total_timesteps-1][TRACE_TIME];
      y_max = 0.0;
      for(i=0; i<total_timesteps; i++)
        y_max = MAX(y_max, trace_data[i][info->trace_number]);

/* clear graph */
      pr_rop(image, 0, 0, image->pr_width, image->pr_height, PIX_CLR, 0, 0, 0);

/* display axes labels -- start scaling and offset calculations */
      x_off = y_off = 0;            /* start font calculations */
      x_scale = image->pr_width;
      y_scale = image->pr_height;

font = pf_default();               /* open default font */ sprintf(label, info->format, y_max);
      pf_textbound(&text_box, strlen(label), font, label);
      y_off = text_box.pos.y + text_box.size.y + 8;
      y_scale = image->pr_height - y_off;
      pr_text(image, text_box.pos.x + 4, text_box.pos.y + text_box.size.y + 8,
          PIX_SRC, font, label);

pf_textbound(&text_box, 1, font, "0");
      x_off = text_box.pos.x + text_box.size.x + 4;
      x_scale = image->pr_width - x_off;
      y_scale -= text_box.size.y + 4;
      pr_text(image, text_box.pos.x + 4, image->pr_height - 4,
          PIX_SRC, font, "0");

sprintf(label, "%g sec", x_max);
      pf_textbound(&text_box, strlen(label), font, label);
      y_scale -= 8;
      pr_text(image, image->pr_width - text_box.pos.x - text_box.size.x - 4,
          image->pr_height - 4, PIX_SRC, font, label);

pf_close(font);

/* draw axes */
      pr_vector(image, x_off, (int)y_scale + y_off, x_off, y_off,
          PIX_SRC, 1);
      pr_vector(image, x_off, (int)y_scale + y_off, (int)x_scale + x_off,
          (int)y_scale + y_off, PIX_SRC, 1);

/* get scaling and offset factors */
      x_scale /= x_max;
      y_off += y_scale;
      y_scale /= - y_max;

/* draw graph */
```

```c
      for(i=1; i<total_timesteps; i++)
        pr_vector(image,
                  (int)(trace_data[i-1][TRACE_TIME] * x_scale) + x_off,
                  (int)(trace_data[i-1][info->trace_number] * y_scale) + y_off,
                  (int)(trace_data[i][TRACE_TIME] * x_scale) + x_off,
                  (int)(trace_data[i][info->trace_number] * y_scale) + y_off,
                  PIX_SRC, 1);

/* save information to be able to draw time mark */
      info->x_scale = x_scale;
      info->x_offset = x_off;
      info->y_top = y_off;
      info->y_bottom = (int)(y_max * y_scale) + y_off;

/* draw canvas with time mark */
      draw_new_time(info->canvas);
   }
} static int new_data()
/*
  called when new frames are read -- reread data and regraph
*/
{
  FILE *trace_file;             /* "trace" file with time information */
  char *trace_file_name;        /* name of trace file from environment */
  struct stat file_info;        /* stat file info for "trace" for file size */
  int i;                        /* loop variable */

/* try to open and read trace file with time info */
  trace_file_name = get_environment_var(ENV_TRACE_FILE, TRACE_FILE_DEFAULT);
  if ((trace_file = fopen(trace_file_name , "r")) == NULL) {
    error_box(trace_file_name);
    total_timesteps = 0;
  } else {

/* count timesteps recorded */
    fstat(fileno(trace_file), &file_info);
    total_timesteps = file_info.st_size / (TRACE_COUNT * sizeof(float));

/* get trace data */
    if (trace_data != NULL) free(trace_data);
    trace_data = (float (*)[TRACE_COUNT]) malloc(file_info.st_size);
    fread(trace_data, file_info.st_size, 1, trace_file);
    fclose(trace_file);
  }

/* draw graphs with new data */
  for(i=0; trace_list[i].name; i++)
    draw_trace(&trace_list[i]);

return(0);
} static void make_trace_canvas(parent_frame, info)
Frame parent_frame;             /* frame for Traces window */
Trace_Info *info;               /* information about this trace graph */
/*
  create window and canvas for a trace
*/
{
  Panel panel;                  /* panel for "Done" button */
```

```
   struct pixrect *done_button_pr;        /* picture of "Done" button */
   Pixwin *pw;                            /* to get width, height, and depth */

/* create window, canvas, and memory image */
   info->frame = window_create(parent_frame, FRAME,
        FRAME_LABEL, info->name,
        FRAME_SHOW_LABEL, TRUE,
        FRAME_DONE_PROC, trace_canvas_done,
        WIN_CLIENT_DATA, info,
        0);
   info->canvas = window_create(info->frame, CANVAS,
        WIN_WIDTH, TRACE_GRAPH_WIDTH,
        WIN_HEIGHT, TRACE_GRAPH_HEIGHT,
        CANVAS_AUTO_EXPAND, FALSE,
        CANVAS_AUTO_SHRINK, FALSE,
        CANVAS_RETAINED, FALSE,
        CANVAS_REPAINT_PROC, draw_new_time,
        WIN_CLIENT_DATA, info,
        0);
   window_fit(info->frame);

pw = canvas_pixwin(info->canvas);
   info->image = mem_create( TRACE_GRAPH_WIDTH, TRACE_GRAPH_HEIGHT,
        pw->pw_pixrect->pr_depth);

/* create panel with done button */
   panel = window_create(info->frame, PANEL,
        WIN_X, 0,
        WIN_BELOW, info->canvas,
        0);

/* create done button */
   done_button_pr = panel_button_image(panel, "Done", 0, 0);
   panel_create_item(panel, PANEL_BUTTON,
        PANEL_LABEL_X, (int)window_get(panel, WIN_WIDTH)
            - done_button_pr->pr_width,
        PANEL_LABEL_Y, ATTR_COL(0),
        PANEL_LABEL_IMAGE, done_button_pr,
        PANEL_NOTIFY_PROC, notify_done_button,
        PANEL_CLIENT_DATA, info->frame,
        0);

window_fit(panel);
   window_fit(info->frame);

/* to be called for each new timestep -- moves time marker */
   add_handler(&frame_step_list, handle_new_frame, info->canvas);
} static void notify_trace_list(item, value)
Panel_item item;          /* sunview item for trace window toggle switches */
int value;                /* bit mask value for first 32 toggles */
/*
   called when a toggle box is changed
   opens and closes all trace windows as necessary
*/
{
  int i;

/* set all windows open/closed according to trace toggle state */
  for(i=0; trace_list[i].name; i++)              /* loop throught names */

/* only open/close if the window and toggle list don't agree */
```

```
      if (((value & 1<<trace_list[i].toggle_number) != 0)
              != ((int)window_get(trace_list[i].frame, WIN_SHOW) != 0))
        window_set(trace_list[i].frame, WIN_SHOW,
              (value & 1<<trace_list[i].toggle_number)!=0, 0);
} void make_trace_window(parent_frame, window_list_index)
Frame parent_frame;                 /* parent frame from navigator window */
int window_list_index;              /* index of Traces window in window_list[] */
/*
  makes sun traces control window
  traces window gives a toggle choice of simple line graph traces to display
  uses global window_list[window_list_index].name for the window title
  sets global window_list[window_list_index].frame
*/
{
  Panel panel;                      /* panel inside traces window */
  Panel_item toggle_pi;             /* panel item for list of traces */
  int i;                            /* loop variable */

/* create panel for traces window toggle list */
  window_list[window_list_index].frame =
        make_navigator_subwindow(parent_frame, window_list_index);
  panel = window_create(window_list[window_list_index].frame, PANEL, 0);

/* create trace list */
  toggle_pi = panel_create_item(panel, PANEL_TOGGLE,
        PANEL_LAYOUT, PANEL_VERTICAL,
        PANEL_NOTIFY_PROC, notify_trace_list,
        0);

/* create traces -- elements in list with non-NULL names have data */
  for(i=0; trace_list[i].name; i++) {
    trace_list[i].toggle_pi = toggle_pi;
    trace_list[i].toggle_number = i;
    panel_set(toggle_pi, PANEL_CHOICE_STRING, i, trace_list[i].name, 0);
    make_trace_canvas(window_list[window_list_index].frame, &trace_list[i]);
  }

/* setup to read trace file and draw new graphs when new frames are found */
  add_handler(&new_frames_list, new_data, NULL);
  do_handler(new_frames_list);

make_done_button(window_list[window_list_index].frame, panel);
}
```

```
/**********************************************************************/
/* anim_view.c by Marc Olano for the Eastman Kodak Company            */
/* all rights reserved by the Eastman Kodak Company                   */
/*                                                                    */
/* creates View panel on sun for gly_animate                          */
/**********************************************************************/ include <suntool/sunview.h>
include <suntool/panel.h>
#include <stdio.h>
#include "anim_globals.h"
include "anim_pix.h"
#include "anim_navigator.h"
#include "item_types.h"
#include "anim_std_save.h"
#include "anim_view.h"

/* icons used as slider labels */

/* tilt icon */
static short tilt_image[] = {
# include "tilt.icon"
};
mpr_static(tilt_pr, 64, 48, 1, tilt_image);

/* pan icon */
static short pan_image[] = {
# include "pan.icon"
};
mpr_static(pan_pr, 64, 48, 1, pan_image);

/* twist icon */
static short twist_image[] = {
# include "twist.icon"
};
mpr_static(twist_pr, 64, 48, 1, twist_image);

/* look at point sliders (global since notify_picked_element() needs them) */
Full_Slider x_fs, y_fs, z_fs;

static void notify_x(fs)
Full_Slider fs;
/*
  called when x coordinate of look-at-point (point being looked toward) changes
*/
{
  int code = Look_At_X;

/* send code and slider value to pixel program */
  write(pixel.link, &code, sizeof(int));
  write(pixel.link, & fs->val, sizeof(float));
} static void notify_y(fs)
Full_Slider fs;
/*
  called when y coordinate of look-at-point (point being looked toward) changes
*/
{
  int code = Look_At_Y;
```

```c
  /* send code and slider value to pixel program */
  write(pixel.link, &code, sizeof(int));
  write(pixel.link, & fs->val, sizeof(float));
} static void notify_z(fs)
Full_Slider fs;
/*
  called when z coordinate of look-at-point (point being looked toward) changes
*/
{
  int code = Look_At_Z;

/* send code and slider value to pixel program */
  write(pixel.link, &code, sizeof(int));
  write(pixel.link, & fs->val, sizeof(float));
} static void notify_picked_element()
/*
  called when button is pushed to look at the last picked element
*/
{
  static int init_start_code = Init_Start;
  static int init_end_code = Init_End;

/* do these together without updating the screen */
  write(pixel.link, &init_start_code, sizeof(int));

x_fs->val = picked_center.x;                      /* set value */
  x_fs->low = MIN(x_fs->low, x_fs->val);            /* check low and high range */
  x_fs->high = MAX(x_fs->high, x_fs->val);
  set_full_slider(x_fs);                            /* update slider */
  notify_x(x_fs);                                   /* tell pixel program. */ y_fs->val = picked_center.y;
  y_fs->low = MIN(y_fs->low, y_fs->val);
  y_fs->high = MAX(y_fs->high, y_fs->val);
  set_full_slider(y_fs);
  notify_y(y_fs);

z_fs->val = picked_center.z;
  z_fs->low = MIN(z_fs->low, z_fs->val);
  z_fs->high = MAX(z_fs->high, z_fs->val);
  set_full_slider(z_fs);
  notify_z(z_fs);

write(pixel.link, &init_end_code, sizeof(int));
} static void notify_distance(fs)
Full_Slider fs;
/*
  called when the slider for distance of the eye from the object changes
*/
{
  int code = Eye_Distance;

/* send code and slider value to pixel program */
  write(pixel.link, &code, sizeof(int));
```

```
  write(pixel.link, & fs->val, sizeof(float));
} static void notify_tilt(fs)
Full_Slider fs;
/*
  called when the eye positon tilt slider changes
*/
{
  int code = Eye_Tilt;

/* send code and slider value to pixel program */
  write(pixel.link, &code, sizeof(int));
  write(pixel.link, & fs->val, sizeof(float));
} static void notify_pan(fs)
Full_Slider fs;
/*
  called when the eye positon pan slider changes
*/
{
  int code = Eye_Pan;

/* send code and slider value to pixel program */
  write(pixel.link, &code, sizeof(int));
  write(pixel.link, & fs->val, sizeof(float));
} static void notify_twist(fs)
Full_Slider fs;
/*
  called when the eye positon twist slider changes
*/
{
  int code = Eye_Twist;

/* send code and slider value to pixel program */
  write(pixel.link, &code, sizeof(int));
  write(pixel.link, & fs->val, sizeof(float));
} void make_view_window(parent_frame, window_list_index)
Frame parent_frame;             /* parent frame from navigator window */
int window_list_index;          /* index of View window in window_list[] */
/*
  makes sun view control window
  uses global window_list[window_list_index].name for the window title
  sets global window_list[window_list_index].frame
*/
{
  Panel view_panel;             /* panel inside view window */
  Rect *item_rect;              /* position and size of dummy item */
  int slider_x_pos;             /* also used for positioning */
  Full_Slider fs;               /* full slider item (for positioning) */
  int x_gap, y_gap;             /* spacing between items in window */

/* create window for view controls */
  window_list[window_list_index].frame =
        make_navigator_subwindow(parent_frame, window_list_index);
```

```
view_panel = window_create(window_list[window_list_index].frame,
      PANEL_WITH_TEXT,
      0);
panel_create_item(view_panel, PANEL_CURSOR_HIDING_PLACE, 0);
x_gap = (int)panel_get(view_panel, PANEL_ITEM_X_GAP);
y_gap = (int)panel_get(view_panel, PANEL_ITEM_Y_GAP);

/* * * * * * * * * * * * * * * * * * * * * * * * * * * * * * * * */
/* create items in window                                        */

/* comment before look-at-point sliders */
item_rect = (Rect *)panel_get(
      panel_create_item(view_panel, PANEL_MESSAGE,
            PANEL_LABEL_STRING, "Point to Look Toward:",
            0),
      PANEL_ITEM_RECT);

/* look-at-x slider */
item_rect = (Rect *)panel_get(
      panel_create_item(view_panel, PANEL_MESSAGE,
            PANEL_LABEL_X, ATTR_COL(8),
            PANEL_LABEL_Y, item_rect->r_top + item_rect->r_height + y_gap,
            PANEL_LABEL_STRING, "X:",
            0),
      PANEL_ITEM_RECT);
slider_x_pos = item_rect->r_left + item_rect->r_width + x_gap;
x_fs = create_full_slider(view_panel, slider_x_pos, item_rect->r_top,
      notify_x, "%7.2f", 7);
add_full_slider_setting("Look At X", x_fs);

/* look-at-y slider */
item_rect = (Rect *)panel_get(
      panel_create_item(view_panel, PANEL_MESSAGE,
            PANEL_LABEL_X, ATTR_COL(8),
            PANEL_LABEL_Y, item_rect->r_top + full_slider_height(x_fs) +
                  2*y_gap,
            PANEL_LABEL_STRING, "Y:",
            0),
      PANEL_ITEM_RECT);
y_fs = create_full_slider(view_panel, slider_x_pos, item_rect->r_top,
      notify_y, "%7.2f", 7);
add_full_slider_setting("Look At Y", y_fs);

/* look-at-z slider */
item_rect = (Rect *)panel_get(
      panel_create_item(view_panel, PANEL_MESSAGE,
            PANEL_LABEL_X, ATTR_COL(8),
            PANEL_LABEL_Y, item_rect->r_top + full_slider_height(y_fs) +
                  2*y_gap,
            PANEL_LABEL_STRING, "Z:",
            0),
      PANEL_ITEM_RECT);
z_fs = create_full_slider(view_panel, slider_x_pos, item_rect->r_top,
      notify_z, "%7.2f", 7);
add_full_slider_setting("Look At Z", z_fs);

/* jump to last element picked button */
item_rect = (Rect *)panel_get(
      panel_create_item(view_panel, PANEL_BUTTON,
            PANEL_LABEL_IMAGE,
                  panel_button_image(view_panel, "Last Picked Element",
                        0, 0),
```

```
                PANEL_LABEL_X, ATTR_COL(8),
                PANEL_LABEL_Y, item_rect->r_top + full_slider_height(z_fs)
                        + 2*y_gap,
                PANEL_NOTIFY_PROC, notify_picked_element,
                0),
        PANEL_ITEM_RECT);

/* comment before eye positon */
item_rect = (Rect *)panel_get(
        panel_create_item(view_panel, PANEL_MESSAGE,
                PANEL_LABEL_X, ATTR_COL(0),
                PANEL_LABEL_Y, item_rect->r_top + full_slider_height(fs) +
                        3*y_gap,
                PANEL_LABEL_STRING, "Position of Eye from Point:",
                0),
        PANEL_ITEM_RECT);

/* distance of eye from look-at-point slider */
item_rect = (Rect *)panel_get(
        panel_create_item(view_panel, PANEL_MESSAGE,
                PANEL_LABEL_X, ATTR_COL(1),
                PANEL_LABEL_Y, item_rect->r_top + item_rect->r_height + y_gap,
                PANEL_LABEL_STRING, "Distance:",
                0),
        PANEL_ITEM_RECT);
fs = create_full_slider(view_panel, slider_x_pos, item_rect->r_top,
        notify_distance, "%7.2f", 7);
add_full_slider_setting("Eye Distance", fs);

/* eye tilt slider */
item_rect = (Rect *)panel_get(
        panel_create_item(view_panel, PANEL_MESSAGE,
                PANEL_LABEL_X, slider_x_pos - x_gap - tilt_pr.pr_width,
                PANEL_LABEL_Y, item_rect->r_top + full_slider_height(fs) +
                        3*y_gap,
                PANEL_LABEL_IMAGE, &tilt_pr,
                0),
        PANEL_ITEM_RECT);
fs = create_full_slider(view_panel,
        slider_x_pos,
        item_rect->r_top + tilt_pr.pr_height - full_slider_height(fs),
        notify_tilt, "%7.2f", 7);
add_full_slider_setting("Eye Tilt", fs);

/* eye pan slider */
item_rect = (Rect *)panel_get(
        panel_create_item(view_panel, PANEL_MESSAGE,
                PANEL_LABEL_X, slider_x_pos - x_gap - tilt_pr.pr_width,
                PANEL_LABEL_Y, item_rect->r_top + item_rect->r_height + y_gap,
                PANEL_LABEL_IMAGE, &pan_pr,
                0),
        PANEL_ITEM_RECT);
fs = create_full_slider(view_panel,
        slider_x_pos,
        item_rect->r_top + tilt_pr.pr_height - full_slider_height(fs),
        notify_pan, "%7.2f", 7);
add_full_slider_setting("Eye Pan", fs);

/* eye twist slider */
item_rect = (Rect *)panel_get(
        panel_create_item(view_panel, PANEL_MESSAGE,
                PANEL_LABEL_X, slider_x_pos - x_gap - tilt_pr.pr_width,
                PANEL_LABEL_Y, item_rect->r_top + item_rect->r_height + y_gap,
```

```
                PANEL_LABEL_IMAGE, &twist_pr,
                    0),
            PANEL_ITEM_RECT);
    fs = create_full_slider(view_panel,
            slider_x_pos,
            item_rect->r_top + tilt_pr.pr_height - full_slider_height(fs),
            notify_twist, "%7.2f", 7);
    add_full_slider_setting("Eye Twist", fs);

make_done_button(window_list[window_list_index].frame, view_panel);
}
```

```
/****************************************************************/
/* data_functions.c by Marc Olano                               */
/*                                                              */
/* functions used to operate on a glyph data directory          */
/* function prototypes in data_functions.h                      */
/****************************************************************/
include <suntool/sunview.h>
include <suntool/panel.h>
include <vfork.h> void gly_data(button)
Panel_item button;
/*
  runs the gly_data program when a glyph data directory button is pressed
  PANEL_CLIENT_DATA for the button should be the directory name
*/
{
  if (vfork() == 0) {
    execlp("gly_data", "gly_data",
        (char *)panel_get(button, PANEL_CLIENT_DATA), 0);
    error_box("gly_data");
    _exit(1);
  }
} void gly_simulate(button)
Panel_item button;
/*
  runs the CIMP program when a glyph data directory button is pressed
  PANEL_CLIENT_DATA for the button should be the directory name
*/
{
  if (vfork() == 0) {
    execlp("gly_simulate", "gly_simulate",
        (char *)panel_get(button, PANEL_CLIENT_DATA), 0);
    error_box("gly_simulate");
    _exit(1);
  }
} void gly_animate(button)
Panel_item button;
/*
  runs the gly_animate program when a glyph data directory button is pressed
  PANEL_CLIENT_DATA for the button should be the directory name
*/
{
  if (vfork() == 0) {
    execlp("gly_animate", "gly_animate",
        (char *)panel_get(button, PANEL_CLIENT_DATA), 0);
    error_box("gly_animate");
    _exit(1);
  }
} void gly_compress(button)
Panel_item button;
/*
  runs the gly_compress program when a glyph data directory button is pressed
  PANEL_CLIENT_DATA for the button should be the directory name
*/
```

```
{
  if (vfork() == 0) {
    execlp("gly_compress", "gly_compress",
        (char *)panel_get(button, PANEL_CLIENT_DATA), 0);
    error_box("gly_compress");
    _exit(1);
  }
} void gly_uncompress(button)
Panel_item button;
/*
  runs the gly_compress program when a glyph data directory button is pressed
  PANEL_CLIENT_DATA for the button should be the directory name
*/
{
  if (vfork() == 0) {
    execlp("gly_uncompress", "gly_uncompress",
        (char *)panel_get(button, PANEL_CLIENT_DATA), 0);
    error_box("gly_uncompress");
    _exit(1);
  }
}
```

```c
/***********************************************************************/
/* flow.c by Marc Olano                                                */
/*                                                                     */
/* display data directories in directory given by enviornment variable */
/* GLY_DATA.                                                           */
/*                                                                     */
/* run gly_data on one of these directories or a new one               */
/***********************************************************************/ include <stdio.h>
include <string.h>
#include <suntool/sunview.h>
include <suntool/panel.h>
#include <suntool/scrollbar.h>
#include <sys/stat.h>
#include <sys/types.h>
#include <dirent.h>
#include "anim_pix.h"
#include "data_functions.h"
#include "sunutil.h"
#include "util.h"
#include "env.h"

/* ---> FUNCTION PROTOTYPES <--- */
void make_sorted_dir_buttons();

/* ---> GLOBAL VARIABLES <--- */

/* global so directory can be refreshed */
Panel dir_panel;                /* directory list panel */
char *gly_data_dir;             /* base data directory path */

/* ---> MENU FUNCTIONS <--- */ void not_done()
/*
  function for unimplemented buttons
*/
{
  mess("this function is not yet implemented");
} void quit(quit_button_item)
/*
  quit gly
*/
Panel_item quit_button_item;
{
  window_done( (Panel)panel_get(quit_button_item, PANEL_PARENT_PANEL) );
} void refresh_dir_list()
/*
  clear and redisplay data directory list
*/
{
  Panel_item next_item, item;   /* loop pointers */

/* let other windows do stuff while we work */
```

```c
    window_release_event_lock(dir_panel);

/* remove old list */
    item = panel_get(dir_panel, PANEL_FIRST_ITEM);
    while (item != NULL) {
      next_item = panel_get(item, PANEL_NEXT_ITEM);

panel_set(item, PANEL_SHOW_ITEM, FALSE, 0);
      free(panel_get(item, PANEL_CLIENT_DATA));
      panel_free(item);

item = next_item;
    }

/* create new list */
    make_sorted_dir_buttons();
} void make_dir()
/*
  make a new data directory
*/
{
  char *dir;                    /* name of new directory */
  char *dir_path;               /* full path of new directory */

/* get new directory name */
  dir = typein("new data directory name", 15, "");
  if (dir == NULL) return;

/* create new directory */
  dir_path = make_strcat(gly_data_dir, "/", dir, NULL);
  if (mkdir(dir_path, 0777) != 0)
    error_box(dir_path);
  free(dir_path);

/* refresh list to show new directory */
  refresh_dir_list();
}

/* ---> PANEL CREATION FUNCTIONS <--- */ void make_dir_line(panel, dir_name)
Panel panel;                    /* panel to put line of butttons in */
char dir_name[];                /* name of directory to make buttons for */
/*
  makes the line of buttons that correspond to a single data directory
     button 1 -- directory name -- 24 char max -- runs gly_data
     button 2 -- "simulate" -- present if INPUT file in directory -- runs rcimp
     button 3 -- "animate xxx frames" -- runs gly_animate
     button 4 -- "compress    xxxxxx Kbytes"/"uncompress xxxxxx Kbytes" -- runs
         compress or uncompress -- bytes given are total directory size (non-
         recursive sum of file sizes -- may not match du which counts partially
         used blocks)
     2 character spacing between buttons/messages
     total width of directory line: 77 characters
  checks that dir_name is a valid directory with glyph files in it
*/
{
  char *full_file_name;         /* file name with path */
  struct stat stat_buffer;      /* buffer for reading file details */
  DIR *dir;                     /* directory file */
```

```c
  struct dirent *dir_entry;         /* directory entry */
  char *frame_base;                 /* base name for frame files */
  int INPUT_file_present;           /* true if INPUT file is in the directory */
  int geometry_file_present;        /* true if geometry file is in the directory */
  int compressed_files_present;     /* true if files with a .Z extension */
                                    /*   are in the directory */
  int frame_count;                  /* number of frame* files */
  int dir_size;                     /* number of bytes in directory */
  int len;                          /* file name length */
  char s[21];                       /* string for building button labels */
  char *name;                       /* copy of dir_name */

/* get file info for (possible) directory */
  full_file_name = make_strcat(gly_data_dir, "/", dir_name, NULL);
  stat(full_file_name, &stat_buffer);
  free(full_file_name);

/* if format part of mode doesn't say "directory", return now */
  if ((stat_buffer.st_mode & S_IFMT) != S_IFDIR) return;

/* if this is the current directory or parent directory (. or ..) return */
  if (strcmp(dir_name, ".") == 0 || strcmp(dir_name, "..") == 0) return;

/* open directory -- if we can't read it, return */
  full_file_name = make_strcat(gly_data_dir, "/", dir_name, NULL);
  dir = opendir(full_file_name);
  free(full_file_name);
  if (dir == NULL) return;

/* read directory -- check for un-compressed files, CIMP input, */
  /* geometry file, and frame files */
  INPUT_file_present = geometry_file_present = compressed_files_present = 0;
  frame_count = dir_size = 0;
  while((dir_entry = readdir(dir)) != NULL) {

/* get file status */
    full_file_name = make_strcat(gly_data_dir, "/", dir_name, "/",
        dir_entry->d_name, NULL);
    stat(full_file_name, &stat_buffer);
    free(full_file_name);

/* add this file to directory size total */
    dir_size += stat_buffer.st_size;

/* don't look at non-files (i.e. directories, sockets, ...) */
    if ((stat_buffer.st_mode & S_IFMT) == S_IFREG) {

/* check if file is compressed, then strip .Z from end */
      len = strlen(dir_entry->d_name);
      if (len > 2 && strcmp(dir_entry->d_name + len - 2, ".Z") == 0) {
        compressed_files_present = 1;
        *(dir_entry->d_name + len - 2) = '\0';
      }

/* check for frame files, cimp input file, or geometry file */
      frame_base = get_environment_var(ENV_FRAME_BASE, FRAME_BASE_DEFAULT);
      if (strncmp(dir_entry->d_name, frame_base, strlen(frame_base)) == 0)
        frame_count++;
      else if (strcmp(dir_entry->d_name, "INPUT") == 0)
        INPUT_file_present = 1;
      else if (strcmp(dir_entry->d_name, get_environment_var(ENV_GEOMETRY_FILE,
           GEOMETRY_FILE_DEFAULT)) == 0)
        geometry_file_present = 1;
    }
  }
```

```c
    }
    closedir(dir);

/* if no INPUT, frame, or geometry files are present, it must not be a */
    /* glyph directory, so return now */
    if (!INPUT_file_present && !geometry_file_present && frame_count == 0)
        return;

/* make actual line of buttons -- button client data is the directory name */ name = (char *)malloc(strlen(dir_name));
    strcpy(name, dir_name);

/* data directory name -- 20 characters max -- runs gly_data */
    panel_create_item(panel, PANEL_BUTTON,
        PANEL_LABEL_STRING, dir_name,
        PANEL_NOTIFY_PROC, gly_data,
        PANEL_CLIENT_DATA, name,
        0);

/* input file present flag -- will run gly_batch */
    if (INPUT_file_present)
        panel_create_item(panel, PANEL_BUTTON,
            PANEL_LABEL_X, ATTR_COL(20),
            PANEL_LABEL_STRING, "simulate",
            PANEL_NOTIFY_PROC, gly_simulate,
            PANEL_CLIENT_DATA, name,
            0);

/* frame count -- will run gly_animate */
    if (geometry_file_present) {
        sprintf(s, "animate %3d frames", frame_count);
        panel_create_item(panel, PANEL_BUTTON,
            PANEL_LABEL_X, ATTR_COL(32),
            PANEL_LABEL_STRING, s,
            PANEL_NOTIFY_PROC, gly_animate,
            PANEL_CLIENT_DATA, name,
            0);
    }

/* compressed/uncompressed -- will run gly_compress or gly_uncompress */
    if (compressed_files_present) {
        sprintf(s, "uncompress %4d Kbytes", dir_size/1024);
        panel_create_item(panel, PANEL_BUTTON,
            PANEL_LABEL_X, ATTR_COL(54),
            PANEL_LABEL_STRING, s,
            PANEL_NOTIFY_PROC, gly_uncompress,
            PANEL_CLIENT_DATA, name,
            0);
    } else {
        sprintf(s, "compress %6d Kbytes", dir_size/1024);
        panel_create_item(panel, PANEL_BUTTON,
            PANEL_LABEL_X, ATTR_COL(54),
            PANEL_LABEL_STRING, s,
            PANEL_NOTIFY_PROC, gly_compress,
            PANEL_CLIENT_DATA, name,
            0);
    }
} void make_sorted_dir_buttons()
/*
    make buttons in dir_panel for subdirectories in gly_data_dir directory
```

```
   buttons will be created in alphabetical order
*/
{
   DIR *dir;                         /* directory file */
   struct dirent *dir_entry;         /* directory entry */
   char (*dir_table)[MAXNAMLEN];     /* malloc'd table of directory info */
   int num_files;                    /* number of files in directory */
   int i;                            /* loop index */

/* open directory */
   if ((dir = opendir(gly_data_dir)) == NULL)
     error_exit(gly_data_dir);

/* count number of files in directory */
   for(num_files=0; readdir(dir) != NULL; num_files++);

/* create array of files in directory */
   dir_table = (char (*)[MAXNAMLEN])malloc(num_files * MAXNAMLEN);
   rewinddir(dir);
   for(i=0; (dir_entry = readdir(dir)) != NULL; i++)
     strcpy(dir_table[i], dir_entry->d_name);        /* save file name */

/* sort array of files in directory */
   qsort(dir_table, num_files, MAXNAMLEN, strcmp);

/* create buttons for subdirectories */
   for(i=0; i<num_files; i++)
     make_dir_line(dir_panel, dir_table[i]);

/* update scrollbar range and draw items in window */
   panel_update_scrolling_size(dir_panel);
   panel_paint(dir_panel, PANEL_NO_CLEAR);

/* clean up */
   free(dir_table);
   closedir(dir);
} void make_dir_panel(frame)
/*
   make panel (global dir_panel) containing listing of directories
*/
Frame frame;
{
   /* create panel with scrollbar */
   dir_panel = window_create(frame, PANEL,
         WIN_VERTICAL_SCROLLBAR, scrollbar_create(0),
         0);

make_sorted_dir_buttons();
} void make_menu_panel(frame)
/*
   make panel for menu items (other than directory list)
*/
Frame frame;
{
   Panel menu_panel;

menu_panel = window_create(frame, PANEL, 0);
```

```
  make_button(menu_panel, "new data directory", make_dir);
  make_button(menu_panel, "refresh directory list", refresh_dir_list);
  make_button(menu_panel, "quit", quit);

window_fit_height(menu_panel);
}

Frame make_gly_frame(frame_name)
/*
  make frame containing gly menu and data directory list
*/
char frame_name[];
{
  Frame gly_frame;

gly_frame = window_create(NULL, FRAME,
        FRAME_LABEL,    frame_name,
        0);

make_menu_panel(gly_frame);
  make_dir_panel(gly_frame);

return(gly_frame);
}

/* ---> STARTUP FUNCTIONS <--- */ void usage_exit(program_name)
char program_name[];
/*
  print program usage and exit
*/
{
  fprintf(stderr, "Usage: %s [<base data directory>]\n", program_name);
  fprintf(stderr, "   if no argument is given, the enviornment variable\n");
  fprintf(stderr, "   GLY_DATA should contain the base data directory path\n");
  exit(1);
} void main(argc, argv)
int argc;
char *argv[];
{
  /* check for usage error */
  if (argc > 2)
    usage_exit(argv[0]);

/* get glyph base data directory */
  if (argc == 2)
    gly_data_dir = set_environment_var(ENV_DATA_DIR, argv[1]);
  else
    gly_data_dir = get_environment_var(ENV_DATA_DIR, DATA_DIR_DEFAULT);

/* check permission and existance of GLY_DATA */
  if (! file_check(gly_data_dir, "r"))
    error_exit(gly_data_dir);

/* create menu window */
  window_main_loop( make_gly_frame(
        make_strcat(argv[0], " - ", gly_data_dir, NULL) ) );
}
```

```
/****************************************************************/
/* full_sider_item.c by Marc Olano for the Eastman Kodak Company */
/* all rights reserved by the Eastman Kodak Company              */
/*                                                               */
/* produce a slider with text entry fields for the value and minimum */
/* and maximum range limits.  A button on each side of the slider    */
/* allows continuous increase or decrease in slider value beyond     */
/* range limits                                                  */
/*                                                               */
/* use:                                                          */
/* include item_types.h                                          */
/*                                                               */
/* create panel that will contain full slider items              */
/*      Panel panel;                                             */
/*      Frame frame;                                             */
/*      panel = window_create(frame, PANEL_WITH_TEXT, 0);        */
/*      panel_create_item(panel, PANEL_CURSOR_HIDING_PLACE, 0);  */
/*                                                               */
/* create full slider item                                       */
/*      Full_Slider fs;                                          */
/*      int x_pos, y_pos, number_length;                         */
/*      char *number_printf_format;                              */
/*      void notify_proc();                                      */
/*      fs = create_full_slider(panel,  x_pos, y_pos,  notify_proc, */
/*             number_printf_format, number_length);             */
/*                                                               */
/* size of full slider item                                      */
/*      int width, height;                                       */
/*      width = full_slider_width(fs);                           */
/*      height = full_slider_height(fs);                         */
/*                                                               */
/* change value or range of full slider item                     */
/*      fs->val = 0.5;                                           */
/*      fs->low = 0.0;                                           */
/*      fs->high = 1.0;                                          */
/*      set_full_slider(fs);                                     */
/*                                                               */
/* notify procedure for full slider item                         */
/*      void notify_proc(fs)                                     */
/*      Full_Slider fs;                                          */
/*      {                                                        */
/*         printf("%f\n", fs->val);                              */
/*      }                                                        */
/*                                                               */
/* link with text_entry_item.o                                   */
/****************************************************************/ include <suntool/sunview.h>
include <suntool/panel.h>
#include <suntool/alert.h>
#include <sys/time.h>
#include "item_types.h"

/*-------------------------------------------------------------------*/
/* global variables                                                  */

/* -- left arrow for slider decrease button */
static short left_arrow_image[] = {
#       include "left_arrow.cursor"
};
mpr_static(left_arrow, 16, 16, 1, left_arrow_image);
```

```c
/* -- right arrow for slider increase button */
static short right_arrow_image[] = {
#       include "right_arrow.cursor"
};
mpr_static(right_arrow, 16, 16, 1, right_arrow_image);

/* interval delay between up/down button steps */
/*    first pair give seconds and microseconds between ticks */
/*    second pair gives second and microsecond delay to first step */
static struct itimerval step_interval = {{0,200000}, {0,200000}};

/* fraction of current range moved each step for up/down buttons */
define STEP_RATE       0.05 void set_full_slider(fs)
Full_Slider fs;
/*
   draw full slider for current values, and update text fields
   uses global pixrect gray50
*/
{
   struct pixrect *slider_pr;   /* pixrect of slider */
   int bar_val;                 /* coordinate of end of bar */

/* calculate un-offset coordinate of end of bar to speed things up */
   bar_val = (int)((fs->val - fs->low) * 250. / (fs->high - fs->low));

/* get slider image */
   slider_pr = (struct pixrect *)panel_get(fs->slider_pi, PANEL_LABEL_IMAGE);

/* draw slider outline */
   pr_vector(slider_pr, 0,0, 255,0, PIX_SET, 1);
   pr_vector(slider_pr, 0,15, 255,15, PIX_SET, 1);
   pr_vector(slider_pr, 0, 0, 0,15, PIX_SET, 1);
   pr_vector(slider_pr, 255, 0, 255,15, PIX_SET, 1);

/* clear inside slider */
   pr_rop(slider_pr, 1,1, 254,14, PIX_CLR, NULL, 0,0);

/* shade center of slider */
   pr_replrop(slider_pr, 1, 1, bar_val, 14, PIX_SRC, &grey50, 0, 0);

/* draw solid slider bars */
   pr_rop(slider_pr, bar_val + 1, 1, 5, 14, PIX_SET, NULL, 0, 0);

/* put revised picture on slider item */
   panel_set(fs->slider_pi, PANEL_LABEL_IMAGE, slider_pr, 0);

/* print value, low and high text values */
   sprintf(fs->val_te->val, fs->format, fs->val);
   set_text_entry(fs->val_te);
   sprintf(fs->low_te->val, fs->format, fs->low);
   set_text_entry(fs->low_te);
   sprintf(fs->high_te->val, fs->format, fs->high);
   set_text_entry(fs->high_te);
} static void notify_val_text(te)
Text_Entry te;
```

```c
/*
  called when value text item has a new value
*/
{
  Full_Slider fs;

/* get data for slider */
  fs = (Full_Slider)(te->client_data);

/* set new value */
  sscanf(te->val, "%f", &fs->val);

/* adjust range limits if value falls outside */
  if (fs->low > fs->val)
    fs->low = fs->val;
  if (fs->high < fs->val)
    fs->high = fs->val;

/* update display with these new settings */
  set_full_slider(fs);

/* let user procedure know about new values too */
  Notify(fs);
} static void notify_low_text(te)
Text_Entry te;
/*
  called when low end text item has a new value
*/
{
  Full_Slider fs;
  float new_val;

/* get data for slider */
  fs = (Full_Slider)(te->client_data);

/* set new value */
  new_val = fs->low;
  sscanf(te->val, "%f", &new_val);

/* check for range error */
  if (new_val >= fs->high) {
    alert_prompt(0, 0, ALERT_MESSAGE_STRINGS,
        "The minimum value for a slider cannot be",
        "greater than its maximum value", 0,
        ALERT_BUTTON_YES, "Ok",
        0);
    set_full_slider(fs);
    return;
  }

/* adjust slider value if it is less than the low end of the range */
  fs->low = new_val;
  if (fs->val < fs->low)
    fs->val = fs->low;

/* update display with these new settings */
  set_full_slider(fs);

/* let user procedure know about new values too */
  Notify(fs);
}
```

```c
static void notify_high_text(te)
Text_Entry te;
/*
  called when high end text item has a new value
*/
{
  Full_Slider fs;
  float new_val;

/* get data for slider */
  fs = (Full_Slider)(te->client_data);

/* set new value */
  new_val = fs->high;
  sscanf(te->val, "%f", &new_val);

/* check for range error */
  if (new_val <= fs->low) {
    alert_prompt(0, 0, ALERT_MESSAGE_STRINGS,
        "The maximum value for a slider cannot be",
        "less than its minimum value", 0,
        ALERT_BUTTON_YES, "Ok",
        0);
    set_full_slider(fs);
    return;
  }

/* adjust range low end and value if they're greater than the high value */
  fs->high = new_val;
  if (fs->val > fs->high)
    fs->val = fs->high;

/* update display with these new settings */
  set_full_slider(fs);

/* let user procedure know about new values too */
  Notify(fs);
} static int full_slider_event_proc(pi, event)
Panel_item pi;
Event *event;
/*
  handle events for full sliders
*/
{
  Full_Slider fs;         /* full slider data */

/* start with standard event handler for panel */
  (*(int (*)())panel_get(  (Panel)panel_get(pi, PANEL_PARENT_PANEL),
        PANEL_EVENT_PROC  ))(pi, event);

/* check event type to see if we should adjust the bar */
  if ( event_id(event) == MS_LEFT  ||                /* left button */
       (event_id(event) == PANEL_EVENT_CANCEL  ||    /* cancel */
        event_id(event) == LOC_DRAG) &&              /* left button drag */
       (int)window_get(  (Panel)panel_get(pi, PANEL_PARENT_PANEL),
            WIN_EVENT_STATE, MS_LEFT) ) { fs = (Full_Slider) panel_get(pi, PANEL_CLIENT_DATA);
    fs->val = (float)(event_x(event) - (int)panel_get(pi, PANEL_LABEL_X) - 3)
```

```c
          * (fs->high - fs->low) / 250. + fs->low;
        if (fs->val < fs->low) fs->val = fs->low;
        if (fs->val > fs->high) fs->val = fs->high;

/* update with new values */
        set_full_slider(fs);

/* let user procedure know about new values too */
        Notify(fs);
    }
} static int move_down(fs)
Full_Slider fs;
/*
   move value of slider down one step for down button
*/
{
    fs->val -= STEP_RATE * (fs->high - fs->low);

if (fs->low > fs->val)
        fs->low = fs->val;

set_full_slider(fs);

/* let user procedure know about new values too */
    Notify(fs);

return(NOTIFY_DONE);
} static int move_up(fs)
Full_Slider fs;
/*
   move value of slider up one step for up button
*/
{
    fs->val += STEP_RATE * (fs->high - fs->low);

if (fs->high < fs->val)
        fs->high = fs->val;

set_full_slider(fs);

/* let user procedure know about new values too */
    Notify(fs);

return(NOTIFY_DONE);
} static int down_arrow_event_proc(pi, event)
Panel_item pi;
Event *event;
/*
   event function for the down button to the left of the slider
   set up or turn off interval timer to call move_down()
   uses global variable step_interval to get the timer period to use
*/
{
    Full_Slider fs;
```

```
    /* start with standard event handler for panel */
    (*(int (*)())panel_get(  (Panel)panel_get(pi, PANEL_PARENT_PANEL),
        PANEL_EVENT_PROC  ))(pi, event);

/* get slider info */
    fs = (Full_Slider)panel_get(pi, PANEL_CLIENT_DATA);

/* start changing if left button was pushed or down when the mouse entered */
    if ( (event_id(event) == MS_LEFT  &&  event_is_down(event)) ||
         (event_id(event) == PANEL_EVENT_DRAG_IN &&
          (int)window_get( (Panel)panel_get(pi, PANEL_PARENT_PANEL),
              WIN_EVENT_STATE, MS_LEFT)) ) {

/* set up to call move_down() every interval */
        notify_set_itimer_func(fs, move_down, ITIMER_REAL, &step_interval, NULL);

/* take first step now */
        move_down(fs);

/* stop changing if button is released or mouse leaves */
    } else if ( (event_id(event) == MS_LEFT  &&  event_is_up(event)) ||
         (event_id(event) == PANEL_EVENT_CANCEL) ) {

/* turn off interval timer */
        notify_set_itimer_func(fs, move_down, ITIMER_REAL, NULL, NULL);
    }
} static int up_arrow_event_proc(pi, event)
Panel_item pi;
Event *event;
/*
   event function for the up button to the right of the slider
   set up or turn off interval timer to call move_up()
   uses global variable step_interval to get the timer period to use
*/
{
    Full_Slider fs;

/* start with standard event handler for panel */
    (*(int (*)())panel_get(  (Panel)panel_get(pi, PANEL_PARENT_PANEL),
        PANEL_EVENT_PROC  ))(pi, event);

/* get slider info */
    fs = (Full_Slider)panel_get(pi, PANEL_CLIENT_DATA);

/* start changing if left button was pushed or down when the mouse entered */
    if ( (event_id(event) == MS_LEFT  &&  event_is_down(event)) ||
         (event_id(event) == PANEL_EVENT_DRAG_IN &&
          (int)window_get( (Panel)panel_get(pi, PANEL_PARENT_PANEL),
              WIN_EVENT_STATE, MS_LEFT)) ) {

/* set up to call move_up() every interval */
        notify_set_itimer_func(fs, move_up, ITIMER_REAL, &step_interval, NULL);

/* take first step now */
        move_up(fs);

/* stop changing if button is released or mouse leaves */
```

```c
    } else if ( (event_id(event) == MS_LEFT  &&  event_is_up(event)) ||
        (event_id(event) == PANEL_EVENT_CANCEL) ) {

/* turn off interval timer */
        notify_set_itimer_func(fs, move_up, ITIMER_REAL, NULL, NULL);
    }
}

Full_Slider create_full_slider(panel, x, y, notify_proc, format, length)
Panel panel;                    /* panel to put it in */
int x, y;                       /* position to put it */
void (*notify_proc)();          /* function to call when it changes */
char *format;                   /* printf format for numbers */
int length;                     /* character width of numbers */
/*
    create a full slider item in a panel
    client_data fields for text items created are set to point to the
        Full_Slider data created
    returns Full_Slider created
    uses global pixrects left_arrow and right_arrow for button pictures
*/
{
    Full_Slider fs;

/* create full slider item */
    fs = (Full_Slider) malloc(sizeof(*fs));
    fs->format = format;
    fs->low = 0.;
    fs->high = 1.;
    fs->val = 0.5;
    fs->notify = notify_proc;

/* create text fields */
    fs->low_te = create_text_entry(panel, x, y, notify_low_text, length);
    panel_set(fs->low_te->pi,
        PANEL_LABEL_Y, y + text_entry_height(fs->low_te) + 5,
        0);
    fs->high_te = create_text_entry(panel,
        x + 16 + 256, y + text_entry_height(fs->low_te) + 5,
        notify_high_text, length);
    fs->val_te = create_text_entry(panel,
        x + 16 + 256 + 16 + 10 + (text_entry_width(fs->low_te) / 2), y,
        notify_val_text, length);
    fs->val_te->client_data = fs->low_te->client_data = fs->high_te->client_data
        = fs;

/* create up and down buttons */
    fs->down_pi = panel_create_item(panel, PANEL_BUTTON,
        PANEL_LABEL_X, x + (text_entry_width(fs->low_te) / 2),
        PANEL_LABEL_Y, y,
        PANEL_LABEL_IMAGE, &left_arrow,
        PANEL_EVENT_PROC, down_arrow_event_proc,
        PANEL_CLIENT_DATA, fs,
        0);
    fs->up_pi = panel_create_item(panel, PANEL_BUTTON,
        PANEL_LABEL_X, x + (text_entry_width(fs->low_te) / 2) + 256 + 16,
        PANEL_LABEL_Y, y,
        PANEL_LABEL_IMAGE, &right_arrow,
        PANEL_EVENT_PROC, up_arrow_event_proc,
        PANEL_CLIENT_DATA, fs,
        0);

fs->slider_pi = panel_create_item(panel, PANEL_MESSAGE,
```

```
            PANEL_LABEL_X, x + (text_entry_width(fs->low_te) / 2) + 16,
            PANEL_LABEL_Y, y,
            PANEL_LABEL_IMAGE, mem_create(256, 16,
                    ((Pixwin *)window_get(panel, WIN_PIXWIN))
                    ->pw_pixrect->pr_depth),
            PANEL_PAINT, PANEL_NO_CLEAR,
            PANEL_EVENT_PROC, full_slider_event_proc,
            PANEL_CLIENT_DATA, fs,
            0);

/* set with initial values */
    set_full_slider(fs);

return(fs);
}
```

```
/*******************************************************************/
/* gly_animate.c by Marc Olano for the Eastman Kodak Company       */
/* All Rights Reserved                                             */
/*                                                                 */
/* animated injection molding simulation display program           */
/* runs on SUN workstation and AT&T 900 series Pixel Machine       */
/* developed under Sun OS release 4.0.3                            */
/*   AT&T Pixel Machines PIClib release 1.2                        */
/*                                                                 */
/* this module contains main and the code to initialize the global */
/* directory variables                                             */
/*                                                                 */
/* unlike many of the other gly_* programs, gly_animate changes the*/
/* working directory to $GLY_DATA/<data directory>                 */
/*                                                                 */
/* usage: gly_animate <data directory>                             */
/*   requires environment variables GLY_DATA and GLY_DIR to be set */
/*   runs glyph visualization program on $GLY_DATA/<data directory>*/
/*   GLY_DATA should be set to a base directory containing individual */
/*      subdirectories for each simulation                         */
/*   GLY_DIR should be set to the base directory for the glyph software */
/*******************************************************************/ include <stdio.h>
include "util.h"
#include "env.h"
#include "sunutil.h"
#include "anim_globals.h"
include "anim_pix.h"
#include "anim_navigator.h"
#include "anim_link.h"

static void set_global_dir_info(data_dir_arg)
char *data_dir_arg;              /* argument with data directory name */
/*
   sets global gly_dir = copy of environment variable GLY_DIR
   changes working directory to $GLY_DATA/data_dir_arg
*/
{
  gly_dir = get_environment_var(ENV_PROGRAM_DIR, PROGRAM_DIR_DEFAULT);
  if (chdir(make_strcat(get_environment_var(ENV_DATA_DIR, DATA_DIR_DEFAULT),
        "/", data_dir_arg, 0)) != 0) {
    error_box(data_dir_arg);
    exit(1);
  }
} main(argc, argv)
int argc;
char *argv[];
{
  if (argc != 2) {
    fprintf(stderr,
"usage: gly_animate <data directory>\n\
  requires environment variables GLY_DATA and GLY_DIR to be set\n\
  runs glyph visualization program on $GLY_DATA/<data directory>\n\
  GLY_DATA should be set to a base directory containing individual\n\
    subdirectories for each simulation\n\
  GLY_DIR should be set to the base directory for the glyph software\n");
    exit(1);
  }
```

```
    /* initialize directory and pixel program stuff */
    set_global_dir_info(argv[1]);
    make_pixel_connection();

/* create sunview windows */
    do_navigator_window();

/* tell child pixel program to stop too */
    kill_pixel_program();
}
```

```c
/*******************************************************************/
/* gly_data.c by Marc Olano                                        */
/*                                                                 */
/* operate on glyph data directory                                 */
/*                                                                 */
/* usage: gly_data data_directory                                  */
/*    directory used is $GLY_DATA/data_dir                         */
/*    if $GLY_DATA does not exist, ./data_dir is used              */
/*******************************************************************/ include <suntool/sunview.h>
include <suntool/panel.h>
#include <stdio.h>
include <string.h>
#include <sys/stat.h>
#include <sys/types.h>
#include <vfork.h>
#include <dirent.h>
#include "anim_pix.h"
#include "sunutil.h"
#include "util.h"
#include "env.h"

/* ---> TYPE DEFINITION <--- */
struct dir_action_struct {     /* PANEL_CLIENT_DATA for buttons in dir list */
   char program_name[20];      /* program to run */
   char dir_name[MAXNAMLEN]    /* name of directory */
};

/* ---> FUNCTION PROTOTYPES <--- */
void make_dir_buttons();

/* ---> GLOBAL VARIABLES <--- */

Panel dir_panel;              /* directory list panel */
char *gly_data_dir;           /* base data directory path */
char *data_dir;               /* data directory name */
char *data_path;              /* full path of data directory */

/* ---> MENU FUNCTIONS <--- */ void quit(quit_button_item)
/*
   quit gly
*/
Panel_item quit_button_item;
{
   window_done( (Panel)panel_get(quit_button_item, PANEL_PARENT_PANEL) );
} void refresh_dir()
/*
   clear and redisplay data directory info
*/
{
   Panel_item next_item, item;   /* loop pointers */

/* remove old info */
   item = panel_get(dir_panel, PANEL_FIRST_ITEM);
```

```
  while (item != NULL) {
    next_item = panel_get(item, PANEL_NEXT_ITEM);

panel_set(item, PANEL_SHOW_ITEM, FALSE, 0);
    free(panel_get(item, PANEL_CLIENT_DATA));
    panel_free(item);

item = next_item;
  }

/* create new list */
  make_dir_buttons();
}

/* ---> DIRECTORY ACTION FUNCTIONS <--- */ void dir_action(button)
Panel_item button;
/*
  run function on data directory when a button is pushed
  runs "program_name dir_name"
  the button's PANEL_CLIENT_DATA points to a dir_action_struct containing
    program_name and dir_name
*/
{
  struct dir_action_struct *dir_data;

dir_data = (struct dir_action_struct *) panel_get(button,
        PANEL_CLIENT_DATA, 0);

if (vfork() == 0) {
    execlp(dir_data->program_name, dir_data->program_name, dir_data->dir_name,
        0);
    error_box(dir_data->program_name);
    _exit(1);
  }
} struct dir_action_struct *make_dir_action_data(program, dir)
char *program, *dir;
/*
  create directory action structure for button PANEL_CLIENT_DATA
*/
{
  struct dir_action_struct *dir_data;

dir_data = (struct dir_action_struct *) malloc(sizeof(
        struct dir_action_struct));
  strcpy(dir_data->program_name, program);
  strcpy(dir_data->dir_name, dir);

return(dir_data);
}

/* ---> PANEL CREATION FUNCTIONS <--- */ void make_dir_line(panel, dir_name)
Panel panel;           /* panel to put line of butttons in */
char dir_name[];       /* name of directory to make buttons for */
/*
  makes the line of buttons that correspond to a single data directory
```

```
     button 1 -- "simulate" -- present if INPUT file in directory -- runs rcimp
     button 2 -- "animate xxx frames" -- runs gly_animate
     button 3 -- "compress   xxxxxx Kbytes"/"uncompress xxxxxx Kbytes" -- runs
         compress or uncompress -- bytes given are total directory size (non-
         recursive sum of file sizes -- may not match du which counts partially
         used blocks)
     2 character spacing between buttons/messages
   checks that dir_name is a valid directory with glyph files in it
*/
{
   char *full_file_name;              /* file name with path */
   struct stat stat_buffer;           /* buffer for reading file details */
   DIR *dir;                          /* directory file */
   struct dirent *dir_entry;          /* directory entry */
   char *frame_base;                  /* base name for frame files */
   int INPUT_file_present;            /* true if INPUT file is in the directory */
   int geometry_file_present;         /* true if geometry file is in the directory */
   int compressed_files_present;      /* true if files with a .Z extension */
                                      /*   are in the directory */
   int frame_count;                   /* number of frame* files */
   int dir_size;                      /* number of bytes in directory */
   int len;                           /* file name length */
   char s[21];                        /* string for building button labels */

/* get file info for (possible) directory */
   full_file_name = make_strcat(gly_data_dir, "/", dir_name, NULL);
   stat(full_file_name, &stat_buffer);
   free(full_file_name);

/* if format part of mode doesn't say "directory", return now */
   if ((stat_buffer.st_mode & S_IFMT) != S_IFDIR) return;

/* if this is the current directory or parent directory (. or ..) return */
   if (strcmp(dir_name, ".") == 0 || strcmp(dir_name, "..") == 0) return;

/* open directory -- if we can't read it, return */
   full_file_name = make_strcat(gly_data_dir, "/", dir_name, NULL);
   dir = opendir(full_file_name);
   free(full_file_name);
   if (dir == NULL) return;

/* read directory -- check for un-compressed files, CIMP input, */
   /* geometry file, and frame files */
   INPUT_file_present = geometry_file_present = compressed_files_present = 0;
   frame_count = dir_size = 0;
   while((dir_entry = readdir(dir)) != NULL) {

/* get file status */
      full_file_name = make_strcat(gly_data_dir, "/", dir_name, "/",
            dir_entry->d_name, NULL);
      stat(full_file_name, &stat_buffer);
      free(full_file_name);

/* add this file to directory size total */
      dir_size += stat_buffer.st_size;

/* don't look at non-files (i.e. directories, sockets, ...) */
      if ((stat_buffer.st_mode & S_IFMT) == S_IFREG) {

/* check if file is compressed, then strip .Z from end */
         len = strlen(dir_entry->d_name);
         if (len > 2  && strcmp(dir_entry->d_name + len - 2, ".Z") == 0) {
            compressed_files_present = 1;
            *(dir_entry->d_name + len - 2) = '\0';
```

```
    }

/* check for frame files, cimp input file, or geometry file */
        frame_base = get_environment_var(ENV_FRAME_BASE, FRAME_BASE_DEFAULT);
        if (strncmp(dir_entry->d_name, frame_base, strlen(frame_base)) == 0)
          frame_count++;
        else if (strcmp(dir_entry->d_name, "INPUT") == 0)
          INPUT_file_present = 1;
        else if (strcmp(dir_entry->d_name, get_environment_var(ENV_GEOMETRY_FILE,
                GEOMETRY_FILE_DEFAULT)) == 0)
          geometry_file_present = 1;
    }
  }
  closedir(dir);

/* if no INPUT, frame, or geometry files are present, it must not be a */
  /* glyph directory, so return now */
  if (!INPUT_file_present && !geometry_file_present && frame_count == 0)
    return;

/* make actual line of buttons */
  /* button PANEL_CLIENT_DATA is a dir_action_struct */

/* input file present flag -- will run gly_batch */
  if (INPUT_file_present)
    panel_create_item(panel, PANEL_BUTTON,
        PANEL_LABEL_STRING, "simulate",
        PANEL_NOTIFY_PROC, dir_action,
        PANEL_CLIENT_DATA, make_dir_action_data("gly_simulate", dir_name),
        0);

/* frame count -- will run gly_animate */
  if (geometry_file_present) {
    sprintf(s, "animate %3d frames", frame_count);
    panel_create_item(panel, PANEL_BUTTON,
        PANEL_LABEL_X, ATTR_COL(11),
        PANEL_LABEL_STRING, s,
        PANEL_NOTIFY_PROC, dir_action,
        PANEL_CLIENT_DATA, make_dir_action_data("gly_animate", dir_name),
        0);
  }

/* compressed/uncompressed -- will run gly_compress or gly_uncompress */
  if (compressed_files_present) {
    sprintf(s, "uncompress %4d Kbytes", dir_size/1024);
    panel_create_item(panel, PANEL_BUTTON,
        PANEL_LABEL_X, ATTR_COL(32),
        PANEL_LABEL_STRING, s,
        PANEL_NOTIFY_PROC, dir_action,
        PANEL_CLIENT_DATA, make_dir_action_data("gly_uncompress", dir_name),
        0);
  } else {
    sprintf(s, "compress %6d Kbytes", dir_size/1024);
    panel_create_item(panel, PANEL_BUTTON,
        PANEL_LABEL_X, ATTR_COL(32),
        PANEL_LABEL_STRING, s,
        PANEL_NOTIFY_PROC, dir_action,
        PANEL_CLIENT_DATA, make_dir_action_data("gly_compress", dir_name),
        0);
  }
} void make_dir_buttons()
```

```
/*
  make buttons in dir_panel for data directory
*/
{
  make_dir_line(dir_panel, data_dir);
  panel_paint(dir_panel, PANEL_NO_CLEAR);
} void make_dir_panel(frame)
/*
  make panel (global dir_panel) containing listing of directories
*/
Frame frame;
{
  /* create panel with scrollbar */
  dir_panel = window_create(frame, PANEL,
        0);

make_dir_buttons();
  window_fit(dir_panel);
  window_fit(frame);
} void make_menu_panel(frame)
/*
  make panel for menu items (other than directory list)
*/
Frame frame;
{
  Panel menu_panel;

menu_panel = window_create(frame, PANEL, 0);

make_button(menu_panel, "refresh display", refresh_dir);
  make_button(menu_panel, "quit", quit);

window_fit_height(menu_panel);
}

Frame make_gly_frame(frame_name)
/*
  make frame containing gly menu and data directory list
*/
char frame_name[];
{
  Frame gly_frame;

gly_frame = window_create(NULL, FRAME,
        FRAME_LABEL,    frame_name,
        0);

make_menu_panel(gly_frame);
  make_dir_panel(gly_frame);

return(gly_frame);
}

/* ---> STARTUP FUNCTIONS <--- */ void usage_exit(program_name)
```

```
char program_name[];
/*
   print program usage and exit
*/
{
  fprintf(stderr, "Usage: %s data_dir\n", program_name);
  fprintf(stderr, "  operate on glyph data directory\n");
  fprintf(stderr, "  path of directory is $GLY_DATA/data_dir\n");
  fprintf(stderr, "  if $GLY_DATA does not exist, ./data_dir is used\n");
  exit(1);
} void main(argc, argv)
int argc;
char *argv[];
{
  /* check for usage error */
  if (argc != 2)
    usage_exit(argv[0]);

/* get data directory */
  gly_data_dir = get_environment_var(ENV_DATA_DIR, DATA_DIR_DEFAULT);
  data_dir = argv[1];
  data_path = make_strcat(gly_data_dir,"/",data_dir,0);

/* check permission and existance of data_path */
  if (! file_check(data_path, "r"))
    error_exit(data_path);

/* create menu window */
  window_main_loop( make_gly_frame(
        make_strcat(argv[0], " - ", data_path, 0) ) );
}
```

```c
/*******************************************************************/
/* gly_pixel.c by Marc Olano for the Eastman Kodak Company         */
/* all rights reserved by the Eastman Kodak Company                */
/*                                                                 */
/* pixel machine part of glyph animation program                   */
/* executed by gly_animate -- NOT TO BE RUN ALONE                  */
/*                                                                 */
/* running conditions -                                            */
/*   environment variable GLY_LINK = file descriptor for bi-directional */
/*     communication socket to gly_animate                         */
/*******************************************************************/
include <stdio.h>
include <piclib.h>
#include <sys/time.h>
#include <signal.h>
#include "anim_pix.h"
#include "pix_globals.h"
#include "pix_init.h"
#include "pix_geometry.h"
#include "pix_draw.h"

/* draw_mode keeps identical images from being wastefully redrawn */
#define WAITING         0       /* no Frame_Start, no new data */
#define READY           1       /* Frame_Start, waiting for changed data */
#define NEW_FRAME       2       /* new time step, waiting for Frame_Start */
#define NEW_DATA        3       /* new data, waiting for Frame_Start */
#define DRAW_NEW_FRAME  4       /* draw with new frame file */
#define DRAW_OLD_FRAME  5       /* draw with old frame file */

/* pixel step when the mouse is moving at full speed */
#define MOUSE_STEP      20

/*   time between movements -- 0.02 seconds; first call (almost) immediately */
static struct itimerval move_interval = {{0,20000},{0,1}};

/* mouse position (0-1) and screen cursor position */
static float mouse_x, mouse_y;
static float cursor_x = -1, cursor_y = -1;      /* -1,-1 until initialized */ static void move_cursor()
/*
   moves the pixel cursor based on the mouse position stored in mouse_x and
     mouse_y -- both are 0-1 fractional positions inside the sun window
*/
{
   cursor_x += MOUSE_STEP * mouse_x * mouse_x * mouse_x;
   cursor_y += MOUSE_STEP * mouse_y * mouse_y * mouse_y;
   cursor_x = BOUND(cursor_x, view_left, view_right);
   cursor_y = BOUND(cursor_y, view_top, view_bottom);

PICposition_cursor((int)cursor_x, (int)cursor_y);
} static void read_link(sun_link)
int sun_link;           /* socket link to interface program */
/*
   read and interpret data from interface program socket link
*/
{
```

```c
/* draw_mode keeps identical images from being wastefully redrawn */
static int draw_mode = WAITING;

/* next_draw_mode is the state transition table for draw_mode */
/* the first index is the old draw_mode value (only 0-3 have transitions */
/*   in this table since 4 and 5 (DRAW_NEW_FRAME and DRAW_OLD_FRAME) */
/*   always change draw_mode to WAITING) */
/* the second index is 0 for Frame_Start, 1 for Frame_Name, and 2 for */
/*   codes that change the view or other data */
static int next_draw_mode[4][3] = {
    /* state \ rcvd- Frame_Start      Frame_Name       data */
    /* WAITING   */ {READY,           NEW_FRAME,       NEW_DATA},
    /* READY     */ {READY,           DRAW_NEW_FRAME,  DRAW_OLD_FRAME},
    /* NEW_FRAME */ {DRAW_NEW_FRAME,  NEW_FRAME,       NEW_FRAME},
    /* NEW_DATA  */ {DRAW_OLD_FRAME,  NEW_FRAME,       NEW_DATA}
};

/* if 1, values from link are read, but not used */
/* to prevent nasty error messages caused by attempting to set the view */
/* when only half of the view parameters are defined yet */
static int init_mode = 0;

/* control codes sent out on socket link */
static int frame_done_code = Frame_Done;        /* frame complete */
static int element_picked_code = Element_Picked;/* for element information */

/* timer constant */
/*   to turn off timer -- no interval and no initial time */
static struct itimerval no_interval = {{0,0},{0,0}};

int code;                          /* code word read from sun_link */
Point look_at;                     /* look toward this point */
float eye_distance, eye_tilt;      /* eye position relative to look_at */
float eye_pan, eye_twist;          /*   in polar coordinates */
char frame_name[256];              /* name of current frame file */
int name_length;                   /* string length of frame_name[] */
int element_number;                /* element picked to get info on */
int moving_cursor;                 /* flag for when cursor is moving */

/* look -- finally real program code in this function */
do {
  read(sun_link, &code, sizeof(code));        /* read code from link */ switch (code) { case Init_Start:
      init_mode = 1;
      break;

case Init_End:
      init_mode = 0;

/* when we turn off init_mode, we have to */
      /* look at all the values read */
      PICpolar_view(eye_distance, eye_pan, eye_tilt, eye_twist);
      PICtranslate(-look_at.x, -look_at.y, -look_at.z);
      break;

case Frame_Start:
      draw_mode = next_draw_mode[draw_mode][0];
      break;

case Frame_Name:
```

```
    read(sun_link, &name_length, sizeof(int));
    read(sun_link, frame_name, name_length);
    frame_name[name_length] = '\0';
    draw_mode = next_draw_mode[draw_mode][1];
    break;

case Look_At_X:
    read(sun_link, &look_at.x, sizeof(float));
    if (!init_mode) {
      PICpolar_view(eye_distance, eye_pan, eye_tilt, eye_twist);
      PICtranslate(-look_at.x, -look_at.y, -look_at.z);
    }
    draw_mode = next_draw_mode[draw_mode][2];
    break;

case Look_At_Y:
    read(sun_link, &look_at.y, sizeof(float));
    if (!init_mode) {
      PICpolar_view(eye_distance, eye_pan, eye_tilt, eye_twist);
      PICtranslate(-look_at.x, -look_at.y, -look_at.z);
    }
    draw_mode = next_draw_mode[draw_mode][2];
    break;

case Look_At_Z:
    read(sun_link, &look_at.z, sizeof(float));
    if (!init_mode) {
      PICpolar_view(eye_distance, eye_pan, eye_tilt, eye_twist);
      PICtranslate(-look_at.x, -look_at.y, -look_at.z);
    }
    draw_mode = next_draw_mode[draw_mode][2];
    break;

case Eye_Distance:
    read(sun_link, &eye_distance, sizeof(float));
    if (!init_mode) {
      PICpolar_view(eye_distance, eye_pan, eye_tilt, eye_twist);
      PICtranslate(-look_at.x, -look_at.y, -look_at.z);
    }
    draw_mode = next_draw_mode[draw_mode][2];
    break;

case Eye_Tilt:
    read(sun_link, &eye_tilt, sizeof(float));
    if (!init_mode) {
      PICpolar_view(eye_distance, eye_pan, eye_tilt, eye_twist);
      PICtranslate(-look_at.x, -look_at.y, -look_at.z);
    }
    draw_mode = next_draw_mode[draw_mode][2];
    break;

case Eye_Pan:
    read(sun_link, &eye_pan, sizeof(float));
    if (!init_mode) {
      PICpolar_view(eye_distance, eye_pan, eye_tilt, eye_twist);
      PICtranslate(-look_at.x, -look_at.y, -look_at.z);
    }
    draw_mode = next_draw_mode[draw_mode][2];
    break;

case Eye_Twist:
    read(sun_link, &eye_twist, sizeof(float));
    if (!init_mode) {
      PICpolar_view(eye_distance, eye_pan, eye_tilt, eye_twist);
```

```
            PICtranslate(-look_at.x, -look_at.y, -look_at.z);
         }
         draw_mode = next_draw_mode[draw_mode][2];
         break;

case Velocity_Range:
         read(sun_link, &vel_min, sizeof(char));
         read(sun_link, &vel_max, sizeof(char));
         draw_mode = next_draw_mode[draw_mode][2];
         break;

case Temperature_Range:
         read(sun_link, &temp_min, sizeof(char));
         read(sun_link, &temp_max, sizeof(char));
         draw_mode = next_draw_mode[draw_mode][2];
         break;

case Empty_Mold:
         read(sun_link, &empty_mold, sizeof(int));
         draw_mode = next_draw_mode[draw_mode][2];
         break;

case Mold_Wall:
         read(sun_link, &mold_wall, sizeof(int));
         draw_mode = next_draw_mode[draw_mode][2];
         break;

case Glyph_Length:
         read(sun_link, &glyph_scale.x, sizeof(float));
         draw_mode = next_draw_mode[draw_mode][2];
         break;

case Glyph_Width:
         read(sun_link, &glyph_scale.y, sizeof(float));
         draw_mode = next_draw_mode[draw_mode][2];
         break;

case Glyph_Height:
         read(sun_link, &glyph_scale.z, sizeof(float));
         draw_mode = next_draw_mode[draw_mode][2];
         break;

case Start_Picking:
         read(sun_link, &mouse_x, sizeof(float));         /* read (and throw */
         read(sun_link, &mouse_y, sizeof(float));         /* away) mouse x,y */ if (cursor_x < 0.0) {
            cursor_x = view_left + (view_right - view_left)/2;
            cursor_y = view_top + (view_bottom - view_top)/2;
         } start_pick((int)cursor_x, (int)cursor_y);        /* plot cursor x,y */
         moving_cursor = 0;                               /* not moving now */
         break;

case Move_Picking:
         read(sun_link, &mouse_x, sizeof(float));         /* read mouse x,y */
         read(sun_link, &mouse_y, sizeof(float));
         mouse_x = (mouse_x - 0.5) * 2.0;                 /* change to -1 to 1 */
         mouse_y = (mouse_y - 0.5) * 2.0;

if (! moving_cursor) {                           /* start periodic */
            signal(SIGALRM, move_cursor);                 /* move_cursor() call*/
            setitimer(ITIMER_REAL, &move_interval, NULL); /* each move_interval*/
```

```
          moving_cursor = 1;
        }
        break;

case Select_Picking:
        read(sun_link, &mouse_x, sizeof(float));      /* read mouse x,y */
        read(sun_link, &mouse_y, sizeof(float));
        mouse_x = (mouse_x - 0.5) * 2.0;              /* change to -1 to 1 */
        mouse_y = (mouse_y - 0.5) * 2.0;

setitimer(ITIMER_REAL, &no_interval, NULL);   /* turn off timer */
        signal(SIGALRM, SIG_DFL);
        moving_cursor = 0;

/* get and write element info */
        element_number = pick((int)cursor_x, (int)cursor_y);
        if (element_number != -1) {
          write(sun_link, &element_picked_code, sizeof(int));
          write(sun_link, &element_number, sizeof(int));
          write(sun_link, &geometry[element_number].thickness, sizeof(float));
          write(sun_link, &geometry[element_number].ctr, sizeof(Point));
          write(sun_link, frame_data + element_number*ELEMENT_SIZE,
                ELEMENT_SIZE);
        }
        break;

case Done_Picking:

setitimer(ITIMER_REAL, &no_interval, NULL);   /* turn off timer */
        signal(SIGALRM, SIG_DFL);
        moving_cursor = 0;

done_pick();
        break;

case Quit:
        break;
    }

/* check if it is OK to draw the next picture yet */
    if (draw_mode == DRAW_NEW_FRAME) {
      draw_new_frame(frame_name);
      write(sun_link, &frame_done_code, sizeof(int));
      draw_mode = 0;
    } else if (draw_mode == DRAW_OLD_FRAME) {
      draw();
      write(sun_link, &frame_done_code, sizeof(int));
      draw_mode = 0;
    }

} while (code != Quit);
} main()
{
  int sun_link;                  /* socket link to interface program */

/* get socket number */
  sscanf(getenv(ENV_INTERNAL_LINK), "%d", &sun_link);

/* initialize */
  init_pixel();                  /* init pixel machine, turn on color bars/lights */
```

```
    read_geometry();      /* read geometry from geometry file */

/* read link until a Quit code is recieved */
    read_link(sun_link);

/* close this end of the socket */
    close(sun_link);
}
```

```c
/**********************************************************************/
/* pix_color.c by Marc Olano for the Eastman Kodak Company            */
/* all rights reserved by the Eastman Kodak Company                   */
/*                                                                    */
/* read, draw, and label color scales                                 */
/**********************************************************************/ include <stdio.h>
include <piclib.h>
include <PICMAC.h>
#include "util.h"
#include "env.h"
#include "pix_globals.h"
#include "pix_color.h"

/* printf format for text range numbers on color bars */
#define RANGE_FORMAT    "%6.0f"

static void read_colors(pres_data, temp_data)
unsigned char pres_data[3][256];
unsigned char temp_data[3][256];
/*
   read raw pressure and temperature data from $GLY_DIR/data/pressure.bin
      and $GLY_DIR/data/temperature.bin
*/
{
   char *gly_dir;                      /* value of environment GLY_DIR */
   char *filename;                     /* full file names and paths */
   FILE *file;                         /* file to read from */

/* get path to glyph directory from environment */
   gly_dir = get_environment_var(ENV_PROGRAM_DIR, PROGRAM_DIR_DEFAULT);

/* read pressure map file */
   filename = make_strcat(gly_dir, get_environment_var(ENV_PRES_COLORS,
         PRES_COLORS_DEFAULT), 0);
   if ((file = fopen(filename, "rb")) == NULL)
      error_exit(filename);
   free(filename);
   fread(pres_data, 1, 3*256, file);
   fclose(file);

/* read temperature map file */
   filename = make_strcat(gly_dir, get_environment_var(ENV_TEMP_COLORS,
         TEMP_COLORS_DEFAULT), 0);
   filename = make_strcat(gly_dir, "/data/temperature.bin", 0);
   if ((file = fopen(filename, "rb")) == NULL)
      error_exit(filename);
   free(filename);
   fread(temp_data, 1, 3*256, file);
   fclose(file);
} static void setup_display()
/*
   setup view and transformation
*/
{
   /* just use colors, not shading */
   PICshade_mode(PIC_SHADE_OFF);
```

```c
    /* set up projection -- based empirically on size of pixel vector fonts */
    /* font height -- approx. 30 */
    /* string width:    "Temperature: " = 237 (italic1 font) */
    /*                  "Pressure: "    = 166 (italic1 font) */
    /*                  "PSI: "         = 63  (italic1 font) */
    /*                  degree symbol   = 18  (special1 font) */
    /*                  digit           = 21  (italic1 font) */
    PICortho_2d_project(0., 2000., 0., 61.);
} static void range_limits(pres_max, temp_min, temp_max)
float *pres_max, *temp_min, *temp_max;
/*
   read range limits from scale file
      pressure (psi), temperature min (K), temperature max (K)
   display at ends of where color bars will be
*/
{
    char *scale_file_name;      /* name of scale file from environment */
    FILE *file;                 /* scale file */
    PICvector_font *symbol;     /* pixel vector font for degree symbol */
    char numstr[10];            /* string version of numbers */

/* read range limits */
    scale_file_name = get_environment_var(ENV_SCALE_FILE, SCALE_FILE_DEFAULT);
    if ((file = fopen(scale_file_name, "rb")) == NULL)
        error_exit(scale_file_name);
    fread(pres_max, sizeof(float), 1, file);
    fread(temp_min, sizeof(float), 1, file);
    fread(temp_max, sizeof(float), 1, file);
    fclose(file);

/* use black to write with */
    PICcolor_rgb(0., 0., 0.);

/* use italic letters unless otherwise noted */
    symbol = PICopen_vector_font("special1");    /* symbols -- degree is 'd' */
    PICput_vector_font(PICopen_vector_font("italic1"));

/* "Temperature:  min <color bar> max <degrees>" */
    PICpush_transform();
    PICtranslate_y(35.);   /* first line of text y-range 35 to 65 */
    PICpush_transform();
    PICvector_text("Temperature:");
    sprintf(numstr, RANGE_FORMAT, 273. * 9/5 - 459.4);    /* temperature min */
    PICtranslate_x(342. - 21.*strlen(numstr));
    PICvector_text(numstr);
    PICpop_transform();
    sprintf(numstr, RANGE_FORMAT, 700. * 9/5 - 459.4);    /* temperature max */
    PICtranslate_x(1899. - 21.*strlen(numstr));
    PICvector_text(numstr);
    PICtranslate_x(21.*strlen(numstr));
    PICvector_font_text(symbol, "d");
    PICtranslate_x(15.);
    PICvector_text("F");
    PICpop_transform();

/* "  Pressure:  min <color bar> max PSI */
    PICpush_transform();
    PICtranslate_y(5.);            /* second line of text y-range 5 to 35 */
    PICpush_transform();
    PICtranslate_x(71.);
```

```c
    PICvector_text("Pressure:");
    sprintf(numstr, RANGE_FORMAT, 0.);
    PICtranslate_x(271. - 21.*strlen(numstr));
    PICvector_text(numstr);
    PICpop_transform();
    sprintf(numstr, RANGE_FORMAT, 20000.);           /* will be *pres_max */
    PICtranslate_x(1899. - 21.*strlen(numstr));
    PICvector_text(numstr);
    PICtranslate_x(18 + 21.*strlen(numstr));
    PICvector_text("PSI");
    PICpop_transform();
} void init_colors()
/*
    reads pressure and temperature color maps from $GLY_DIR/data/pressure.bin
        and $GLY_DIR/data/temperature.bin
    puts in global variables temp_surf[] and press_surf[];
    draws color bars with these color maps
    also defines global variable wall_surf
*/
{
    unsigned char pres_data[3][256];    /* raw color data */
    unsigned char temp_data[3][256];
    float pres_max, temp_min, temp_max; /* ranges for colors (pres_min = 0) */
    int i;                              /* loop variable */ read_colors(pres_data, temp_data);  /* read raw color data */ setup_display();                    /* setup viewing transformation */

/* read scale file with range limits for pressure and temperature */
    /* display range limits on screen */
    range_limits(&pres_max, &temp_min, &temp_max);

/* stuff raw color data into surface model arrays and draw color bars */
    for(i=0; i<256; i++) {
        pres_surf[i].a_red   = pres_data[0][i]/1000.;
        pres_surf[i].a_green = pres_data[1][i]/1000.;
        pres_surf[i].a_blue  = pres_data[2][i]/1000.;
        temp_surf[i].a_red   = temp_data[0][i]/1000.;
        temp_surf[i].a_green = temp_data[1][i]/1000.;
        temp_surf[i].a_blue  = temp_data[2][i]/1000.;

pres_surf[i].d_red   = pres_data[0][i]/255.;
        pres_surf[i].d_green = pres_data[1][i]/255.;
        pres_surf[i].d_blue  = pres_data[2][i]/255.;
        temp_surf[i].d_red   = temp_data[0][i]/255.;
        temp_surf[i].d_green = temp_data[1][i]/255.;
        temp_surf[i].d_blue  = temp_data[2][i]/255.;

pres_surf[i].s_red   = 0.0;
        pres_surf[i].s_green = 0.0;
        pres_surf[i].s_blue  = 0.0;
        temp_surf[i].s_red   = 0.0;
        temp_surf[i].s_green = 0.0;
        temp_surf[i].s_blue  = 0.0;

pres_surf[i].exp = 0.;
        pres_surf[i].transparent = 0.;
        temp_surf[i].exp = 0.;
        temp_surf[i].transparent = 0.;
```

```c
/* draw bars */
PICMACcolor_rgb((float)temp_surf[i].d_red, (float)temp_surf[i].d_green,
     (float)temp_surf[i].d_blue);
PICrectangle(
          363. + (1773. - 363.)/256. * i,
          35.,
          363. + (1773. - 363.)/256. * (i+1),
          60.);

PICMACcolor_rgb( (float)pres_surf[i].d_red, (float)pres_surf[i].d_green,
          (float)pres_surf[i].d_blue );
PICrectangle(
          363. + (1773. - 363.)/256. * i,
          5.,
          363. + (1773. - 363.)/256. * (i+1),
          30.);
}

/* draw box around color bars */
PICeuclid_mode(PIC_EUCLID_LINE);
PICcolor_rgb(0., 0., 0.);
PICrectangle(363.,   5., 1773., 30.);
PICrectangle(363.,  35., 1773., 60.);
PICeuclid_mode(PIC_EUCLID_POLYGON);

/* create top plate surface */
wall_surf.a_red = wall_surf.a_green = wall_surf.a_blue = 0.0;
wall_surf.d_red = wall_surf.d_green = wall_surf.d_blue = 0.0;
wall_surf.s_red = wall_surf.s_green = wall_surf.s_blue = 0.0;
wall_surf.exp = 0.0;
wall_surf.transparent = 0.9;
}
```

```
/******************************************************************/
/* pix_draw.c by Marc Olano for the Eastman Kodak Company         */
/* all rights reserved by the Eastman Kodak Company               */
/*                                                                */
/* actual drawing portion of gly_pixel                            */
/*                                                                */
/* Note: for the sake of speed, this code is unreadable           */
/*   optimizations done:                                          */
/*      wherever possible, loops with indexed arrays have been changed */
/*         to loops with on (or more parallel) loop pointers instead of */
/*         a loop index                                           */
/*      most loops count down with the decrement occurring inside the */
/*         conditional check                                      */
/*      code is (OK, Ok, ok ... will be) written as functions calling */
/*         collections of basic macros which contain the actual code -- */
/*         thus overall frame settings are not tested for each element */
/*         (or more often)                                        */
/******************************************************************/
#include <stdio.h>
#include <math.h>
#include <piclib.h>
include <PICMAC.h>
#include "pix_globals.h"
#include "anim_pix.h"
#include "pix_draw.h"

void draw_new_frame(frame_name)
char *frame_name;
/*
  loads new frame info from frame file and draws one frame of glyphs
*/
{
  FILE *frame_file;            /* file with frame information */
  int i;                       /* loop index */
  Geom_Info *geom_ptr;         /* loop pointer for geometry info */
  unsigned char *element_ptr;  /* loop pointer to element in frame_data[] */

/* read new frame information */
  if ((frame_file = fopen(frame_name, "r")) != NULL)
    fread(frame_data, ELEMENT_SIZE, num_elements, frame_file);
  fclose(frame_file);

draw();
} void draw()
/*
  draws one frame of glyphs using information in curframe
*/
{
  int i;                       /* loop index */
  Geom_Info *geom_ptr;         /* loop pointer for geometry info */
  unsigned char *element_ptr;  /* loop pointer to element in frame_data[] */
  unsigned char *velocity_ptr, *temperature_ptr;
  float *above_ptr, *below_ptr;
  float length;
  int last_not_seen;           /* flag for visible segments */

/* loop through elements in frame from last down to first */
  geom_ptr = &geometry[num_elements];         /* init loop pointers */
```

```
element_ptr = &frame_data[num_elements * ELEMENT_SIZE];

while (geom_ptr-- > geometry) {               /* loop to bottom of arrays */
  element_ptr -= ELEMENT_SIZE;

/* draw mold base plane / pressure information */
  if (geom_ptr->element_type == TRIANGLE) {

/* draw pressure surface */
    if (element_ptr[ELEMENT_PRES] != 0 || empty_mold) {
      PICflip(PIC_ON);
      PICMACput_surface_model( (&pres_surf[element_ptr[ELEMENT_PRES]]) );
      PICMACpoly_point_3d(geom_ptr->v1.x,geom_ptr->v1.y,geom_ptr->v1.z);
      PICMACpoly_point_3d(geom_ptr->v2.x,geom_ptr->v2.y,geom_ptr->v2.z);
      PICMACpoly_point_3d(geom_ptr->v3.x,geom_ptr->v3.y,geom_ptr->v3.z);
      PICMACpoly_close();
      PICflip(PIC_OFF);
    }

/* draw glyphs */
    if (element_ptr[ELEMENT_PRES] != 0) {
      /* transform to standard glyph orientation */
      PICpush_transform();
      PICpremultiply_transform(geom_ptr->transform);

/* rotate glyph and scale from interface settings */
      PICrotate_z(byte_to_deg[element_ptr[ELEMENT_ANGLE]]);
      PICscale(glyph_scale.x, glyph_scale.y, glyph_scale.z);

/* initalize loop pointers */
      velocity_ptr = element_ptr + ELEMENT_VELOCITY + NUMSEGS;
      temperature_ptr = element_ptr + ELEMENT_TEMP + NUMSEGS;
      below_ptr = &height_divisions[NUMSEGS - 1];

/* loop through segments */
      last_not_seen = 0;      /* always see both sides of center segment */
      for(i=0; i<NUMSEGS; i++) {
        velocity_ptr--;
        temperature_ptr--;
        above_ptr = below_ptr--;

if (*velocity_ptr < vel_min || *velocity_ptr > vel_max ||
              *temperature_ptr < temp_min || *temperature_ptr > temp_max)
          last_not_seen = 1;              /* record if element was not seen */ else {
          length = byte_to_len[*velocity_ptr];
          PICMACput_surface_model( (&temp_surf[*temperature_ptr]) );

/** top glyph **/
          /* back face */
          PICMACpoly_point_3d(back_x, -back_y, *above_ptr);
          PICMACpoly_point_3d(back_x,  back_y, *above_ptr);
          PICMACpoly_point_3d(back_x,  back_y, *below_ptr);
          PICMACpoly_point_3d(back_x, -back_y, *below_ptr);
          PICMACpoly_close();

/* positive y side */
          PICMACpoly_point_3d(back_x, back_y, *above_ptr);
          PICMACpoly_point_3d(length,    0.0, *above_ptr);
          PICMACpoly_point_3d(length,    0.0, *below_ptr);
          PICMACpoly_point_3d(back_x, back_y, *below_ptr);
          PICMACpoly_close();
```

```
            /* negative y side */
            PICMACpoly_point_3d(length,    0.0, *above_ptr);
            PICMACpoly_point_3d(back_x, -back_y, *above_ptr);
            PICMACpoly_point_3d(back_x, -back_y, *below_ptr);
            PICMACpoly_point_3d(length,    0.0, *below_ptr);
            PICMACpoly_close();

/* top face */
            PICMACpoly_point_3d(back_x, -back_y, *above_ptr);
            PICMACpoly_point_3d(length,    0.0, *above_ptr);
            PICMACpoly_point_3d(back_x,  back_y, *above_ptr);
            PICMACpoly_close();

/** bottom glyph **/
            /* back face */
            PICMACpoly_point_3d(back_x, -back_y,-*below_ptr);
            PICMACpoly_point_3d(back_x,  back_y,-*below_ptr);
            PICMACpoly_point_3d(back_x,  back_y,-*above_ptr);
            PICMACpoly_point_3d(back_x, -back_y,-*above_ptr);
            PICMACpoly_close();

/* positive y side */
            PICMACpoly_point_3d(back_x,  back_y,-*below_ptr);
            PICMACpoly_point_3d(length,    0.0,-*below_ptr);
            PICMACpoly_point_3d(length,    0.0,-*above_ptr);
            PICMACpoly_point_3d(back_x,  back_y,-*above_ptr);
            PICMACpoly_close();

/* negative y side */
            PICMACpoly_point_3d(length,    0.0,-*below_ptr);
            PICMACpoly_point_3d(back_x, -back_y,-*below_ptr);
            PICMACpoly_point_3d(back_x, -back_y,-*above_ptr);
            PICMACpoly_point_3d(length,    0.0,-*above_ptr);
            PICMACpoly_close();

/* top face */
            PICMACpoly_point_3d(back_x,  back_y,-*above_ptr);
            PICMACpoly_point_3d(length,    0.0,-*above_ptr);
            PICMACpoly_point_3d(back_x, -back_y,-*above_ptr);
            PICMACpoly_close();

/* bottom faces for upper and lower half of glyph */
            if (last_not_seen) {
              /* top glyph */
              PICMACpoly_point_3d(back_x,  back_y, *below_ptr);
              PICMACpoly_point_3d(length,    0.0, *below_ptr);
              PICMACpoly_point_3d(back_x, -back_y, *below_ptr);
              PICMACpoly_close();

/* bottom glyph */
              PICMACpoly_point_3d(back_x, -back_y,-*below_ptr);
              PICMACpoly_point_3d(length,    0.0,-*below_ptr);
              PICMACpoly_point_3d(back_x,  back_y,-*below_ptr);
              PICMACpoly_close();
            } last_not_seen = 0;
        }
      }
      PICpop_transform();
    }
  } else {                              /* ROD */
```

```c
/* only do transformation if the element is going to be drawn */
if (element_ptr[ELEMENT_PRES] != 0 || empty_mold) {
  PICpush_transform();
  PICpremultiply_transform(geom_ptr->transform);
  PICscale(glyph_scale.z, glyph_scale.z, 1.0);

/* draw pressure surface */
  /* note that t.x is both the x and y radius for the pressure surface */
  PICMACput_surface_model( (&pres_surf[element_ptr[ELEMENT_PRES]]) );
  PICsuperq_ellipsoid(geom_ptr->t.x, geom_ptr->t.x, geom_ptr->t.z,
          0.0, 1.0);

/* draw glyphs */
  if (element_ptr[ELEMENT_PRES] != 0) {

/* scale and position for segments */
    PICscale_z(glyph_scale.x);      /* length scaling */
    PICrotate_x(byte_to_deg[element_ptr[ELEMENT_ANGLE]]);
    PICtranslate_z(-back_x);        /* shift off center of element */
    PICscale_z(0.5);                /* superq's use radius = length/2 */

/* initialize loop pointers */
    velocity_ptr = element_ptr + ELEMENT_VELOCITY + NUMSEGS;
    temperature_ptr = element_ptr + ELEMENT_TEMP + NUMSEGS;
    below_ptr = &height_divisions[NUMSEGS - 1];

/* loop through finite difference segments */
    for(i=0; i<NUMSEGS; i++) {
      velocity_ptr--;
      temperature_ptr--;
      above_ptr = below_ptr--;

/* only display segment if it is within the velocity/temp ranges */
      if (*velocity_ptr >= vel_min && *velocity_ptr <= vel_max &&
              *temperature_ptr >= temp_min &&
              *temperature_ptr <= temp_max) {

PICpush_transform();

/* translate length to floating point radius */
        length = byte_to_len[*velocity_ptr];

/* set color */
        PICMACput_surface_model( (&temp_surf[*temperature_ptr]) );

/* shift tube forward to make axi-symmetric bullet glyph */
        PICtranslate_z(length);

/* draw superquad tube */
        PICsuperq_ellipsoid((*above_ptr), (*below_ptr), length,
              0.0,1.0);

PICpop_transform();
      }
    }
  }
  PICpop_transform();
 }
}
/* draw mold wall if it is turned on */
if (mold_wall) {
  PICMACput_surface_model( (&wall_surf) );
```

```
            geom_ptr = &geometry[num_elements];         /* init loop pointer */
            while (geom_ptr-- > geometry) {             /* loop to bottom of array */ if (geom_ptr->element_type == TRIANGLE) {

/* set up to draw top triangle mold wall */
                    PICflip(PIC_ON);
                    PICpush_transform();
                    PICtranslate(geom_ptr->t.x * glyph_scale.z,
                            geom_ptr->t.y * glyph_scale.z,
                            geom_ptr->t.z * glyph_scale.z);

/* draw top mold wall */
                    PICMACpoly_point_3d(geom_ptr->v1.x, geom_ptr->v1.y, geom_ptr->v1.z);
                    PICMACpoly_point_3d(geom_ptr->v2.x, geom_ptr->v2.y, geom_ptr->v2.z);
                    PICMACpoly_point_3d(geom_ptr->v3.x, geom_ptr->v3.y, geom_ptr->v3.z);
                    PICMACpoly_close();

/* setup to draw bottom triangle mold wall */
                    PICpop_transform();
                    PICpush_transform();
                    PICtranslate(- geom_ptr->t.x * glyph_scale.z,
                            - geom_ptr->t.y * glyph_scale.z,
                            - geom_ptr->t.z * glyph_scale.z);

/* draw bottom mold wall */
                    PICMACpoly_point_3d(geom_ptr->v1.x, geom_ptr->v1.y, geom_ptr->v1.z);
                    PICMACpoly_point_3d(geom_ptr->v2.x, geom_ptr->v2.y, geom_ptr->v2.z);
                    PICMACpoly_point_3d(geom_ptr->v3.x, geom_ptr->v3.y, geom_ptr->v3.z);
                    PICMACpoly_close();

/* restore */
                    PICpop_transform();
                    PICflip(PIC_OFF);
                } else {                                /* ROD */

/* setup to draw rod mold wall */
                    PICpush_transform();
                    PICpremultiply_transform(geom_ptr->transform);
                    PICscale(glyph_scale.z, glyph_scale.z, 1.0);

/* draw mold wall */
                    /* note that t.y is both the x and y radius for the mold wall */
                    PICsuperq_ellipsoid(geom_ptr->t.y, geom_ptr->t.y, geom_ptr->t.z,
                            0.0, 1.0);

/* restore */
                    PICpop_transform();
                }
            }
        }

PICswap_buffer();
        PICMACcolor_rgb( BACKGROUND_R, BACKGROUND_G, BACKGROUND_B );
        PICclear_rgbz();
    }
```

```
/*******************************************************************/
/* pix_draw.c by Marc Olano for the Eastman Kodak Company          */
/* all rights reserved by the Eastman Kodak Company                */
/*                                                                 */
/* actual drawing portion of gly_pixel                             */
/*                                                                 */
/* Note: for the sake of speed, this code is unreadable            */
/*   optimizations done:                                           */
/*     wherever possible, loops with indexed arrays have been changed */
/*        to loops with on (or more parallel) loop pointers instead of */
/*        a loop index                                             */
/*     most loops count down with the decrement occurring inside the */
/*        conditional check                                        */
/*     code is (OK, Ok, ok ... will be) written as functions calling  */
/*        collections of basic macros which contain the actual code -- */
/*        thus overall frame settings are not tested for each element */
/*        (or more often)                                          */
/*******************************************************************/
include <stdio.h>
#include <math.h>
#include <piclib.h>
include <PICMAC.h>
#include "pix_globals.h"
#include "anim_pix.h"
#include "pix_draw.h"

void draw_new_frame(frame_name)
char *frame_name;
/*
  loads new frame info from frame file and draws one frame of glyphs
*/
{
  FILE *frame_file;             /* file with frame information */
  int i;                        /* loop index */
  Geom_Info *geom_ptr;          /* loop pointer for geometry info */
  unsigned char *element_ptr;   /* loop pointer to element in frame_data[] */

/* read new frame information */
  if ((frame_file = fopen(frame_name, "r")) != NULL)
    fread(frame_data, ELEMENT_SIZE, num_elements, frame_file);
  fclose(frame_file);

draw();
} void draw()
/*
  draws one frame of glyphs using information in curframe
*/
{
  int i;                        /* loop index */
  Geom_Info *geom_ptr;          /* loop pointer for geometry info */
  unsigned char *element_ptr;   /* loop pointer to element in frame_data[] */
  unsigned char *velocity_ptr, *temperature_ptr;
  float *above_ptr, *below_ptr;
  float length;
  int last_not_seen;            /* flag for visible segments */

/* loop through elements in frame from last down to first */
  geom_ptr = &geometry[num_elements];           /* init loop pointers */
```

```c
element_ptr = &frame_data[num_elements * ELEMENT_SIZE];

while (geom_ptr-- > geometry) {                    /* loop to bottom of arrays */
  element_ptr -= ELEMENT_SIZE;

/* draw mold base plane / pressure information */
  if (geom_ptr->element_type == TRIANGLE) {

/* draw pressure surface */
    if (element_ptr[ELEMENT_PRES] != 0 || empty_mold) {
      PICflip(PIC_ON);
      PICMACput_surface_model( (&pres_surf[element_ptr[ELEMENT_PRES]]) );
      PICMACpoly_point_3d(geom_ptr->v1.x,geom_ptr->v1.y,geom_ptr->v1.z);
      PICMACpoly_point_3d(geom_ptr->v2.x,geom_ptr->v2.y,geom_ptr->v2.z);
      PICMACpoly_point_3d(geom_ptr->v3.x,geom_ptr->v3.y,geom_ptr->v3.z);
      PICMACpoly_close();
      PICflip(PIC_OFF);
    }

/* draw glyphs */
    if (element_ptr[ELEMENT_PRES] != 0) {
      /* transform to standard glyph orientation */
      PICpush_transform();
      PICpremultiply_transform(geom_ptr->transform);

/* rotate glyph and scale from interface settings */
      PICrotate_z(byte_to_deg[element_ptr[ELEMENT_ANGLE]]);
      PICscale(glyph_scale.x, glyph_scale.y, glyph_scale.z);

/* initalize loop pointers */
      velocity_ptr = element_ptr + ELEMENT_VELOCITY + NUMSEGS;
      temperature_ptr = element_ptr + ELEMENT_TEMP + NUMSEGS;
      below_ptr = &height_divisions[NUMSEGS - 1];

/* loop through segments */
      last_not_seen = 0;          /* always see both sides of center segment */
      for(i=0; i<NUMSEGS; i++) {
        velocity_ptr--;
        temperature_ptr--;
        above_ptr = below_ptr--;

if (*velocity_ptr < vel_min  || *velocity_ptr > vel_max  ||
            *temperature_ptr < temp_min || *temperature_ptr > temp_max)
          last_not_seen = 1;              /* record if element was not seen */ else {
          length = byte_to_len[*velocity_ptr];
          PICMACput_surface_model( (&temp_surf[*temperature_ptr]) );

/** top glyph **/
          /* back face */
          PICMACpoly_point_3d(back_x, -back_y, *above_ptr);
          PICMACpoly_point_3d(back_x,  back_y, *above_ptr);
          PICMACpoly_point_3d(back_x,  back_y, *below_ptr);
          PICMACpoly_point_3d(back_x, -back_y, *below_ptr);
          PICMACpoly_close();

/* positive y side */
          PICMACpoly_point_3d(back_x, back_y, *above_ptr);
          PICMACpoly_point_3d(length,    0.0, *above_ptr);
          PICMACpoly_point_3d(length,    0.0, *below_ptr);
          PICMACpoly_point_3d(back_x, back_y, *below_ptr);
          PICMACpoly_close();
```

```
                /* negative y side */
                PICMACpoly_point_3d(length,    0.0, *above_ptr);
                PICMACpoly_point_3d(back_x, -back_y, *above_ptr);
                PICMACpoly_point_3d(back_x, -back_y, *below_ptr);
                PICMACpoly_point_3d(length,    0.0, *below_ptr);
                PICMACpoly_close();

/* top face */
                PICMACpoly_point_3d(back_x, -back_y, *above_ptr);
                PICMACpoly_point_3d(length,    0.0, *above_ptr);
                PICMACpoly_point_3d(back_x,  back_y, *above_ptr);
                PICMACpoly_close();

/** bottom glyph **/
                /* back face */
                PICMACpoly_point_3d(back_x, -back_y,-*below_ptr);
                PICMACpoly_point_3d(back_x,  back_y,-*below_ptr);
                PICMACpoly_point_3d(back_x,  back_y,-*above_ptr);
                PICMACpoly_point_3d(back_x, -back_y,-*above_ptr);
                PICMACpoly_close();

/* positive y side */
                PICMACpoly_point_3d(back_x,  back_y,-*below_ptr);
                PICMACpoly_point_3d(length,    0.0,-*below_ptr);
                PICMACpoly_point_3d(length,    0.0,-*above_ptr);
                PICMACpoly_point_3d(back_x,  back_y,-*above_ptr);
                PICMACpoly_close();

/* negative y side */
                PICMACpoly_point_3d(length,    0.0,-*below_ptr);
                PICMACpoly_point_3d(back_x, -back_y,-*below_ptr);
                PICMACpoly_point_3d(back_x, -back_y,-*above_ptr);
                PICMACpoly_point_3d(length,    0.0,-*above_ptr);
                PICMACpoly_close();

/* top face */
                PICMACpoly_point_3d(back_x,  back_y,-*above_ptr);
                PICMACpoly_point_3d(length,    0.0,-*above_ptr);
                PICMACpoly_point_3d(back_x, -back_y,-*above_ptr);
                PICMACpoly_close();

/* bottom faces for upper and lower half of glyph */
                if (last_not_seen) {
                  /* top glyph */
                    PICMACpoly_point_3d(back_x,  back_y, *below_ptr);
                    PICMACpoly_point_3d(length,    0.0, *below_ptr);
                    PICMACpoly_point_3d(back_x, -back_y, *below_ptr);
                    PICMACpoly_close();

/* bottom glyph */
                    PICMACpoly_point_3d(back_x, -back_y,-*below_ptr);
                    PICMACpoly_point_3d(length,    0.0,-*below_ptr);
                    PICMACpoly_point_3d(back_x,  back_y,-*below_ptr);
                    PICMACpoly_close();
                } last_not_seen = 0;
            }
        }
        PICpop_transform();
      }
    } else {                        /* ROD */
```

```c
      /* only do transformation if the element is going to be drawn */
      if (element_ptr[ELEMENT_PRES] != 0 ||  empty_mold) {
        PICpush_transform();
        PICpremultiply_transform(geom_ptr->transform);
        PICscale(glyph_scale.z, glyph_scale.z, 1.0);

/* draw pressure surface */
        /* note that t.x is both the x and y radius for the pressure surface */
        PICMACput_surface_model( (&pres_surf[element_ptr[ELEMENT_PRES]]) );
        PICsuperq_ellipsoid(geom_ptr->t.x, geom_ptr->t.x, geom_ptr->t.z,
                  0.0, 1.0);

/* draw glyphs */
        if (element_ptr[ELEMENT_PRES] != 0) {

/* scale and position for segments */
          PICscale_z(glyph_scale.x);    /* length scaling */
          PICrotate_x(byte_to_deg[element_ptr[ELEMENT_ANGLE]]);
          PICtranslate_z(-back_x);      /* shift off center of element */
          PICscale_z(0.5);              /* superq's use radius = length/2 */

/* initialize loop pointers */
          velocity_ptr = element_ptr + ELEMENT_VELOCITY + NUMSEGS;
          temperature_ptr = element_ptr + ELEMENT_TEMP + NUMSEGS;
          below_ptr = &height_divisions[NUMSEGS - 1];

/* loop through finite difference segments */
          for(i=0; i<NUMSEGS; i++) {
            velocity_ptr--;
            temperature_ptr--;
            above_ptr = below_ptr--;

/* only display segment if it is within the velocity/temp ranges */
            if (*velocity_ptr >= vel_min  && *velocity_ptr <= vel_max  &&
                      *temperature_ptr >= temp_min  &&
                      *temperature_ptr <= temp_max) {

PICpush_transform();

/* translate length to floating point radius */
              length = byte_to_len[*velocity_ptr];

/* set color */
              PICMACput_surface_model( (&temp_surf[*temperature_ptr]) );

/* shift tube forward to make axi-symmetric bullet glyph */
              PICtranslate_z(length);

/* draw superquad tube */
              PICsuperq_ellipsoid((*above_ptr), (*below_ptr), length,
                      0.0,1.0);

PICpop_transform();
            }
          }
        }
        PICpop_transform();
      }
    }
  }
}

/* draw mold wall if it is turned on */
if (mold_wall) {
  PICMACput_surface_model( (&wall_surf) );
```

```
      geom_ptr = &geometry[num_elements];        /* init loop pointer */
      while (geom_ptr-- > geometry) {            /* loop to bottom of array */ if (geom_ptr->element_type == TRIANGLE) {

/* set up to draw top triangle mold wall */
            PICflip(PIC_ON);
            PICpush_transform();
            PICtranslate(geom_ptr->t.x * glyph_scale.z,
                    geom_ptr->t.y * glyph_scale.z,
                    geom_ptr->t.z * glyph_scale.z);

/* draw top mold wall */
            PICMACpoly_point_3d(geom_ptr->v1.x, geom_ptr->v1.y, geom_ptr->v1.z);
            PICMACpoly_point_3d(geom_ptr->v2.x, geom_ptr->v2.y, geom_ptr->v2.z);
            PICMACpoly_point_3d(geom_ptr->v3.x, geom_ptr->v3.y, geom_ptr->v3.z);
            PICMACpoly_close();

/* setup to draw bottom triangle mold wall */
            PICpop_transform();
            PICpush_transform();
            PICtranslate(- geom_ptr->t.x * glyph_scale.z,
                    - geom_ptr->t.y * glyph_scale.z,
                    - geom_ptr->t.z * glyph_scale.z);

/* draw bottom mold wall */
            PICMACpoly_point_3d(geom_ptr->v1.x, geom_ptr->v1.y, geom_ptr->v1.z);
            PICMACpoly_point_3d(geom_ptr->v2.x, geom_ptr->v2.y, geom_ptr->v2.z);
            PICMACpoly_point_3d(geom_ptr->v3.x, geom_ptr->v3.y, geom_ptr->v3.z);
            PICMACpoly_close();

/* restore */
            PICpop_transform();
            PICflip(PIC_OFF);
         } else {                                /* ROD */

/* setup to draw rod mold wall */
            PICpush_transform();
            PICpremultiply_transform(geom_ptr->transform);
            PICscale(glyph_scale.z, glyph_scale.z, 1.0);

/* draw mold wall */
            /* note that t.y is both the x and y radius for the mold wall */
            PICsuperq_ellipsoid(geom_ptr->t.y, geom_ptr->t.y, geom_ptr->t.z,
                    0.0, 1.0);

/* restore */
            PICpop_transform();
         }
      }
   }

PICswap_buffer();
   PICMACcolor_rgb( BACKGROUND_R, BACKGROUND_G, BACKGROUND_B );
   PICclear_rgbz();
}
```

```c
/**********************************************************************/
/* pix_geometry.c by Marc Olano for the Eastman Kodak Company         */
/* all rights reserved by the Eastman Kodak Company                   */
/*                                                                    */
/* read geometry description file                                     */
/**********************************************************************/ include <stdio.h>
include <sys/types.h>
#include <sys/stat.h>
#include <math.h>
#include <piclib.h>
include <PICMAC.h>
#include "util.h"
#include "pix_globals.h"
#include "anim_pix.h"
#include "pix_geometry.h"

static void read_element(geom_file, element_ptr)
FILE *geom_file;
Geom_Info *element_ptr;
/*
    read one element's worth of data from the geometry file
*/
{
  PICmatrix rotation;         /* glyph orientation matrix */
  int i;                      /* loop index */

/* read rotation matrix for orienting glyph -- really glyph unit vectors */
  for(i=0; i<3; i++)
    fread(rotation[i],sizeof(float),3,geom_file);
  for(i=0; i<3; i++)          /* set extra row/column like identity matrix */
    rotation[i][3] = rotation[3][i] = 0.0;
  rotation[3][3] = 1.0;

/* glyph center */
  fread(&element_ptr->ctr,sizeof(float),3,geom_file);

/* base plate coordinates */
  fread(&element_ptr->v1,sizeof(float),9,geom_file);

/* decide if element is TRIANGLE or ROD */
  /* based on equivalence of 3rd vertex and center */
  if ((element_ptr->v3.x == element_ptr->ctr.x)
       && (element_ptr->v3.y == element_ptr->ctr.y)
       && (element_ptr->v3.z == element_ptr->ctr.z) )
    element_ptr->element_type = ROD;
  else
    element_ptr->element_type = TRIANGLE;

/* glyph height */
  fread(&element_ptr->thickness,sizeof(float),1,geom_file);

if (element_ptr->element_type == ROD) {

/* calculate scalings for drawing top plate */
    element_ptr->t.x = height_divisions[1];      /* radius for base plate */
    element_ptr->t.y = height_divisions[NUMSEGS];/* radius for top plate */
    element_ptr->t.z = sqrt(
        (element_ptr->v1.x - element_ptr->ctr.x)
              *(element_ptr->v1.x - element_ptr->ctr.x) +
        (element_ptr->v1.y - element_ptr->ctr.y)
```

```
              *(element_ptr->v1.y - element_ptr->ctr.y) +
         (element_ptr->v1.z - element_ptr->ctr.z)
              *(element_ptr->v1.z - element_ptr->ctr.z));
    } else {            /* top plate calculations for TRIANGLES */
      /* calculate and store top plate offset                         */
      /* each component = (max glyph height * this glyph height       */
      /*   the corresponding component of the glyph z unit vector)    */
      element_ptr->t.x = height_divisions[NUMSEGS] * element_ptr->thickness
           * rotation[2][0];
      element_ptr->t.y = height_divisions[NUMSEGS] * element_ptr->thickness
           * rotation[2][1];
      element_ptr->t.z = height_divisions[NUMSEGS] * element_ptr->thickness
           * rotation[2][2];
    }

/* create transformation matrix from rotation, translation, and height */
    PICput_identity_transform();
    PICtranslate(element_ptr->ctr.x, element_ptr->ctr.y, element_ptr->ctr.z);
    PICpremultiply_transform(rotation);

if (element_ptr->element_type == ROD ) {
      PICrotate_y(90.);
      PICscale(element_ptr->thickness/(2. * M_PI),
          element_ptr->thickness/(2. * M_PI), 1.0);
    } else {
      PICscale_z(element_ptr->thickness);
    }

PICget_transform(element_ptr->transform);
  } void read_geometry()
/*
   read binary geometry file
   sets global variables height_divisions[], height_midpoints[],
     backdistx, backdisty, numelements
   also creates global tables byte_to_deg[], byte_to_len[], byte_to_float[]
   format of the geometry file -- 32 bit binary IEEE floats:
     NUMSEGS (9) floats: finite difference divisions
     1 float: length in model coordinates of the back side of a glyph
     1 float: length in model coordinates of a maximum length glyph
     for each element:
        9 floats: x,y,z unit vectors -- z = element normal, +x = 0 deg rotation
        3 floats: center of element
        9 floats: corners of element -- for rods 3rd vertex = center
        1 float: glyph height -- half thickness of mold
*/
{
  char *geom_file_name;          /* name of geometry file from environment */
  FILE *geom_file;               /* geometry file */
  struct stat stat_geom_file;    /* geometry file info (including file size) */
  float back_len;                /* length of back side of glyph triangle */
  float length_offset;           /* forward offset for 0-length glyph */
  float maxlength;               /* maximum glyph length */
  float lengthscale;             /* scaling factor for byte to length */
  float anglescale;              /* scaling factor for byte to degrees */
  int i;                         /* loop index */

/* open geometry file */
  geom_file_name = get_environment_var(ENV_GEOMETRY_FILE,
       GEOMETRY_FILE_DEFAULT);
  if ((geom_file = fopen(geom_file_name, "rb")) == NULL)
```

```c
    error_exit(geom_file_name);

/* calculate number of elements */
  fstat(fileno(geom_file), &stat_geom_file);
  num_elements = ( (stat_geom_file.st_size/sizeof(float)) - NUMSEGS - 2) / 22;

/* build tables of height divisions between finite difference segments */
  height_divisions = (float *)malloc((NUMSEGS+1) * sizeof(float));
  height_midpoints = (float *)malloc((NUMSEGS) * sizeof(float));
  height_divisions[0] = 0;
  fread(&height_divisions[1], sizeof(float), NUMSEGS, geom_file);
  for(i=0; i<NUMSEGS; i++)               /* find midpoint of segments */
     height_midpoints[i] = (height_divisions[i] + height_divisions[i+1])/2.;

/* find glyph dimension information */
  fread(&back_len, sizeof(float),1, geom_file); /* size of back face */
  back_y = back_len / 2;                   /* find position of back corner */
  back_x = - sqrt(3.0) * back_len / 4;

/* offset from glyph center to make 0-length glyphs equilateral triangles */
  length_offset = sqrt(7.0) * back_len / 4;

fread(&maxlength,sizeof(float),1,geom_file);  /* maximum glyph length */

PICpush_transform();  /* make room for matrix compression operations */

/* read geometry information for all elements */
  geometry = (Geom_Info *) malloc(num_elements * sizeof(Geom_Info));
  for(i=0; i<num_elements; i++)
     read_element(geom_file, &geometry[i]);

PICpop_transform();  /* release space used to do transform compression */ fclose(geom_file);

/* set up conversion tables for length, angle, and floating point numbers */
  anglescale = 360.0/256.0;              /* scaling factor for angles.*/
  lengthscale = maxlength/255.0;          /* scaling factor for length */
  for(i=0; i<256; i++) {
     byte_to_deg[i] = anglescale * i;
     byte_to_len[i] = lengthscale * i + length_offset;
     byte_to_float[i] = i;
  }

/* create frame data space */
  frame_data = (unsigned char *) malloc(num_elements * ELEMENT_SIZE);
}
```

```
/*********************************************************************/
/* pix_globals.c by Marc Olano for the Eastman Kodak Company         */
/* all rights reserved by the Eastman Kodak Company                  */
/*                                                                    */
/* global variables used in pixel portion (gly_pixel) of animation   */
/* program                                                            */
/*********************************************************************/ include <piclib.h>
include "pix_globals.h"
#include "anim_pix.h"

/* screen window sizes */
int total_left, total_right, total_top, total_bottom;
int color_left, color_right, color_top, color_bottom;
int view_left, view_right, view_top, view_bottom;

/* surface characteristics for each color index */
PICsurface_model temp_surf[256];        /* glyph color map */
PICsurface_model pres_surf[256];        /* base plane color map */
PICsurface_model wall_surf;             /* mold wall color */

/* conversion tables */
float byte_to_deg[256];         /* byte to angle conversion table */
float byte_to_len[256];         /* byte to length conversion table */
float byte_to_float[256];       /* byte to float conversion table */

/* glyph geometry information */
float *height_divisions;        /* array: divisions between glyph segments */
float *height_midpoints;        /* array: midpoint of glyph segments */
float back_x, back_y;           /* coordinates of back corner of glyph */ int num_elements;               /* number of glyphs read in */
Geom_Info *geometry;            /* array: element geometry information */

/* frame information array of element info in Geom_Info order */
unsigned char *frame_data;

/* values from interface -- used by assorted draw_... functions */
Point glyph_scale;      /* length, width, and height scale */
int mold_wall;          /* 1 if mold wall is visible, 0 if not */
int empty_mold;         /* 1 if grey plane is shown for empty mold */
unsigned char vel_min, vel_max;         /* velocity display range */
unsigned char temp_min, temp_max;       /* temperature display range */
```

```c
/*********************************************************************/
/* pix_init.c by Marc Olano for the Eastman Kodak Company            */
/* all rights reserved by the Eastman Kodak Company                  */
/*                                                                    */
/* initialize pixel machine                                           */
/*********************************************************************/ include <piclib.h>
include <PICMAC.h>
#include <sys/wait.h>
#include <vfork.h>
#include "util.h"
#include "env.h"
#include "pix_globals.h"
#include "pix_color.h"
#include "pix_init.h"

/* color bar viewport */
#define XBARSTART       (0.02 * (xend - xstart) + xstart)
#define XBAREND         (0.98 * (xend - xstart) + xstart)
#define YBARSTART       (0.02 * (yend - ystart) + ystart)
#define YBAREND         (0.06 * (yend - ystart) + ystart)

/* animation viewport */
#define XVIEWSTART      xstart
#define XVIEWEND        xend
#define YVIEWSTART      YBAREND
define YVIEWEND        yend /* pixel machine crosshair cursor */
static DEVcursor crosshair = { 15, 15,
        0x00018000,     0x00018000,     0x00018000,     0x00018000,
        0x00018000,     0x00018000,     0x00018000,     0x00018000,
        0x00018000,     0x00018000,     0x00018000,     0x00018000,
        0x00018000,     0x00018000,     0x00018000,     0xffffffff,
        0xffffffff,     0x00018000,     0x00018000,     0x00018000,
        0x00018000,     0x00018000,     0x00018000,     0x00018000,
        0x00018000,     0x00018000,     0x00018000,     0x00018000,
        0x00018000,     0x00018000,     0x00018000,     0x00018000
        };

void init_pixel()
/*
   initialize pixel graphics library
*/
{
  static PIClight_source lights[4];     /* light sources */
  int xsiz, ysiz;                       /* size of screen */
  float xstart, xend, ystart, yend;     /* 0-1 viewport endpoints */
  char *screen_size;                    /* screen size environment string */
  int scanned;                          /* character count reading viewport */
  int i;                                /* loop variable */

/* run the hypinit program to make sure the pixel machine can run */
  if (vfork() == 0) {
    execlp("hypinit", "hypinit", 0);
    _exit(127);
  }
  wait(0);

/* tell PIClib to initialize graphics */
```

```c
if ( PICinit() )
   {
   printf("error initializing PIClib\n");
   exit(1);
   }

/* pixel machine modes */
PICzbuffer(PIC_ON);                    /* z-buffered hidden surface removal */
PICdouble_buffer(PIC_ON);              /* use double buffer for animation */
PICbackface(PIC_ON);                   /* cull polygons facing away */
PICeuclid_mode(PIC_EUCLID_POLYGON);    /* draw as polygons, not lines */
PICquadric_precision(3, 4);            /* precision of rod elements */

/* get bounds of viewport from environment */
screen_size = get_environment_var(ENV_SCREEN_SIZE, SCREEN_SIZE_DEFAULT);
scanned = -1;
sscanf(screen_size, "%f,%f,%f,%f %n", &xstart, &xend, &ystart, ¥d,
       &scanned);
if (scanned != strlen(screen_size)) {
   screen_size = set_environment_var(ENV_SCREEN_SIZE, SCREEN_SIZE_DEFAULT);
   sscanf(SCREEN_SIZE_DEFAULT, "%f,%f,%f,%f", &xstart, &xend, &ystart, ¥d);
}

/* set full viewport size */
PICget_screen_size( &xsiz, &ysiz );
xsiz--;
ysiz--;
total_left =   (int)(xsiz * xstart);
total_right =  (int)(xsiz * xend);
total_top =    (int)(ysiz * ystart);
total_bottom = (int)(ysiz * yend);
PICput_viewport(total_left, total_right, total_top, total_bottom);

/* define cursor and cursor colors */
PICdefine_cursor(crosshair);
PICupdate_map(PIC_OFF);
for(i=1; i<256; i++)
   PICput_alpha_map_entry(i, 1.0, 0.0, 0.0);
PICupdate_map(PIC_ON);

/* clear alpha overlay planes (used for cursor) */
PICoverlay_mode(PIC_OVERLAY_NON_ZERO);
PICcolor_alpha(0);
PICclear_alpha();

/* clear screen */
PICMACcolor_rgb( BACKGROUND_R, BACKGROUND_G, BACKGROUND_B );
PICclear_rgbz();

/* draw color bars */
color_left =   (int)(xsiz * XBARSTART);
color_right =  (int)(xsiz * XBAREND);
color_top =    (int)(ysiz * YBARSTART);
color_bottom = (int)(ysiz * YBAREND);
PICput_viewport(color_left, color_right, color_top, color_bottom);
init_colors();

/* copy drawing to both buffers -- set viewport for view */
PICput_viewport(total_left, total_right, total_top, total_bottom);
PICswap_buffer();
PICcopy_front_to_back();

view_left =    (int)(xsiz * XVIEWSTART);
```

```
view_right =   (int)(xsiz * XVIEWEND);
view_top =     (int)(ysiz * YVIEWSTART);
view_bottom =  (int)(ysiz * YVIEWEND);
PICput_viewport(view_left, view_right, view_top, view_bottom);

/* turn on ambient light */
PIClight_ambient( 0.9, 0.9, 0.9 );

/* define light sources */
lights[0].nx = 1.;      lights[0].ny = 1.;     lights[0].nz = 1.;
lights[1].nx =-1.;      lights[1].ny = 1.;     lights[1].nz = 1.;
lights[2].nx = 0.;      lights[2].ny = 0.;     lights[2].nz =-1.;
lights[3].nx = 0.;      lights[3].ny =-1.;     lights[3].nz = 1.;

lights[0].r = 1.;       lights[0].g = 1.;      lights[0].b = 1.;
lights[1].r = .5;       lights[1].g = .5;      lights[1].b = .7;
lights[2].r = .5;       lights[2].g = .5;      lights[2].b = .7;
lights[3].r = .5;       lights[3].g = .5;      lights[3].b = .7;

/* turn on light sources */
for(i=0; i < sizeof(lights) / sizeof(*lights); i++) {
  PICput_light_source(PIC_LIGHT_DIRECT, i, &lights[i]);
  PIClight_switch(PIC_LIGHT_DIRECT, i, PIC_ON);
}

/* do perspective */
PICshade_mode(PIC_SHADE_FLAT);
PICpersp_project(50.0, xsiz*(xend - xstart) / (ysiz*(yend - ystart)),
      0.1, 1000.0);
}
```

```c
/*********************************************************************/
/* pix_pick.c by Marc Olano for the Eastman Kodak Company            */
/* all rights reserved by the Eastman Kodak Company                  */
/*                                                                   */
/* for selecting an element to get data on                           */
/*                                                                   */
/* Note:                                                             */
/*   pick function is modeled after the draw() function              */
/*   all polygons for each element are drawn in a flat color         */
/*   the green and blue color bytes store the element number         */
/*********************************************************************/
include <stdio.h>
#include <math.h>
#include <piclib.h>
include <PICMAC.h>
#include "pix_globals.h"
#include "anim_pix.h"
#include "pix_pick.h"

void start_pick(x, y)
int x, y;
/*
  turns on cursor at x,y
  draws one frame of glyphs using information in curframe
  each element is drawn in a distinct flat shaded color
*/
{
  int i, element_number;        /* loop index */
  Geom_Info *geom_ptr;          /* loop pointer for geometry info */
  unsigned char *element_ptr;   /* loop pointer to element in frame_data[] */
  unsigned char *velocity_ptr, *temperature_ptr;
  float *above_ptr, *below_ptr; /* loop pointer into height_divisions[] */
  float length;                 /* length of glyph segment */
  int last_not_seen;            /* flag for visible segments */
  float green, blue;

/* save normal picture in top external buffer */
  PICcopy_front_to_back();
  PICcopy_back_to_ext(PIC_TOP_BUFFER, 0, 0);

/* loop through elements in frame from last down to first */
  geom_ptr = &geometry[num_elements];           /* init loop pointers */
  element_ptr = &frame_data[num_elements * ELEMENT_SIZE];
  PICshade_mode(PIC_SHADE_OFF);                 /* turn off shading */ element_number = num_elements;
  while (geom_ptr-- > geometry) {               /* loop to bottom of arrays */
    element_ptr -= ELEMENT_SIZE;
    element_number--;

/* store element number in green and blue componenets of color */
    /* least significant byte stored as 0-1 blue value */
    /* second byte stored as 0-1 green value */
    PICMACcolor_rgb( 0.0
        , (float)(element_number >> 8)/255.
        , (float)(element_number & 0xff)/255. );

/* draw mold base plane / pressure information */
    if (geom_ptr->element_type == TRIANGLE) {

/* draw pressure surface */
      if (element_ptr[ELEMENT_PRES] != 0 || empty_mold) {
        PICflip(PIC_ON);
```

```
      PICMACpoly_point_3d(geom_ptr->v1.x,geom_ptr->v1.y,geom_ptr->v1.z);
      PICMACpoly_point_3d(geom_ptr->v2.x,geom_ptr->v2.y,geom_ptr->v2.z);
      PICMACpoly_point_3d(geom_ptr->v3.x,geom_ptr->v3.y,geom_ptr->v3.z);
      PICMACpoly_close();
      PICflip(PIC_OFF);
    }

/* draw glyphs */
    if (element_ptr[ELEMENT_PRES] != 0) {
      /* transform to standard glyph orientation */
      PICpush_transform();
      PICpremultiply_transform(geom_ptr->transform);

/* rotate glyph and scale from interface settings */
      PICrotate_z(byte_to_deg[element_ptr[ELEMENT_ANGLE]]);
      PICscale(glyph_scale.x, glyph_scale.y, glyph_scale.z);

/* initalize loop pointers */
      velocity_ptr = element_ptr + ELEMENT_VELOCITY + NUMSEGS;
      temperature_ptr = element_ptr + ELEMENT_TEMP + NUMSEGS;
      below_ptr = &height_divisions[NUMSEGS - 1];

/* loop through segments */
      last_not_seen = 0;        /* always see both sides of center segment */
      for(i=0; i<NUMSEGS; i++) {
        velocity_ptr--;
        temperature_ptr--;
        above_ptr = below_ptr--;

if (*velocity_ptr < vel_min || *velocity_ptr > vel_max ||
            *temperature_ptr < temp_min || *temperature_ptr > temp_max)
          last_not_seen = 1;              /* record if element was not seen */ else {
          length = byte_to_len[*velocity_ptr];

/** top glyph **/
          /* back face */
          PICMACpoly_point_3d(back_x, -back_y, *above_ptr);
          PICMACpoly_point_3d(back_x,  back_y, *above_ptr);
          PICMACpoly_point_3d(back_x,  back_y, *below_ptr);
          PICMACpoly_point_3d(back_x, -back_y, *below_ptr);
          PICMACpoly_close();

/* positive y side */
          PICMACpoly_point_3d(back_x,  back_y, *above_ptr);
          PICMACpoly_point_3d(length,     0.0, *above_ptr);
          PICMACpoly_point_3d(length,     0.0, *below_ptr);
          PICMACpoly_point_3d(back_x,  back_y, *below_ptr);
          PICMACpoly_close();

/* negative y side */
          PICMACpoly_point_3d(length,     0.0, *above_ptr);
          PICMACpoly_point_3d(back_x, -back_y, *above_ptr);
          PICMACpoly_point_3d(back_x, -back_y, *below_ptr);
          PICMACpoly_point_3d(length,     0.0, *below_ptr);
          PICMACpoly_close();

/* top face */
          PICMACpoly_point_3d(back_x, -back_y, *above_ptr);
          PICMACpoly_point_3d(length,     0.0, *above_ptr);
          PICMACpoly_point_3d(back_x,  back_y, *above_ptr);
          PICMACpoly_close();
```

```
            /** bottom glyph **/
            /* back face */
            PICMACpoly_point_3d(back_x,  -back_y,-*below_ptr);
            PICMACpoly_point_3d(back_x,   back_y,-*below_ptr);
            PICMACpoly_point_3d(back_x,   back_y,-*above_ptr);
            PICMACpoly_point_3d(back_x,  -back_y,-*above_ptr);
            PICMACpoly_close();

/* positive y side */
            PICMACpoly_point_3d(back_x,   back_y,-*below_ptr);
            PICMACpoly_point_3d(length,      0.0,-*below_ptr);
            PICMACpoly_point_3d(length,      0.0,-*above_ptr);
            PICMACpoly_point_3d(back_x,   back_y,-*above_ptr);
            PICMACpoly_close();

/* negative y side */
            PICMACpoly_point_3d(length,      0.0,-*below_ptr);
            PICMACpoly_point_3d(back_x,  -back_y,-*below_ptr);
            PICMACpoly_point_3d(back_x,  -back_y,-*above_ptr);
            PICMACpoly_point_3d(length,      0.0,-*above_ptr);
            PICMACpoly_close();

/* top face */
            PICMACpoly_point_3d(back_x,   back_y,-*above_ptr);
            PICMACpoly_point_3d(length,      0.0,-*above_ptr);
            PICMACpoly_point_3d(back_x,  -back_y,-*above_ptr);
            PICMACpoly_close();

/* bottom faces for upper and lower half of glyph */
            if (last_not_seen) {
              /* top glyph */
              PICMACpoly_point_3d(back_x,   back_y, *below_ptr);
              PICMACpoly_point_3d(length,      0.0, *below_ptr);
              PICMACpoly_point_3d(back_x,  -back_y, *below_ptr);
              PICMACpoly_close();

/* bottom glyph */
              PICMACpoly_point_3d(back_x,  -back_y,-*below_ptr);
              PICMACpoly_point_3d(length,      0.0,-*below_ptr);
              PICMACpoly_point_3d(back_x,   back_y,-*below_ptr);
              PICMACpoly_close();
            } last_not_seen = 0;
         }
       }
       PICpop_transform();
     }
  } else {                       /* ROD */

/* only do transformation if the element is going to be drawn */
     if (element_ptr[ELEMENT_PRES] != 0 || empty_mold) {
       PICpush_transform();
       PICpremultiply_transform(geom_ptr->transform);
       PICscale(glyph_scale.z, glyph_scale.z, 1.0);

/* draw pressure surface */
       /* note that t.x is both the x and y radius for the pressure surface */
       PICsuperq_ellipsoid(geom_ptr->t.x, geom_ptr->t.x, geom_ptr->t.z,
             0.0, 1.0);

/* draw glyphs */
       if (element_ptr[ELEMENT_PRES] != 0) {
```

```c
        /* scale and position for segments */
        PICscale_z(glyph_scale.x);      /* length scaling */
        PICrotate_x(byte_to_deg[element_ptr[ELEMENT_ANGLE]]);
        PICtranslate_z(-back_x);        /* shift off center of element */
        PICscale_z(0.5);                /* superq's use radius =.length/2 */

/* initialize loop pointers */
        velocity_ptr = element_ptr + ELEMENT_VELOCITY + NUMSEGS;
        temperature_ptr = element_ptr + ELEMENT_TEMP + NUMSEGS;
        below_ptr = &height_divisions[NUMSEGS - 1];

/* loop through finite difference segments */
        for(i=0; i<NUMSEGS; i++) {
          velocity_ptr--;
          temperature_ptr--;
          above_ptr = below_ptr--;

/* only display segment if it is within the velocity/temp ranges */
          if (*velocity_ptr >= vel_min  ||  *velocity_ptr <= vel_max  ||
                  *temperature_ptr >= temp_min  ||
                  *temperature_ptr <= temp_max) {

PICpush_transform();

/* translate length to floating point radius */
            length = byte_to_len[*velocity_ptr];

/* shift tube forward to make axi-symmetric bullet glyph */
            PICtranslate_z(length);

/* draw superquad tube */
            PICsuperq_ellipsoid((*above_ptr), (*below_ptr), length,
                    0.0,1.0);

PICpop_transform();
          }
        }
      }
      PICpop_transform();
    }
  }
}

/* return to normal drawing mode */
    PICshade_mode(PIC_SHADE_FLAT);

/* save picture with element info in bottom external buffer */
    PICcopy_back_to_ext(PIC_BOTTOM_BUFFER, 0, 0);

/* turn on cursor */
    PICposition_cursor(x, y);
    PICdisplay_overlay(PIC_ON);
    PICdisplay_cursor(PIC_ON);
} int pick(x, y)
int x, y;
/*
   when called after start_pick() returns element number of element at x,y
*/
{
    int element_number;             /* number of element picked */
```

```c
    unsigned char red, green, blue;        /* colors read from screen */

/* get element number selected */
    PICget_scan_line(x,y, &red, &green, &blue, 0, 1, PIC_RGB_PIXELS);
    if (red) {      /* element numbers should have no red */
       element_number = -1;

/* unmark previously chosen element */
       PICcopy_ext_to_back(PIC_TOP_BUFFER, 0, 0);   /* fetch normal image */
       PICswap_buffer();
       PICcopy_ext_to_back(PIC_BOTTOM_BUFFER,0,0); /* fetch element-ized image */

} else {
       element_number = (((int)green) << 8) + (int)blue;

/* mark chosen element */
       PICcopy_ext_to_back(PIC_TOP_BUFFER, 0, 0);   /* fetch normal image */

/* set for flat red */
       PICshade_mode(PIC_SHADE_OFF);
       PICMACcolor_rgb(1., 0., 0.);

/* draw base of glyph in red */
       if (geometry[element_number].element_type == TRIANGLE) {

/* draw triangle */
          PICflip(PIC_ON);
          PICMACpoly_point_3d(geometry[element_number].v1.x,
             geometry[element_number].v1.y,geometry[element_number].v1.z);
          PICMACpoly_point_3d(geometry[element_number].v2.x,
             geometry[element_number].v2.y,geometry[element_number].v2.z);
          PICMACpoly_point_3d(geometry[element_number].v3.x,
             geometry[element_number].v3.y,geometry[element_number].v3.z);
          PICMACpoly_close();
          PICflip(PIC_OFF);
       } else {                                    /* ROD */

/* transform coordinates to draw cylinder */
          PICpush_transform();
          PICpremultiply_transform(geometry[element_number].transform);
          PICscale(glyph_scale.z, glyph_scale.z, 1.0);

/* draw red base cylinder */
          PICsuperq_ellipsoid(geometry[element_number].t.x,
                   geometry[element_number].t.x, geometry[element_number].t.z,
                   0.0, 1.0);
          PICpop_transform();
       }

/* restore shading mode */
       PICshade_mode(PIC_SHADE_FLAT);

PICswap_buffer();
       PICcopy_ext_to_back(PIC_BOTTOM_BUFFER,0,0); /* fetch element-ized image */
    }

PICposition_cursor(x,y);
    return(element_number);
} void done_pick()
/*
   called when picking is over -- turn off cursor
```

```
*/
{
  /* turn off cursor */
  PICdisplay_cursor(PIC_OFF);
  PICdisplay_overlay(PIC_OFF);

/* restore display */
  PICcopy_ext_to_back(PIC_TOP_BUFFER, 0, 0);
  PICswap_buffer();

PICMACcolor_rgb( BACKGROUND_R, BACKGROUND_G, BACKGROUND_B );
  PICclear_rgbz();
}
```

```
/***************************************************************/
/* range_slider_item.c by Marc Olano for the Eastman Kodak Company */
/* all rights reserved by the Eastman Kodak Company             */
/*                                                              */
/* produce a slider with two bars for specifying a range        */
/* a shaded area appears between the two bars, and the actual values */
/* given in text entry fields (see text_sun_anim.c) on either side of */
/* the slider                                                   */
/*                                                              */
/* use:                                                         */
/* include item_types.h                                         */
/*                                                              */
/* create panel that will contain range slider items            */
/*      Panel panel;                                            */
/*      Frame frame;                                            */
/*      panel = window_create(frame, PANEL_WITH_TEXT, 0);       */
/*      panel_create_item(panel, PANEL_CURSOR_HIDING_PLACE, 0); */
/*                                                              */
/* create range slider item                                     */
/*      Range_Slider rs;                                        */
/*      int x_pos, y_pos, number_length;                        */
/*      char *number_printf_format;                             */
/*      void notify_proc();                                     */
/*      rs = create_range_slider(panel,  x_pos, y_pos,  notify_proc, */
/*             number_printf_format, number_length);            */
/*                                                              */
/* size of range slider item                                    */
/*      int width, height;                                      */
/*      width = range_slider_width(rs);                         */
/*      height = range_slider_height(rs);                       */
/*                                                              */
/* change value of range slider item                            */
/*      rs->low = 0.0;                                          */
/*      rs->high = 1.0;                                         */
/*      set_range_slider(rs);                                   */
/*                                                              */
/* notify procedure for range slider item                       */
/*      void notify_proc(rs)                                    */
/*      Range_Slider rs;                                        */
/*      {                                                       */
/*         printf("%f %f\n", rs->low, rs->high);                */
/*      }                                                       */
/*                                                              */
/* link with text_entry_item.o                                  */
/***************************************************************/ include <suntool/sunview.h>
include <suntool/panel.h>
#include "item_types.h"

void set_range_slider(rs)
Range_Slider rs;
/*
  draw range slider for current values, and update low and high text values
*/
{
   struct pixrect *slider_pr;   /* pixrect of slider */
   int bar_min, bar_max;        /* coordinates of ends of bar */

/* calculate un-offset coordinates of ends of bars to speed things up */
   rs->scale = 250. / (rs->top - rs->bottom);
   bar_min = (int)((rs->low - rs->bottom) * rs->scale);
```

```
  bar_max = (int)((rs->high - rs->bottom) * rs->scale);

/* get slider image */
  slider_pr = (struct pixrect *)panel_get(rs->slider_pi, PANEL_LABEL_IMAGE);

/* draw slider outline */
  pr_vector(slider_pr, 0,0, 255,0, PIX_SET, 1);
  pr_vector(slider_pr, 0,15, 255,15, PIX_SET, 1);
  pr_vector(slider_pr, 0, 0, 0,15, PIX_SET, 1);
  pr_vector(slider_pr, 255, 0, 255,15, PIX_SET, 1);

/* clear inside slider */
  pr_rop(slider_pr, 1,1, 254,14, PIX_CLR, NULL, 0,0);

/* shade center of slider */
  pr_replrop(slider_pr,  bar_min + 3, 1,  bar_max - bar_min, 14,
       PIX_SRC, &grey50, 0, 0);

/* draw left and right solid slider bars */
  pr_rop(slider_pr,  bar_min + 1, 1,   5, 14,  PIX_SET, NULL, 0, 0);
  pr_rop(slider_pr,  bar_max + 1, 1,   5, 14,  PIX_SET, NULL, 0, 0);

/* put revised picture on slider item */
  panel_set(rs->slider_pi, PANEL_LABEL_IMAGE, slider_pr, 0);

/* print low and high text values */
  sprintf(rs->low_te->val, rs->format, rs->low);
  set_text_entry(rs->low_te);
  sprintf(rs->high_te->val, rs->format, rs->high);
  set_text_entry(rs->high_te);
} static void notify_low_text(te)
Text_Entry te;
/*
   called when low end text item has a new value
*/
{
  Range_Slider rs;
  float new_val;

/* get data for slider */
  rs = (Range_Slider)(te->client_data);

/* set new value if it is in range */
  new_val = rs->low;
  sscanf(te->val, "%f", &new_val);
  if (new_val >= rs->bottom  &&  new_val <= rs->top)
    rs->low = new_val;

/* adjust high value if it less than the low value */
  if (rs->low > rs->high)
    rs->high = rs->low;

/* update display with these new settings */
  set_range_slider(rs);

/* let user procedure know about new values too */
  Notify(rs);
} static void notify_high_text(te)
```

```
  Text_Entry te;
/*
  called when high end text item has a new value
*/
{
  Range_Slider rs;
  float new_val;

/* get data for slider */
  rs = (Range_Slider)(te->client_data);

/* set new value if it is in range */
  new_val = rs->high;
  sscanf(te->val, "%f", &new_val);
  if (new_val >= rs->bottom && new_val <= rs->top)
    rs->high = new_val;

/* adjust low value if it greater than the high value */
  if (rs->low > rs->high)
    rs->low = rs->high;

/* update display with these new settings */
  set_range_slider(rs);

/* let user procedure know about new values too */
  Notify(rs);
} static int range_event_proc(pi, event)
Panel_item pi;
Event *event;
/*
  handle events for range sliders
*/
{
  Range_Slider rs;        /* range slider data */
  float value;            /* value of slider at current mouse positon */

/* start with standard event handler for panel */
  (*(int (*)())panel_get(  (Panel)panel_get(pi, PANEL_PARENT_PANEL),
         PANEL_EVENT_PROC  ))(pi, event);

/* check event type to see if we should adjust the bar */
  if ( event_id(event) == MS_LEFT    ||                 /* left button */
         (event_id(event) == PANEL_EVENT_CANCEL  ||     /* cancel */
          event_id(event) == LOC_DRAG) &&               /* left button drag */
         (int)window_get(  (Panel)panel_get(pi, PANEL_PARENT_PANEL),
              WIN_EVENT_STATE, MS_LEFT) ) { rs = (Range_Slider) panel_get(pi, PANEL_CLIENT_DATA);
    value = (float)(event_x(event) - (int)panel_get(pi, PANEL_LABEL_X) - 3)
         / rs->scale + rs->bottom;
    if (value < rs->bottom) value = rs->bottom;
    if (value > rs->top) value = rs->top;

/* just started moving, or neither bar is active, pick one to move */
    if (!rs->active)
      if (value < (rs->low + rs->high) / 2.)
        rs->active = 1;
      else
        rs->active = 2;

/* move appropriate bar -- check for low > high */
```

```c
    if (rs->active == 1) {
      rs->low = value;
      if (rs->low > rs->high)
        rs->high = rs->low;
    } else {
      rs->high = value;
      if (rs->low > rs->high)
        rs->low = rs->high;
    }

/* for a button release or cancel event, mark as inactive again */
    if ( (event_id(event) == MS_LEFT && event_is_up(event))  ||
         (event_id(event) == PANEL_EVENT_CANCEL) )
      rs->active = 0;

/* update with new values */
    set_range_slider(rs);

/* let user procedure know about new values too */
    Notify(rs);
  }
}

Range_Slider create_range_slider(panel, x, y, notify_proc, format, length)
Panel panel;                    /* panel to put it in */
int x, y;                       /* position to put it */
void (*notify_proc)();          /* function to call when it changes */
char *format;                   /* printf format for numbers */
int length;                     /* character width of numbers */
/*
   create a range slider item in a panel
   client_data fields for text items created are set to point to the
         Range_Slider data created
   returns Range_Slider created
*/
{
  Range_Slider rs;

/* create range slider item */
  rs = (Range_Slider) malloc(sizeof(*rs));
  rs->low_te = create_text_entry(panel, x, y, notify_low_text, length);
  rs->high_te = create_text_entry(panel, x + text_entry_width(rs->low_te)
          + 276, y, notify_high_text, length);
  rs->low_te->client_data = rs->high_te->client_data = rs;
  rs->format = format;
  rs->bottom = 0.;
  rs->top = 1.;
  rs->scale = 250. / (rs->top - rs->bottom);
  rs->low = rs->bottom;
  rs->high = rs->top;
  rs->notify = notify_proc;
  rs->slider_pi = panel_create_item(panel, PANEL_MESSAGE,
        PANEL_LABEL_X, x + 10 + text_entry_width(rs->low_te),
        PANEL_LABEL_Y, y,
        PANEL_LABEL_IMAGE, mem_create(256, 16,
                ((Pixwin *)window_get(panel, WIN_PIXWIN))
                  ->pw_pixrect->pr_depth),
        PANEL_PAINT, PANEL_NO_CLEAR,
        PANEL_EVENT_PROC, range_event_proc,
        PANEL_CLIENT_DATA, rs,
        0);

/* set with initial values */
```

```
    set_range_slider(rs);

return(rs);
}
```

```
/**************************************************************/
/* text_entry_item.c by Marc Olano for the Eastman Kodak Company */
/* all rights reserved by the Eastman Kodak Company           */
/*                                                            */
/* produce a text entry field with slightly different behavior than the */
/*    standard PANEL_TEXT type                                */
/* when item is clicked on, caret cursor appears and text entry field */
/*    is cleared                                              */
/* caret cursor disappears when item is done (notified)       */
/* the item is notified when return or tab is pressed, or when any item */
/*    in the panel is activated (by clicking or dragging in it) */
/*                                                            */
/* use:                                                       */
/* include item_types.h                                       */
/*                                                            */
/* create panel that will contain text entry items            */
/*      Panel panel;                                          */
/*      Frame frame;                                          */
/*      panel = window_create(frame, PANEL_WITH_TEXT, 0);     */
/*      panel_create_item(panel, PANEL_CURSOR_HIDING_PLACE, 0); */
/*                                                            */
/* create text entry item                                     */
/*      Text_Entry te;                                        */
/*      int x_pos, y_pos, character_length;                   */
/*      void notify_proc();                                   */
/*      te = create_text_entry(panel, x_pos, y_pos, notify_proc, */
/*              character_length);                            */
/*                                                            */
/* size of text entry item                                    */
/*      int width, height;                                    */
/*      width = text_entry_width(te);                         */
/*      height = text_entry_height(te);                       */
/*                                                            */
/* change value of text entry item                            */
/*      strcpy(te->val, "abcd");                              */
/*      set_text_entry(te);                                   */
/*                                                            */
/* notify procedure for text entry item                       */
/*      void notify_proc(te)                                  */
/*      Text_Entry te;                                        */
/*      {                                                     */
/*          printf("%s\n", te->val);                          */
/*      }                                                     */
/**************************************************************/ include <suntool/sunview.h>
include <suntool/panel.h>
#include "item_types.h"

/* -- 50% gray texture */
/* used by full_slider_item.c and range_slider_item.c */
/* really doesn't belong in this source file, but since it is the only */
/* shared variable between them, and they both use text_entry, here it is */
static short grey50_image[] = { /* 16x16 50% grey pattern */
        0xAAAA, 0x5555, 0xAAAA, 0x5555, 0xAAAA, 0x5555, 0xAAAA, 0x5555,
        0xAAAA, 0x5555, 0xAAAA, 0x5555, 0xAAAA, 0x5555, 0xAAAA, 0x5555,
};
mpr_static(grey50, 16, 16, 1, grey50_image);

void set_text_entry(te)
```

```
Text_Entry te;
/*
  update text entry item on panel to reflect it's current settings
*/
{
panel_set_value(te->pi, te->val);
} static void pre_event_proc(pi, event)
Panel_item pi;
Event *event;
/*
  called before normal event handling
  notifies active text item before going on to next action
*/
{
  Panel_item text_pi;          /* current text item */
  int (*notify_func)();        /* notify function for text item */

/* check if event is a click or drag -- starting actions for panel items */
  if (event_action(event) == PANEL_EVENT_DRAG_IN ||
       (event_action(event) == MS_LEFT && event_is_down(event))) {

/* get notify function for current text entry item */
    text_pi = (Panel_item) panel_get(
              (Panel) panel_get(pi, PANEL_PARENT_PANEL),
              PANEL_CARET_ITEM);
    notify_func = (int (*)()) panel_get(text_pi, PANEL_NOTIFY_PROC);

/* if notify function exists, notify current text item */
    if (notify_func) notify_func(text_pi, event);
  }
} int text_panel_event_proc(pi, event)
Panel_item pi;
Event *event;
/*
  default event function for panels containing text entry items
  notifies current text item when action starts on another item in the panel
*/
{
  /* notify active text item */
  pre_event_proc(pi, event);

/* do normal stuff with this event too */
  return( panel_default_handle_event(pi, event) );
} static int text_entry_event_proc(pi, event)
Panel_item pi;
Event *event;
/*
  called when event happens in text entry item
*/
{
  Panel panel;           /* panel containing item */
  Text_Entry te;         /* text entry item with event */

/* notify previous text item */
  pre_event_proc(pi, event);
```

```c
    /* clear text item if it is just being selected */
    panel = (Panel) panel_get(pi, PANEL_PARENT_PANEL);
    if ((event_id(event) == MS_LEFT && event_is_down(event)) ||
            (event_id(event) == PANEL_EVENT_DRAG_IN &&
            (int)window_get(panel, WIN_EVENT_STATE, MS_LEFT))) { te = (Text_Entry) panel_get(pi, PANEL_CLIENT_DATA);
        te->val[0] = '\0';
        set_text_entry(te);
    }

/* do normal stuff with this event too */
    return( panel_default_handle_event(pi, event) );
} static int text_entry_notify_proc(pi)
Panel_item pi;
/*
    called when done with a text entry item
    assumes the first item created in the panel was an off-screen text item
        used to hide the cursor when not in use
*/
{
    Panel panel;        /* panel containing text item */
    Text_Entry te;      /* text entry item being notified */

/* set cursor on first item in panel - should by PANEL_HIDE_CURSOR */
    panel = (Panel) panel_get(pi, PANEL_PARENT_PANEL);
    panel_set(panel, PANEL_CARET_ITEM, panel_get(panel, PANEL_FIRST_ITEM), 0);

/* get text entry data */
    te = (Text_Entry) panel_get(pi, PANEL_CLIENT_DATA);

/* turn inactive -- done typing */
    te->active = 0;

/* update the Text_Entry internal string value */
    strcpy(te->val,(char *)panel_get_value(pi));

/* call users notify procedure */
    Notify(te);
}

Text_Entry create_text_entry(panel, x, y, notify_proc, length)
Panel panel;                /* panel to put it in */
int x, y;                   /* position to put it */
void (*notify_proc)();      /* function to call when it changes */
int length;                 /* number of characters in field */
/*
    create a text entry item in a panel
    returns Text_Entry created
*/
{
    Text_Entry te;

te = (Text_Entry) malloc(sizeof(*te));
    te->val = (char *)malloc(length + 1);
    te->val[0] = '\0';
    te->length = length;
    te->notify = notify_proc;
    te->pi = panel_create_item(panel, PANEL_TEXT,
```

```
            PANEL_LABEL_X, x,
            PANEL_LABEL_Y, y,
            PANEL_VALUE_STORED_LENGTH, length,
            PANEL_VALUE_DISPLAY_LENGTH, length,
            PANEL_NOTIFY_PROC, text_entry_notify_proc,
            PANEL_EVENT_PROC, text_entry_event_proc,
            PANEL_CLIENT_DATA, te,
            0);

return(te);
}
```

```c
/**********************************************************************/
/* util.c by Marc Olano                                               */
/*                                                                    */
/* some non-window utility functions used by the gly_* programs       */
/* function prototypes in util.h                                      */
/**********************************************************************/ include <varargs.h>
include <stdio.h>
include "util.h"

/* constant definitions for environment variables */
#define GLY_DIR        "GLY_DIR"
#define GLY_DIR_eq_dot "GLY_DIR=."

#define GLY_DATA        "GLY_DATA"
#define GLY_DATA_eq     "GLY_DATA="
#define GLY_DATA_eq_dot "GLY_DATA=."

/* unix system variable and function definitions */
extern char *getenv();

void add_handler(list, handler, data)
Handler_List *list;
int (*handler)();
void *data;
/*
   add a new handler function (with associated word-sized data) to a list
   for the first call, the list variable should be initialized to NULL
*/
{
  Handler_List new;      /* new list element */ new = (Handler_List) malloc(sizeof(*new));
  new->handler = handler;
  new->data = data;
  new->next = *list;
  *list = new;
} int do_handler(list, data)
Handler_List list;
void *data;
/*
   call functions in list until one returns 1 or the end of the list
   each function is passed the word data parameter "data" and it's own
      internal data field
   returns 1 if any function in the list returned 1
   returns 0 if all functions returned 0
*/
{
  Handler_List list_ptr;        /* loop pointer through list */ for(list_ptr = list; list_ptr; list_ptr = list_ptr->next)
    if ((*list_ptr->handler)(data, list_ptr->data))
      break;

if (list_ptr)
    return(1);
  else
    return(0);
}
```

```
int file_check(filename, mode)
/*
  returns true if filename can be opened in given mode
*/
char filename[], mode[];
{
  return(fclose(fopen(filename, mode)) == 0);
} char *make_strcat(va_alist)
va_dcl
/*
  allocates space for and concatenates a list of strings (terminated by a NULL)
  example: string = make_strcat(gly_dir,"/",file,NULL);
*/
{
  va_list args;                /* used to get function arguments */
  char *full_str;              /* final combined string */
  char *str;                   /* current string in argument list */
  int full_str_len;            /* length of combined string */

/* once through list to find string size */
  va_start(args);
  full_str_len = 0;
  while ((str = va_arg(args, char *)) != NULL)
    full_str_len += strlen(str);
  va_end(args);

/* allocate space for full string */
  full_str = (char *)malloc(full_str_len + 1);
  full_str[0] = '\0';

/* again through list to create full string */
  va_start(args);
  while ((str = va_arg(args, char *)) != NULL)
    strcat(full_str, str);
  va_end(args);

return(full_str);
} void error_exit(err_str)
/*
  print a perror message , then exit
*/
char err_str[];                /* string to pass to perror */
{
  perror(err_str);
  exit(1);
} char *get_environment_var(var_name, default_val)
char *var_name;
char *default_val;
/*
  return environment variable value
  if variable does not exist, create a local entry with the default value
    and return the default value
*/
```

```
{
  char *value;

if ((value = getenv(var_name)) == NULL) {
    fprintf(stderr, "warning: environment variable %s not set\n", var_name);
    fprintf(stderr, "  attempting to use default value: \"%s\"\n",default_val);
    putenv(make_strcat(var_name, "=", default_val, 0));
    value = getenv(var_name);
  } return(value);
} char *set_environment_var(var_name, value)
char *var_name;
char *value;
/*
  char *set_environment_var(char *var_name, char *value)
  set environment variable in the local copy of the environment
  return new value of environment variable
*/
{
  putenv( make_strcat(var_name, "=", value, 0) );
  return( getenv(var_name) );
}
```

```c
/****************************************************************/
/* anim_clamp.c by Marc Olano for the Eastman Kodak Company     */
/* all rights reserved by the Eastman Kodak Company             */
/*                                                              */
/* creates Clamp Force graph panel on sun for gly_animate        */
/****************************************************************/ include <suntool/sunview.h>
include <suntool/panel.h>
#include "anim_globals.h"
include "anim_pix.h"
#include "anim_navigator.h"
#include "item_types.h"
#include "anim_clamp.h"

void make_clamp_frame(parent_frame, frame_list_index)
Frame parent_frame;              /* parent frame from navigator window */
int frame_list_index;            /* index of Display window in frame_list[] */
/*
   makes sun clamp force graph window
   uses global frame_list[frame_list_index].name for the window title
   sets global frame_list[frame_list_index].frame
*/
{
   Panel panel;                  /* panel inside window */

/* create frame for display controls */
   frame_list[frame_list_index].frame =
        make_navigator_subframe(parent_frame, frame_list_index);
   panel = window_create(frame_list[frame_list_index].frame, PANEL, 0);

make_done_button(frame_list[frame_list_index].frame, panel);
}
```

```
/***************************************************************/
/* anim_clamp.c by Marc Olano for the Eastman Kodak Company     */
/* all rights reserved by the Eastman Kodak Company             */
/*                                                              */
/* animated injection molding simulation display program        */
/* runs on SUN workstation and AT&T 900 series Pixel Machine    */
/* developed under Sun OS release 4.0.3                         */
/*   AT&T Pixel Machines PIClib release 1.2                     */
/*                                                              */
/* definitions and prototypes for anim_clamp.c                  */
/***************************************************************/ ifndef ANIM_CLAMP_H
define ANIM_CLAMP_H void make_clamp_frame();
/*
void make_pressure_frame(Frame parent_frame, int frame_list_index)
  makes sun clamp force window
     shows clamp force vs time
     shows time in animation on graph -- can select directly
  uses global frame_list[frame_list_index].name for the window title
  sets global frame_list[frame_list_index].frame
*/ endif ANIM_CLAMP_H
```

```
/***********************************************************************/
/* anim_codes.h by Marc Olano for the Eastman Kodak Company            */
/* all rights reserved by the Eastman Kodak Company                    */
/*                                                                     */
/* integer codes sent over the gly_animate/gly_pixel communication     */
/*    socket                                                           */
/* typically one of these codes is followed by appropriate data        */
/***********************************************************************/ ifndef ANIM_CODES_H
define ANIM_CODES_H enum communication_codes {
/* code name              data             comment /* bi-directional */
Quit,                     /* none          Control - kill program */

/* from pixel program to sun program */
Frame_Done,               /* none          Control - signal of end of drawing */
Element_Picked,           /* int, char[]   Element Information window - element
                                           number selected followed by
                                           raw frame data for element */

/* from sun program to pixel program */
Init_Start,               /* none          Control - initializing, read following
                                                   commands, but don't do them */
Init_End,                 /* none                - done initializing, set everything
                                                   based on the current values
                                                   start drawing a frame */
Frame_Start,              /* none          Control - signal to start drawing */
Frame_Name,               /* int, char []  Time window - next frame's file name
                                                   int passed is string length
                                                   giving number of charaters
                                                   passed -- '\0' is not passed */
Look_At_X,                /* float         View window - looking toward here */
Look_At_Y,                /* float           -    */
Look_At_Z,                /* float           -    */
Eye_Distance,             /* float         - position of eye relative to */
Eye_Tilt,                 /* float           above point in polar coords */
Eye_Pan,                  /* float         -  distance, phi, and theta */
Eye_Twist,                /* float         - view rot. around line of sight */
Glyph_Length,             /* float         Glyph Parameters window - glyph */
Glyph_Width,              /* float         -  scaling */
Glyph_Height,             /* float           -    */
Velocity_Range,           /* byte, byte    Display window - velocity range */
Temperature_Range,        /* byte, byte    - temperature range */
Empty_Mold,               /* boolean       - empty mold elements visible */
Mold_Wall,                /* boolean       - mold wall visible */
Velocity_Min,             /* float         Initialization - pressure color bar */
Velocity_Max,             /* float           - range */
Temperature_Min,          /* float         - temperature color bar range */
Temperature_Max,          /* float           -   */
Start_Picking,            /* none          Element Information window - setup for
                                                   element picking - cursor on */
Move_Picking,             /* float, float  - move cursor - floats (0-1) are
                                                   position in window */
Select_Picking,           /* float, float  - pick the element the cursor's on
                                                   floats (0-1) are final mouse
                                                   position */
Done_Picking,             /* none          - turn off element picking/cursor */
NUM_CODES                 /* total number of communication codes */
};

#endif ANIM_CODES_H
```

```
/*********************************************************************/
/* anim_display.h by Marc Olano for the Eastman Kodak Company        */
/* all rights reserved by the Eastman Kodak Company                  */
/*                                                                   */
/* animated injection molding simulation display program             */
/* runs on SUN workstation and AT&T 900 series Pixel Machine         */
/* developed under Sun OS release 4.0.3                              */
/*   AT&T Pixel Machines PIClib release 1.2                          */
/*                                                                   */
/* definitions and prototypes for anim_display.c                     */
/*********************************************************************/ ifndef ANIM_DISPLAY_H
define ANIM_DISPLAY_H void make_display_window();
/*
void make_display_window(Frame parent_frame, int window_list_index)
   makes sun display control window
     display window controls
         displayed velocity and temperature range,
         visibility of empty mold and mold surface
   uses global window_list[window_list_index].name for the window title
   sets global window_list[window_list_index].frame
*/ endif ANIM_DISPLAY_H
```

```c
/**********************************************************************/
/* anim_frame.c by Marc Olano for the Eastman Kodak Company           */
/* all rights reserved by the Eastman Kodak Company                   */
/*                                                                    */
/* animated injection molding simulation display program              */
/* runs on SUN workstation and AT&T 900 series Pixel Machine          */
/* developed under Sun OS release 4.0.3                               */
/*   AT&T Pixel Machines PIClib release 1.2                           */
/*                                                                    */
/* definitions and prototypes for anim_frame.c                        */
/**********************************************************************/ ifndef ANIM_FRAME_H
define ANIM_FRAME_H void set_frame_index();
/*
void set_frame_index(int index)
   set index of current frame in frame list
   changes globals frame_index, frame_number, frame_time
*/ void set_frame_number();
/*
void set_frame_number(int num)
   set frame number of current frame in frame list
   changes globals frame_index, frame_number, frame_time
*/ void set_frame_time();
/*
void set_frame_time(float time)
   set frame time of current frame in frame list
   changes globals frame_index, frame_number, frame_time
*/ void init_frame();
/*
void init_frame()
   initialize frame list and frame information
*/ endif ANIM_FRAME_H
```

```
/*********************************************************************/
/* anim_frame.c by Marc Olano for the Eastman Kodak Company          */
/* all rights reserved by the Eastman Kodak Company                  */
/*                                                                   */
/* animated injection molding simulation display program             */
/* runs on SUN workstation and AT&T 900 series Pixel Machine         */
/* developed under Sun OS release 4.0.3                              */
/*   AT&T Pixel Machines PIClib release 1.2                          */
/*                                                                   */
/* definitions and prototypes for anim_frame.c                       */
/*********************************************************************/ ifndef ANIM_FRAME_H
define ANIM_FRAME_H void set_frame_index();
/*
void set_frame_index(int index)
   set index of current frame in frame list
   changes globals frame_index, frame_number, frame_time
*/ void set_frame_number();
/*
void set_frame_number(int num)
   set frame number of current frame in frame list
   changes globals frame_index, frame_number, frame_time
*/ void set_frame_time();
/*
void set_frame_time(float time)
   set frame time of current frame in frame list
   changes globals frame_index, frame_number, frame_time
*/ void init_frame();
/*
void init_frame()
   initialize frame list and frame information
*/ endif ANIM_FRAME_H
```

```c
/*******************************************************************/
/* anim_globals.h by Marc Olano for the Eastman Kodak Company      */
/* all rights reserved by the Eastman Kodak Company                */
/*                                                                 */
/* definitions from anim_globals.c                                 */
/*                                                                 */
/* definitions and declarations of global variables for the sun portion */
/* of the glyph visualization animation program                    */
/*******************************************************************/ ifndef ANIM_GLOBALS_H
define ANIM_GLOBALS_H include <suntool/sunview.h>
include "util.h"
#include "anim_pix.h"

/* data about pixel machine part of program */
extern struct pixel_data_struct {
   int pid;                     /* process id of pixel program */
   int link;                    /* end of socket link to pixel program */
} pixel;

extern char *gly_dir;           /* GLY_DIR environment variables */

/* lists of functions for handling various events */
/* list built by a series of calls to add_handler(), used with do_handler() */
extern Handler_List read_list;       /* read settings files */
extern Handler_List save_list;       /* save settings files */
extern Handler_List feedback_list;   /* read messages from pixel program */
extern Handler_List frame_step_list; /* called each frame */
extern Handler_List new_frames_list; /* called when new frames are read */

/* list of seperate windows and their names */
/* list ends with an entry whose window name = NULL */
extern struct window_list_struct {
   char *name;                  /* title of window */
   void (*make_window)();       /* function to create window */
                                /*    void make_window(Frame parent_frame, */
                                /*    int window_list_index) */
   Frame frame;                 /* sunview frame for window */
} window_list[];

/* use Frame create_navigator_subwindow(parent_frame, window_list_index) */
/* to create the windows in window_list */
extern Frame make_navigator_subwindow();

/* information identifying current frame */
extern int frame_index;         /* index in list of frames - 1 frame / index */
extern int frame_number;        /* timestep of frame - skips */
extern float frame_time;        /* time in seconds into simulation */

/* center of last-picked element */
extern Point picked_center;
```

```
/* "trace" file contains sets of data values for each timestep */
#define TRACE_TIME      0       /* real simulation time */
#define TRACE_COUNT     6       /* width of trace data */

/* malloc'd array of trace data -- setup and updated by anim_frame.c */
extern float (*trace_data)[TRACE_COUNT];        /* data array */
extern int total_timesteps;                     /* size of data array */ endif ANIM_GLOBALS_H
```

```
/****************************************************************/
/* anim_gly_parm.c by Marc Olano for the Eastman Kodak Company  */
/* all rights reserved by the Eastman Kodak Company             */
/*                                                              */
/* animated injection molding simulation display program        */
/* runs on SUN workstation and AT&T 900 series Pixel Machine    */
/* developed under Sun OS release 4.0.3                         */
/*   AT&T Pixel Machines PIClib release 1.2                     */
/*                                                              */
/* definitions and prototypes for anim_gly_parm.c               */
/****************************************************************/ ifndef ANIM_GLY_PARM_H
define ANIM_GLY_PARM_H void make_gly_parm_frame();
/*
void make_gly_parm_frame(Frame parent_frame, int frame_list_index)
   makes sun glyph parameters control window
     glyph parameters window controls glyph scaling
         length, width, and height scaling
   uses global frame_list[frame_list_index].name for the window title
   sets global frame_list[frame_list_index].frame
*/ endif ANIM_GLY_PARM_H
```

```
/****************************************************************/
/* anim_gly_scale.c by Marc Olano for the Eastman Kodak Company */
/* all rights reserved by the Eastman Kodak Company             */
/*                                                              */
/* animated injection molding simulation display program        */
/* runs on SUN workstation and AT&T 900 series Pixel Machine    */
/* developed under Sun OS release 4.0.3                         */
/*   AT&T Pixel Machines PIClib release 1.2                     */
/*                                                              */
/* definitions and prototypes for anim_gly_scale.c              */
/****************************************************************/ ifndef ANIM_GLY_PARM_H
define ANIM_GLY_PARM_H void make_gly_scale_window();
/*
void make_gly_scale_window(Frame parent_frame, int window_list_index)
  makes sun glyph scale control window
    glyph scaling window controls size of glyphs
        length, width, and height scaling
  uses global window_list[window_list_index].name for the window title
  sets global window_list[window_list_index].frame
*/ endif ANIM_GLY_PARM_H
```

```c
/****************************************************************/
/* anim_info.h by Marc Olano for the Eastman Kodak Company      */
/* all rights reserved by the Eastman Kodak Company             */
/*                                                              */
/* animated injection molding simulation display program        */
/* runs on SUN workstation and AT&T 900 series Pixel Machine    */
/* developed under Sun OS release 4.0.3                         */
/*   AT&T Pixel Machines PIClib release 1.2                     */
/*                                                              */
/* definitions and prototypes for anim_info.c                   */
/****************************************************************/ ifndef ANIM_INFO_H
define ANIM_INFO_H void make_info_window();
/*
void make_info_window(Frame parent_frame, int window_list_index)
  makes sun element information window
  uses global window_list[window_list_index].name for the window title
  sets global window_list[window_list_index].frame
*/ endif ANIM_INFO_H
```

```c
/**********************************************************************/
/* anim_link.c by Marc Olano for the Eastman Kodak Company            */
/* all rights reserved by the Eastman Kodak Company                   */
/*                                                                    */
/* animated injection molding simulation display program              */
/* runs on SUN workstation and AT&T 900 series Pixel Machine          */
/* developed under Sun OS release 4.0.3                               */
/*   AT&T Pixel Machines PIClib release 1.2                           */
/*                                                                    */
/* definitions and prototypes for anim_link.c                         */
/**********************************************************************/ ifndef ANIM_LINK_H
define ANIM_LINK_H void make_pixel_connection();
/*
void make_pixel_connection()
  creates connection socket
  puts socket number into environment (GLY_LINK) for pixel machine program
    and forks drawgly program
  saves socket file descriptor and pixel program process id in global "pixel"
*/ void kill_pixel_program();
/*
void kill_pixel_program()
  kills pixel machine program and closes communications socket
  uses global variable "pixel" to get socket and process id
*/ endif ANIM_LINK_H
```

```
/*********************************************************************/
/* anim_navigator.h by Marc Olano for the Eastman Kodak Company      */
/* all rights reserved by the Eastman Kodak Company                  */
/*                                                                   */
/* animated injection molding simulation display program             */
/* runs on SUN workstation and AT&T 900 series Pixel Machine         */
/* developed under Sun OS release 4.0.3                              */
/*   AT&T Pixel Machines PIClib release 1.2                          */
/*                                                                   */
/* definitions and prototypes for anim_navigator.c                   */
/*********************************************************************/ ifndef ANIM_NAVIGATOR_H
define ANIM_NAVIGATOR_H include <suntool/sunview.h>
include <suntool/panel.h>

Frame make_navigator_subwindow();
/*
Frame make_navigator_subwindow(Frame parent_frame, int window_list_index)
   create sub-window for navigator toggle menu
   labeled by name field in global window_list[]
   WIN_CLIENT_DATA is set to the window_list_index
   FRAME_DONE_PROC is set to subwindow_done
*/

Panel_item make_done_button();
/*
Panel_item make_done_button(Frame frame, Panel panel)
   create a "done" button in the bottom right corner of a subwindow
*/ void do_navigator_window();
/*
void do_navigator_window()
   create and run navigator window -- creates all other panels
   uses global variable window_list[] to get names of windows and functions to
     make them
*/ endif ANIM_NAVIGATOR_H
```

```
/*****************************************************************/
/* anim_pix.h by Marc Olano for the Eastman Kodak Company         */
/* all rights reserved by the Eastman Kodak Company               */
/*                                                                */
/* defines shared by gly_animate and gly_pixel                    */
/*****************************************************************/ ifndef ANIM_PIX_H
define ANIM_PIX_H define MAX(a,b)         (((a)>(b))?(a):(b))
define MIN(a,b)         (((a)<(b))?(a):(b))
#define BOUND(a,bot,top)        (((a)<(bot))?(bot):((a)>(top))?(top):(a))

typedef struct {              /* 3-D point structure */
   float x, y, z;
} Point;

/* integer codes sent over the gly_animate/gly_pixel communication */
/*    socket                                                       */
/* typically one of these codes is followed by appropriate data    */
enum communication_codes {
/* code name              data           comment /* bi-directional */
Quit,                   /* none          Control - kill program */

/* from pixel program to sun program */
Frame_Done,             /* none          Control - signal of end of drawing */
Element_Picked,         /* int, float, Point, char[]
                                        Element Information window - element
                                             number selected followed by
                                             element half-gap thickness,
                                             then element center, then
                                             raw frame data for element */

/* from sun program to pixel program */
Init_Start,             /* none          Control - initializing, read following
                                             commands, but don't do them */
Init_End,               /* none          - done initializing, set everything
                                             based on the current values
                                             start drawing a frame */
Frame_Start,            /* none          Control - signal to start drawing */
Frame_Name,             /* int, char []  Time window - next frame's file name
                                             int passed is string length
                                             giving number of charaters
                                             passed -- '\0' is not passed */
Look_At_X,              /* float         View window - looking toward here */
Look_At_Y,              /* float            - */
Look_At_Z,              /* float            - */
Eye_Distance,           /* float         - position of eye relative to */
Eye_Tilt,               /* float         -   above point in polar coords */
Eye_Pan,                /* float         -   distance, phi, and theta */
Eye_Twist,              /* float         - view rot. around line of sight */
Glyph_Length,           /* float         Glyph Parameters window - glyph */
Glyph_Width,            /* float         -   scaling */
Glyph_Height,           /* float         -   */
Velocity_Range,         /* byte, byte    Display window - velocity range */
Temperature_Range,      /* byte, byte    - temperature range */
Empty_Mold,             /* boolean       - empty mold elements visible */
Mold_Wall,              /* boolean       - mold wall visible */
```

```
    Velocity_Min,        /* float      Initialization - pressure color bar */
    Velocity_Max,        /* float       -   range */
    Temperature_Min,     /* float       - temperature color bar range */
    Temperature_Max,     /* float       - */
    Start_Picking,       /* none       Element Information window - setup for
                                           element picking - cursor on */
    Move_Picking,        /* float, float  - move cursor - floats (0-1) are
                                           position in window */
    Select_Picking,      /* float, float  - pick the element the cursor's on
                                           floats (0-1) are final mouse
                                           position */
    Done_Picking,        /* none        - turn off element picking/cursor */
    NUM_PIX           /* total number of communication codes */
};

/* number of finite difference segments */
#define NUMSEGS         9

/* frame information array of element info in Geom_Info order */
/*   element information consists of: */
/*      1 byte = angle of plastic flow 0-256 = 0 degrees - 360 degrees */
/*      1 byte = pressure of element */
/*      num_segs bytes = temperature of finite difference segments */
/*      num_segs bytes = velocity of finite difference segments */
extern unsigned char *frame_data;

/* positions of data for each element relative to it's start */
#define ELEMENT_ANGLE         0
#define ELEMENT_PRES          1
#define ELEMENT_TEMP          2
#define ELEMENT_VELOCITY      (2 + NUMSEGS)
#define ELEMENT_SIZE          (2 + 2*NUMSEGS)

#endif ANIM_PIX_H
```

```
/*********************************************************************/
/* anim_pressure.c by Marc Olano for the Eastman Kodak Company       */
/* all rights reserved by the Eastman Kodak Company                  */
/*                                                                   */
/* animated injection molding simulation display program             */
/* runs on SUN workstation and AT&T 900 series Pixel Machine         */
/* developed under Sun OS release 4.0.3                              */
/*   AT&T Pixel Machines PIClib release 1.2                          */
/*                                                                   */
/* definitions and prototypes for anim_pressure.c                    */
/*********************************************************************/ ifndef ANIM_PRESSURE_H
define ANIM_PRESSURE_H void make_pressure_frame();
/*
void make_pressure_frame(Frame parent_frame, int frame_list_index)
   makes sun pressure trace window
      shows pressure at gate vs time
      shows time in animation on graph -- can select directly
   uses global frame_list[frame_list_index].name for the window title
   sets global frame_list[frame_list_index].frame
*/ endif ANIM_PRESSURE_H
```

```c
/****************************************************************/
/* anim_save.h by Marc Olano for the Eastman Kodak Company      */
/* all rights reserved by the Eastman Kodak Company             */
/*                                                              */
/* animated injection molding simulation display program        */
/* runs on SUN workstation and AT&T 900 series Pixel Machine    */
/* developed under Sun OS release 4.0.3                         */
/*   AT&T Pixel Machines PIClib release 1.2                     */
/*                                                              */
/* definitions and prototypes for anim_save.c                   */
/****************************************************************/ ifndef ANIM_SAVE_H
define ANIM_SAVE_H void make_save_window();
/*
void make_save_window(Frame parent_frame, int window_list_index)
  makes sun save settings window
     save window controls
        load file
        save current settings
  uses global window_list[window_list_index].name for the window title
  sets global window_list[window_list_index].frame
*/ void read_startup();
/*
void read_startup()
  read "startup.set" file
*/ void save_startup();
/*
void save_startup()
  write "startup.set" file
*/ endif ANIM_SAVE_H
```

```
/*******************************************************************/
/* anim_save.h by Marc Olano for the Eastman Kodak Company         */
/* all rights reserved by the Eastman Kodak Company                */
/*                                                                 */
/* animated injection molding simulation display program           */
/* runs on SUN workstation and AT&T 900 series Pixel Machine       */
/* developed under Sun OS release 4.0.3                            */
/*   AT&T Pixel Machines PIClib release 1.2                        */
/*                                                                 */
/* definitions and prototypes for anim_save.c                      */
/*******************************************************************/ ifndef ANIM_SAVE_H
define ANIM_SAVE_H void make_save_window();
/*
void make_save_window(Frame parent_frame, int window_list_index)
  makes sun save settings window
    save window controls
      load file
      save current settings
  uses global window_list[window_list_index].name for the window title
  sets global window_list[window_list_index].frame
*/ void read_startup();
/*
void read_startup()
  read "startup.set" file
*/ void save_startup();
/*
void save_startup()
  write "startup.set" file
*/ endif ANIM_SAVE_H
```

```
/*******************************************************************/
/* anim_save.h by Marc Olano for the Eastman Kodak Company          */
/* all rights reserved by the Eastman Kodak Company                 */
/*                                                                  */
/* animated injection molding simulation display program            */
/* runs on SUN workstation and AT&T 900 series Pixel Machine        */
/* developed under Sun OS release 4.0.3                             */
/*    AT&T Pixel Machines PIClib release 1.2                        */
/*                                                                  */
/* definitions and prototypes for anim_save.c                       */
/*******************************************************************/ ifndef ANIM_SAVE_H
define ANIM_SAVE_H void make_save_window();
/*
void make_save_window(Frame parent_frame, int window_list_index)
  makes sun save settings window
    save window controls
      load file
      save current settings
  uses global window_list[window_list_index].name for the window title
  sets global window_list[window_list_index].frame
*/ void read_startup();
/*
void read_startup()
  read "startup.set" file
*/ void save_startup();
/*
void save_startup()
  write "startup.set" file
*/ endif ANIM_SAVE_H
```

```c
/****************************************************************/
/* anim_std_save.h by Marc Olano for the Eastman Kodak Company  */
/* all rights reserved by the Eastman Kodak Company             */
/*                                                              */
/* animated injection molding simulation display program        */
/* runs on SUN workstation and AT&T 900 series Pixel Machine    */
/* developed under Sun OS release 4.0.3                         */
/*   AT&T Pixel Machines PIClib release 1.2                     */
/*                                                              */
/* definitions and prototypes for anim_std_save.c               */
/****************************************************************/ ifndef ANIM_STD_SAVE_H
define ANIM_STD_SAVE_H void add_range_slider_setting();
/*
void add_range_slider_setting(char *name, Range_Slider rs)
  setup standard setting functions for range sliders
  setup lines in the form "<name> <low>, <high>"
  range slider notify function is called when new values are read
*/ void add_full_slider_setting();
/*
void add_full_slider_setting(char *name, Full_Slider fs)
  setup standard setting functions for full sliders
  setup lines in the form "<name> <low>, <val>, <high>"
  full slider notify function is called when new values are read
*/ endif ANIM_STD_SAVE_H
```

```
/*******************************************************************/
/* anim_time.c by Marc Olano for the Eastman Kodak Company         */
/* all rights reserved by the Eastman Kodak Company                */
/*                                                                 */
/* animated injection molding simulation display program           */
/* runs on SUN workstation and AT&T 900 series Pixel Machine       */
/* developed under Sun OS release 4.0.3                            */
/*    AT&T Pixel Machines PIClib release 1.2                       */
/*                                                                 */
/* definitions and prototypes for anim_time.c                      */
/*******************************************************************/ ifndef ANIM_TIME_H
define ANIM_TIME_H int animation_pause();
/*
int animation_pause(int mode)
  momentarily stop any animation
  if mode = 1, stop ; if mode = 0, continue
  uses global variable play_controls -- sunview item for play buttons
*/ void make_time_window();
/*
void make_time_window(Frame parent_frame, int window_list_index)
  makes sun animation time control window
    time window controls running of animation with
        first and last buttons to jump to the ends of the simulation
        play and reverse buttons to view a continuous animation
        next and back buttons to step a single frame at a time
        a stop button to stop play or reverse
        a frame rate text entry item to control the speed
        a simulation time text entry item to show the point in the animation
          and allow jumping to instants in the flow
  uses global window_list[window_list_index].name for the window title
  sets global window_list[window_list_index].frame
*/ endif ANIM_TIME_H
```

```
/*********************************************************************/
/* anim_trace.h by Marc Olano for the Eastman Kodak Company          */
/* all rights reserved by the Eastman Kodak Company                  */
/*                                                                    */
/* animated injection molding simulation display program             */
/* runs on SUN workstation and AT&T 900 series Pixel Machine         */
/* developed under Sun OS release 4.0.3                              */
/*    AT&T Pixel Machines PIClib release 1.2                         */
/*                                                                    */
/* definitions and prototypes for anim_trace.c                       */
/*********************************************************************/ ifndef ANIM_TRACE_H
define ANIM_TRACE_H void make_trace_window();
/*
void make_trace_window(Frame parent_frame, int window_list_index)
  makes sun traces control window
  traces window gives a toggle choice of simple line graph traces to display
  uses global window_list[window_list_index].name for the window title
  sets global window_list[window_list_index].frame
*/ endif ANIM_TRACE_H
```

```
/*********************************************************************/
/* anim_view.h by Marc Olano for the Eastman Kodak Company           */
/* all rights reserved by the Eastman Kodak Company                  */
/*                                                                   */
/* animated injection molding simulation display program             */
/* runs on SUN workstation and AT&T 900 series Pixel Machine         */
/* developed under Sun OS release 4.0.3                              */
/*    AT&T Pixel Machines PIClib release 1.2                         */
/*                                                                   */
/* definitions and prototypes for anim_view.c                        */
/*********************************************************************/ ifndef ANIM_VIEW_H
define ANIM_VIEW_H void make_view_window();
/*
void make_view_window(Frame parent_frame, int window_list_index)
  makes sun view control window
    view window controls perspective view with
        look-at-point in rectangular model coordinates -- look toward this
        eye position relative to point in polar coordinates
            distance, tilt (phi), pan (theta)
        eye orientation about line of sight (twist)
  uses global window_list[window_list_index].name for the window title
  sets global window_list[window_list_index].frame
*/ endif ANIM_VIEW_H
```

```
/* Format_version=1, Width=64, Height=64, Depth=1, Valid_bits_per_item=16
*/
        0xFFFF,0xFFFF,0xFFFF,0xFFFF,0x8000,0x0000,0x0000,0x0001,
        0x8000,0x0000,0x0000,0x0001,0x8000,0x0000,0x0000,0x0001,
        0x8000,0x0000,0x0000,0x0001,0x8000,0x0000,0x0000,0x0001,
        0x8000,0x0000,0x0000,0x0001,0x8000,0x0000,0x0000,0x0001,
        0x8000,0x0000,0x0000,0x0001,0x8000,0x0000,0x0000,0x0001,
        0x8000,0x0000,0x0000,0x0001,0x8000,0x0000,0x0000,0x0001,
        0x8000,0x0000,0x0000,0x0001,0x8000,0x0000,0x0000,0x0001,
        0x8000,0x0000,0x0000,0x0001,0x8000,0x00FF,0xFF00,0x0001,
        0x8000,0x00FF,0xFF00,0x0001,0x8000,0x0000,0x0000,0x0001,
        0x8000,0x0000,0x0000,0x0001,0x8000,0x0000,0x0000,0x0001,
        0x8000,0x0000,0x0000,0x0001,0x8000,0x0000,0x0000,0x0001,
        0x8000,0x0000,0x0000,0x0001,0x8000,0x0000,0x0000,0x0001,
        0x8000,0x0000,0x0000,0x0001,0x8000,0x0000,0x0000,0x0001,
        0x8000,0x0000,0x0000,0x0001,0x8000,0x0000,0x0000,0x0001,
        0x8000,0x0000,0x0000,0x0001,0xFFFF,0xFFFF,0xFFFF,0xFFFF,
        0x8000,0x0000,0x0000,0x0001,0x8000,0x0000,0x0000,0x0001,
        0x8000,0x7800,0x0040,0x0001,0x8000,0x4400,0x0040,0x0001,
        0x8000,0x4400,0x0040,0x0001,0x8000,0x4438,0x3C44,0x0001,
        0x8000,0x7844,0x4248,0x0001,0x8000,0x4404,0x4050,0x0001,
        0x8000,0x423C,0x4070,0x0001,0x8000,0x4244,0x4048,0x0001,
        0x8000,0x4244,0x4244,0x0001,0x8000,0x7C3A,0x3C42,0x0001,
        0x8000,0x0000,0x0000,0x0001,0x8000,0x0000,0x0000,0x0001,
        0xFFFF,0xFFFF,0xFFFF,0xFFFF,0x0000,0x0000,0x0000,0x0000,
        0x0000,0x0000,0x0000,0x0000,0x0000,0x0000,0x0000,0x0000,
        0x0000,0x0000,0x0000,0x0000,0x0000,0x0000,0x0000,0x0000,
        0x0000,0x0000,0x0000,0x0000,0x0000,0x0000,0x0000,0x0000,
        0x0000,0x0000,0x0000,0x0000,0x0000,0x0000,0x0000,0x0000,
        0x0000,0x0000,0x0000,0x0000,0x0000,0x0000,0x0000,0x0000,
        0x0000,0x0000,0x0000,0x0000,0x0000,0x0000,0x0000,0x0000,
        0x0000,0x0000,0x0000,0x0000,0x0000,0x0000,0x0000,0x0000,
        0x0000,0x0000,0x0000,0x0000,0x0000,0x0000,0x0000,0x0000
```

```
/****************************************************************/
/* data_functions.h by Marc Olano                               */
/*                                                              */
/* function prototypes for data_functions.c                     */
/* sunview button notify functions for glyph data directory operations */
/****************************************************************/ extern void gly_data();
/*
  void gly_data(button)
  Panel_item button;
  runs the gly_data program when a glyph data directory button is pressed
  PANEL_CLIENT_DATA of the button must be the directory name
*/ extern void gly_simulate();
/*
  void gly_simulate(button)
  Panel_item button;
  runs the CIMP simulation program on a glyph data directory
  PANEL_CLIENT_DATA of the button must be the directory name
*/ extern void gly_animate();
/*
  void gly_animate(button)
  Panel_item button;
  runs the CIMP simulation program on a glyph data directory
  PANEL_CLIENT_DATA of the button must be the directory name
*/ extern void gly_compress();
/*
  void gly_compress(button)
  Panel_item button;
  runs the unix compress utility on all the files in a glyph data directory
  PANEL_CLIENT_DATA of the button must be the directory name
*/ extern void gly_uncompress();
/*
  void gly_uncompress(button)
  Panel_item button;
  runs the unix uncompress utility on all the files in a glyph data directory
  PANEL_CLIENT_DATA of the button must be the directory name
*/
```

```
/* Format_version=1, Width=16, Height=16, Depth=1, Valid_bits_per_item=16
 */
        0xFFFF,0xFFFF,0x7FFE,0x7FFE,0x3FFC,0x3FFC,0x1FF8,0x1FF8,
        0x0FF0,0x0FF0,0x07E0,0x07E0,0x03C0,0x03C0,0x0180,0x0180
```

```
/*******************************************************************/
/* env.h by Marc Olano for the Eastman Kodak Company               */
/* all rights reserved by the Eastman Kodak Company                */
/*                                                                 */
/* environment variable names and defaults                         */
/*******************************************************************/ ifndef ENV_H
define ENV_H define ENV_DATA_DIR            "GLY_DATA"
define DATA_DIR_DEFAULT        "."

#define ENV_PROGRAM_DIR         "GLY_DIR"
#define PROGRAM_DIR_DEFAULT     "."

#define ENV_SCREEN_SIZE         "GLY_SCREEN"
define SCREEN_SIZE_DEFAULT     "0,1,0,1"        /* xmin, xmax, ymin, ymax */ define ENV_TRACE_FILE          "GLY_TRACE"
define TRACE_FILE_DEFAULT      "trace"

#define ENV_SCALE_FILE          "GLY_SCALE"
#define SCALE_FILE_DEFAULT      "scale"

#define ENV_GEOMETRY_FILE       "GLY_GEOMETRY"
#define GEOMETRY_FILE_DEFAULT   "geometry"

#define ENV_FRAME_BASE          "GLY_FRAME_BASE"
#define FRAME_BASE_DEFAULT      "frame"

#define ENV_PRES_COLORS         "GLY_PRES_COLORS"
#define PRES_COLORS_DEFAULT     "data/pressure.bin"

#define ENV_TEMP_COLORS         "GLY_TEMP_COLORS"
#define TEMP_COLORS_DEFAULT     "data/temperature.bin"

#define ENV_INTERNAL_LINK       "GLY_LINK"

#endif ENV_H
```

```
/* Format_version=1, Width=16, Height=16, Depth=1, Valid_bits_per_item=16
 */
        0xFFFF,0x7FFE,0x3FFC,0x1FF8,0x0FF0,0x07E0,0x03C0,0x0180,
        0xFFFF,0x7FFE,0x3FFC,0x1FF8,0x0FF0,0x07E0,0x03C0,0x0180
```

```
/* Format_version=1, Width=16, Height=16, Depth=1, Valid_bits_per_item=16
 */
        0x0101,0x0303,0x0707,0x0F0F,0x1F1F,0x3F3F,0x7F7F,0xFFFF,
        0xFFFF,0x7F7F,0x3F3F,0x1F1F,0x0F0F,0x0707,0x0303,0x0101
```

```
/* Format_version=1, Width=16, Height=16, Depth=1, Valid_bits_per_item=16
 */
        0x0101,0x0303,0x0707,0x0F0F,0x1F1F,0x3F3F,0x7F7F,0xFFFF,
        0xFFFF,0x7F7F,0x3F3F,0x1F1F,0x0F0F,0x0707,0x0303,0x0101
```

```
/* Format_version=1, Width=16, Height=16, Depth=1, Valid_bits_per_item=16
 */
    0x8080,0xC0C0,0xE0E0,0xF0F0,0xF8F8,0xFCFC,0xFEFE,0xFFFF,
    0xFFFF,0xFEFE,0xFCFC,0xF8F8,0xF0F0,0xE0E0,0xC0C0,0x8080
```

```
/* Format_version=1, Width=16, Height=16, Depth=1, Valid_bits_per_item=16
 */
        0x0180,0x03C0,0x07E0,0x0FF0,0x1FF8,0x3FFC,0x7FFE,0xFFFF,
        0x0180,0x03C0,0x07E0,0x0FF0,0x1FF8,0x3FFC,0x7FFE,0xFFFF
```

```
/* Format_version=1, Width=64, Height=64, Depth=1, Valid_bits_per_item=16
*/
    0xFFFF,0xFFFF,0xFFFF,0xFFFF,0x8000,0x0000,0x0000,0x0001,
    0x8000,0x0000,0x0000,0x0001,0x8000,0x0000,0x0000,0x0001,
    0x8000,0x0000,0x0000,0x0001,0x8000,0x0000,0x0000,0x0001,
    0x8000,0x0000,0x0000,0x0001,0x8000,0x0000,0x0000,0x0001,
    0x8000,0x00C0,0x0300,0x0001,0x8000,0x00C0,0x0F00,0x0001,
    0x8000,0x00C0,0x3F00,0x0001,0x8000,0x00C0,0xFF00,0x0001,
    0x8000,0x00C3,0xFF00,0x0001,0x8000,0x00CF,0xFF00,0x0001,
    0x8000,0x00FF,0xFF00,0x0001,0x8000,0x00FF,0xFF00,0x0001,
    0x8000,0x00FF,0xFF00,0x0001,0x8000,0x00FF,0xFF00,0x0001,
    0x8000,0x00CF,0xFF00,0x0001,0x8000,0x00C3,0xFF00,0x0001,
    0x8000,0x00C0,0xFF00,0x0001,0x8000,0x00C0,0x3F00,0x0001,
    0x8000,0x00C0,0x0F00,0x0001,0x8000,0x00C0,0x0300,0x0001,
    0x8000,0x0000,0x0000,0x0001,0x8000,0x0000,0x0000,0x0001,
    0x8000,0x0000,0x0000,0x0001,0x8000,0x0000,0x0000,0x0001,
    0x8000,0x0000,0x0000,0x0001,0x8000,0x0000,0x0000,0x0001,
    0x8000,0x0000,0x0000,0x0001,0xFFFF,0xFFFF,0xFFFF,0xFFFF,
    0x8000,0x0000,0x0000,0x0001,0x8000,0x0000,0x0000,0x0001,
    0x8001,0xF820,0x0000,0x4001,0x8001,0x0020,0x0000,0x4001,
    0x8001,0x0000,0x0000,0x4001,0x8001,0x00E1,0x70F1,0xF001,
    0x8001,0xF021,0x8908,0x4001,0x8001,0x0021,0x0100,0x4001,
    0x8001,0x0021,0x00F0,0x4001,0x8001,0x0021,0x0008,0x4001,
    0x8001,0x0021,0x0108,0x4801,0x8001,0x0021,0x00F0,0x3001,
    0x8000,0x0000,0x0000,0x0001,0x8000,0x0000,0x0000,0x0001,
    0xFFFF,0xFFFF,0xFFFF,0xFFFF,0x0000,0x0000,0x0000,0x0000,
    0x0000,0x0000,0x0000,0x0000,0x0000,0x0000,0x0000,0x0000,
    0x0000,0x0000,0x0000,0x0000,0x0000,0x0000,0x0000,0x0000,
    0x0000,0x0000,0x0000,0x0000,0x0000,0x0000,0x0000,0x0000,
    0x0000,0x0000,0x0000,0x0000,0x0000,0x0000,0x0000,0x0000,
    0x0000,0x0000,0x0000,0x0000,0x0000,0x0000,0x0000,0x0000,
    0x0000,0x0000,0x0000,0x0000,0x0000,0x0000,0x0000,0x0000,
    0x0000,0x0000,0x0000,0x0000,0x0000,0x0000,0x0000,0x0000,
    0x0000,0x0000,0x0000,0x0000,0x0000,0x0000,0x0000,0x0000
```

```
/* Format_version=1, Width=64, Height=64, Depth=1, Valid_bits_per_item=16
*/
        0xFFFF,0xFFFF,0xFFFF,0xFFFF,0x8000,0x0000,0x0000,0x0001,
        0x8000,0x0000,0x0000,0x0001,0x8000,0x0000,0x0000,0x0001,
        0x8000,0x0000,0x0000,0x0001,0x8000,0x0000,0x0000,0x0001,
        0x8000,0x0000,0x0000,0x0001,0x8000,0x0000,0x0000,0x0001,
        0x8000,0x0180,0x0000,0x0001,0x8000,0x0678,0x0000,0x0001,
        0x8003,0xEFFE,0x0000,0x0001,0x8001,0xC802,0x0000,0x0001,
        0x8002,0xA803,0x0000,0x0001,0x8000,0x8FFF,0xF000,0x0001,
        0x8000,0x8800,0x1000,0x0001,0x8000,0x8800,0x1000,0x0001,
        0x8000,0x8800,0x1C00,0x0001,0x8000,0x8FFF,0xFF80,0x0001,
        0x8000,0x8800,0x0080,0x0001,0x8000,0x8800,0x0080,0x0001,
        0x8000,0x8800,0x0080,0x0001,0x8000,0x8800,0x0080,0x0001,
        0x8000,0x8FFF,0xFF80,0x0001,0x8000,0x8800,0x1000,0x0001,
        0x8000,0x8800,0x1000,0x0001,0x8000,0x8800,0x1000,0x0001,
        0x8000,0x8FFF,0xF000,0x0001,0x8002,0xA802,0x0000,0x0001,
        0x8001,0xC802,0x0000,0x0001,0x8003,0xEFFE,0x0000,0x0001,
        0x8000,0x0000,0x0000,0x0001,0xFFFF,0xFFFF,0xFFFF,0xFFFF,
        0x8000,0x0000,0x0000,0x0001,0x8000,0x0000,0x0000,0x0001,
        0x8042,0x0008,0x0040,0x1001,0x8042,0x0008,0x0040,0x1001,
        0x8042,0x0000,0x0040,0x1001,0x8042,0x3C38,0x3A5C,0x7C01,
        0x807E,0x4208,0x4662,0x1001,0x8042,0x4208,0x4242,0x1001,
        0x8042,0x7E08,0x4242,0x1001,0x8042,0x4008,0x4242,0x1001,
        0x8042,0x4208,0x4642,0x1201,0x8042,0x3C08,0x3A42,0x0C01,
        0x8000,0x0000,0x0200,0x0001,0x8000,0x0000,0x4200,0x0001,
        0xFFFF,0xFFFF,0x3CFF,0xFFFF,0x0000,0x0000,0x0000,0x0000,
        0x0000,0x0000,0x0000,0x0000,0x0000,0x0000,0x0000,0x0000,
        0x0000,0x0000,0x0000,0x0000,0x0000,0x0000,0x0000,0x0000,
        0x0000,0x0000,0x0000,0x0000,0x0000,0x0000,0x0000,0x0000,
        0x0000,0x0000,0x0000,0x0000,0x0000,0x0000,0x0000,0x0000,
        0x0000,0x0000,0x0000,0x0000,0x0000,0x0000,0x0000,0x0000,
        0x0000,0x0000,0x0000,0x0000,0x0000,0x0000,0x0000,0x0000,
        0x0000,0x0000,0x0000,0x0000,0x0000,0x0000,0x0000,0x0000,
        0x0000,0x0000,0x0000,0x0000,0x0000,0x0000,0x0000,0x0000
```

```c
/****************************************************************/
/* item_types.h by Marc Olano for the Eastman Kodak Company     */
/* all rights reserved by the Eastman Kodak Company             */
/*                                                              */
/* data types used by sun item types in text_entry_item.c,      */
/*   range_slider_item.c and full_slider_item.c                 */
/*                                                              */
/* Note: the following suffixes are used for the naming of struct fields*/
/*       pi - sunview Panel_item                                */
/*       te - Text_Entry                                        */
/*       rs - Range_Slider                                      */
/*       fs - Full_Slider                                       */
/****************************************************************/ ifndef ITEM_TYPES_H
define ITEM_TYPES_H

/* includes in case they have not been done yet */
#include <suntool/sunview.h>
include <suntool/panel.h>

/*--------------------------------------------------------------*/
/* general defines                                              */
/*--------------------------------------------------------------*/

/* for calling users notify procedure                           */
/* works with Text_Entry, Range_Slider, and Full_Slider types   */
/* assumes:     the parameter it's been given is a pointer to a */
/*                      structure                               */
/*              this structure has a field called 'notify' that is a */
/*                      pointer to a function of type void      */
/*                      (void (*notify)())                      */
/*              if non-NULL, the notify field will contain a function */
/*                      that expects to be passed a single argument */
/*                      that is the original parameter to this macro */
/*              if NULL, no function is called                  */
#define Notify(t)       ((t)->notify ? (*(t)->notify)(t) : (void) 0)

/* -- 50% grey texture */
/* used by full_slider_item.c and range_slider_item.c */
/* definition resides in text_entry_item.c */
extern struct pixrect grey50;

/*--------------------------------------------------------------*/
/* text entry items                                             */
/*--------------------------------------------------------------*/ typedef struct {
  Panel_item pi;                /* sun Panel_item */
  char *val;                    /* value of text item */
  int length;                   /* max number of characters */
  int active;                   /* true while being typed in */
  void (*notify)();             /* function to call when value changes */
  void *client_data;            /* replacement for PANEL_CLIENT_DATA */
} *Text_Entry;

/* size of text entry item */
/* based on size of screen.r.13 font */
#define text_entry_width(te)    (8 * (te)->length)
#define text_entry_height(te)   16
```

```c
extern Text_Entry create_text_entry();
/*
Text_Entry create_text_entry(Panel panel, int x, int y,
        void (*notify)(), int length);
   creates length-character-long text entry item at location x,y in given panel
*/ extern void set_text_entry();
/*
void set_text_entry(Text_Entry te);
   set panel item to match current settings of Text_Entry structure
*/ extern int text_panel_event_proc();
/*
int text_panel_event_proc(Panel_item pi, Event *event);
   default event proc for panels containing text entry items
   put in place by PANEL_WITH_TEXT -- don't need to call seperately
*/

/* item type for hiding cursor in a panel with text entry items in it */
/* MUST be the first item created in the panel */ define PANEL_CURSOR_HIDING_PLACE      PANEL_TEXT,      \
   PANEL_LABEL_X, 0,                                    \
   PANEL_LABEL_Y, ATTR_ROW(-2),                         \
   PANEL_VALUE_DISPLAY_LENGTH, 1,                       \
   PANEL_NOTIFY_LEVEL, PANEL_NONE /* use instead of PANEL as window type for panels with text entry items */ define PANEL_WITH_TEXT          PANEL,                 \
   WIN_FONT, pf_open("/usr/lib/fonts/fixedwidthfonts/screen.r.13"), \
   PANEL_EVENT_PROC, text_panel_event_proc /*---------------------------------------------------------------------------*/
/* range slider items                                                        */
/*---------------------------------------------------------------------------*/ typedef struct {
   Panel_item slider_pi;        /* sunview item for slider */
   Text_Entry low_te, high_te;  /* text entry items for ends of range */
   char *format;                /* printf format for text entry numbers */
   float bottom, top;           /* absolute limits to range */
   float scale;                 /* scaling factor from coordinate to value */
   float low, high;             /* values of two ends of slider */
   int active;                  /* which is moving, 1=low, 2=high */
   void (*notify)();            /* called when low or high change */
   void *client_data;           /* replacement for PANEL_CLIENT_DATA */
} *Range_Slider;

/* size of range slider item */
#define range_slider_width(rs)   (256 + 20 + 2*text_entry_width((rs)->low_te))
#define range_slider_height(rs)  (text_entry_height((rs)->low_te))
```

```
extern void set_range_slider();
/*
void set_range_slider(Range_Slider rs);
    draw range slider for current values, and update low and high text values
*/ extern Range_Slider create_range_slider();
/*
Range_Slider create_range_slider(Panel panel, int x, int y,
        void (*notify_proc)(), char *format, int length);
    create a range slider item at position x,y in a panel
    client_data fields for text items created are set to point to the
        Range_Slider data created
    notify_proc is called whenever either the low or high value changes
    format is the printf format to use for numbers, and length is the maximum
        number of characters a number will be
    returns Range_Slider created
*/

/*--------------------------------------------------------------------*/
/* full slider items                                                  */
/*--------------------------------------------------------------------*/

/* additional data (PANEL_CLIENT_DATA) for full sliders */
typedef struct {
    Panel_item slider_pi;        /* sunview item for slider */
    Panel_item down_pi, up_pi;   /* sunview items for slider-end arrows */
    Text_Entry val_te;           /* text entry item for value */
    Text_Entry low_te, high_te;  /* text entry items for slider range */
    char *format;                /* printf format for numbers */
    float val, low, high;        /* slider value and range */
    void (*notify)();            /* called when slider value changes */
    void *client_data;           /* replacement for PANEL_CLIENT_DATA */
} *Full_Slider;

/* size of range slider item */
#define full_slider_width(fs)    (256 + 10 + text_entry_width((rs)->val_te))
#define full_slider_height(fs)   (5 + 2*text_entry_height((rs)->val_te))

extern void set_full_slider();
/*
void set_full_slider(Full_Slider fs);
    draw 'full' slider for current values, and update low and high text values
*/ extern Full_Slider create_full_slider();
/*
Full_Slider create_full_slider(Panel panel, int x, int y,
        void (*notify_proc)(), char *format, int length);
    create a full slider item at position x,y in a panel
    client_data fields for text items created are set to point to the
        Full_Slider data created
    notify_proc is called whenever either the value, low or high value changes
    format is the printf format to use for numbers, and length is the maximum
        number of characters a number will be
    returns Full_Slider created
*/ endif ITEM_TYPES_H
```

```
/* Format_version=1, Width=64, Height=64, Depth=1, Valid_bits_per_item=16
 */
        0xFFFF,0xFFFF,0xFFFF,0xFFFF,0x8000,0x0000,0x0000,0x0001,
        0x8000,0x0000,0x0000,0x0001,0x8000,0x0000,0x0000,0x0001,
        0x8000,0x0000,0x0000,0x0001,0x8000,0x0000,0x0000,0x0001,
        0x8000,0x0000,0x0000,0x0001,0x8000,0x0000,0x0000,0x0001,
        0x8000,0x00C0,0x0300,0x0001,0x8000,0x00F0,0x0300,0x0001,
        0x8000,0x00FC,0x0300,0x0001,0x8000,0x00FF,0x0300,0x0001,
        0x8000,0x00FF,0xC300,0x0001,0x8000,0x00FF,0xF300,0x0001,
        0x8000,0x00FF,0xFF00,0x0001,0x8000,0x00FF,0xFF00,0x0001,
        0x8000,0x00FF,0xFF00,0x0001,0x8000,0x00FF,0xFF00,0x0001,
        0x8000,0x00FF,0xF300,0x0001,0x8000,0x00FF,0xC300,0x0001,
        0x8000,0x00FF,0x0300,0x0001,0x8000,0x00FC,0x0300,0x0001,
        0x8000,0x00F0,0x0300,0x0001,0x8000,0x00C0,0x0300,0x0001,
        0x8000,0x0000,0x0000,0x0001,0x8000,0x0000,0x0000,0x0001,
        0x8000,0x0000,0x0000,0x0001,0x8000,0x0000,0x0000,0x0001,
        0x8000,0x0000,0x0000,0x0001,0x8000,0x0000,0x0000,0x0001,
        0x8000,0x0000,0x0000,0x0001,0xFFFF,0xFFFF,0xFFFF,0xFFFF,
        0x8000,0x0000,0x0000,0x0001,0x8000,0x0000,0x0000,0x0001,
        0x8000,0x4000,0x0010,0x0001,0x8000,0x4000,0x0010,0x0001,
        0x8000,0x4000,0x0010,0x0001,0x8000,0x4038,0x3C7C,0x0001,
        0x8000,0x4044,0x4210,0x0001,0x8000,0x4004,0x4010,0x0001,
        0x8000,0x403C,0x3C10,0x0001,0x8000,0x4044,0x0210,0x0001,
        0x8000,0x4044,0x4212,0x0001,0x8000,0x7E3A,0x3C0C,0x0001,
        0x8000,0x0000,0x0000,0x0001,0x8000,0x0000,0x0000,0x0001,
        0xFFFF,0xFFFF,0xFFFF,0xFFFF,0x0000,0x0000,0x0000,0x0000,
        0x0000,0x0000,0x0000,0x0000,0x0000,0x0000,0x0000,0x0000,
        0x0000,0x0000,0x0000,0x0000,0x0000,0x0000,0x0000,0x0000,
        0x0000,0x0000,0x0000,0x0000,0x0000,0x0000,0x0000,0x0000,
        0x0000,0x0000,0x0000,0x0000,0x0000,0x0000,0x0000,0x0000,
        0x0000,0x0000,0x0000,0x0000,0x0000,0x0000,0x0000,0x0000,
        0x0000,0x0000,0x0000,0x0000,0x0000,0x0000,0x0000,0x0000,
        0x0000,0x0000,0x0000,0x0000,0x0000,0x0000,0x0000,0x0000,
        0x0000,0x0000,0x0000,0x0000,0x0000,0x0000,0x0000,0x0000
```

```
/* Format_version=1, Width=16, Height=16, Depth=1, Valid_bits_per_item=16
 */
     0x0003,0x000F,0x003F,0x00FF,0x03FF,0x0FFF,0x3FFF,0xFFFF,
     0xFFFF,0x3FFF,0x0FFF,0x03FF,0x00FF,0x003F,0x000F,0x0003
```

```
/* Format_version=1, Width=16, Height=16, Depth=1, Valid_bits_per_item=16
 */
        0x01FF,0x024D,0x049B,0x0935,0x126B,0x24D5,0x49AB,0x9355,
        0x92AB,0x4955,0x24AB,0x1255,0x092B,0x0495,0x024B,0x01FF
```

```
/* Format_version=1, Width=64, Height=64, Depth=1, Valid_bits_per_item=16
 */
    0xFFFF,0xFFFF,0xFFFF,0xFFFF,0x8000,0x0000,0x0000,0x0001,
    0x8000,0x0A00,0x0280,0x0001,0x8000,0x0C00,0x0180,0x0001,
    0x8000,0x0FFF,0xFF80,0x0001,0x8000,0x0C00,0x0180,0x0001,
    0x8000,0x0A00,0x0280,0x0001,0x8000,0x0000,0x0000,0x0001,
    0x8000,0x0180,0x0000,0x0001,0x8000,0x0678,0x0000,0x0001,
    0x8000,0x0FFE,0x0000,0x0001,0x8000,0x0802,0x0000,0x0001,
    0x8000,0x0803,0x0000,0x0001,0x8000,0x0FFF,0xF000,0x0001,
    0x8000,0x0800,0x1000,0x0001,0x8000,0x0800,0x1000,0x0001,
    0x8000,0x0800,0x1C00,0x0001,0x8000,0x0FFF,0xFF80,0x0001,
    0x8000,0x0800,0x0080,0x0001,0x8000,0x0800,0x0080,0x0001,
    0x8000,0x0800,0x0080,0x0001,0x8000,0x0800,0x0080,0x0001,
    0x8000,0x0FFF,0xFF80,0x0001,0x8000,0x0800,0x1000,0x0001,
    0x8000,0x0800,0x1000,0x0001,0x8000,0x0800,0x1000,0x0001,
    0x8000,0x0FFF,0xF000,0x0001,0x8000,0x0802,0x0000,0x0001,
    0x8000,0x0802,0x0000,0x0001,0x8000,0x0FFE,0x0000,0x0001,
    0x8000,0x0000,0x0000,0x0001,0xFFFF,0xFFFF,0xFFFF,0xFFFF,
    0x8000,0x0000,0x0000,0x0001,0x8000,0x0000,0x0000,0x0001,
    0x8040,0x0000,0x0010,0x4001,0x8040,0x0000,0x0010,0x4001,
    0x8040,0x0000,0x0010,0x4001,0x8040,0x3C5C,0x3A7C,0x5C01,
    0x8040,0x4262,0x4610,0x6201,0x8040,0x4242,0x4210,0x4201,
    0x8040,0x7E42,0x4210,0x4201,0x8040,0x4042,0x4210,0x4201,
    0x8040,0x4242,0x4612,0x4201,0x807E,0x3C42,0x3A0C,0x4201,
    0x8000,0x0000,0x0200,0x0001,0x8000,0x0000,0x4200,0x0001,
    0xFFFF,0xFFFF,0x3CFF,0xFFFF,0x0000,0x0000,0x0000,0x0000,
    0x0000,0x0000,0x0000,0x0000,0x0000,0x0000,0x0000,0x0000,
    0x0000,0x0000,0x0000,0x0000,0x0000,0x0000,0x0000,0x0000,
    0x0000,0x0000,0x0000,0x0000,0x0000,0x0000,0x0000,0x0000,
    0x0000,0x0000,0x0000,0x0000,0x0000,0x0000,0x0000,0x0000,
    0x0000,0x0000,0x0000,0x0000,0x0000,0x0000,0x0000,0x0000,
    0x0000,0x0000,0x0000,0x0000,0x0000,0x0000,0x0000,0x0000,
    0x0000,0x0000,0x0000,0x0000,0x0000,0x0000,0x0000,0x0000,
    0x0000,0x0000,0x0000,0x0000,0x0000,0x0000,0x0000,0x0000
```

```
/* Format_version=1, Width=64, Height=64, Depth=1, Valid_bits_per_item=16
 */
        0xFFFF,0xFFFF,0xFFFF,0xFFFF,0x8000,0x0000,0x0000,0x0001,
        0x8000,0x0000,0x0000,0x0001,0x8000,0x0000,0x0000,0x0001,
        0x8000,0x0000,0x0000,0x0001,0x8000,0x0000,0x0000,0x0001,
        0x8000,0x0000,0x0000,0x0001,0x8000,0x0000,0x0000,0x0001,
        0x8000,0x0001,0x8000,0x0001,0x8000,0x0001,0x8000,0x0001,
        0x8000,0x0001,0x8000,0x0001,0x8000,0x0001,0x8000,0x0001,
        0x8000,0x0001,0x8000,0x0001,0x8000,0x0001,0x8000,0x0001,
        0x8000,0x0001,0x8000,0x0001,0x8000,0x00FF,0xFF00,0x0001,
        0x8000,0x00FF,0xFF00,0x0001,0x8000,0x0001,0x8000,0x0001,
        0x8000,0x0001,0x8000,0x0001,0x8000,0x0001,0x8000,0x0001,
        0x8000,0x0001,0x8000,0x0001,0x8000,0x0001,0x8000,0x0001,
        0x8000,0x0001,0x8000,0x0001,0x8000,0x0001,0x8000,0x0001,
        0x8000,0x0000,0x0000,0x0001,0x8000,0x0000,0x0000,0x0001,
        0x8000,0x0000,0x0000,0x0001,0x8000,0x0000,0x0000,0x0001,
        0x8000,0x0000,0x0000,0x0001,0x8000,0x0000,0x0000,0x0001,
        0x8000,0x0000,0x0000,0x0001,0xFFFF,0xFFFF,0xFFFF,0xFFFF,
        0x8000,0x0000,0x0000,0x0001,0x8000,0x0000,0x0000,0x0001,
        0x8000,0x4200,0x0010,0x0001,0x8000,0x6200,0x0010,0x0001,
        0x8000,0x6200,0x0010,0x0001,0x8000,0x523C,0x427C,0x0001,
        0x8000,0x5242,0x4210,0x0001,0x8000,0x4A42,0x2410,0x0001,
        0x8000,0x4A7E,0x1810,0x0001,0x8000,0x4640,0x2410,0x0001,
        0x8000,0x4642,0x4212,0x0001,0x8000,0x423C,0x420C,0x0001,
        0x8000,0x0000,0x0000,0x0001,0x8000,0x0000,0x0000,0x0001,
        0xFFFF,0xFFFF,0xFFFF,0xFFFF,0x0000,0x0000,0x0000,0x0000,
        0x0000,0x0000,0x0000,0x0000,0x0000,0x0000,0x0000,0x0000,
        0x0000,0x0000,0x0000,0x0000,0x0000,0x0000,0x0000,0x0000,
        0x0000,0x0000,0x0000,0x0000,0x0000,0x0000,0x0000,0x0000,
        0x0000,0x0000,0x0000,0x0000,0x0000,0x0000,0x0000,0x0000,
        0x0000,0x0000,0x0000,0x0000,0x0000,0x0000,0x0000,0x0000,
        0x0000,0x0000,0x0000,0x0000,0x0000,0x0000,0x0000,0x0000,
        0x0000,0x0000,0x0000,0x0000,0x0000,0x0000,0x0000,0x0000,
        0x0000,0x0000,0x0000,0x0000,0x0000,0x0000,0x0000,0x0000,
        0x0000,0x0000,0x0000,0x0000,0x0000,0x0000,0x0000,0x0000
```

```
/* Format_version=1, Width=64, Height=64, Depth=1, Valid_bits_per_item=16
*/
    0xFFFF,0xFFFF,0xFFFF,0xFFFF,0xF000,0x1E00,0x0000,0x0001,
    0xBE00,0x2000,0x0000,0x0001,0xB1E0,0x7800,0x0000,0x0001,
    0x901C,0xE400,0x0000,0x0001,0x9003,0x1000,0x0000,0x0001,
    0x907D,0x1000,0x0000,0x0001,0x9086,0x0000,0x0000,0x0001,
    0x8904,0x0000,0x0000,0x0001,0x893C,0x0000,0x0000,0x0001,
    0x8A7C,0x0000,0x0000,0x0001,0x8578,0x0000,0x0000,0x0001,
    0x8530,0x0000,0x0000,0x0001,0x83E0,0x0010,0x0000,0x0001,
    0x8180,0x0060,0x0000,0x0001,0x8100,0x80FF,0xFE00,0x0001,
    0x8100,0x4060,0x01FF,0x0001,0x8104,0x0010,0x0000,0xE001,
    0x8218,0x0000,0x0000,0x1801,0x8420,0x0800,0x0000,0x0401,
    0x8018,0x0400,0x0000,0x1801,0x8007,0x0000,0x0000,0xE001,
    0x8000,0xFF80,0x01FF,0x0001,0x8000,0x007F,0xFE00,0x0001,
    0x8000,0x0000,0x0000,0x0001,0x8000,0x0000,0x0000,0x0001,
    0x8000,0x0008,0x0000,0x0001,0x8000,0x0004,0x0000,0x0001,
    0x8000,0x0000,0x0000,0x0001,0x8000,0x0000,0x0000,0x0001,
    0x8000,0x0000,0x8000,0x0001,0xFFFF,0xFFFF,0xFFFF,0xFFFF,
    0x8000,0x0000,0x0000,0x0001,0x8000,0x0000,0x0000,0x0001,
    0x8000,0x07C0,0x0000,0x0001,0x8000,0x0420,0x0000,0x0001,
    0x8000,0x0420,0x0000,0x0001,0x8000,0x0423,0x85C0,0x0001,
    0x8000,0x0424,0x4620,0x0001,0x8000,0x07C0,0x4420,0x0001,
    0x8000,0x0403,0xC420,0x0001,0x8000,0x0404,0x4420,0x0001,
    0x8000,0x0404,0x4420,0x0001,0x8000,0x0403,0xA420,0x0001,
    0x8000,0x0000,0x0000,0x0001,0x8000,0x0000,0x0000,0x0001,
    0xFFFF,0xFFFF,0xFFFF,0xFFFF,0x0000,0x0000,0x0000,0x0000,
    0x0000,0x0000,0x0000,0x0000,0x0000,0x0000,0x0000,0x0000,
    0x0000,0x0000,0x0000,0x0000,0x0000,0x0000,0x0000,0x0000,
    0x0000,0x0000,0x0000,0x0000,0x0000,0x0000,0x0000,0x0000,
    0x0000,0x0000,0x0000,0x0000,0x0000,0x0000,0x0000,0x0000,
    0x0000,0x0000,0x0000,0x0000,0x0000,0x0000,0x0000,0x0000,
    0x0000,0x0000,0x0000,0x0000,0x0000,0x0000,0x0000,0x0000,
    0x0000,0x0000,0x0000,0x0000,0x0000,0x0000,0x0000,0x0000,
    0x0000,0x0000,0x0000,0x0000,0x0000,0x0000,0x0000,0x0000
```

```
/************************************************************************/
/* pix_color.h by Marc Olano for the Eastman Kodak Company              */
/* all rights reserved by the Eastman Kodak Company                     */
/*                                                                      */
/* animated injection molding simulation display program                */
/* runs on SUN workstation and AT&T 900 series Pixel Machine            */
/* developed under Sun OS release 4.0.3                                 */
/*   AT&T Pixel Machines PIClib release 1.2                             */
/*                                                                      */
/* definitions and prototypes for pix_color.c                           */
/************************************************************************/ ifndef PIX_COLOR_H
define PIX_COLOR_H void init_colors();
/*
void init_colors();
    reads pressure and temperature color maps from $GLY_DIR/data/pressure.bin
      and $GLY_DIR/data/temperature.bin
    puts in global variables temp_surf[] and press_surf[];
    draws color bars with these color maps
    also defines global variable wall_surf
*/ endif PIX_COLOR_H
```

```
/**************************************************************************/
/* pix_draw.h by Marc Olano for the Eastman Kodak Company                 */
/* all rights reserved by the Eastman Kodak Company                       */
/*                                                                        */
/* animated injection molding simulation display program                  */
/* runs on SUN workstation and AT&T 900 series Pixel Machine              */
/* developed under Sun OS release 4.0.3                                   */
/*   AT&T Pixel Machines PIClib release 1.2                               */
/*                                                                        */
/* definitions and prototypes for pix_draw.c                              */
/**************************************************************************/ ifndef PIX_DRAW_H
define PIX_DRAW_H void draw();
/*
void draw()
   draws one frame of glyphs using information in curframe
*/ endif PIX_DRAW_H
```

```
/*********************************************************************/
/* pix_geometry.h by Marc Olano for the Eastman Kodak Company        */
/* all rights reserved by the Eastman Kodak Company                  */
/*                                                                   */
/* animated injection molding simulation display program             */
/* runs on SUN workstation and AT&T 900 series Pixel Machine         */
/* developed under Sun OS release 4.0.3                              */
/*   AT&T Pixel Machines PIClib release 1.2                          */
/*                                                                   */
/* definitions and prototypes for pix_geometry.c                     */
/*********************************************************************/ ifndef PIX_GEOMETRY_H
define PIX_GEOMETRY_H void read_geometry();
/*
void read_geometry()
  read binary geometry file
  sets global variables height_divisions[], height_midpoints[],
    backdistx, backdisty, numelements
  also creates global tables byte_to_deg[], byte_to_len[], byte_to_float[]
  format of the geometry file -- 32 bit binary IEEE floats:
    NUMSEGS (9) floats: finite difference divisions
    1 float: length in model coordinates of the back side of a glyph
    1 float: length in model coordinates of a maximum length glyph
    for each element:
      9 floats: x,y,z unit vectors -- z = element normal, +x = 0 deg rotation
      3 floats: center of element
      9 floats: corners of element -- for rods 3rd vertex == center
      1 float: glyph height -- half thickness of mold
*/ endif PIX_GEOMETRY_H
```

```
/*********************************************************************/
/* pix_globals.h by Marc Olano for the Eastman Kodak Company         */
/* all rights reserved by the Eastman Kodak Company                  */
/*                                                                   */
/* definitions from pix_globals.c                                    */
/*                                                                   */
/* definitions and declarations of global variables for the pixel    */
/* portion of the glyph visualization animation program              */
/*                                                                   */
/* since piclib.h does not check to see if it is already present, it */
/* is not included as part of this file, and must be included BEFORE */
/* including pix_globals.h                                           */
/*********************************************************************/ ifndef PIX_GLOBALS_H
define PIX_GLOBALS_H include "anim_pix.h"

/* screen background color */
#define BACKGROUND_R    0.8
#define BACKGROUND_G    0.8
#define BACKGROUND_B    0.8

/* screen window sizes */
extern int total_left, total_right, total_top, total_bottom;
extern int color_left, color_right, color_top, color_bottom;
extern int view_left, view_right, view_top, view_bottom;

/* surface characteristics for each color index */
extern PICsurface_model temp_surf[256];  /* glyph color map */
extern PICsurface_model pres_surf[256];  /* base plane color map */
extern PICsurface_model wall_surf;       /* mold wall color */

/* conversion tables */
extern float byte_to_deg[256];      /* byte to angle conversion table */
extern float byte_to_len[256];      /* byte to length conversion table */
extern float byte_to_float[256];    /* byte to float conversion table */

/* flag for element_type field of Geom_Info struct */
/* rods determined because the third vertex will be the same as the center */
#define ROD         2
define TRIANGLE    3 typedef struct {                /* geometry information structure */
    int element_type;           /* 2 for ROD, 3 for TRIANGLE */
    Point v1;                   /* first point of base triangle */
    Point v2;                   /*   second point */
    Point v3;                   /*   third point */
    Point ctr;                  /* center of base triangle */
    Point t;                    /* offset from base to top */
    float thickness;            /* half gap thickness of element */
    PICmatrix transform;        /* position, orientation, and scaling matrix */
} Geom_Info;

/* glyph geometry information */
extern float *height_divisions; /* array: divisions between glyph segments */
```

```
extern float *height_midpoints;  /* array: midpoint of glyph segments */
extern float back_x, back_y;     /* coordinates of back corner of glyph */ extern int num_elements;         /* number of glyphs read in */
extern Geom_Info *geometry;      /* array: element geometry information */

/* values from interface -- used by assorted draw_... functions */
extern Point glyph_scale;        /* length, width, and height scale */
extern int mold_wall;            /* 1 if mold wall is visible, 0 if not */
extern int empty_mold;           /* 1 if grey plane is shown for empty mold */
extern unsigned char vel_min, vel_max;    /* velocity display range */
extern unsigned char temp_min, temp_max;  /* temperature display range */ endif PIX_GLOBALS_H
```

```
/******************************************************************/
/* pix_init.h by Marc Olano for the Eastman Kodak Company          */
/* all rights reserved by the Eastman Kodak Company                */
/*                                                                 */
/* animated injection molding simulation display program           */
/* runs on SUN workstation and AT&T 900 series Pixel Machine       */
/* developed under Sun OS release 4.0.3                            */
/*   AT&T Pixel Machines PIClib release 1.2                        */
/*                                                                 */
/* definitions and prototypes for pix_init.c                       */
/******************************************************************/ ifndef PIX_INIT_H
define PIX_INIT_H void init_pixel();
/*
void init_pixel()
  initialize pixel machine
  draw color bars
  turn on lights
*/ endif PIX_INIT_H
```

```
/****************************************************************/
/* pix_pick.h by Marc Olano for the Eastman Kodak Company       */
/* all rights reserved by the Eastman Kodak Company             */
/*                                                              */
/* animated injection molding simulation display program        */
/* runs on SUN workstation and AT&T 900 series Pixel Machine    */
/* developed under Sun OS release 4.0.3                         */
/*   AT&T Pixel Machines PIClib release 1.2                     */
/*                                                              */
/* definitions and prototypes for pix_pick.c                    */
/****************************************************************/ ifndef PIX_PICK_H
define PIX_PICK_H void start_pick();
/*
void start_pick(int x, int y)
   turn on cursor at x,y
   draws one frame of glyphs using information in curframe
   each element is drawn in a distinct flat shaded color
*/ int pick();
/*
int pick(int x, int y)
   when called after start_pick() returns element number of element at x,y
*/ void done_pick();
/*
void done_pick()
   called when picking is over -- turn off cursor
*/ endif PIX_PICK_H
```

```
/* Format_version=1, Width=64, Height=64, Depth=1, Valid_bits_per_item=16
 */
        0xFFFF,0xFFFF,0xFFFF,0xFFFF,0x8000,0x0000,0x0000,0x0001,
        0x8000,0x0000,0x0000,0x0001,0x8000,0x0000,0x0000,0x0001,
        0x8000,0x0000,0x0000,0x0001,0x8000,0x0000,0x0000,0x0001,
        0x8000,0x0000,0x0000,0x0001,0x8000,0x0000,0x0000,0x0001,
        0x8000,0x00C0,0x0000,0x0001,0x8000,0x00F0,0x0000,0x0001,
        0x8000,0x00FC,0x0000,0x0001,0x8000,0x00FF,0x0000,0x0001,
        0x8000,0x00FF,0xC000,0x0001,0x8000,0x00FF,0xF000,0x0001,
        0x8000,0x00FF,0xFC00,0x0001,0x8000,0x00FF,0xFF00,0x0001,
        0x8000,0x00FF,0xFF00,0x0001,0x8000,0x00FF,0xFC00,0x0001,
        0x8000,0x00FF,0xF000,0x0001,0x8000,0x00FF,0xC000,0x0001,
        0x8000,0x00FF,0x0000,0x0001,0x8000,0x00FC,0x0000,0x0001,
        0x8000,0x00F0,0x0000,0x0001,0x8000,0x00C0,0x0000,0x0001,
        0x8000,0x0000,0x0000,0x0001,0x8000,0x0000,0x0000,0x0001,
        0x8000,0x0000,0x0000,0x0001,0x8000,0x0000,0x0000,0x0001,
        0x8000,0x0000,0x0000,0x0001,0x8000,0x0000,0x0000,0x0001,
        0x8000,0x0000,0x0000,0x0001,0xFFFF,0xFFFF,0xFFFF,0xFFFF,
        0x8000,0x0000,0x0000,0x0001,0x8000,0x0000,0x0000,0x0001,
        0x8000,0x7C38,0x0000,0x0001,0x8000,0x4208,0x0000,0x0001,
        0x8000,0x4208,0x0000,0x0001,0x8000,0x4208,0x3842,0x0001,
        0x8000,0x4208,0x4442,0x0001,0x8000,0x7C08,0x0422,0x0001,
        0x8000,0x4008,0x3C24,0x0001,0x8000,0x4008,0x4414,0x0001,
        0x8000,0x4008,0x4414,0x0001,0x8000,0x4008,0x3A08,0x0001,
        0x8000,0x0000,0x0008,0x0001,0x8000,0x0000,0x0010,0x0001,
        0xFFFF,0xFFFF,0xFF57,0xFFFF,0x0000,0x0000,0x0020,0x0000,
        0x0000,0x0000,0x0000,0x0000,0x0000,0x0000,0x0000,0x0000,
        0x0000,0x0000,0x0000,0x0000,0x0000,0x0000,0x0000,0x0000,
        0x0000,0x0000,0x0000,0x0000,0x0000,0x0000,0x0000,0x0000,
        0x0000,0x0000,0x0000,0x0000,0x0000,0x0000,0x0000,0x0000,
        0x0000,0x0000,0x0000,0x0000,0x0000,0x0000,0x0000,0x0000,
        0x0000,0x0000,0x0000,0x0000,0x0000,0x0000,0x0000,0x0000,
        0x0000,0x0000,0x0000,0x0000,0x0000,0x0000,0x0000,0x0000,
        0x0000,0x0000,0x0000,0x0000,0x0000,0x0000,0x0000,0x0000
```

```
/* Format_version=1, Width=64, Height=64, Depth=1, Valid_bits_per_item=16
*/
        0xFFFF,0xFFFF,0xFFFF,0xFFFF,0x8000,0x0000,0x0000,0x0001,
        0x8000,0x0000,0x0000,0x0001,0x8000,0x0000,0x0000,0x0001,
        0x8000,0x0000,0x0000,0x0001,0x8000,0x0000,0x0000,0x0001,
        0x8000,0x0000,0x0000,0x0001,0x8000,0x0000,0x0000,0x0001,
        0x8000,0x0000,0x0300,0x0001,0x8000,0x0000,0x0F00,0x0001,
        0x8000,0x0000,0x3F00,0x0001,0x8000,0x0000,0xFF00,0x0001,
        0x8000,0x0003,0xFF00,0x0001,0x8000,0x000F,0xFF00,0x0001,
        0x8000,0x003F,0xFF00,0x0001,0x8000,0x00FF,0xFF00,0x0001,
        0x8000,0x00FF,0xFF00,0x0001,0x8000,0x003F,0xFF00,0x0001,
        0x8000,0x000F,0xFF00,0x0001,0x8000,0x0003,0xFF00,0x0001,
        0x8000,0x0000,0xFF00,0x0001,0x8000,0x0000,0x3F00,0x0001,
        0x8000,0x0000,0x0F00,0x0001,0x8000,0x0000,0x0300,0x0001,
        0x8000,0x0000,0x0000,0x0001,0x8000,0x0000,0x0000,0x0001,
        0x8000,0x0000,0x0000,0x0001,0x8000,0x0000,0x0000,0x0001,
        0x8000,0x0000,0x0000,0x0001,0x8000,0x0000,0x0000,0x0001,
        0x8000,0x0000,0x0000,0x0001,0xFFFF,0xFFFF,0xFFFF,0xFFFF,
        0x8000,0x0000,0x0000,0x0001,0x8000,0x0000,0x0000,0x0001,
        0x87C0,0x0000,0x0000,0x0001,0x8420,0x0000,0x0000,0x0001,
        0x8420,0x0000,0x0000,0x0001,0x8423,0xC423,0xC5C3,0xC3C1,
        0x87C4,0x2424,0x2624,0x2421,0x8484,0x2424,0x2404,0x0421,
        0x8447,0xE247,0xE403,0xC7E1,0x8444,0x0244,0x0400,0x2401,
        0x8424,0x2184,0x2404,0x2421,0x8423,0xC183,0xC403,0xC3C1,
        0x8000,0x0000,0x0000,0x0001,0x8000,0x0000,0x0000,0x0001,
        0xFFFF,0xFFFF,0xFFFF,0xFFFF,0x0000,0x0000,0x0000,0x0000,
        0x0000,0x0000,0x0000,0x0000,0x0000,0x0000,0x0000,0x0000,
        0x0000,0x0000,0x0000,0x0000,0x0000,0x0000,0x0000,0x0000,
        0x0000,0x0000,0x0000,0x0000,0x0000,0x0000,0x0000,0x0000,
        0x0000,0x0000,0x0000,0x0000,0x0000,0x0000,0x0000,0x0000,
        0x0000,0x0000,0x0000,0x0000,0x0000,0x0000,0x0000,0x0000,
        0x0000,0x0000,0x0000,0x0000,0x0000,0x0000,0x0000,0x0000,
        0x0000,0x0000,0x0000,0x0000,0x0000,0x0000,0x0000,0x0000,
        0x0000,0x0000,0x0000,0x0000,0x0000,0x0000,0x0000,0x0000
```

```
/* Format_version=1, Width=16, Height=16, Depth=1, Valid_bits_per_item=16
 */
    0xC000,0xF000,0xFC00,0xFF00,0xFFC0,0xFFF0,0xFFFC,0xFFFF,
    0xFFFF,0xFFFC,0xFFF0,0xFFC0,0xFF00,0xFC00,0xF000,0xC000
```

```
/* Format_version=1, Width=16, Height=16, Depth=1, Valid_bits_per_item=16
 */
        0xFF80,0xD240,0xA920,0xD490,0xAA48,0xD524,0xAA92,0xD549,
        0xAAC9,0xD592,0xAB24,0xD648,0xAC90,0xD920,0xB240,0xFF80
```

```
/* Format_version=1, Width=64, Height=64, Depth=1, Valid_bits_per_item=16
 */
        0xFFFF,0xFFFF,0xFFFF,0xFFFF,0x8000,0x0000,0x0000,0x0001,
        0x8000,0x0000,0x0000,0x0001,0x8000,0x0003,0x8000,0x0001,
        0x8000,0x0007,0xC000,0x0001,0x8000,0x0007,0xC000,0x0001,
        0x8000,0x0007,0xC000,0x0001,0x8000,0x0007,0xC000,0x0001,
        0x8000,0x001F,0xF000,0x0001,0x8001,0xE07F,0xFC0F,0x0001,
        0x8001,0xF1F3,0x9F1F,0x0001,0x8001,0xFF83,0x83FF,0x0001,
        0x8001,0xFE03,0x80FF,0x0001,0x8000,0xFC03,0x807E,0x0001,
        0x8000,0x7C0F,0xE07C,0x0001,0x8000,0x7E33,0x98FC,0x0001,
        0x8000,0x6743,0x85CC,0x0001,0x8000,0xC383,0x8386,0x0001,
        0x8000,0xC1C3,0x8706,0x0001,0x8001,0x82E3,0x8E83,0x0001,
        0x8001,0x8477,0xDC43,0x0001,0x8003,0x843B,0xB843,0x8001,
        0x8003,0x081F,0xF021,0x8001,0x803F,0x082F,0xE821,0xF801,
        0x807F,0xFFFF,0xFFFF,0xFC01,0x807F,0xFFFF,0xFFFF,0xFC01,
        0x807F,0xFFFF,0xFFFF,0xFC01,0x803F,0x082F,0xE821,0xF801,
        0x8003,0x081F,0xF021,0x8001,0x8003,0x843B,0xB843,0x8001,
        0x8001,0x8477,0xDC43,0x0001,0x8001,0x82E3,0x8E83,0x0001,
        0x8000,0xC1C3,0x8706,0x0001,0x8000,0xC383,0x8386,0x0001,
        0x8000,0x6743,0x85CC,0x0001,0x8000,0x7E33,0x98FC,0x0001,
        0x8000,0x7C0F,0xE07C,0x0001,0x8000,0xFC03,0x807E,0x0001,
        0x8001,0xFE03,0x80FF,0x0001,0x8001,0xFF83,0x83FF,0x0001,
        0x8001,0xF1F3,0x9F1F,0x0001,0x8001,0xE07F,0xFC0F,0x0001,
        0x8000,0x001F,0xF000,0x0001,0x8000,0x0007,0xC000,0x0001,
        0x8000,0x0007,0xC000,0x0001,0x8000,0x0007,0xC000,0x0001,
        0x8000,0x0007,0xC000,0x0001,0x8000,0x0003,0x8000,0x0001,
        0x8000,0x0000,0x0000,0x0001,0x8000,0x0000,0x0000,0x0001,
        0xFFFF,0xFFFF,0xFFFF,0xFFFF,0x0000,0x0000,0x0000,0x0000,
        0x0000,0x0080,0x0004,0x0000,0x0000,0x0000,0x0004,0x0000,
        0x5871,0x1383,0x471F,0x1C58,0x6489,0x1084,0xC884,0x2264,
        0x4409,0x1084,0x4084,0x2240,0x4478,0xA084,0x4784,0x2240,
        0x4488,0xA084,0x4884,0x2240,0x4488,0x4084,0xC884,0x2240,
        0x4478,0x4083,0x4783,0x1C40,0x0000,0x0000,0x4000,0x0000,
        0x0000,0x0004,0x4000,0x0000,0x0000,0x0003,0x8000,0x0000
```

```
/* Format_version=1, Width=64, Height=64, Depth=1, Valid_bits_per_item=16
 */
        0xFFFF,0xFFFF,0xFFFF,0xFFFF,0x8000,0x0000,0x0000,0x0001,
        0x8000,0x0000,0x0000,0x0001,0x8000,0x0000,0x0000,0x0001,
        0x8000,0x0000,0x0000,0x0001,0x8000,0x0000,0x0000,0x0001,
        0x8000,0x0000,0x0000,0x0001,0x8000,0x0000,0x0000,0x0001,
        0x8000,0x00FF,0xFF00,0x0001,0x8000,0x00FF,0xFF00,0x0001,
        0x8000,0x00FF,0xFF00,0x0001,0x8000,0x00FF,0xFF00,0x0001,
        0x8000,0x00FF,0xFF00,0x0001,0x8000,0x00FF,0xFF00,0x0001,
        0x8000,0x00FF,0xFF00,0x0001,0x8000,0x00FF,0xFF00,0x0001,
        0x8000,0x00FF,0xFF00,0x0001,0x8000,0x00FF,0xFF00,0x0001,
        0x8000,0x00FF,0xFF00,0x0001,0x8000,0x00FF,0xFF00,0x0001,
        0x8000,0x00FF,0xFF00,0x0001,0x8000,0x00FF,0xFF00,0x0001,
        0x8000,0x00FF,0xFF00,0x0001,0x8000,0x0000,0x0000,0x0001,
        0x8000,0x0000,0x0000,0x0001,0x8000,0x0000,0x0000,0x0001,
        0x8000,0x0000,0x0000,0x0001,0x8000,0x0000,0x0000,0x0001,
        0x8000,0x0000,0x0000,0x0001,0x8000,0x0000,0x0000,0x0001,
        0x8000,0x0000,0x0000,0x0001,0xFFFF,0xFFFF,0xFFFF,0xFFFF,
        0x8000,0x0000,0x0000,0x0001,0x8000,0x0000,0x0000,0x0001,
        0x8000,0x3C10,0x0000,0x0001,0x8000,0x4210,0x0000,0x0001,
        0x8000,0x4210,0x0000,0x0001,0x8000,0x207C,0x3C5C,0x0001,
        0x8000,0x1810,0x4262,0x0001,0x8000,0x0410,0x4242,0x0001,
        0x8000,0x0210,0x4242,0x0001,0x8000,0x4210,0x4242,0x0001,
        0x8000,0x4212,0x4262,0x0001,0x8000,0x3C0C,0x3C5C,0x0001,
        0x8000,0x0000,0x0040,0x0001,0x8000,0x0000,0x0040,0x0001,
        0xFFFF,0xFFFF,0xFF5F,0xFFFF,0x0000,0x0000,0x0040,0x0000,
        0x0000,0x0000,0x0000,0x0000,0x0000,0x0000,0x0000,0x0000,
        0x0000,0x0000,0x0000,0x0000,0x0000,0x0000,0x0000,0x0000,
        0x0000,0x0000,0x0000,0x0000,0x0000,0x0000,0x0000,0x0000,
        0x0000,0x0000,0x0000,0x0000,0x0000,0x0000,0x0000,0x0000,
        0x0000,0x0000,0x0000,0x0000,0x0000,0x0000,0x0000,0x0000,
        0x0000,0x0000,0x0000,0x0000,0x0000,0x0000,0x0000,0x0000,
        0x0000,0x0000,0x0000,0x0000,0x0000,0x0000,0x0000,0x0000,
        0x0000,0x0000,0x0000,0x0000,0x0000,0x0000,0x0000,0x0000
```

```
/****************************************************************/
/* sunutil.h by Marc Olano                                      */
/*                                                              */
/* prototypes for functions from sunutil.c                      */
/*                                                              */
/* functions to make sunwindows access easier                   */
/****************************************************************/ ifndef SUNUTIL_H
define SUNUTIL_H include <suntool/sunview.h>
include <suntool/panel.h> extern int confirm();
/*
  int confirm(char message[])
  makes a confirmer window with the message printed in it and
  two buttons, NO and YES
  returns 1 if YES was pressed or 0 if NO was pressed
*/ extern void mess();
/*
  void mess(char message[])
  makes a message window with the message printed in it
*/ extern Panel_item make_button();
/*
  Panel_item make_button(Panel panel, char *label, void (*notify_proc)())
  makes a normal sunview button with given label
  notify_proc() is called when the button is pushed
*/ extern Panel_item make_text_button();
/*
  Panel_item make_text_button(Panel panel, char *label, void (*notify_proc())
  makes a button without a border around it
*/ extern char *typein();
/*
  char *typein(char *message, int typein_len, char *init_text)
  creates a prompt box for single line text entry
  message is a prompt string
  typein_len is the maximum number of characters of the typed string
  init_text is an default value for the string (it can be edited)
  returns the typed string or NULL if the typein box was cancelled
*/ extern void error_box();
/*
  void error_box(char *err_str);
  just like unix system perror() except message is displayed in a window
    instead of stderr
  if err_str is NULL, an error message is displayed for the most recent error
  if err_str is not NULL, err_str, a colon, and the error message are shown
*/ endif SUNUTIL_H
```

```
/* Format_version=1, Width=64, Height=64, Depth=1, Valid_bits_per_item=16
*/
        0xFFFF,0xFFFF,0xFFFF,0xFFFF,0xF000,0x1E00,0x0000,0x0001,
        0xBE00,0x2000,0x0000,0x0001,0xB1E0,0x7800,0x0000,0x0001,
        0x901C,0xE400,0x0000,0x0001,0x9003,0x1000,0x0000,0x0001,
        0x907D,0x1000,0x0000,0x0001,0x9086,0x0000,0x0000,0x0001,
        0x8904,0x0000,0x0000,0x0001,0x893C,0x0000,0x0000,0x0001,
        0x8A7C,0x0000,0x0000,0x0001,0x8578,0x0000,0x0000,0x0001,
        0x8530,0x0000,0x0000,0x0001,0x83E0,0x0000,0x0000,0x0001,
        0x8180,0x0000,0x0000,0x0001,0x8100,0x8000,0x0000,0x0001,
        0x8100,0x4000,0x0000,0x0001,0x8100,0x0000,0x0000,0x0001,
        0x8200,0x0000,0x0000,0x0001,0x8400,0x0800,0x0000,0x0001,
        0x8000,0x3C00,0x0000,0x0001,0x8000,0xD800,0x0000,0x0001,
        0x8000,0x1480,0x0000,0x0001,0x8000,0x2440,0x0000,0x0001,
        0x8000,0x2400,0x0000,0x0001,0x8000,0x4000,0x0000,0x0001,
        0x8000,0x4008,0x0000,0x0001,0x8000,0x8004,0x0000,0x0001,
        0x8000,0x8000,0x0000,0x0001,0x8000,0x8000,0x0000,0x0001,
        0x8000,0x8000,0x8000,0x0001,0xFFFF,0xFFFF,0xFFFF,0xFFFF,
        0x8000,0x0000,0x0000,0x0001,0x8000,0x0000,0x0000,0x0001,
        0x8000,0xFE08,0x3810,0x0001,0x8000,0x1008,0x0810,0x0001,
        0x8000,0x1000,0x0810,0x0001,0x8000,0x1038,0x087C,0x0001,
        0x8000,0x1008,0x0810,0x0001,0x8000,0x1008,0x0810,0x0001,
        0x8000,0x1008,0x0810,0x0001,0x8000,0x1008,0x0810,0x0001,
        0x8000,0x1008,0x0812,0x0001,0x8000,0x1008,0x080C,0x0001,
        0x8000,0x0000,0x0000,0x0001,0x8000,0x0000,0x0000,0x0001,
        0xFFFF,0xFFFF,0xFFFF,0xFFFF,0x0000,0x0000,0x0000,0x0000,
        0x0000,0x0000,0x0000,0x0000,0x0000,0x0000,0x0000,0x0000,
        0x0000,0x0000,0x0000,0x0000,0x0000,0x0000,0x0000,0x0000,
        0x0000,0x0000,0x0000,0x0000,0x0000,0x0000,0x0000,0x0000,
        0x0000,0x0000,0x0000,0x0000,0x0000,0x0000,0x0000,0x0000,
        0x0000,0x0000,0x0000,0x0000,0x0000,0x0000,0x0000,0x0000,
        0x0000,0x0000,0x0000,0x0000,0x0000,0x0000,0x0000,0x0000,
        0x0000,0x0000,0x0000,0x0000,0x0000,0x0000,0x0000,0x0000,
        0x0000,0x0000,0x0000,0x0000,0x0000,0x0000,0x0000,0x0000
```

```
/* Format_version=1, Width=64, Height=64, Depth=1, Valid_bits_per_item=16
*/
        0xFFFF,0xFFFF,0xFFFF,0xFFFF,0xF000,0x1E00,0x0000,0x0001,
        0xBE00,0x2000,0x0000,0x0001,0xB1E0,0x7800,0x0000,0x0001,
        0x901C,0xE400,0x0000,0x0001,0x9003,0x1000,0x0000,0x0001,
        0x907D,0x1000,0x0000,0x0001,0x9086,0x0000,0x0000,0x0001,
        0x8904,0x0000,0x0000,0x0001,0x893C,0x0870,0x0000,0x0001,
        0x8A7C,0x0990,0x0000,0x0001,0x8578,0x1610,0x0000,0x0001,
        0x8530,0x1820,0x0000,0x0001,0x83E0,0x1E20,0x0000,0x0001,
        0x8180,0x0040,0x0000,0x0001,0x8100,0x8040,0x0000,0x0001,
        0x8100,0x4080,0x0000,0x0001,0x8100,0x0100,0x0000,0x0001,
        0x8202,0x0200,0x0000,0x0001,0x8404,0x0A00,0x0000,0x0001,
        0x8008,0x0400,0x0000,0x0001,0x8008,0x1800,0x0000,0x0001,
        0x8010,0x2080,0x0000,0x0001,0x8010,0x4040,0x0000,0x0001,
        0x8021,0x8000,0x0000,0x0001,0x8026,0x0000,0x0000,0x0001,
        0x8038,0x0008,0x0000,0x0001,0x8000,0x0004,0x0000,0x0001,
        0x8000,0x0000,0x0000,0x0001,0x8000,0x0000,0x0000,0x0001,
        0x8000,0x0000,0x8000,0x0001,0xFFFF,0xFFFF,0xFFFF,0xFFFF,
        0x8000,0x0000,0x0000,0x0001,0x8000,0x0000,0x0000,0x0001,
        0x800F,0xE000,0x8001,0x0001,0x8001,0x0000,0x8001,0x0001,
        0x8001,0x0000,0x0001,0x0001,0x8001,0x0823,0x83C7,0xC001,
        0x8001,0x0820,0x8421,0x0001,0x8001,0x0920,0x8401,0x0001,
        0x8001,0x0920,0x83C1,0x0001,0x8001,0x0920,0x8021,0x0001,
        0x8001,0x0920,0x8421,0x2001,0x8001,0x06C0,0x83C0,0xC001,
        0x8000,0x0000,0x0000,0x0001,0x8000,0x0000,0x0000,0x0001,
        0xFFFF,0xFFFF,0xFFFF,0xFFFF,0x0000,0x0000,0x0000,0x0000,
        0x0000,0x0000,0x0000,0x0000,0x0000,0x0000,0x0000,0x0000,
        0x0000,0x0000,0x0000,0x0000,0x0000,0x0000,0x0000,0x0000,
        0x0000,0x0000,0x0000,0x0000,0x0000,0x0000,0x0000,0x0000,
        0x0000,0x0000,0x0000,0x0000,0x0000,0x0000,0x0000,0x0000,
        0x0000,0x0000,0x0000,0x0000,0x0000,0x0000,0x0000,0x0000,
        0x0000,0x0000,0x0000,0x0000,0x0000,0x0000,0x0000,0x0000,
        0x0000,0x0000,0x0000,0x0000,0x0000,0x0000,0x0000,0x0000,
        0x0000,0x0000,0x0000,0x0000,0x0000,0x0000,0x0000,0x0000
```

```
/* Format_version=1, Width=16, Height=16, Depth=1, Valid_bits_per_item=16
 */
        0x0180,0x0180,0x03C0,0x03C0,0x07E0,0x07E0,0x0FF0,0x0FF0,
        0x1FF8,0x1FF8,0x3FFC,0x3FFC,0x7FFE,0x7FFE,0xFFFF,0xFFFF
```

```c
/****************************************************************/
/* util.h by Marc Olano                                         */
/*                                                              */
/* definitions of functions from util.c                         */
/*                                                              */
/* some non-window utility functions used by the gly_* programs */
/****************************************************************/ ifndef UTIL_H
define UTIL_H

/* list of functions to call in response to some event */
typedef struct handler_list_struct {
   int (*handler)();      /* int func(void *data, void *data) */
                          /*   data1 is an arbitrary word-sized data parameter */
                          /*      (int, float, or pointer) passed to all */
                          /*      functions in the list from the caller */
                          /*   data2 is the data field of this structure */
                          /*   returns 1 if event has been handled and no more */
                          /*      functions should be called from list */
                          /*   returns 0 if the next function should be called */
   void *data;            /* arbitrary word data passed to function when called */
   struct handler_list_struct *next;   /* next function in list */
} *Handler_List;

void add_handler();
/*
void add_handler(Handler_List *list, int (*handler)(), void *data)
   add a new handler function (with associated word-sized data) to a list
   for the first call, the list variable should be initialized to NULL
*/ int do_handler();
/*
void do_handler(Handler_List list, void *data)
   call functions in list until one returns 1 or the end of the list
   each function is passed the word data parameter "data" and it's own
      internal data field
   returns 1 if any function in the list returned 1
   returns 0 if all functions returned 0
*/ extern int file_check();
/*
   int file_check(char filename[], char mode[])
   returns true if filename can be opened in given fopen mode
*/ extern char *make_strcat();
/*
   char *make_strcat(char *str1, char *str2, ..., NULL)
   allocates space for and concatenates a list of strings (terminated by a NULL)
   example: string = make_strcat(gly_dir,"/",file,NULL);
*/ extern void error_exit();
/*
   void error_exit(char err_str[])
   print perror error message and exit
*/
```

```c
extern char *get_gly_dir();
/*
   char *get_gly_dir()
   return GLY_DIR enviornment variable (base program directory)
   if GLY_DIR does not exist, create a local entry that says "GLY_DIR=."
      (i.e. use current directory as GLY_DIR)
*/ extern char *gly_data_dir_arg();
/*
   char *gly_data_dir_arg(char *dir_arg)
   return GLY_DATA (base program directory) given in a command line argument
   set GLY_DATA environment variable for children processes
*/ extern char *get_gly_data_dir();
/*
   char *get_gly_data_dir()
   return GLY_DATA enviornment variable (base data directory)
   if GLY_DATA does not exist, create a local entry that says "GLY_DATA=."
      (i.e. use current directory as GLY_DATA)
*/ char *get_environment_var();
/*
char *get_environment_var(char *var_name, char *default_val)
   return environment variable value
   if variable does not exist, create a local entry with the default value
      and return the default value
*/ char *set_environment_var();
/*
char *set_environment_var(char *var_name, char *value)
   set environment variable in the local copy of the environment
   return new value of environment variable
*/ endif UTIL_H
```

```
/* Format_version=1, Width=64, Height=64, Depth=1, Valid_bits_per_item=16
 */
        0xFFFF,0xFFFF,0xFFFF,0xFFFF,0x8000,0x0000,0x0000,0x0001,
        0x8000,0x0000,0x0000,0x0001,0x8000,0x0030,0x0000,0x0001,
        0x8000,0x00C0,0x0000,0x0001,0x8000,0x0300,0x0000,0x0001,
        0x8000,0x2C00,0x0000,0x0001,0x8000,0x7C00,0x0000,0x0001,
        0x8000,0x0180,0x0000,0x0001,0x8000,0x0678,0x0000,0x0001,
        0x8003,0xEFFE,0x0000,0x0001,0x8006,0x4802,0x0000,0x0001,
        0x8018,0x0803,0x0000,0x0001,0x8060,0x0FFF,0xF000,0x0001,
        0x8080,0x0800,0x1000,0x0001,0x8000,0x0800,0x1000,0x0001,
        0x8000,0x0800,0x1C00,0x0001,0x8000,0x0FFF,0xFF80,0x0001,
        0x8000,0x0800,0x0080,0x0001,0x8000,0x0800,0x0080,0x0001,
        0x8000,0x0800,0x0080,0x0001,0x8000,0x0800,0x0080,0x0001,
        0x8000,0x0FFF,0xFF80,0x0001,0x8000,0x0800,0x1000,0x0001,
        0x8000,0x0800,0x1000,0x0001,0x8000,0x0800,0x1000,0x0001,
        0x8000,0x0FFF,0xF000,0x0001,0x8000,0x0802,0x0000,0x0001,
        0x8000,0x0802,0x0000,0x0001,0x8000,0x0FFE,0x0000,0x0001,
        0x8000,0x0000,0x0000,0x0001,0xFFFF,0xFFFF,0xFFFF,0xFFFF,
        0x8000,0x0000,0x0000,0x0001,0x8000,0x0000,0x0000,0x0001,
        0x8008,0x2080,0x2104,0x0001,0x8008,0x2080,0x2104,0x0001,
        0x8008,0x2000,0x2104,0x0001,0x8009,0x2383,0xA7C5,0xC001,
        0x8005,0x4084,0x6106,0x2001,0x8005,0x4084,0x2104,0x2001,
        0x8005,0x4084,0x2104,0x2001,0x8002,0x8084,0x2104,0x2001,
        0x8002,0x8084,0x6124,0x2001,0x8002,0x8083,0xA0C4,0x2001,
        0x8000,0x0000,0x0000,0x0001,0x8000,0x0000,0x0000,0x0001,
        0xFFFF,0xFFFF,0xFFFF,0xFFFF,0x0000,0x0000,0x0000,0x0000,
        0x0000,0x0000,0x0000,0x0000,0x0000,0x0000,0x0000,0x0000,
        0x0000,0x0000,0x0000,0x0000,0x0000,0x0000,0x0000,0x0000,
        0x0000,0x0000,0x0000,0x0000,0x0000,0x0000,0x0000,0x0000,
        0x0000,0x0000,0x0000,0x0000,0x0000,0x0000,0x0000,0x0000,
        0x0000,0x0000,0x0000,0x0000,0x0000,0x0000,0x0000,0x0000,
        0x0000,0x0000,0x0000,0x0000,0x0000,0x0000,0x0000,0x0000,
        0x0000,0x0000,0x0000,0x0000,0x0000,0x0000,0x0000,0x0000,
        0x0000,0x0000,0x0000,0x0000,0x0000,0x0000,0x0000,0x0000
```

```
/*
 * /voxel/hyper/cursors/aim.h
 * Edit 5
 * Tue Dec 15 14:34:08 1987
 */ static DEVcursor aim_plus = { 15, 15,
        0x00010000,     0x00010000,     0x00010000,     0x00010000,
        0x00010000,     0x00010000,     0x00010000,     0x00010000,
        0x00010000,     0x00010000,     0x00010000,     0x00010000,
        0x00010000,     0x00010000,     0x00010000,     0xffffffff,
        0x00010000,     0x00010000,     0x00010000,     0x00010000,
        0x00010000,     0x00010000,     0x00010000,     0x00010000,
        0x00010000,     0x00010000,     0x00010000,     0x00010000,
        0x00010000,     0x00010000,     0x00010000,     0x00010000
        };

static DEVcursor aim_x = { 15, 15,
        0x80000001,     0x40000002,     0x20000004,     0x10000008,
        0x08000010,     0x04000020,     0x02000040,     0x01000080,
        0x00800100,     0x00400200,     0x00200400,     0x00100800,
        0x00081000,     0x00042000,     0x00024000,     0x00018000,
        0x00018000,     0x00024000,     0x00042000,     0x00081000,
        0x00100800,     0x00200400,     0x00400200,     0x00800100,
        0x01000080,     0x02000040,     0x04000020,     0x08000010,
        0x10000008,     0x20000004,     0x40000002,     0x80000001
        };

static DEVcursor aim_frame = { 15, 15,
        0xffffffff,     0x80000001,     0x80000001,     0x80000001,
        0x80000001,     0x80000001,     0x80000001,     0x80000001,
        0x80000001,     0x80000001,     0x80000001,     0x80000001,
        0x80010001,     0x80010001,     0x80010001,     0x800ff001,
        0x80010001,     0x80010001,     0x80010001,     0x80000001,
        0x80000001,     0x80000001,     0x80000001,     0x80000001,
        0x80000001,     0x80000001,     0x80000001,     0x80000001,
        0x80000001,     0x80000001,     0x80000001,     0xffffffff
        };

static DEVcursor frame32 = { 15, 15,
        0xffffffff,     0x80000001,     0x80000001,     0x80000001,
        0x80000001,     0x80000001,     0x80000001,     0x80000001,
        0x80000001,     0x80000001,     0x80000001,     0x80000001,
        0x80000001,     0x80000001,     0x80000001,     0x80000001,
        0x80000001,     0x80000001,     0x80000001,     0x80000001,
        0x80000001,     0x80000001,     0x80000001,     0x80000001,
        0x80000001,     0x80000001,     0x80000001,     0x80000001,
        0x80000001,     0x80000001,     0x80000001,     0xffffffff
        };

static DEVcursor frame16 = { 15, 15,
        0x00000000,     0x00000000,     0x00000000,     0x00000000,
        0x00000000,     0x00000000,     0x00000000,     0x00000000,
        0x00ffff00,     0x00800100,     0x00800100,     0x00800100,
```

```
        0x00800100,      0x00800100,     0x00800100,     0x00800100,
        0x00800100,      0x00800100,     0x00800100,     0x00800100,
        0x00800100,      0x00800100,     0x00800100,     0x00ffff00,
        0x00000000,      0x00000000,     0x00000000,     0x00000000,
        0x00000000,      0x00000000,     0x00000000,     0x00000000
        };

static DEVcursor frame8 = { 15, 15,
        0x00000000,      0x00000000,     0x00000000,     0x00000000,
        0x00000000,      0x00000000,     0x00000000,     0x00000000,
        0x00000000,      0x00000000,     0x00000000,     0x00000000,
        0x000ff000,      0x00081000,     0x00081000,     0x00081000,
        0x00081000,      0x00081000,     0x00081000,     0x000ff000,
        0x00000000,      0x00000000,     0x00000000,     0x00000000,
        0x00000000,      0x00000000,     0x00000000,     0x00000000,
        0x00000000,      0x00000000,     0x00000000,     0x00000000
        };

static DEVcursor aim = { 0, 0,
        0xf01e0000, 0x80020000, 0x80020000, 0x80020000,
        0x0, 0x1000000, 0x1000000, 0x7c00000,
        0x1000000, 0x1000000, 0x0, 0x80020000,
        0x80020000, 0x80020000, 0xf01e0000, 0x0,
        0x0, 0x0, 0x0, 0x0,
        0x0, 0x0, 0x0, 0x0,
        0x0, 0x0, 0x0, 0x0,
        0x0, 0x0, 0x0, 0x0,
        };

static DEVcursor target = { 8, 8,
        0x7e00000, 0x1ff80000, 0x381c0000, 0x63c60000,
        0x6ff60000, 0xcc330000, 0xd99b0000, 0xdbdb0000,
        0xdbdb0000, 0xd99b0000, 0xcc330000, 0x6ff60000,
        0x63c60000, 0x381c0000, 0x1ff80000, 0x7e00000,
        0x0, 0x0, 0x0, 0x0,
        0x0, 0x0, 0x0, 0x0,
        0x0, 0x0, 0x0, 0x0,
        0x0, 0x0, 0x0, 0x0,
        };

static DEVcursor target1 = { 8, 8,
        0x7e00000, 0x1ff80000, 0x399c0000, 0x63c60000,
        0x6ff60000, 0xcdb30000, 0xd99b0000, 0xffff0000,
        0xffff0000, 0xd99b0000, 0xcdb30000, 0x6ff60000,
        0x63c60000, 0x399c0000, 0x1ff80000, 0x7e00000,
        0x0, 0x0, 0x0, 0x0,
        0x0, 0x0, 0x0, 0x0,
        0x0, 0x0, 0x0, 0x0,
        0x0, 0x0, 0x0, 0x0,
        };
```

What is claimed is:

1. A real-time animation system for producing an animation display of physical phenomena, wherein said physical phenomena is represented by simulation data generated by simulation programs, the real-time animation system comprising:

host processing means for generating a stock geometrical element in the form of floating point geometrical element simulation data and byte width variable simulation data resulting from execution of a simulation program describing the physical phenomena;

graphics processing means for generating element transformation matrices determined by the floating point geometrical element simulation data generated by the host processing means and for generating layer transformation matrices determined by the element transformation matrices and the variable simulation data;

communication means for transferring the geometrical element simulation data and the variable simulation data from the host processing means to the graphics processing means; and wherein the graphics processing means generates a plurality of glyphs by combining the layer transformation matrices and the stock geometric element, each of the plurality of glyphs providing a geometrical representation of the physical phenomena for selected time periods of the simulation.

2. The real time animation system as claimed in claim 1, further comprising animation display means for displaying the glyphs generated by the graphics processing means.

3. The real time animation system as claimed in claim 2, further comprising a user interface for supplying user variable data to the host processing means, wherein the host processing means supplies the user variable data to the graphics processing means via the communication means and the graphics processing means modifies the element transformation matrices determined by the user variable data.

4. The real-time animation system of claim 3, further comprising a user interface display means coupled to the host processing means for displaying graphic representations of the user variable data.

5. The real-time animation system as claimed in claim 4, further comprising means for selecting one of the glyphs displayed by the animation display means and displaying data related to the selected glyph on the user interface display means.

6. A method of providing a real-time animation display of a physical phenomena capable of being represented by simulation data generated by simulation programs, said method comprising the steps of:

calculating a stock geometrical element in the form of floating point geometrical element simulation data and generating byte width variable simulation data from a simulation of the physical phenomena with a host processor resulting from a simulation program;

supplying the stock geometrical element to a graphics processor;

with said graphic processor, generating element transformation matrices determined by the floating point geometrical element simulation data;

supplying the byte width variable simulation data to the graphics processor;

with said graphics processor, generating layer transformation matrices determined by the element transformation matrices and the variable simulation data;

combining the layer transformation matrices and the stock geometric element with the graphics processor to generate a plurality of glyphs; and displaying the plurality of glyphs on an animation display monitor, each glyph visually representing by its structure a simulation parameter.

7. The method of providing a real time animation display as claimed in claim 6, further comprising the steps of:

entering user variable data into the host processor via a user interface, supplying the user variable data to the graphics processor, and modifying the element transformation matrices determined by the user variable data with the graphics processor.

8. The method of providing a real time animation display as claimed in claim 7, further comprising the steps of:

selecting one of the glyphs displayed on the animation display monitor with the user interface and displaying scalar variable data associated therewith on a user interface display monitor.

\* \* \* \* \*